US012078745B2

(12) United States Patent
Kishigami et al.

(10) Patent No.: US 12,078,745 B2
(45) Date of Patent: Sep. 3, 2024

(54) RADAR DEVICE

(71) Applicant: Panasonic Intellectual Property Management Co., Ltd., Osaka (JP)

(72) Inventors: Takaaki Kishigami, Tokyo (JP); Kenta Iwasa, Tokyo (JP); Hidekuni Yomo, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 408 days.

(21) Appl. No.: 17/439,682

(22) PCT Filed: Feb. 14, 2020

(86) PCT No.: PCT/JP2020/005749
§ 371 (c)(1),
(2) Date: Sep. 15, 2021

(87) PCT Pub. No.: WO2020/189116
PCT Pub. Date: Sep. 24, 2020

(65) Prior Publication Data
US 2022/0163623 A1     May 26, 2022

(30) Foreign Application Priority Data

Mar. 20, 2019   (JP) ................ 2019-053751

(51) Int. Cl.
*G01S 7/00*    (2006.01)
*G01S 7/03*    (2006.01)
(Continued)

(52) U.S. Cl.
CPC .......... *G01S 7/032* (2013.01); *G01S 13/4463* (2013.01); *H01Q 21/065* (2013.01); *H04B 7/0413* (2013.01)

(58) Field of Classification Search
CPC ... G01S 7/032; G01S 13/4463; H01Q 21/065; H04B 7/0413
See application file for complete search history.

(56) References Cited

U.S. PATENT DOCUMENTS

| | | | |
|---|---|---|---|
| 9,869,762 B1* | 1/2018 | Alland | H01Q 21/08 |
| 2011/0298676 A1* | 12/2011 | Yanagihara | H01Q 21/06 |
| | | | 343/893 |

(Continued)

FOREIGN PATENT DOCUMENTS

| | | |
|---|---|---|
| CN | 106546983 A | 3/2017 |
| CN | 106662637 A | 5/2017 |

(Continued)

OTHER PUBLICATIONS

Japanese Notice of Reasons for Refusal dated Feb. 6, 2024, for the corresponding Japanese Patent Application No. 2023-014575, 7 pages. (With English Machine Translation).

(Continued)

*Primary Examiner* — Ladimir Magloire
*Assistant Examiner* — Samarina Makhdoom
(74) *Attorney, Agent, or Firm* — Seed IP Law Group LLP

(57) ABSTRACT

Each of the plurality of transmission antenna groups includes a plurality of transmission antennas that are disposed at second intervals in a first direction, and are disposed at fourth intervals each of which is an interval of an integral multiple of a third interval in a second direction. Each of the plurality of reception antenna groups includes a plurality of reception antennas that are disposed at fifth intervals in the first direction, and are disposed at sixth intervals each of which is an interval of an integral multiple of the third interval in the second direction. The difference between the second interval and the fifth interval is the first (Continued)

interval, and the difference between the fourth interval and the sixth interval is the third interval.

10 Claims, 128 Drawing Sheets

(51) Int. Cl.
*G01S 13/44* (2006.01)
*H01Q 21/06* (2006.01)
*H04B 7/0413* (2017.01)

(56) References Cited

U.S. PATENT DOCUMENTS

| | | | |
|---|---|---|---|
| 2012/0223852 A1* | 9/2012 | Gross | H01Q 21/22 342/175 |
| 2016/0025839 A1* | 1/2016 | Trummer | G01S 13/931 342/188 |
| 2016/0282450 A1* | 9/2016 | Kishigami | G01S 13/426 |
| 2017/0082730 A1* | 3/2017 | Kishigami | H01Q 21/061 |
| 2017/0139042 A1* | 5/2017 | Alenljung | G01S 7/354 |
| 2017/0307744 A1* | 10/2017 | Loesch | H01Q 21/296 |
| 2018/0166794 A1* | 6/2018 | Raphaeli | G01S 13/42 |
| 2019/0056491 A1* | 2/2019 | Bialer | G01S 13/931 |

FOREIGN PATENT DOCUMENTS

| | | |
|---|---|---|
| JP | 2019-053751 A | 4/2019 |
| WO | 2018/142396 A1 | 8/2018 |

OTHER PUBLICATIONS

Li et al., "MIMO Radar with Colocated Antennas," *IEEE Signal Processing Magazine*, vol. 24, Issue: 5, 2007, pp. 106-114. (9 pages).

Wenger, "Automotive MM-Wave Radar: Status and Trends in System Design and Technology," *IEE Colloquium on Automotive Radar and Navigation Techniques*, 1998, pp. 144-147.

Harter et al., "2-D Antenna Array Geometries for MIMO Radar Imaging by Digital Beamforming," *10$^{th}$ European Radar Conference*, Nuremberg, Germany, Oct. 9-11, 2013, pp. 1695-1698. (4 pages).

Vaidyanathan et al., "MIMO Radar with Broadband waveforms: Smearing Filter Banks and 2D Virtual Arrays," *IEEE Asilomar Conference on Signals, Systems and Computers*, 2008, pp. 188-192.

English Translation of Chinese Office Action, dated Oct. 13, 2023, for Chinese Patent Application No. 202080022510.2. (18 pages).

\* cited by examiner

RADAR DEVICE

TECHNICAL FIELD

The present disclosure relates to a radar apparatus.

BACKGROUND ART

In recent years, a study of radar apparatuses using a short-wavelength radar transmission signal including a microwave or a millimeter wave that provides high resolution has been carried out. To improve safety outdoors, development of radar apparatuses that detect objects (targets) including pedestrians in addition to vehicles in a wider range of angles (hereinafter, referred to as wide-angle radar apparatuses) is desired.

For example, a pulse radar apparatus that repeatedly transmits a pulse wave is known as a radar apparatus. A received signal of a wide-angle pulse radar apparatus that detects vehicles and/or pedestrians in a wider range of angles tends to be a signal that is a mixture of a plurality of reflected waves from a target (for example, a vehicle) at a short distance and a target (for example, a pedestrian) at a long distance. For this reason, (1) a radar transmitter is required to have a configuration to transmit a pulse wave or a pulse-modulated wave having autocorrelation properties providing a low range side lobe (hereinafter, referred to as low range side lobe properties), and (2) a radar receiver is required to have a configuration having a wide reception dynamic range.

Examples of the configuration of the wide-angle radar apparatus include the following two configurations.

The first configuration is to transmit a radar wave while mechanically or electronically scanning a pulse wave or a modulated wave by using a directional beam with a narrower angle (for example, a beam width of about several angles) than a detection angle assumed in the radar apparatus and receive a reflected wave by using a narrow-angle directional beam. With this configuration, scanning is required many times to obtain high resolution, so trackability to a target moving at high speed deteriorates.

The second configuration is to use a method of receiving a reflected wave with an array antenna made up of a plurality of antennas (antenna elements) and estimating an angle of arrival of the reflected wave with a signal processing algorithm in accordance with a reception phase difference for an interelement spacing (antenna spacing) (direction-of-arrival (DOA) estimation). With this configuration, even when the scanning angular interval is increased, an angle of arrival can be estimated by a reception branch, so a scanning time is shortened, with the result that trackability improves as compared to the first configuration. An example of the direction-of-arrival estimation method is a Fourier transform based on matrix computation, a Capon method and LP (linear prediction) method based on inverse matrix computation, or MUSIC (multiple signal classification) and ESPRIT (estimation of signal parameters via rotational invariance techniques) based on eigenvalue computation.

A configuration that includes a plurality of antennas (array antenna) is provided in not only a reception branch but also a transmission branch and that performs beam scanning through signal processing using transmission and reception array antennas (which may be called MIMO (multiple input multiple output) radar) is proposed as a radar apparatus (see, for example, NPL 1).

With the MIMO radar, a virtual reception array antenna (hereinafter, referred to as virtual reception array) equal in number up to the product of the number of transmission antenna elements and the number of reception antenna elements can be configured by devising the arrangement of the antenna elements in the transmission and reception array antennas. With this configuration, the effect of increasing the effective aperture length of the array antenna with a small number of elements is obtained, so angular resolution is improved.

MIMO radars are applicable to not only one-dimensional scanning (angle measurement) in a vertical direction or a horizontal direction but also two-dimensional beam scanning in the vertical direction and the horizontal direction (see, for example, NPL 2).

CITATION LIST

Non-Patent Literature

NPL 1
J. Li, P. Stoica, "MIMO Radar with Colocated Antennas," Signal Processing Magazine, IEEE Vol. 24, Issue: 5, pp. 106-114, 2007.

NPL 2
P. P. Vaidyanathan, P. Pal, Chun-Yang Chen, "MIMO radar with broadband waveforms: Smearing filter banks and 2D virtual arrays,"
IEEE Asilomar Conference on Signals, Systems and Computers, pp. 188-192, 2008.

NPL 3
J. Wenger, "Automotive mm-wave radar: status and trends in system design and technology," IEE Colloquium on Automotive Radar and Navigation Techniques (Ref. No. 1998/230), pp. 144-147, 1998.

NPL 4
M. Harte, T. Mahler, T. Schipper, A. Ziroff, and T. Zwick, "2-D antenna array geometries for MIMO radar imaging by digital beamforming," 2013 European Microwave Conference, pp. 1695-1698, 2013.

SUMMARY OF INVENTION

The detection performance of a radar apparatus can deteriorate depending on the antenna arrangement of transmission and reception branches in a MIMO radar.

Non-limiting embodiments of the present disclosure facilitate providing a radar apparatus that improves detection performance.

A radar apparatus according to one embodiment of the present disclosure includes: a radar transmitter circuit that transmits a radar signal by using a transmission array antenna; and a radar receiver circuit that receives a reflected wave signal that is the radar signal reflected from a target by using a reception array antenna, in which the transmission array antenna is made up of a plurality of transmission antenna groups, each of the plurality of transmission antenna groups includes a plurality of transmission antennas arranged at a second spacing that is an integer multiple of a first spacing in a first direction, the plurality of transmission antenna groups is arranged at a fourth spacing that is an integer multiple of a third spacing in a second direction perpendicular to the first direction, the reception array antenna is made up of a plurality of reception antenna groups, each of the plurality of reception antenna groups includes a plurality of reception antennas arranged at a fifth spacing that is an integer multiple of the first spacing in the first direction, the plurality of reception antenna groups is arranged at a sixth spacing that is an integer multiple of the third spacing in the second direction, a difference between the second spacing and the fifth spacing is the first spacing, and a difference between the fourth spacing and the sixth spacing is the third spacing.

Note that these generic or specific aspects may be achieved by a system, an apparatus, a method, an integrated circuit, a computer program, or a recoding medium, and also by any combination of the system, the apparatus, the method, the integrated circuit, the computer program, and the recoding medium.

According to one embodiment of the present disclosure, the detection performance of the radar apparatus is improved.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 92A is a diagram showing an example of an antenna arrangement according to basic arrangement 5;

FIG. 92B is a diagram showing an example of an antenna arrangement according to basic arrangement 5;

FIG. 92C is a diagram showing an example of an antenna arrangement according to basic arrangement 5;

FIG. 92D is a diagram showing an example of an antenna arrangement according to basic arrangement 5;

FIG. 93A is a diagram showing a configuration example of a transmission array antenna using sub-arrays according to basic arrangement 5;

FIG. 93B is a diagram showing a configuration example of a transmission array antenna using the sub-arrays according to basic arrangement 5;

FIG. 94 is a diagram showing an example of a direction estimation result using a transmission-reception antenna arrangement according to basic arrangement 5;

FIG. 95 is a diagram showing an example of an antenna arrangement according to Modification 1 of basic arrangement 5;

FIG. 96 is a diagram showing an example of an antenna arrangement according to Modification 1 of basic arrangement 5;

FIG. 97 is a diagram showing an example of an antenna arrangement according to Modification 1 of basic arrangement 5;

FIG. 98 is a diagram showing an example of an antenna arrangement according to Modification 1 of basic arrangement 5;

FIG. 99 is a diagram showing an example of an antenna arrangement according to Modification 1 of basic arrangement 5;

Figure 100A:
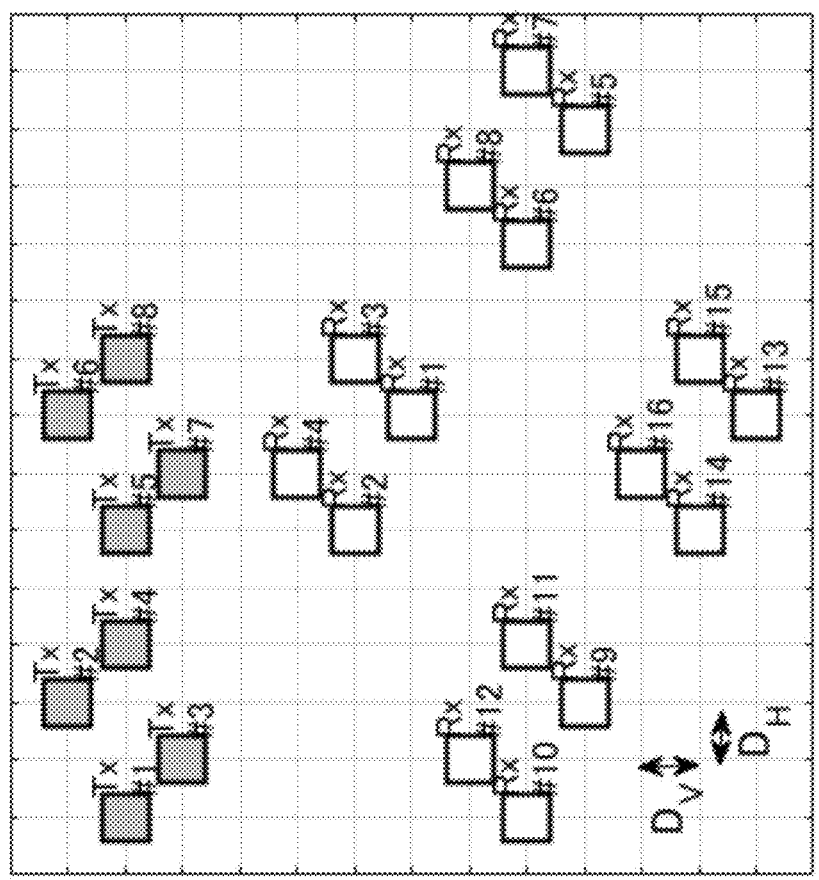
Figure 100B:
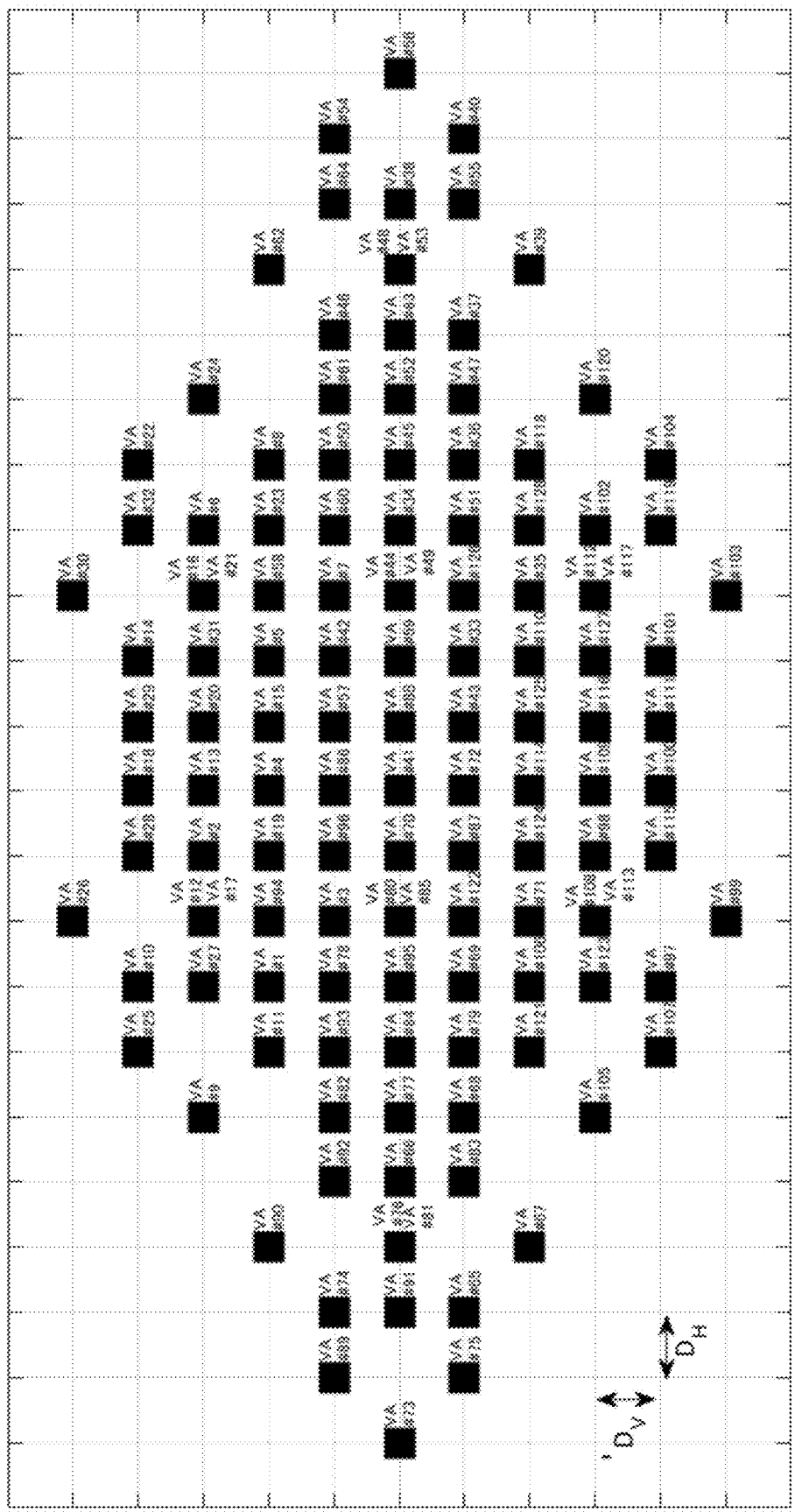
Figure 101:
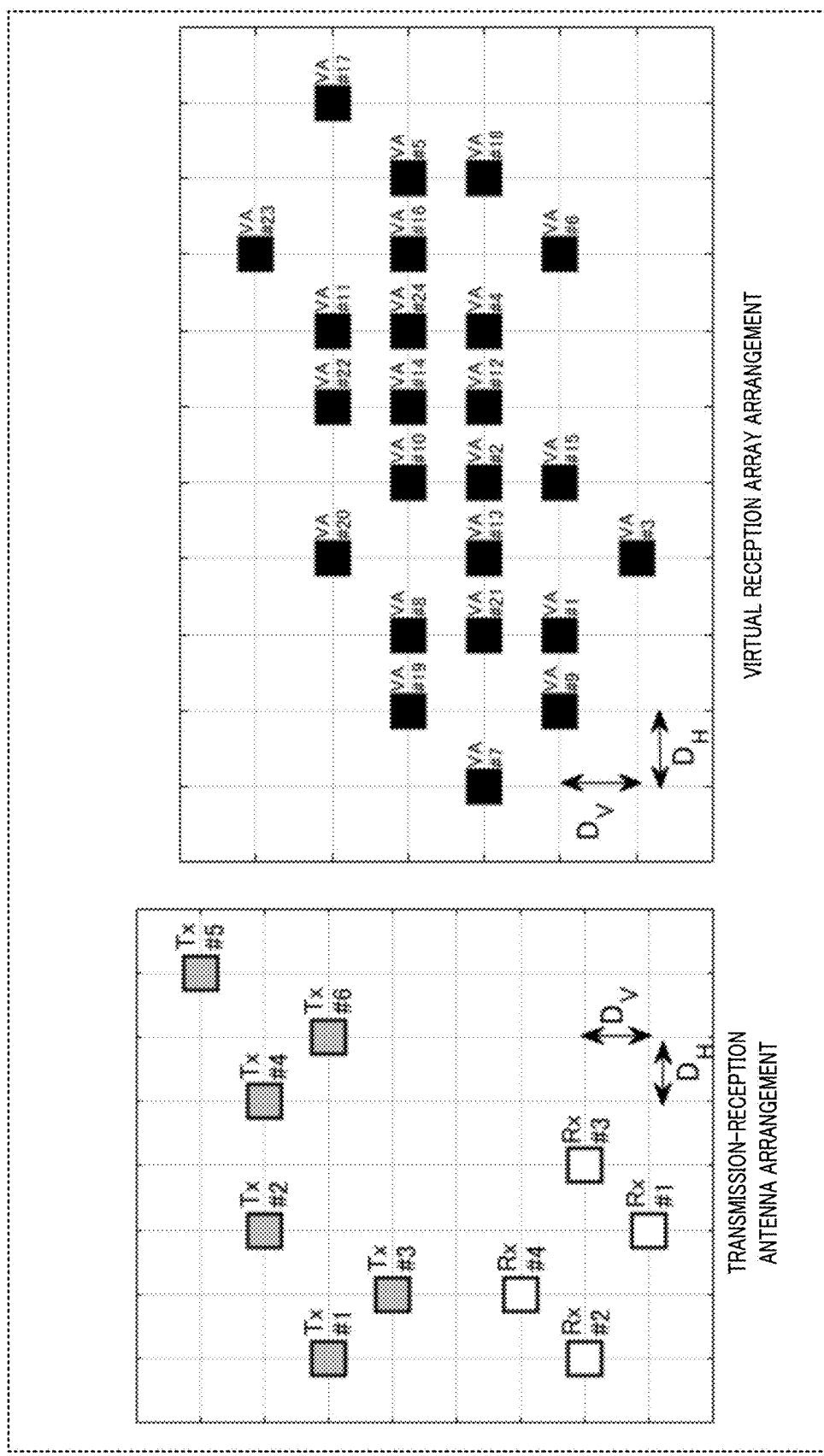
Figure 102:
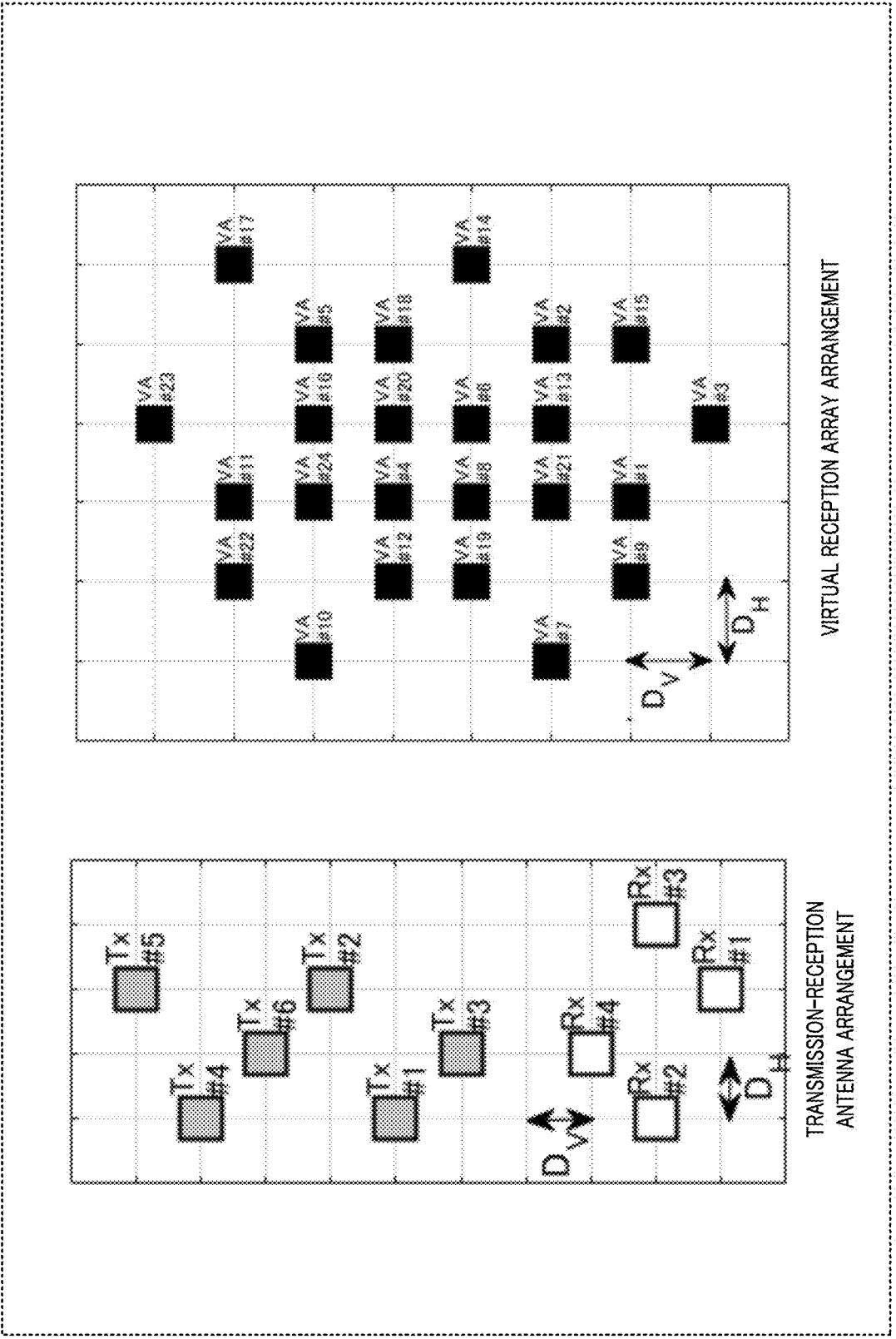
Figure 103:
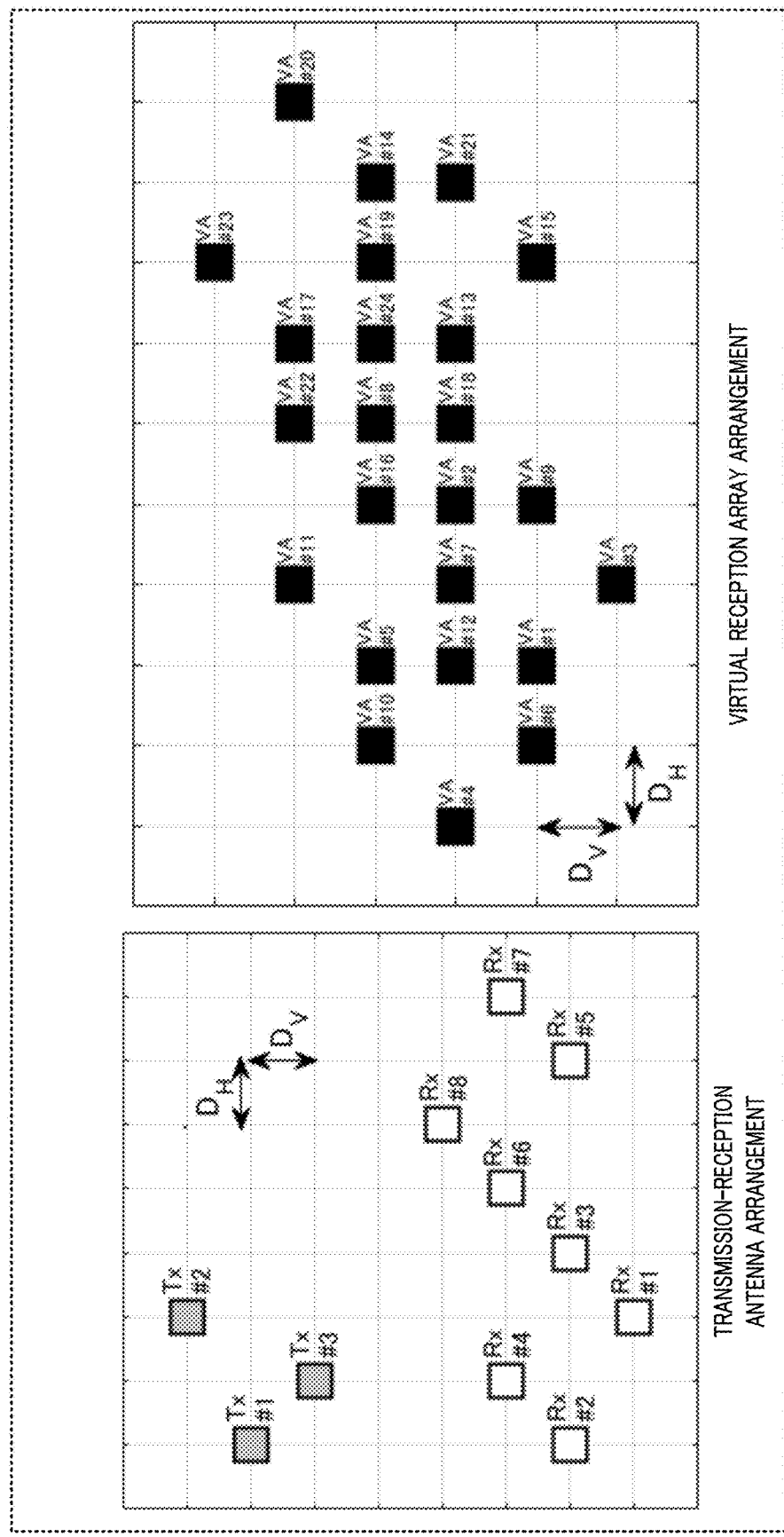
Figure 104:
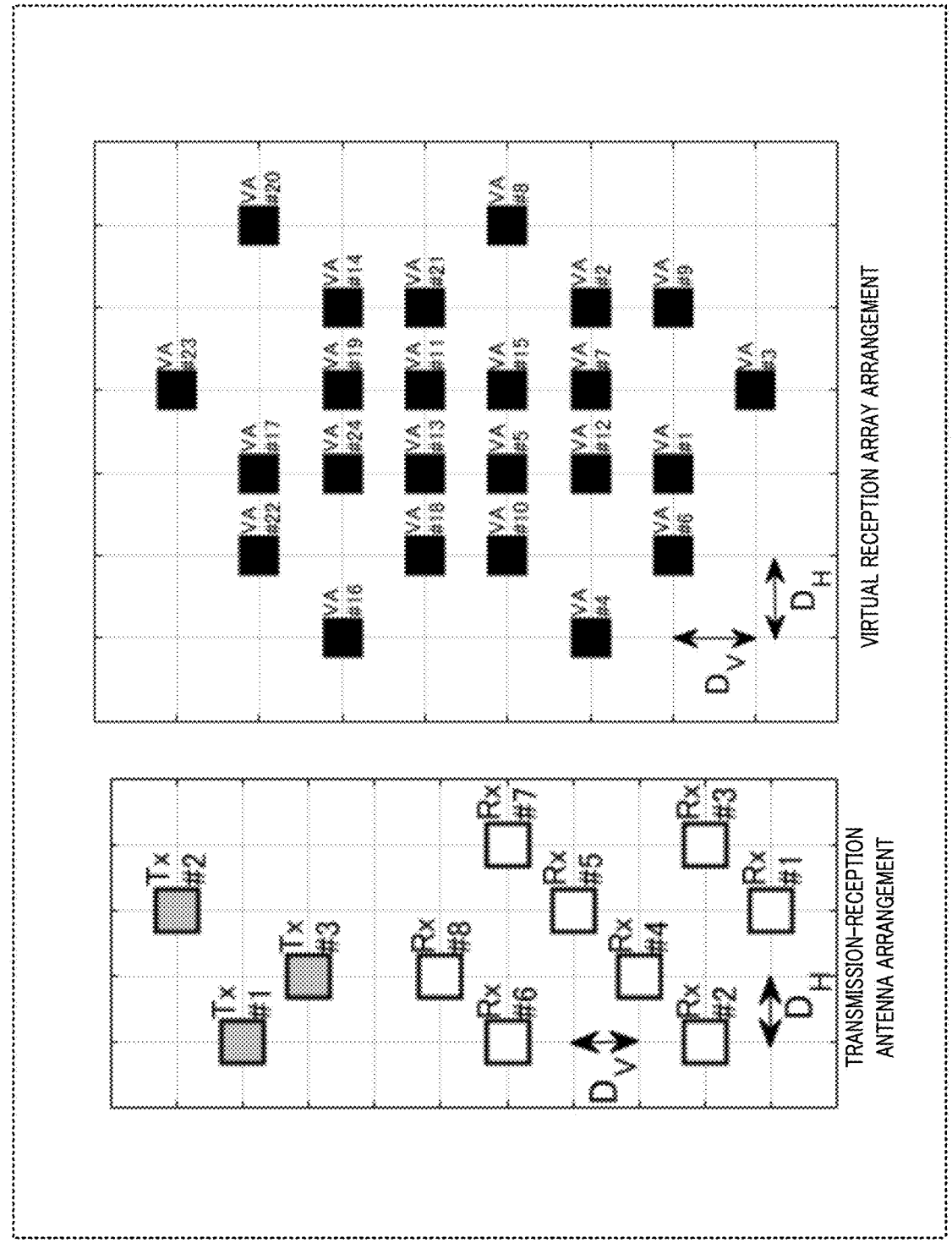
Figure 105:
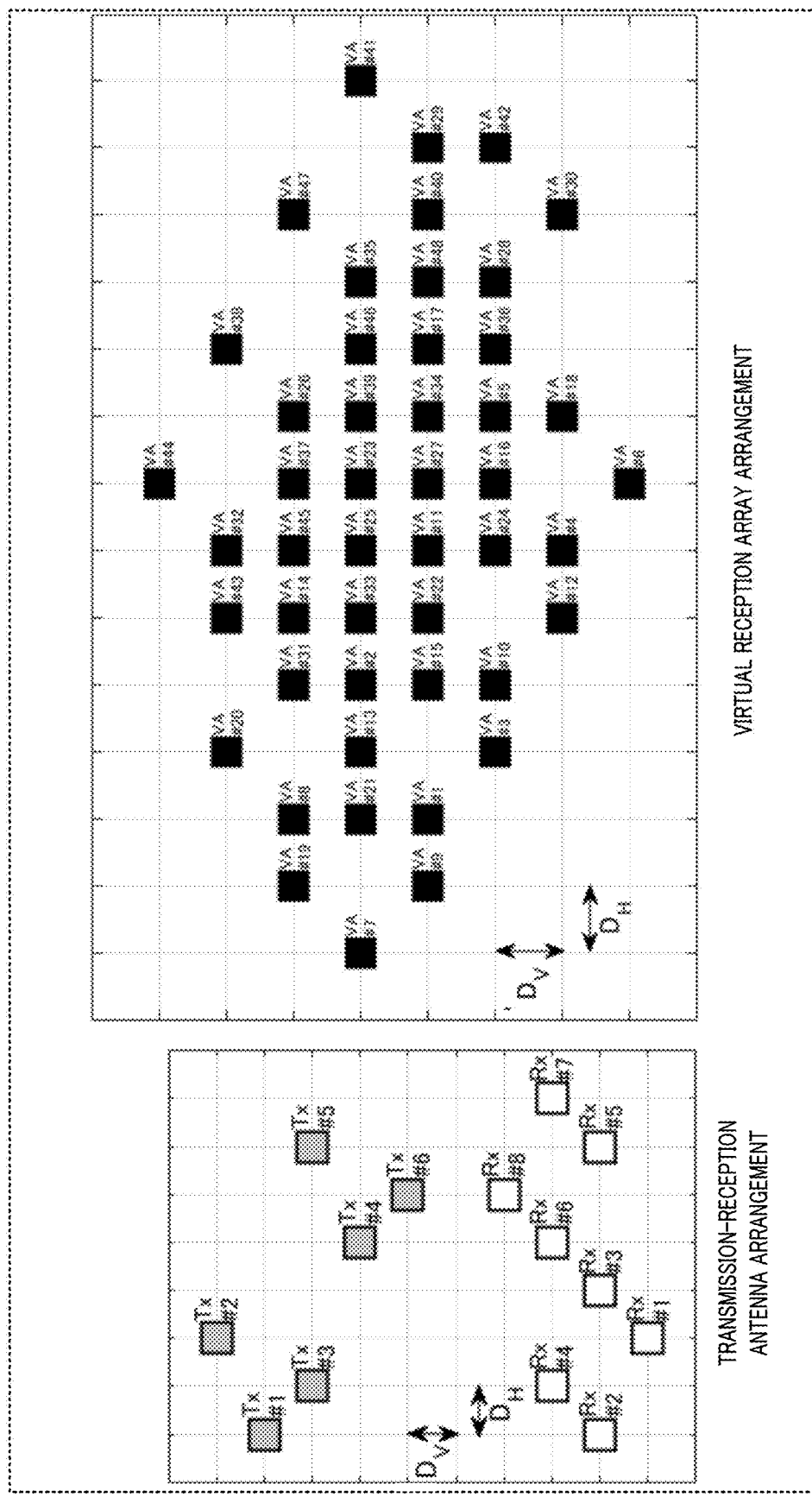
Figure 106A:
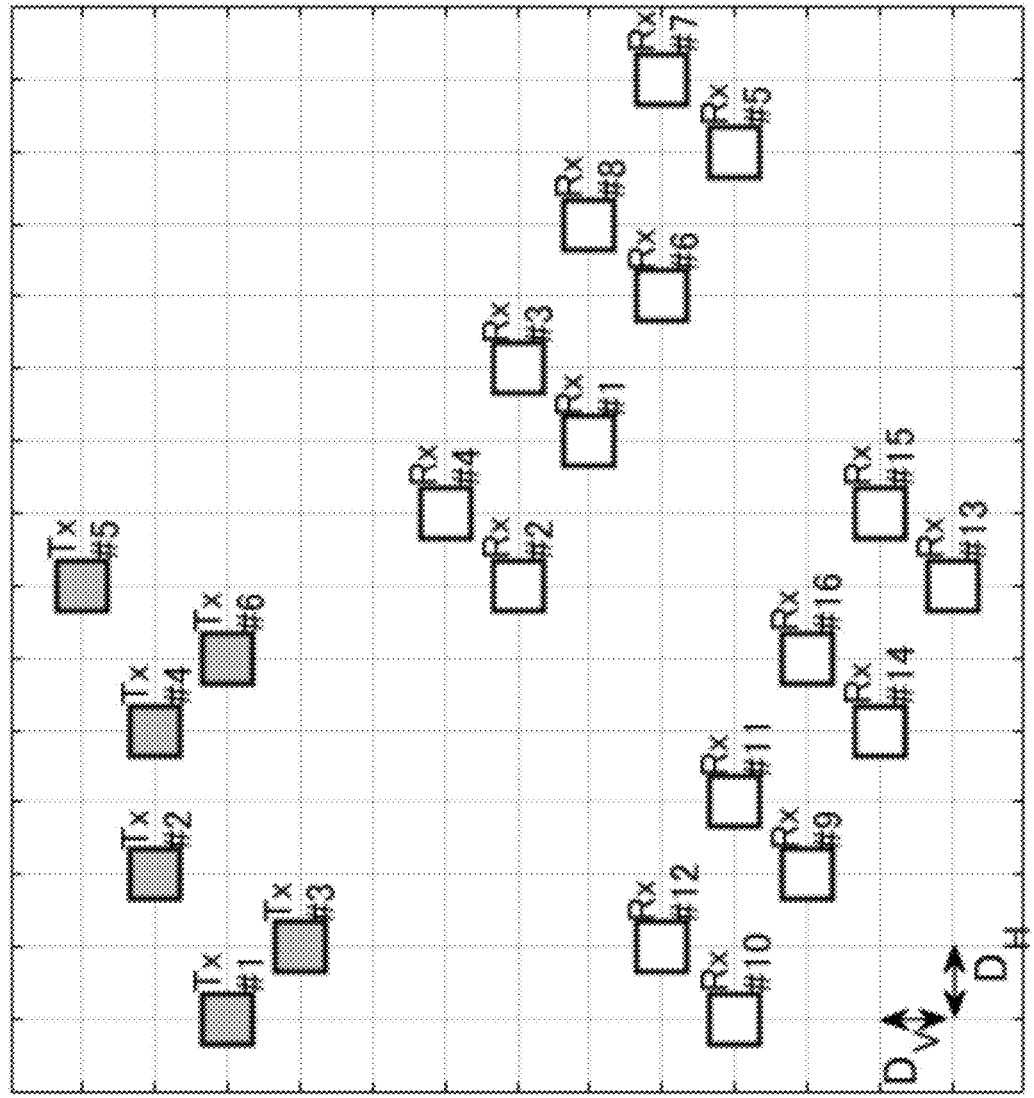
Figure 106B:
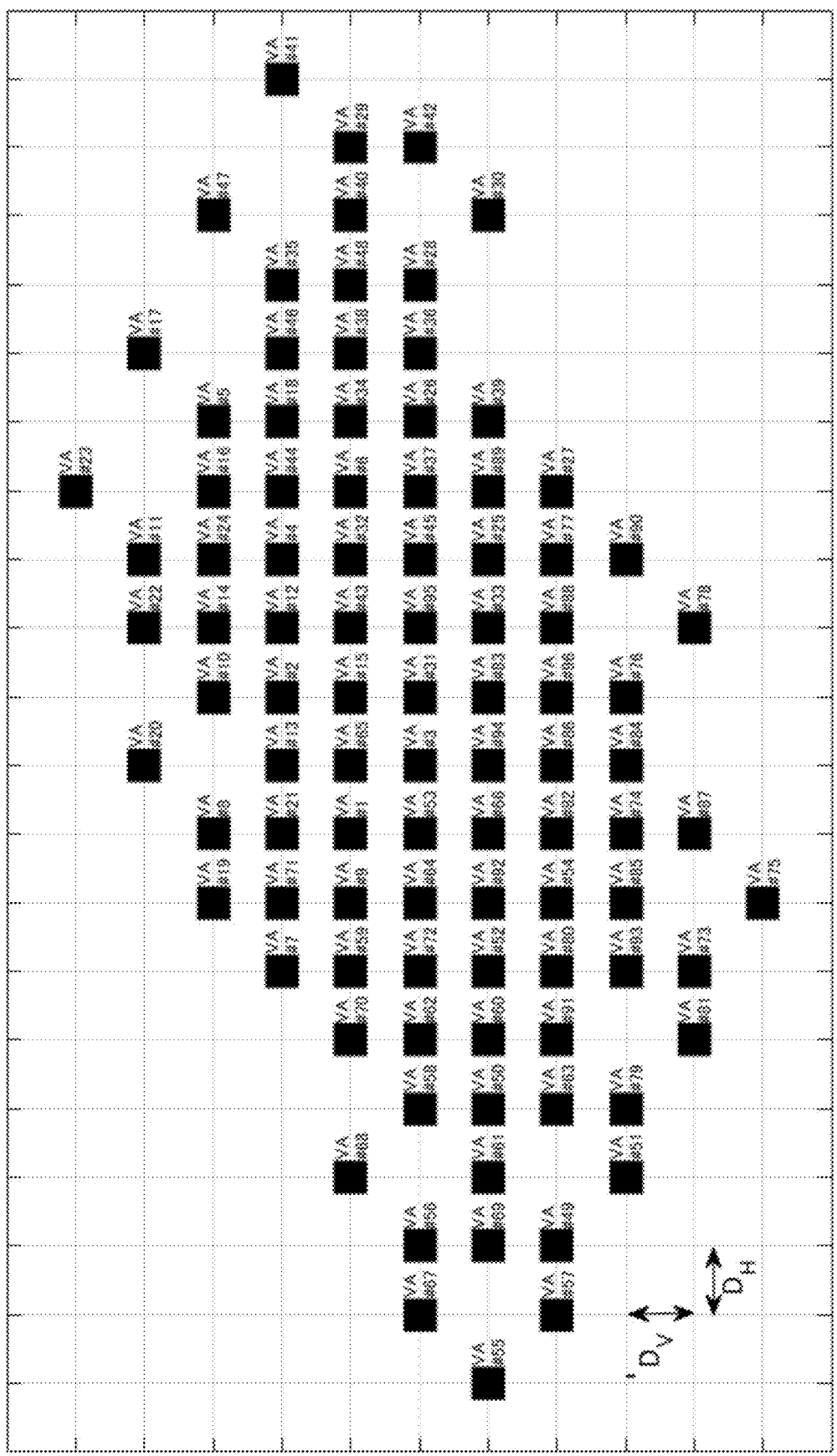
Figure 107:
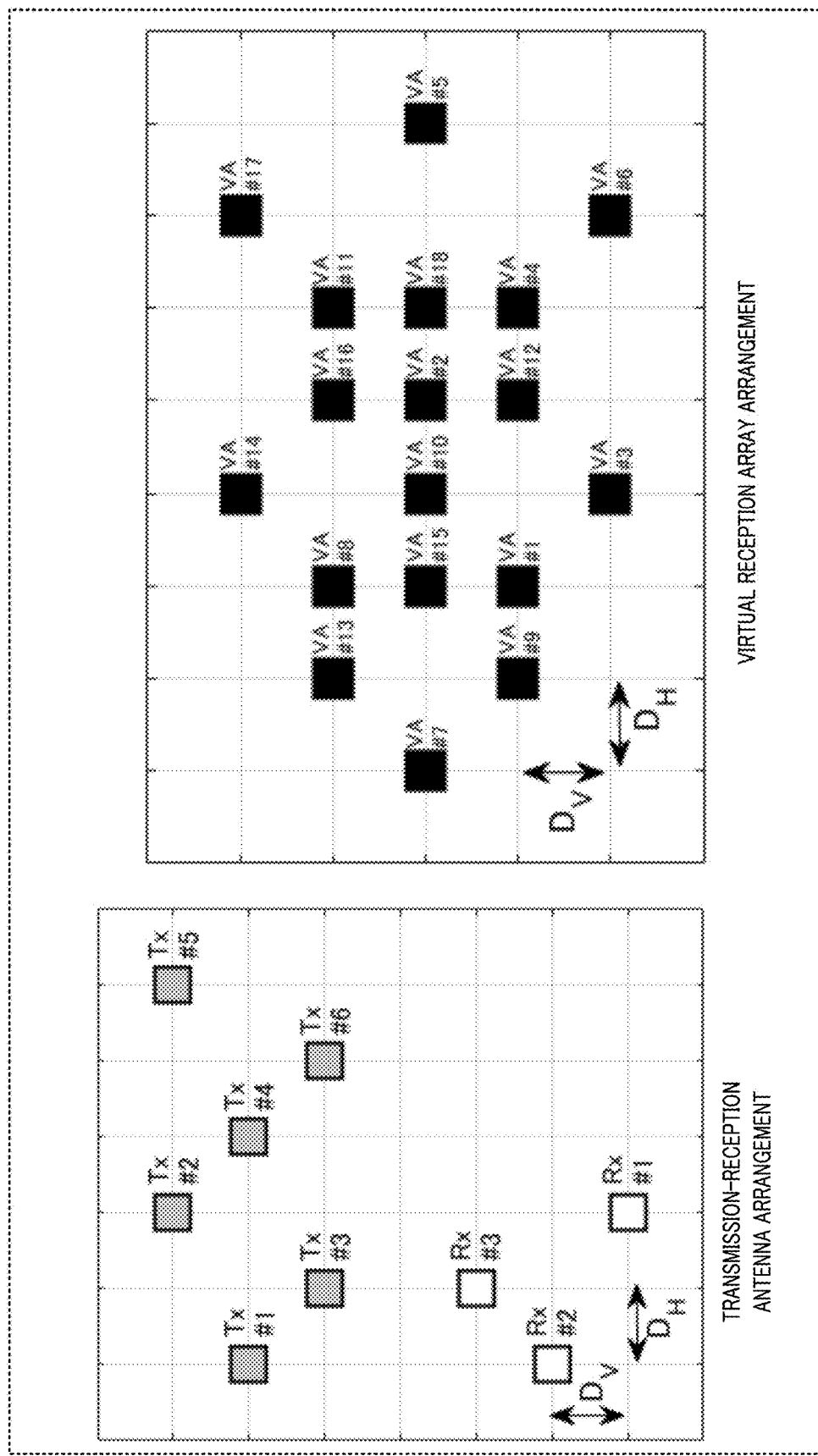
Figure 108:
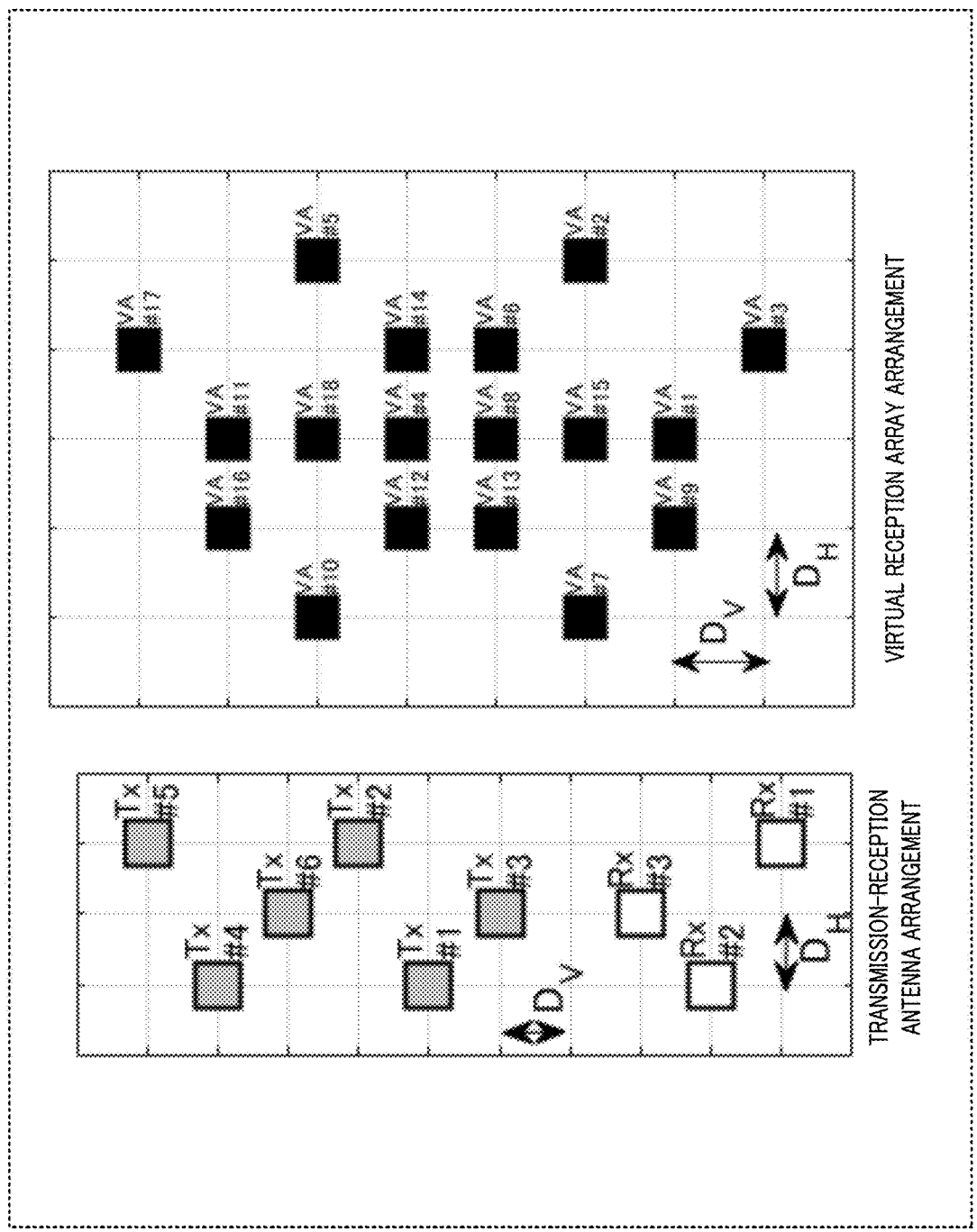
Figure 109:
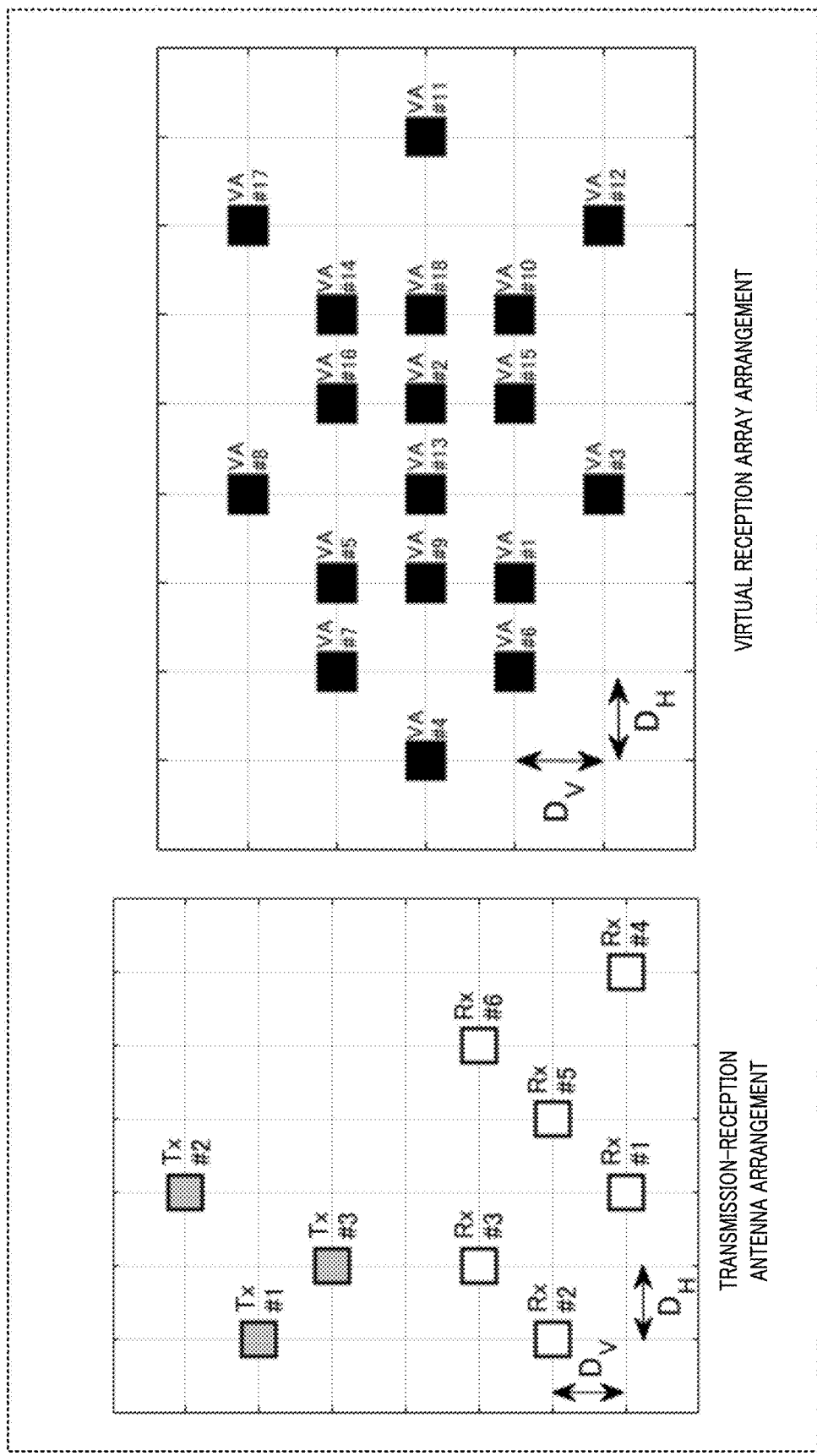
Figure 110:
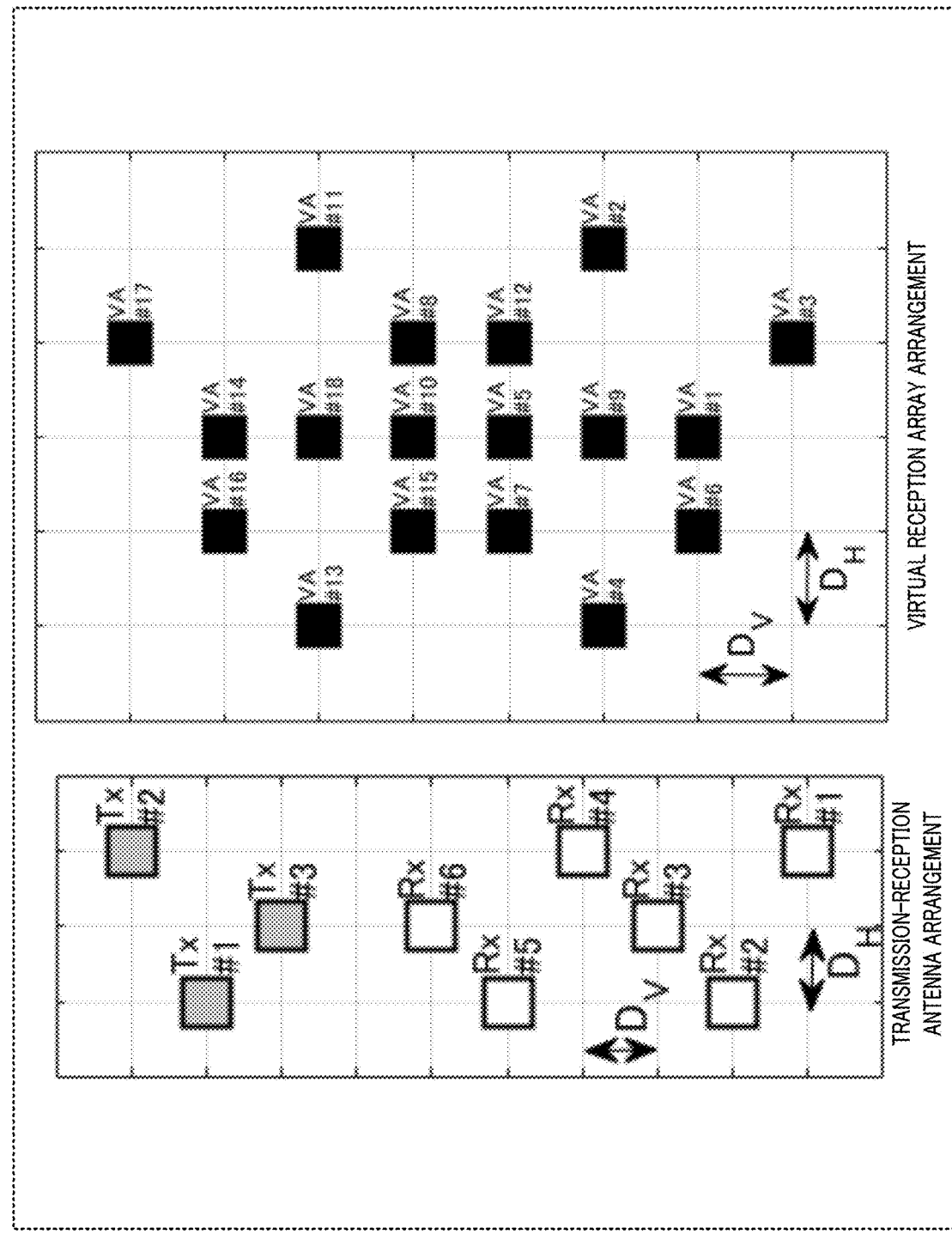
Figure 111:
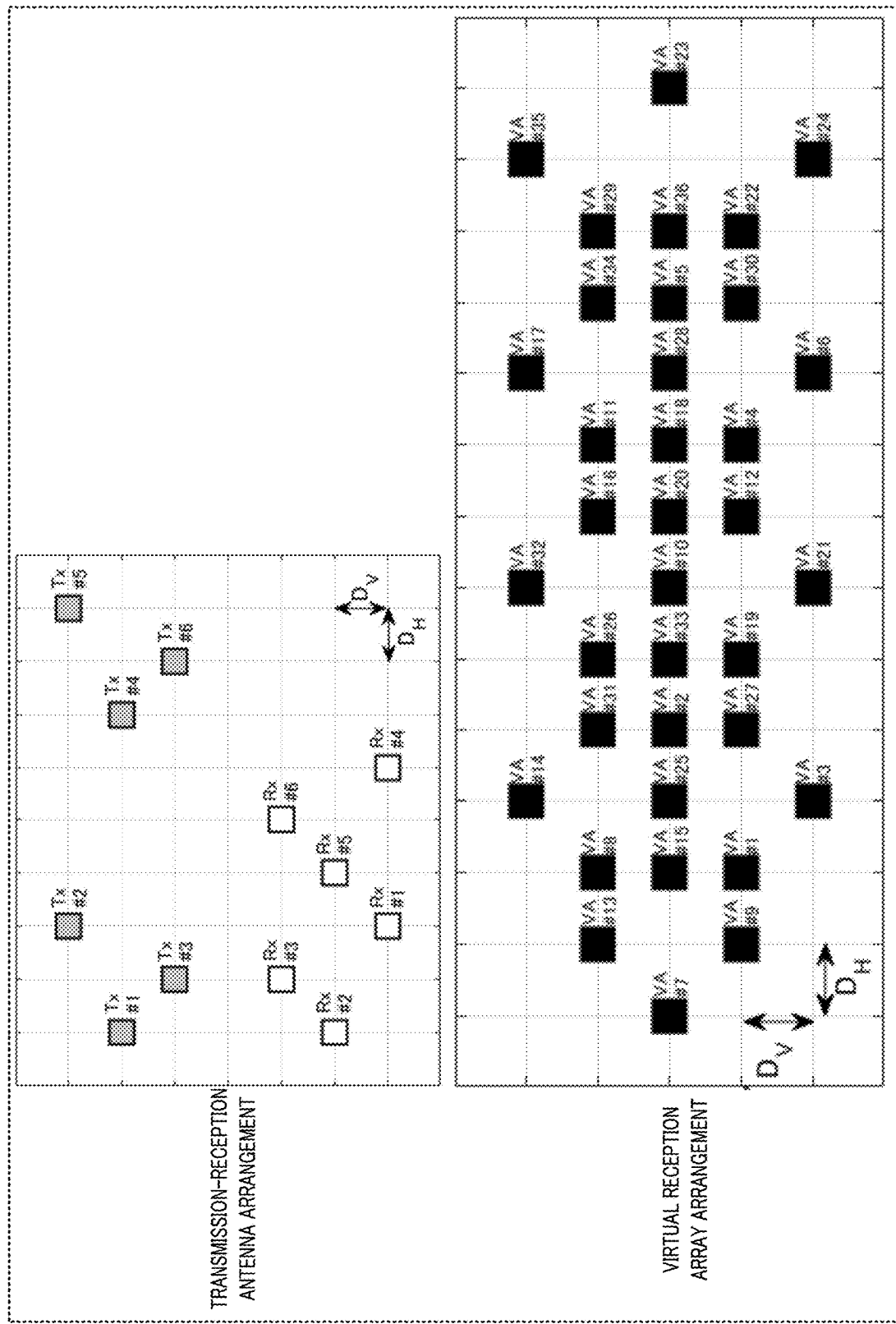
Figure 112A:
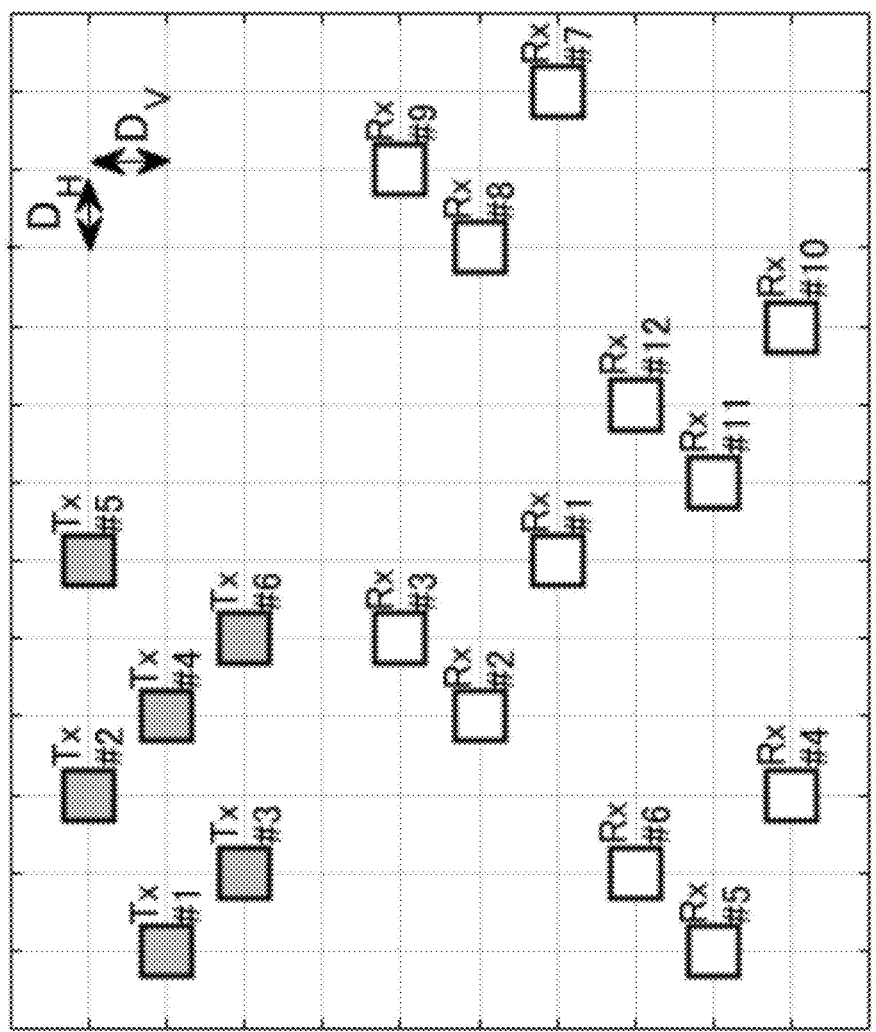
Figure 112B:
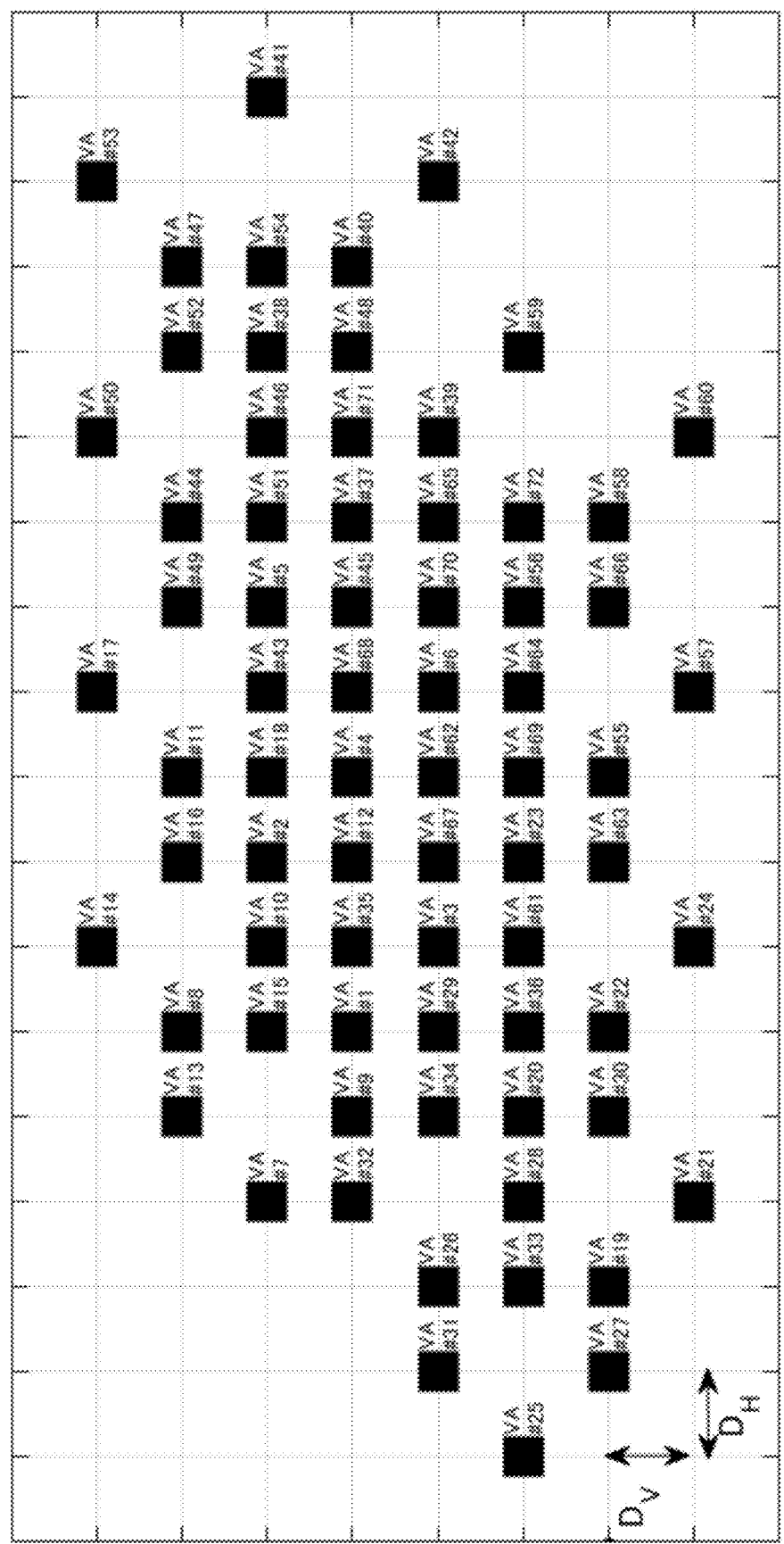

FIG. 100A is a diagram showing an example of an antenna arrangement according to Modification 1 of basic arrangement 5;

FIG. 100B is a diagram showing an example of an antenna arrangement according to Modification 1 of basic arrangement 5;

FIG. 101 is a diagram showing an example of an antenna arrangement according to Modification 1 of basic arrangement 5;

FIG. 102 is a diagram showing an example of an antenna arrangement according to Modification 1 of basic arrangement 5;

FIG. 103 is a diagram showing an example of an antenna arrangement according to Modification 1 of basic arrangement 5;

FIG. 104 is a diagram showing an example of an antenna arrangement according to Modification 1 of basic arrangement 5;

FIG. 105 is a diagram showing an example of an antenna arrangement according to Modification 1 of basic arrangement 5;

FIG. 106A is a diagram showing an example of an antenna arrangement according to Modification 1 of basic arrangement 5;

FIG. 106B is a diagram showing an example of an antenna arrangement according to Modification 1 of basic arrangement 5;

FIG. 107 is a diagram showing an example of an antenna arrangement according to Modification 1 of basic arrangement 5;

FIG. 108 is a diagram showing an example of an antenna arrangement according to Modification 1 of basic arrangement 5;

FIG. 109 is a diagram showing an example of an antenna arrangement according to Modification 1 of basic arrangement 5;

FIG. 110 is a diagram showing an example of an antenna arrangement according to Modification 1 of basic arrangement 5;

FIG. 111 is a diagram showing an example of an antenna arrangement according to Modification 1 of basic arrangement 5;

FIG. 112A is a diagram showing an example of an antenna arrangement according to Modification 1 of basic arrangement 5; and FIG. 112B is a diagram showing an example of an antenna arrangement according to Modification 1 of basic arrangement 5.

DESCRIPTION OF EMBODIMENTS

As described above, a MIMO radar with a virtual reception array is applicable to not only one-dimensional scanning (angle measurement) in a vertical direction or a horizontal direction but also two-dimensional beam scanning in the vertical direction and the horizontal direction.

Figure 1A:
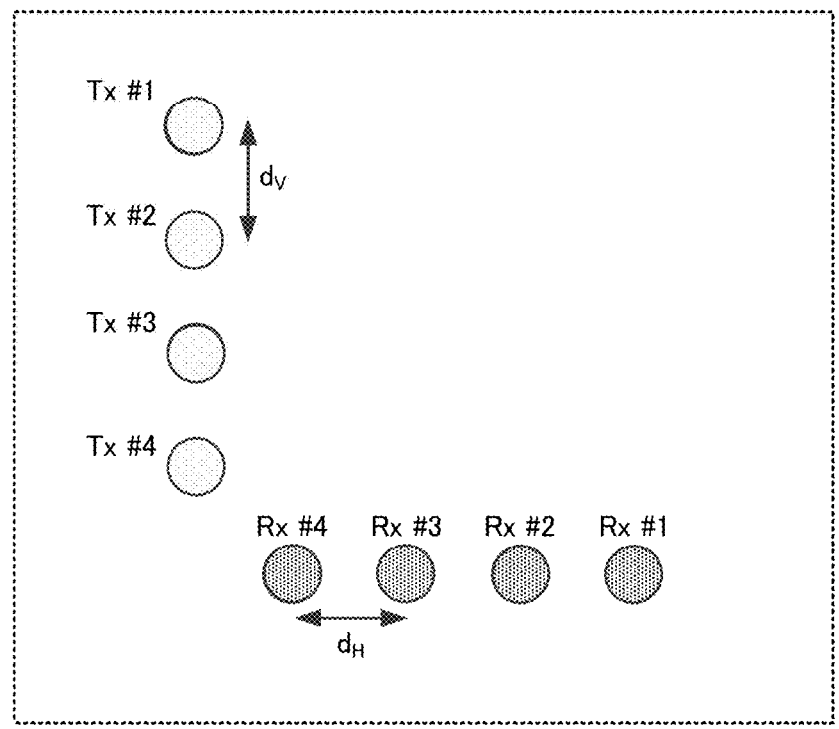
FIG. 1A is a diagram showing an example of an arrangement of a transmission-reception antenna.

For example, FIG. 1A shows a transmission array antenna including four transmission antennas (Tx #1 to Tx #4) arranged in a vertical direction (longitudinal direction in FIG. 1A) and a reception array antenna including four reception antennas (Rx #1 to Rx #4) arranged in a horizontal direction (cross direction in FIG. 1A). As shown in FIG. 1A, the transmission antennas are arranged at equal spacings ($d_V$) in the vertical direction, and the reception antennas are arranged at equal spacings ($d_H$) in the horizontal direction (see, for example, NPL 4).

Figure 1B:
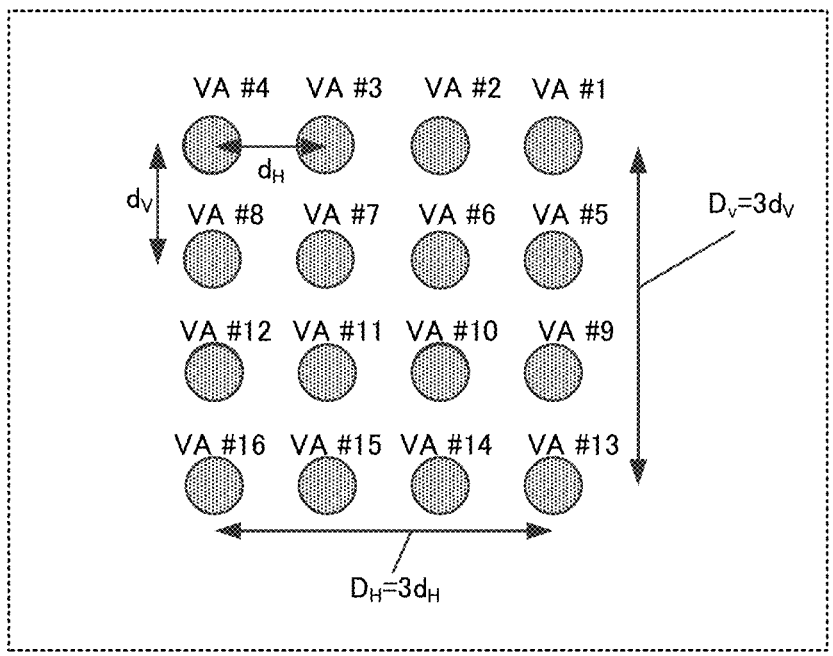
FIG. 1B is a diagram showing an example of an arrangement of a virtual reception array.

FIG. 1B shows a virtual reception array including transmission and reception array antennas of an antenna arrangement shown in FIG. 1A. The virtual reception array shown in FIG. 1B is made up of 16-element virtual reception antennas (VA #1 to VA #16) in which four antennas in the horizontal direction and four antennas in the vertical direction are arranged in a rectangular shape. In FIG. 1B the horizontal interelement spacing of the virtual reception array is dx, and the vertical interelement spacing of the virtual reception array is $d_V$. In other words, horizontal aperture length $D_H$ of the virtual reception array is $3d_H$, and vertical aperture length $D_V$ of the virtual reception array is $3d_V$.

Figure 2A:
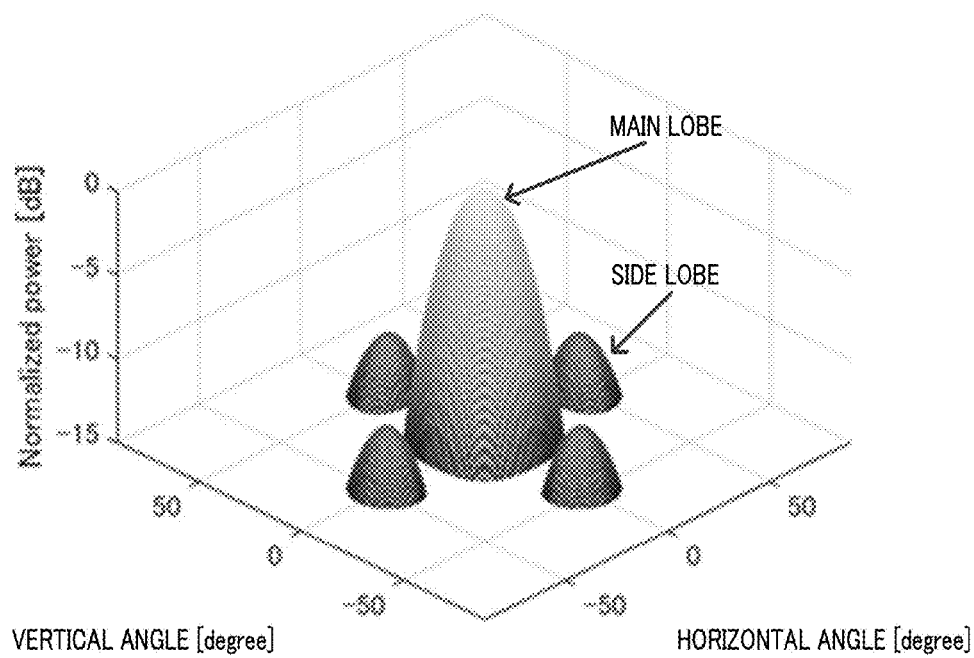
FIG. 2A is a diagram showing a directivity pattern provided by a virtual reception array ($d_V=0.5\lambda$)
Figure 2B:
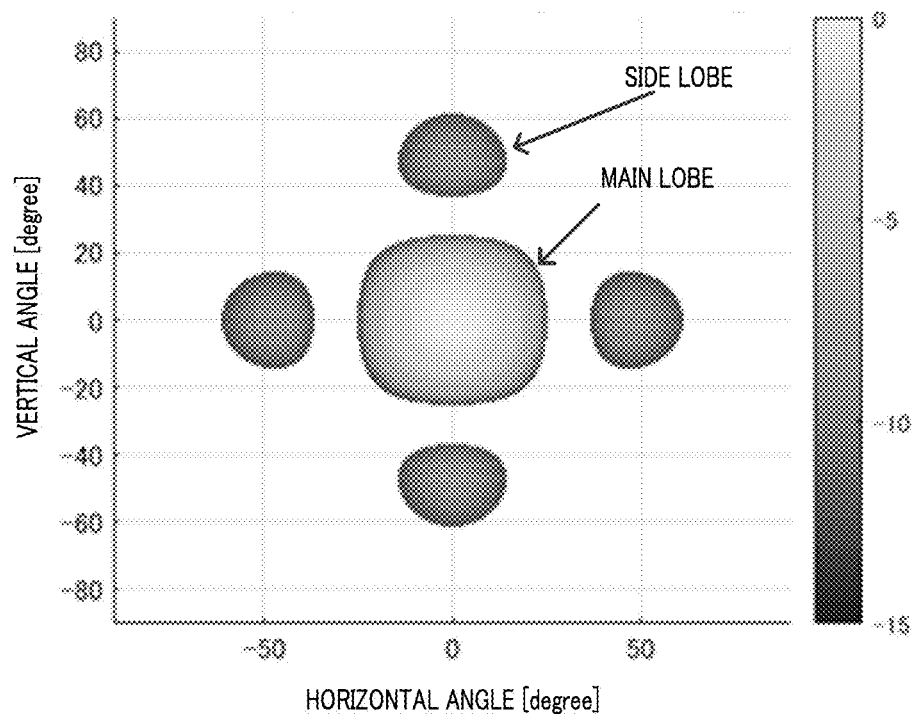
FIG. 2B is a diagram showing a directivity pattern provided by the virtual reception array ($d_V=0.5\lambda$)

FIGS. 2A and 2B illustrate a Fourier beam pattern oriented at 0° in the horizontal direction and 0° in the vertical direction where, in the antenna arrangement of the MIMO radar shown in FIGS. 1A and 1B, the horizontal interelement spacing $d_H$=0.5λ and the vertical interelement spacing $d_V$=0.5λ. λ denotes the wavelength of a radar carrier wave.

As shown in FIGS. 2A and 2B, a main beam (main lobe) is formed at 0° in the horizontal direction and 0° in the vertical direction. Here, as the beam width of a main beam narrows, angular separation performance for a plurality of targets improves. For example, in FIGS. 2A and 2B, the beam width at a power level of 3 dB is about 13°. As shown in FIGS. 2A and 2B, side lobes are generated around the main beam. In a radar apparatus, a side lobe becomes a factor of erroneous detection as a virtual image. For this reason, as the peak level of a side lobe decreases, the probability that the side lobe is erroneously detected as a virtual image in a radar apparatus is reduced. In FIGS. 2A and 2B, a power ratio to the peak level of each side lobe, normalized by the peak level of the main beam, (peak sidelobe level ratio (PSLR)) is about −13 dB.

To expand the detection range of a radar apparatus, it is effective to use antennas with a high gain. The gain of an antenna is improved by, for example, narrowing the directivity (beam width) of the antenna. The directivity of an antenna narrows as, for example, the aperture area of the antenna expands. Thus, to narrow the directivity of an antenna, the size of the antenna increases.

For example, a radar apparatus mounted on a vehicle (for example, also referred to as in-vehicle radar) or the like uses a sub-array antenna made up of a plurality of antenna elements arranged in a vertical direction (see, for example, NPL 3) to narrow the directivity in the vertical direction. By narrowing the directivity in the vertical direction, the gain of the antenna in the vertical direction is improved, so reflected waves from a road surface or the like in unnecessary directions are reduced.

However, when a sub-allay antenna is used for antenna elements that make up a transmission array antenna or a reception array antenna, it is difficult to arrange array antennas of which the interelement spacing is narrower than the size of the sub-array antenna. When, for example, antenna elements that make up a sub-array antenna are arranged in a vertical direction, the size of the sub-array antenna can be greater than or equal to one wavelength. Thus, when, for example, a sub-array antenna is used in the vertical direction in the MIMO radar shown in FIG. 1A, the vertical interelement spacing $d_V$ is expanded to one wavelength or greater.

Figure 3A:
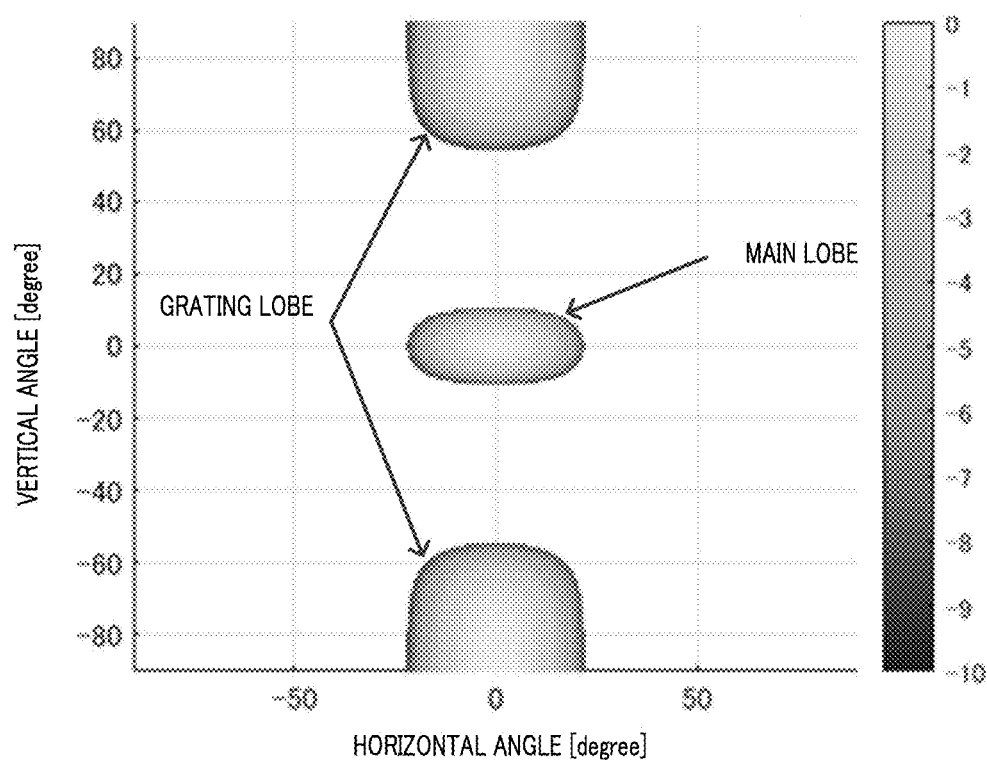
FIG. 3A is a diagram showing a directivity pattern provided by a virtual reception array ($d_V=\lambda$)
Figure 3B:
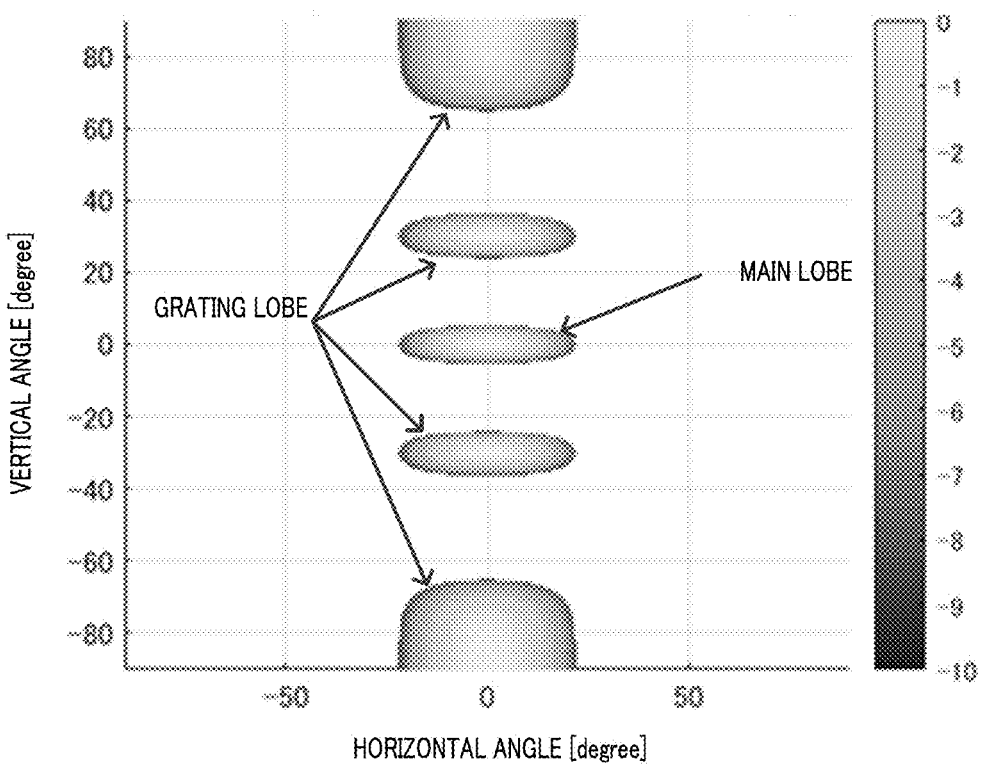
FIG. 3B is a diagram showing a directivity pattern provided by a virtual reception array ($d_V=2\lambda$)

FIGS. 3A and 3B show examples of a Fourier beam pattern oriented at 0° in the horizontal direction and 0° in the vertical direction where, in a transmission-reception antenna arrangement of the MIMO radar shown in FIG. 1A, the vertical interelement spacing $d_V$ is one wavelength (λ) or greater. In FIGS. 3A and 3B, the directivity of each of antenna elements alone sub-arrayed in the vertical direction is not considered.

In FIG. 3A, the vertical interelement spacing $d_V$=λ and the horizontal interelement spacing $d_H$=0.5λ. In FIG. 3B, the vertical interelement spacing $d_V$=2λ and the horizontal interelement spacing $d_H$=0.5λ.

As shown in FIG. 3A and FIG. 3B, the main beam (main lobe) is oriented at 0° in the horizontal direction and 0° in the vertical direction, and, for example, as compared to the side lobes in FIGS. 2A and 2B, high-level grating lobes are generated in the vertical direction around the main beam. In FIGS. 3A and 3B, the ratio of the peak level of the grating lobes to the peak level of the main lobe is 0 dB. In FIG. 3B ($d_V$=2λ), as compared to FIG. 3A ($d_V$=λ), an angular interval at which the high-level grating lobes are generated in the vertical direction is narrow. In other words, such properties that, as the vertical interelement spacing $d_V$ expands, the angular interval at which grating lobes are generated narrows are found.

In this way, in a radar apparatus, as the vertical antenna size increases, the vertical interelement spacing expands, so a grating lobe is easily generated at an angle relatively close to a main beam. For this reason, when the detection angular range assumed in a radar apparatus is wider than or equal to an angle at which a grating lobe is generated, the probability that the radar apparatus detects a virtual peak due to a grating lobe erroneously as a target within the detection angular range increases, so the detection performance of the radar apparatus can deteriorate.

In one embodiment according to the present disclosure, in the case where beam scanning is performed in two vertical and horizontal dimensions with a MIMO radar, even when the vertical or horizontal antenna size (or element size) is greater than or equal to one wavelength, generation of grating lobes is suppressed, and improvement in vertical or horizontal angular resolution is possible.

Hereinafter, embodiments according to one embodiment of the present disclosure will be described in detail with reference to the drawings. In the embodiments, like reference signs are assigned to the same component elements, and the description thereof will not be repeated.

Hereinafter, the configuration of a radar apparatus to send code division multiplexed different transmission signals from a plurality of transmission antennas in a transmission branch and to perform a process of separately receiving the transmission signals in a reception branch will be described. The configuration of the radar apparatus is not limited thereto and may be a configuration that sends frequency division multiplexed different transmission signals from a plurality of transmission antennas in a transmission branch and that performs a process of separately receiving the transmission signals in a reception branch. Similarly, the configuration of the radar apparatus may be a configuration that sends time division multiplexed transmission signals from a plurality of transmission antennas in a transmission branch and that performs a receiving process in a reception branch.

Embodiment 1

[Configuration of Radar Apparatus]

Figure 4:
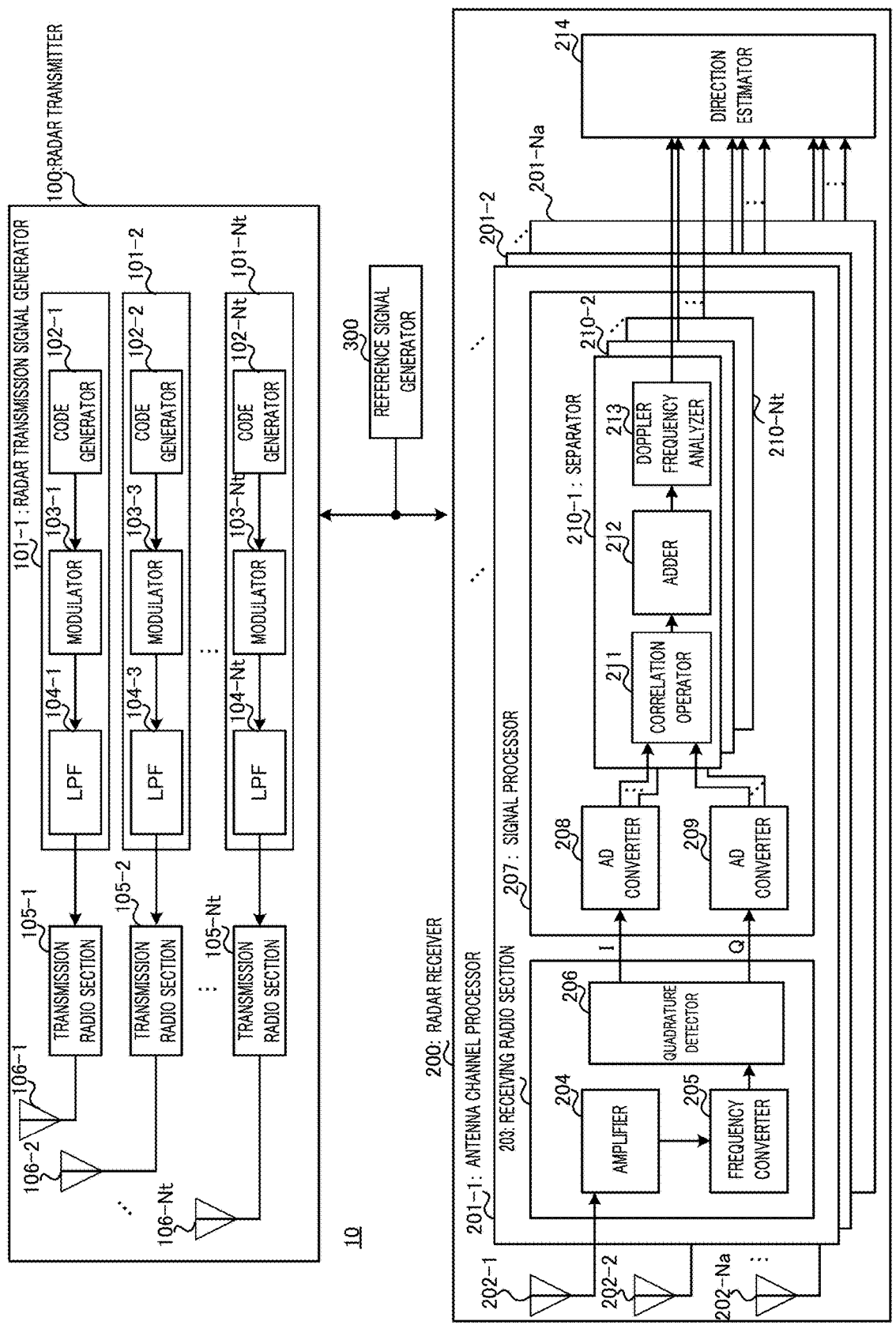
FIG. 4 is a block diagram showing a configuration of a radar apparatus.

FIG. 4 is a block diagram showing the configuration of radar apparatus 10 according to the present embodiment.

Radar apparatus 10 includes radar transmitter (transmission branch) 100, radar receiver (reception branch) 200, and reference signal generator 300.

Radar transmitter 100 generates a high frequency (radio frequency) radar signal (radar transmission signal) in accordance with a reference signal received from reference signal generator 300. Radar transmitter 100 transmits the radar transmission signal at a predetermined transmission period by using a transmission array antenna made up of a plurality of transmission antennas 106-1 to 106-Nt.

Radar receiver 200 receives a reflected wave signal that is the radar transmission signal reflected from a target (not shown) by using a reception array antenna including a plurality of reception antennas 202-1 to 202-Na. Radar receiver 200 performs processing in synchronization with radar transmitter 100 by performing the following operation using the reference signal received from reference signal generator 300. In other words, radar receiver 200 performs signal processing on the reflected wave signal received in each reception antenna 202 and performs at least one processing of presence/absence detection and direction estimation for the target. The target is an object to be detected by radar apparatus 10 and includes, for example, a vehicle (including a four-wheel vehicle and a two-wheel vehicle) or a person.

Reference signal generator 300 is connected to each of radar transmitter 100 and radar receiver 200. Reference signal generator 300 supplies the reference signal as a reference signal to radar transmitter 100 and radar receiver 200 and synchronizes the processing of radar transmitter 100 with the processing of radar receiver 200.

Configuration of Radar Transmitter 100

Radar transmitter 100 includes radar transmission signal generators 101-1 to 101-Nt, transmission radio sections 105-1 to 105-Nt, and transmission antennas 106-1 to 106-Nt. In other words, radar transmitter 100 includes Nt transmission antennas 106. Each transmission antenna 106 is connected to individual radar transmission signal generator 101 and individual transmission radio section 105.

Radar transmission signal generator 101 generates a timing clock obtained by multiplying the reference signal received from reference signal generator 300 by a predetermined number and generates a radar transmission signal in accordance with the generated timing clock. Radar transmission signal generator 101 repeatedly outputs the radar transmission signal at a predetermined radar transmission period (Tr). The radar transmission signal is expressed by $r_z(k, M) = I_z(k, M) + j Q_z(k, M)$. Here, z denotes a number corresponding to each transmission antenna 106, and $z=1, \ldots, Nt$. j denotes imaginary unit, k denotes discrete time, and M denotes the ordinal number of a radar transmission period.

Each radar transmission signal generator 101 includes code generator 102, modulator 103, and LPF (low pass filter) 104. Hereinafter, components in radar transmission signal generator 101-z corresponding to z-th ($z=1, \ldots, Nt$) transmission antenna 106 will be described.

For example, code generator 102 generates codes $a(z)_n$ ($n=1, \ldots, L$) (pulse codes) in a code sequence of a code length L at every radar transmission period Tr. Mutually low-correlated or uncorrelated codes are used as codes $a(z)_n$ ($z=1, \ldots, Nt$) generated in respective code generators 102-1 to 102-Nt. Examples of the code sequence include a Walsh-Hadamard code, an M-sequence code, and a Gold code.

Modulator 103 performs pulse modulation (amplitude modulation, ASK (amplitude shift keying), or pulse shift keying) or phase modulation (phase shift keying) over the code sequence (for example, codes $a(z)_n$ output from code generator 102 and outputs a modulated signal to LPF 104.

LPF 104 outputs a signal component in a predetermined limit band or lower of the modulated signal output from modulator 103 to transmission radio section 105 as a baseband radar transmission signal.

Z-th ($z=1, \ldots, Nt$) transmission radio section 105 generates a radar transmission signal in a carrier frequency (radio frequency (RF)) band by applying frequency conversion to the baseband radar transmission signal output from z-th radar transmission signal generator 101 and outputs predetermined transmission power P [dB] amplified by a transmission amplifier to z-th transmission antenna 106.

Z-th ($z=1, \ldots, Nt$) transmission antenna 106 radiates the radar transmission signal output from z-th transmission radio section 105 to a space.

Figure 5:
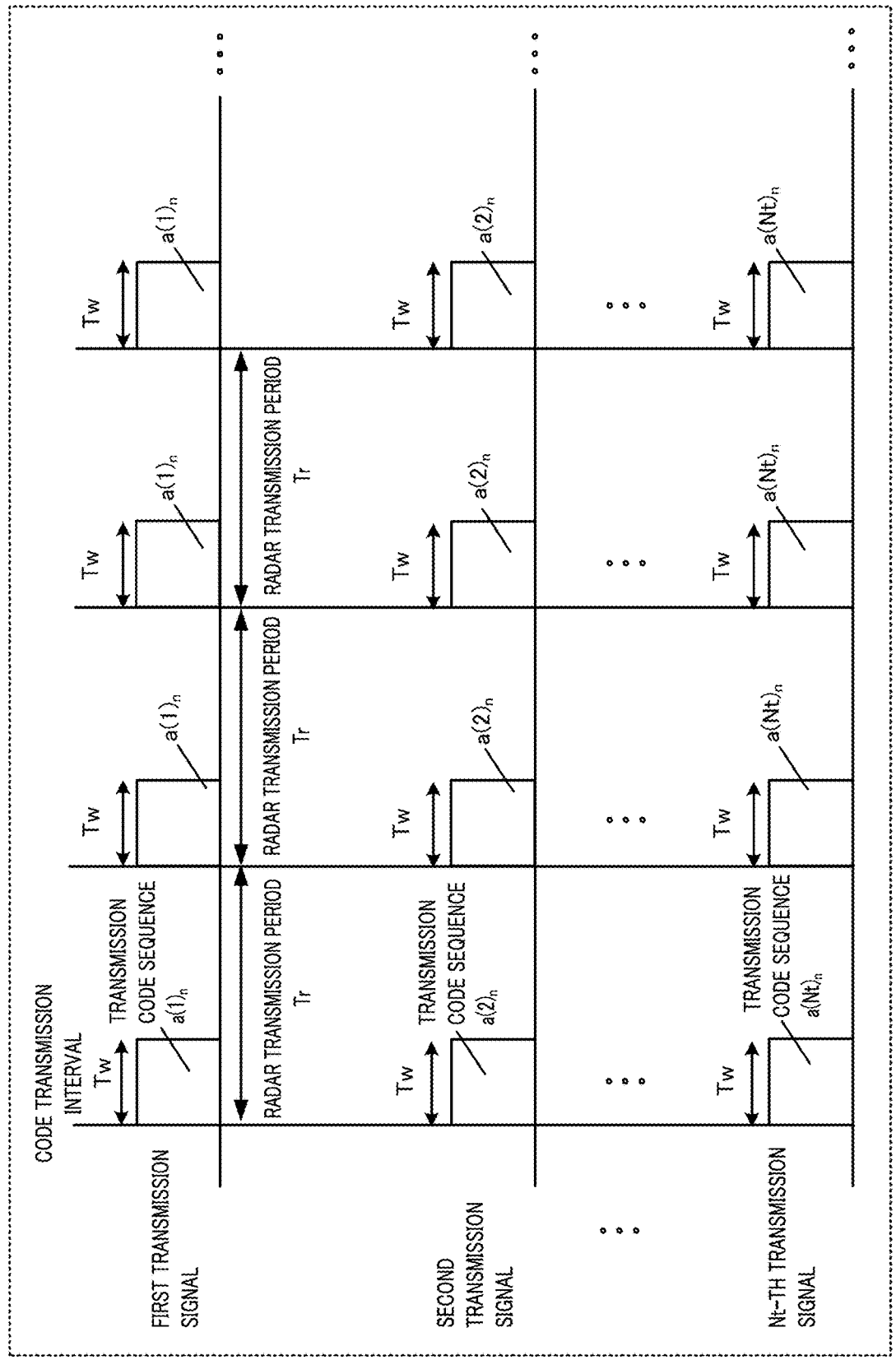
FIG. 5 is a diagram showing an example of radar transmission signals.

FIG. 5 shows radar transmission signals transmitted from Nt transmission antennas 106 of radar transmitter 100. A pulse code sequence having a code length L is included in a code transmission interval Tw. Within each radar transmission period Tr, a pulse code sequence is transmitted during code transmission interval Tw, and the remaining interval (Tr−Tw) becomes a no-signal interval. When pulse modulation using No samples is performed per one pulse code $(a(z)_n)$, a signal of Nr (=No×L) samples is included in each code transmission interval Tw. In other words, a sampling rate in modulator 103 is (No×L)/Tw. Nu samples are included in the no-signal interval (Tr−Tw).

Figure 6:
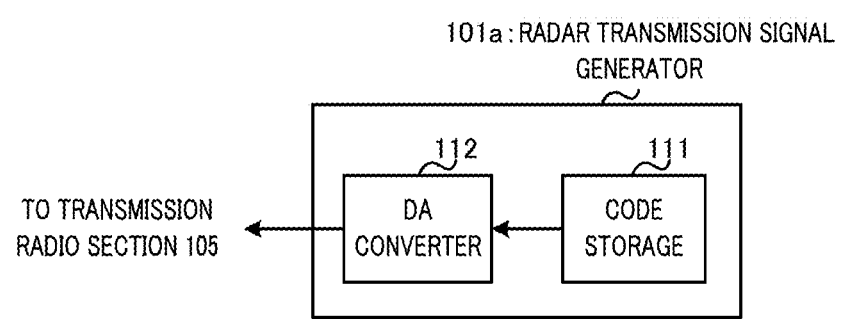
FIG. 6 is a block diagram showing another configuration of a radar transmission signal generator.

Radar transmitter 100 may include radar transmission signal generator 101a shown in FIG. 6 instead of radar transmission signal generator 101. Radar transmission signal generator 101a does not include code generator 102, modulator 103, or LPF 104 shown in FIG. 4 and includes code storage 111 and DA converter 112 instead. Code storage 111 prestores a code sequence generated in code generator 102 (FIG. 4) and sequentially reads out the stored code sequence cyclically. DA converter 112 converts the code sequence (digital signal) output from code storage 111 to an analog signal (baseband signal).

Configuration of Radar Receiver 200

In FIG. 4, radar receiver 200 includes Na reception antennas 202 to make up an array antenna. Radar receiver 200 includes Na antenna channel processors 201-1 to 201-Na and direction estimator 214.

Each reception antenna 202 receives a reflected wave signal that is a radar transmission signal reflected from a target (object) and outputs the received reflected wave signal to an associated one of antenna channel processors 201 as a received signal.

Each antenna channel processor 201 includes receiving radio section 203 and signal processor 207.

Receiving radio section 203 includes amplifier 204, frequency converter 205, and quadrature detector 206. Receiving radio section 203 generates a timing clock obtained by multiplying the reference signal output from reference signal generator 300 by a predetermined number and operates in accordance with the generated timing clock. Specifically, amplifier 204 amplifies a received signal output from reception antenna 202 to a predetermined level, frequency converter 205 converts the frequency of the received signal in a high frequency range to a baseband range, and quadrature detector 206 converts the received signal in the baseband range to a received signal in a baseband range, including an I signal and a Q signal.

Signal processor 207 includes AD converters 208, 209 and separators 210-1 to 210-Nt.

An I signal is input from quadrature detector 206 to AD converter 208. A Q signal is input from quadrature detector 206 to AD converter 209. AD converter 208 converts the I signal to digital data by sampling a baseband signal including the I signal at discrete time. AD converter 209 converts the Q signal to digital data by sampling a baseband signal including the Q signal at discrete time.

In sampling of AD converters 208, 209, Ns discrete samples are acquired per time Tp (=Tw/L) of one sub-pulse in a radar transmission signal. In other words, the number of over samples per sub-pulse is Ns.

In the following description, a baseband received signal at discrete time k in an M-th radar transmission period Tr[M], which is an output of AD converters 208, 209, is expressed as a complex number signal x(k, M)=Ir(k, M)+j Qr(k, M) by using an I signal Ir(k, M) and a Q signal Qr(k, M). Hereinafter, for discrete time k, the timing to start a radar transmission period (Tr) is defined as a reference (k=1), and signal processor 207 periodically operates until k=(Nr+Nu)Ns/No that is a sample point before the radar transmission period Tr terminates. In other words, k=1, . . . , (Nr+Ni)Ns/No. Here, j is an imaginary unit.

Signal processor 207 includes Nt separators 210 equal in number to the number of channels corresponding to the number of transmission antennas 106. Each separator 210 includes correlation operator 211, adder 212, and Doppler frequency analyzer 213. Hereinafter, the configuration of z-th (z=1, . . . , Nt) separator 210 will be described.

Correlation operator 211 performs correlation operation between a discrete sample value x(k, M) including discrete sample values Ir(k, M) and Qr(k, M) respectively received from AD converters 208, 209 and a pulse code $a(z)_n$ (where z=1, . . . , Nt; n=1, . . . , L) having a code length L, transmitted from radar transmitter 100, for each radar transmission period Tr. For example, correlation operator 211 performs sliding correlation operation between the discrete sample value x(k, M) and the pulse code $a(z)_n$. For example, a correlation operation value $AC_{(z)}(k, M)$ of sliding correlation operation at discrete time k in an M-th radar transmission period Tr[M] is calculated in accordance with the following expression.

[1]

$$AC_{(z)}(k, M) = \sum_{n=1}^{L} x(k + N_s(n-1), M) a(z)_n^* \quad \text{(Expression 1)}$$

In the above expression, the asterisk (*) denotes a complex conjugate operator.

Correlation operator 211, for example, performs correlation operation over a period of k=1, . . . , (Nr+Nu)Ns/No in accordance with the expression 1.

Figure 7:
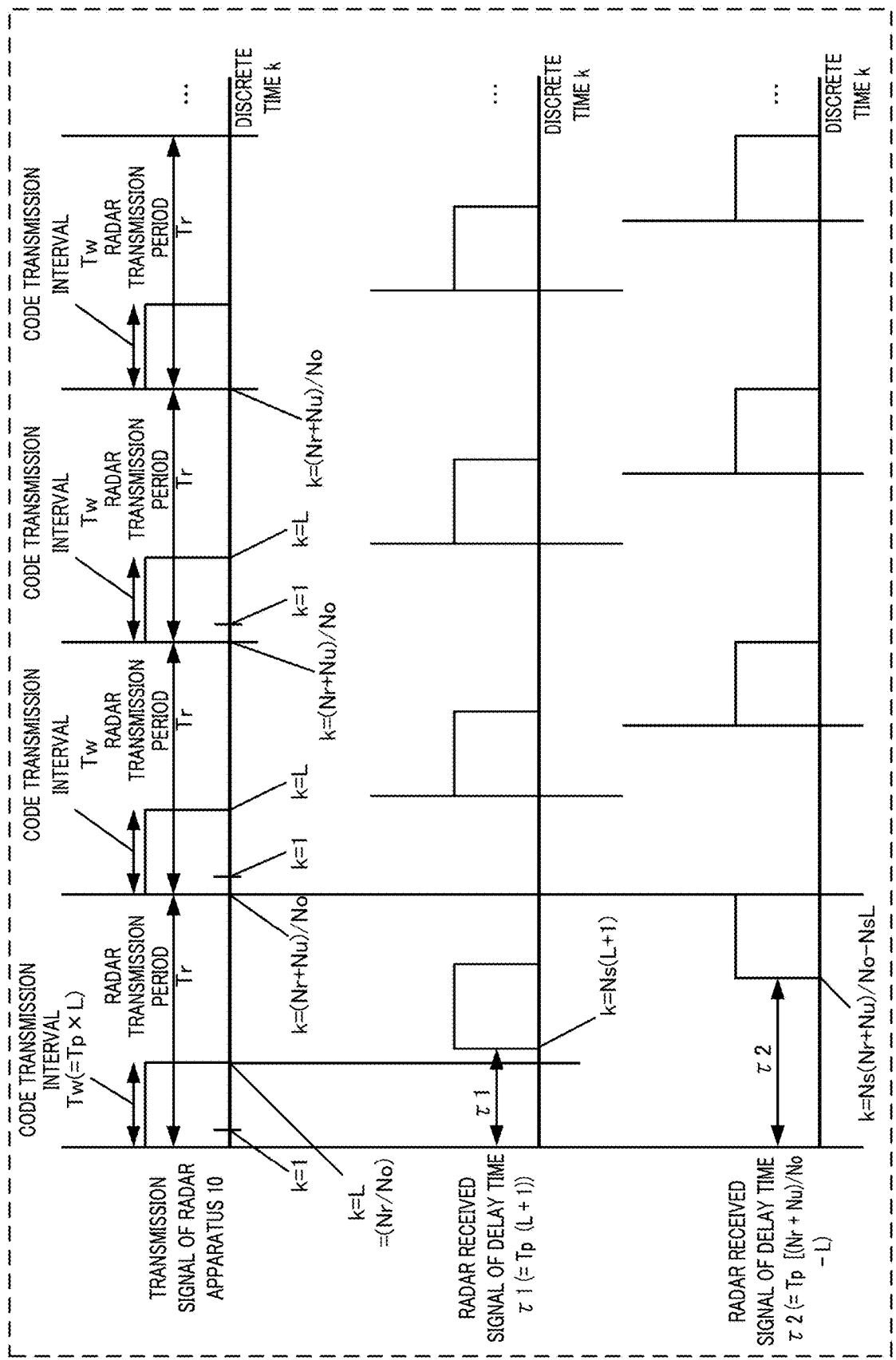
FIG. 7 is a diagram showing an example of transmission timing of a radar transmission signal and a measurement range.

Correlation operator 211 is not limited to the case where correlation operation is performed over k=1, . . . , (Nr+Nu)Ns/No and may limit a measurement range (that is, the range of k) according to the presence range of a target that is a target to be measured by radar apparatus 10. With this configuration, with radar apparatus 10, it is possible to reduce the operation throughput of correlation operator 211. For example, correlation operator 211 may limit the measurement range to k=Ns(L+1), . . . , (Nr+Nu)Ns/No−NsL. In this case, as shown in FIG. 7, radar apparatus 10 does not perform time measurement in a time interval corresponding to the code transmission interval Tw.

With this configuration, in radar apparatus 10, even when a radar transmission signal directly sneaks to radar receiver 200, processing by correlation operator 211 is not performed in a period during which a radar transmission signal sneaks (at least a period shorter than τ1), so measurement excluding the influence of sneaking is possible. When the measurement range (the range of k) is limited, processing with a limited measurement range (the range of k) may be applied similarly to processing of adder 212, Doppler frequency analyzer 213, and direction estimator 214, described below. With this configuration, it is possible to reduce throughput in each component, so it is possible to reduce electric power consumption in radar receiver 200.

Adder 212 adds (coherent integration) correlation operation value $AC_{(z)}(k, M)$ over a period (Tr×Np) of a predetermined number of times (Np times) of the radar transmission period Tr by using the correlation operation value $AC_{(z)}(k, M)$ output from correlation operator 211 at each discrete time k in the M-th radar transmission period Tr. Addition (coherent integration) processing of the number Np of additions over the period (Tr×Np) is expressed by the following expression.

[2]

$$CI_{(z)}(k, m) = \sum_{g=1}^{N_p} AC_{(z)}(k, N_p(m-1)+g) \quad \text{(Expression 2)}$$

Here, $CI_{(z)}(k, m)$ denotes an added value of correlation operation values (hereinafter, referred to as correlation added value), Np is an integer value greater than or equal to one, and m is an integer greater than or equal to one and indicating the ordinal number of the number of times of addition in the case where the number of times of addition Np in adder 212 is defined as one unit. In addition, z=1, . . . , Nt.

Adder 212 performs addition Np times on the assumption that the output of correlation operator 211, obtained in unit of the radar transmission period Tr, as one unit. In other words, adder 212 calculates, for each discrete time k, a correlation value $CI_{(z)}(k, m)$ obtained by adding correlation operation values $AC(z)(k, Np(m-1)+1)$ to $AC_{(z)}(k, Np \times m)$ as one unit while the timing of discrete time k is matched. With this configuration, adder 212 improves the SNR (signal to noise ratio) of a reflected wave signal in a range in which a reflected wave signal from a target has a high correlation due to the effect of addition of correlation operation values over Np times. Thus, radar receiver 200 improves measurement performance related to estimation of a distance of arrival of the target.

To obtain an ideal addition gain, the condition in which phase components of correlation operation values match within a certain range in the interval of adding correlation operation values the number Np of additions is required. In other words, the number Np of additions is preferably set in accordance with an assumed maximum moving speed of a target that is an object to be measured. This is because of the following reason. As the assumed maximum speed of a target increases, the amount of variations in Doppler frequency included in a reflected wave from the target increases. For this reason, a time period with a high correlation shortens, so the number Np of additions becomes a small value, and a gain improving effect from addition in adder 212 reduces.

Doppler frequency analyzer 213 performs coherent integration while matching the timing of discrete time k using $CI_{(z)}(k, Nc(w-1)+1)$ to $CI_{(z)}(k, Nc \times w)$ that are Nc outputs of adder 212 and obtained for each discrete time k as one unit. For example, Doppler frequency analyzer 213 corrects phase variations $\Phi(fs)=2\pi fs(Tr \times Np)\Delta\Phi$ according to different 2Nf Doppler frequencies $fs\Delta\Phi$ and performs coherent integration as shown in the following expression.

[3]

$$FT\_CI_{(z)}^{Nant}(k, f_s, w) = \quad \text{(Expression 3)}$$
$$\sum_{q=0}^{N_c-1} CI_{(z)}(k, N_c(w-1)+q+1)\exp[-j\phi(f_s)q] =$$
$$\sum_{q=0}^{N_c-1} CI_{(z)}(k, N_c(w-)+q+1)\exp[-j2\pi f_s T_r N_p q\Delta\phi]$$

Here, $FT\_CI_{(z)}^{Nant}(k, fs, w)$ is the w-th output in Doppler frequency analyzer 213, and denotes the coherent integration result of Doppler frequency $fs\Delta\Phi 1$ at discrete time k in Nant-th antenna channel processor 201. Nant=1 to Na, fs=−Nf+1, . . . , 0, . . . , Nf, k=1, . . . , (Nr+Nu)Ns/No, w is an integer greater than or equal to one, and $\Delta\Phi$ is a phase rotation unit.

With this configuration, each antenna channel processor 201 obtains $FT\_CI_{(z)}^{Nant}(k, -Nf+1, w), \ldots, FT\_CI_{(z)}^{Nant}(k, Nf-1, w)$ that are coherent integration results according to 2Nf Doppler frequency components at each discrete time k for each period (Tr×Np×Nc) of multiple times Np×Nc of the radar transmission period Tr. j is an imaginary unit, and z=1, . . . , Nt.

When $\Delta\Phi=1/(Nc \times Tr \times Np)$, the above-described processing of Doppler frequency analyzer 213 is equivalent to performing discrete Fourier transform (DFT) on the output of adder 212 at a sampling interval Tm=(Tr×Np) at a sampling frequency fm=1/Tm.

By setting Nf to a power of two number, a fast Fourier transform (FFT) can be applied in Doppler frequency analyzer 213, and the operation throughput can be reduced. Where Nf>Nc, when zero padding for setting $CI_{(z)}(k, Nc(w-1)+q)=0$ in the region in which q>Nc is performed, an FFT can be similarly applied, and the operation throughput can be reduced.

In Doppler frequency analyzer 213, instead of an FFT, a process of sequentially computing product-sum operation shown in the expression 3 may be performed. In other words, Doppler frequency analyzer 213 may generate coefficients $\exp[-j2\pi f_s T_r N_p q\Delta\phi]$ for fs=−Nf+1, . . . , 0, . . . , Nf−1 over $CI_{(z)}(k, Nc(w-1)+q+1)$ that are Nc outputs of adder 212 and obtained for each discrete time k and may sequentially perform product-sum operation. Here, q=0 to Nc−1.

In the following description, w-th outputs $FT\_CI_{(z)}^1(k, fs, w), FT\_CI_{(z)}^2(k, fs, w), \ldots, FT\_CI_{(z)}^{Na}(k, fs, w)$ obtained by applying similar processing in each of Na antenna channel processors 201 are expressed as a virtual reception array correlation vector h(k, fs, w) as shown in the following expression. The virtual reception array correlation vector h(k, fs, w) contains Nt×Na elements that are the products of the number Nt of transmission antennas and the number Na of reception antennas. The virtual reception array correlation vector h(k, fs, w) is used to describe a process of performing direction estimation based on a phase difference between reception antennas 202 over a reflected wave signal from a target, which will be described later. Here, z=1, . . . , Nt, and b=1, . . . , Na.

[4]

$$h(k, fs, w) = \begin{bmatrix} FT\_CI_{(1)}^1(k, fs, w) \\ FT\_CI_{(2)}^1(k, fs, w) \\ \vdots \\ FT\_CI_{(Nt)}^1(k, fs, w) \\ FT\_CI_{(1)}^{(2)}(k, fs, w) \\ FT\_CI_{(2)}^{(2)}(k, fs, w) \\ \vdots \\ FT\_CI_{(Nt)}^2(k, fs, w) \\ \vdots \\ FT\_CI_{(1)}^{Na}(k, fs, w) \\ FT\_CI_{(2)}^{Na}(k, fs, w) \\ \vdots \\ FT\_CI_{(Nt)}^{Na}(k, fs, w) \end{bmatrix} = \begin{bmatrix} h^1(k, fs, w) \\ h^2(k, fs, w) \\ \vdots \\ h^{Na}(k, fs, w) \end{bmatrix} \quad \text{(Expression 4)}$$

[5]

$$h^b(k, fs, w) = \begin{bmatrix} FT\_CI^b_{(1)}(k, fs, w) \\ FT\_CI^b_{(2)}(k, fs, w) \\ \vdots \\ FT\_CI^b_{(Nt)}(k, fs, w) \end{bmatrix} \quad \text{(Expression 5)}$$

The processing in each of the components of signal processor 207 has been described above.

Direction estimator 214 calculates a virtual reception array correlation vector $h\_{after\_cal}(k, fs, w)$ obtained by correcting a phase deviation and amplitude deviation between antenna channel processors 201 by using an array correction value $h\_cal_{[y]}$ over the virtual reception array correlation vector $h(k, fs, w)$ of w-th Doppler frequency analyzer 213, output from antenna channel processors 201-1 to 201-Na. Virtual reception array correlation vector $h\_{after\_cal}(k, fs, w)$ is expressed by the following expression. Here, y=1, ..., (Nt×Na).

[6]

$$h\_{after\_cal}(k, fs, w) = CA\ h(k, fs, w) = \begin{bmatrix} h_1(k, fs, w) \\ h_2(k, fs, w) \\ \vdots \\ H_{Na \times Nr}(k, fs, w) \end{bmatrix} \quad \text{(Expression 6)}$$

$$CA = \begin{bmatrix} h\_cal_{[1]} & 0 & \cdots & 0 \\ 0 & h\_cal_{[2]} & \ddots & \vdots \\ \vdots & \ddots & \ddots & 0 \\ 0 & \cdots & 0 & h\_cal_{[Nt \times Na]} \end{bmatrix}$$

The virtual reception array correlation vector $h\_{after\_cal}(k, fs, w)$ obtained by correcting inter-antenna deviations is a column vector consisting of Na×Nr elements. Hereinafter, the elements of the virtual reception array correlation vector $h\_{after\_cal}(k, fs, w)$ are expressed by h1(k, fs, w), ..., $h_{Na \times Nr}(k, fs, w)$ and are used to describe direction estimation processing.

Antenna Arrangement in Radar Apparatus 10

The arrangement of Nt transmission antennas 106 and Na reception antennas 202 in radar apparatus 10 having the above-described configuration will be described.

Basic Arrangement 1

Figure 8:
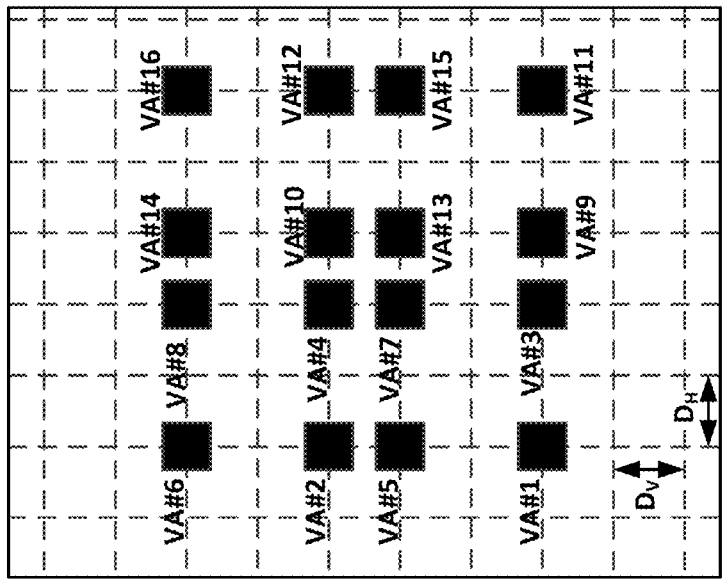
FIG. 8 is a diagram showing an example of an antenna arrangement according to basic arrangement 1.
Figure 8:
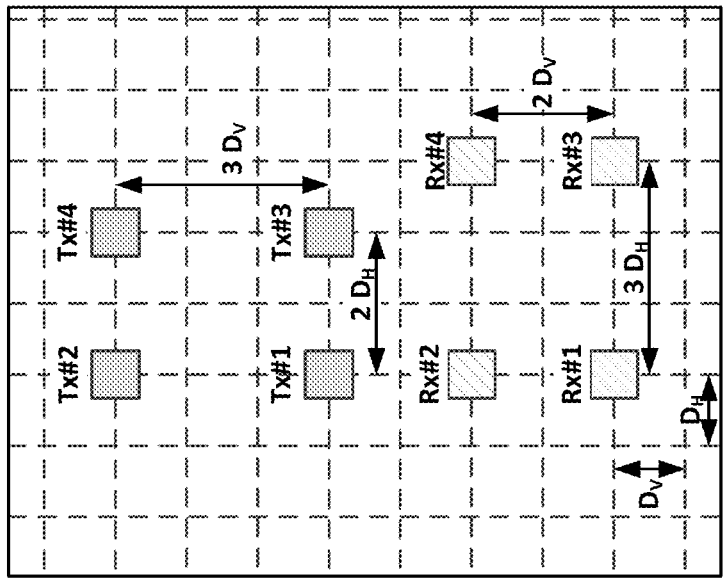

FIG. 8 shows an example of the arrangement of transmission antennas 106 and reception antennas 202 and an example of the arrangement of a virtual reception array according to basic arrangement 1.

The spacing $D_H$ in the horizontal direction (for example, the cross direction in FIG. 8) and the spacing $D_V$ in the vertical direction (for example, the longitudinal direction in FIG. 8), used in the following description, are, for example, the same. The spacing $D_H$ and the spacing $D_V$ may be different from each other.

(1) Arrangement of Transmission-Reception Antenna

In FIG. 8, the number Nt of transmission antennas 106 in the transmission array antenna is four (Tx #1, Tx #2, Tx #3, and Tx #4), and the number Na of reception antennas 202 in the reception array antenna is four (Rx #1, Rx #2, Rx #3, and Rx #4).

The transmission array antenna shown in FIG. 8 is made up of a first transmission antenna group (Tx #2 and Tx #4 in FIG. 8) and a second transmission antenna group (Tx #1 and Tx #3 in FIG. 8). Each transmission antenna group includes two transmission antenna elements of which the positions are the same in the vertical direction and the antenna spacing in the horizontal direction (the cross direction in FIG. 8) is $2D_H$. The spacing in the vertical direction (the longitudinal direction in FIG. 8) between the first transmission antenna group and the second transmission antenna group is, for example, $3D_V$.

The reception array antenna shown in FIG. 8 is made up of a first reception antenna group (Rx #2 and Rx #4 in FIG. 8) and a second reception antenna group (Rx #1 and Rx #3 in FIG. 8). Each reception antenna group includes two reception antenna elements of which the positions are the same in the vertical direction and the horizontal antenna spacing is $3D_H$. The vertical spacing between the first reception antenna group and the second reception antenna group is, for example, $2D_V$.

In other words, in FIG. 8, the vertical spacing between the transmission antenna groups ($3D_V$ in FIG. 8) and the horizontal antenna spacing in each reception antenna group ($3D_H$ in FIG. 8) are the same. In FIG. 8, the horizontal antenna spacing in each transmission antenna group ($2D_H$ in FIG. 8) and the vertical spacing between the reception antenna groups ($2D_V$ in FIG. 8) are the same.

In FIG. 8, the difference between the spacing $3D_V$ between the transmission antenna groups (or the antenna spacing $3D_H$ between the reception antenna groups) and the antenna spacing $2D_H$ in each transmission antenna group (or the spacing $2D_V$ in each reception antenna group) is $D_H$ or $D_V$.

In FIG. 8, the difference between the antenna spacing $2D_H$ (the spacing that is an integral multiple of $D_H$) in each transmission antenna group and the antenna spacing $3D_H$ (the spacing that is an integer multiple of $D_H$) in each reception antenna group is $D_H$. In FIG. 8, the difference between the spacing $3D_V$ (the spacing that is an integer multiple of $D_V$) at which the plurality of transmission antenna groups is arranged and the spacing $2D_V$ (the spacing that is an integer multiple of $D_V$) at which the plurality of reception antenna groups is arranged is $D_V$.

(2) Arrangement of Virtual Reception Array

The arrangement of the virtual reception array (virtual antennas VA #1 to VA #16), provided in accordance with the above-described transmission-reception antenna arrangement shown in FIG. 8, has the following features.

Here, the arrangement of the virtual reception array can be expressed as the following expression from the positions (the positions of feeding points) of transmission antennas that make up the transmission array antenna and the positions (the positions of feeding points) of reception antennas that make up the reception array antenna.

[7]

(Expression 1)

$$\begin{cases} X_{V\_\#k} = (X_{T\_\#[mod(k-1,Nt)+1]} - X_{T\_\#1}) + (X_{R\#[ceil(k/Na)]} - X_{R\_\#1}) \\ Y_{V\_\#k} = (Y_{T\_\#[mod(k-1,Nt)+1]} - Y_{T\_\#1}) + (Y_{R\#[ceil(k/Na)]} - Y_{R\_\#1}) \end{cases}$$

mod(x, y) is an operator that calculates the remainder after division (modulo operation) and returns the remainder when x is divided by y. ceil(x) is an operator that returns a value rounded to a nearest integer greater than or equal to x. In the expression 7, the X-axis corresponds to the horizontal direction (cross direction) shown in FIG. 8, and the Y-axis corresponds to the vertical direction (longitudinal direction) shown in FIG. 8.

Here, the position coordinates of each of transmission antennas 106 that make up the transmission array antenna are $(X_{T\_\#n}, Y_{T\_\#n})$ (where n=1, . . . , Nt), the position coordinates of each of reception antennas 202 that make up the reception array antenna are $(X_{R\_\#m}, Y_{R\_\#m})$ (where m=1, . . . , Na), and the position coordinates of each of the virtual antennas that make up the virtual reception array are $(X_{V\_\#k}, Y_{V\_\#k})$ (where k=1, . . . , Nt×Na). In the expression 7, VA #1 is expressed as the position reference (0, 0) of the virtual reception array.

The case of the antenna arrangement shown in FIG. 8 will be described as an example.

The position coordinates of each of transmission antennas 106 that make up the transmission array antenna are expressed as the position coordinates $(X_{T\_\#2}, Y_{T\_\#2}) = (X_{T\_\#1}, Y_{T\_\#1}+3D_V)$ of transmission antenna Tx #2, the position coordinates $(X_{T\_\#3}, Y_{T\_\#3}) = (X_{T\_\#1}+2D_H, Y_{T\_\#1})$ of transmission antenna Tx #3, and the position coordinates $(X_{T\_\#4}, Y_{T\_\#4}) = (X_{T\_\#1}+2D_H, Y_{T\_\#1}+3D_V)$ of transmission antenna Tx #4 with reference to the position coordinates $(X_{T\_\#1}, Y_{T\_\#1})$ of transmission antenna Tx #1.

Similarly, the position coordinates of each of reception antennas 202 that make up the reception array antenna are expressed as the position coordinates $(X_{R\_\#2}, Y_{R\_\#2}) = (X_{R\_\#1}, Y_{R\_\#1}+2D_V)$ of reception antenna Rx #2, the position coordinates $(X_{R\_\#3}, Y_{R\_\#3}) = (X_{R\_\#1}+3D_H, Y_{R\_\#1})$ of reception antenna Rx #3, and the position coordinates $(X_{R\_\#4}, Y_{R\_\#4}) = (X_{R\_\#1}+3D_H, Y_{R\_\#1}+2D_V)$ of reception antenna Rx #4 with reference to the position coordinates $(X_{R\_\#1}, Y_{R\_\#1})$ of reception antenna Rx #1.

With such an arrangement of the transmission array antenna and an arrangement of the reception array antenna, each set of the position coordinates $(X_{V\_\#1}, Y_{V\_\#1})$ to $(X_{V\_\#16}, Y_{V\_\#16})$ of virtual reception array VA #1 to VA #16 is as follows.

(0, 0), (0, $3D_V$), ($2D_H$, 0), ($2D_H$, $3D_V$), (0, $2D_V$), (0, $5D_V$), ($2D_H$, $2D_V$), ($2D_H$, $5D_V$), ($3D_H$, 0), ($3D_H$, $3D_V$), ($5D_H$, 0), ($5D_H$, $3D_V$), ($3D_H$, $2D_V$), ($3D_H$, $5D_V$), ($5D_H$, $2D_V$), and ($5D_H$, $5D_V$).

In this way, in the arrangement of the virtual reception array shown in FIG. 8, the virtual reception array elements are arranged at different positions without any overlap. For this reason, the aperture length of the virtual reception array is expanded, so the main lobe narrows, and angular resolution is improved.

As shown in FIG. 8, virtual array elements VA #4, VA #7, VA #10, and VA #13 positioned around the center of the virtual reception array are densely arranged at a spacing of $D_H$ in the horizontal direction and a spacing of $D_V$ in the vertical direction. For example, in FIG. 8, when the spacing $D_H$ and the spacing $D_V$ are set to about 0.5λ, virtual array elements VA #4, VA #7, VA #10, and VA #13 are arranged at a spacing of $D_H$=0.5λ in the horizontal direction and a spacing of $D_V$=0.5λ in the vertical direction. With this configuration, grating lobes are reduced. The effect of reducing grating lobes will be described later.

In the arrangement of the virtual reception array, there is no dependence between the position of the transmission array antenna and the position of the reception array antenna. For this reason, the positions of the transmission array antenna and the reception array antenna are not limited to the arrangement shown in FIG. 8 and may be set to any arrangement. This also applies to other arrangement configurations described below.

A similar effect is obtained when the horizontal and vertical arrangement in the arrangement of the transmission array antenna and the reception array antenna shown in FIG. 8 is modified as the vertical and horizontal arrangement (for example, the arrangement in which the arrangement of FIG. 8 is rotated 90 degrees). This also applies to other arrangement configurations described below.

In the antenna arrangement shown in FIG. 8, the arrangement of the transmission array antenna and the arrangement of the reception array antenna may be interchanged. For example, the arrangement of the reception array antenna shown in FIG. 8 may be used as the arrangement of the transmission array antenna, and the arrangement of the transmission array antenna shown in FIG. 8 may be used as the arrangement of the reception array antenna. Even when the arrangement of the transmission array antenna and the arrangement of the reception array antenna are interchanged, the arrangement of the virtual reception array is the same arrangement, so a similar effect is obtained. This also applies to other arrangement configurations described below.

Here, the case where the spacing $D_H$ and the spacing $D_V$ are set to about 0.5λ in FIG. 8 will be described as an example. As shown in FIG. 8, in both the transmission antenna array and the reception antenna array, the spacing of the antenna elements is any one of $2D_H$, $3D_H$, $2D_V$, and $3D_V$. In other words, in FIG. 8, the spacing $3D_V$ between the transmission antenna groups, the antenna spacing $3D_H$ in each reception antenna group, the antenna spacing $2D_H$ in each transmission antenna group, and the spacing $2D_V$ between the reception antenna groups are spacings longer than one wavelength of a radar transmission signal (for example, radar carrier wave). Thus, in FIG. 8, the horizontal and vertical element sizes of each of transmission antennas 106 and reception antennas 202 can be designed as a size greater than or equal to about 1λ.

Figure 9A:
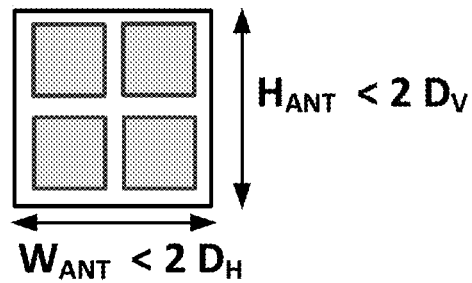
FIG. 9A is a diagram showing an example of a sub-array configuration.

With this configuration, for example, an antenna using four elements that are planar patch antennas arranged in a two by two matrix as a sub-array as shown in FIG. 9A is applicable to each antenna element of at least one of the transmission array antenna and the reception array antenna shown in FIG. 8. In FIG. 9A, the antenna width $W_{ANT}<2D_H$, and the antenna height $H_{ANT}<2D_V$.

Figure 9B:
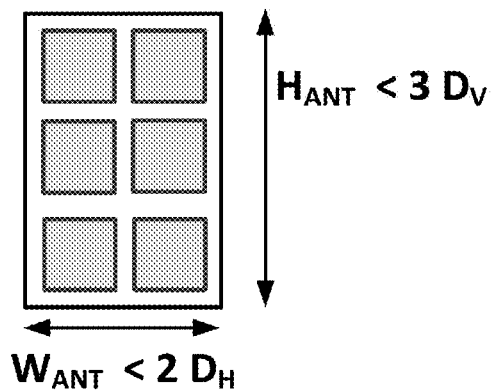
FIG. 9B is a diagram showing an example of a sub-array configuration.

In the case of FIG. 8, the vertical antenna spacing of the transmission array antenna is $3D_V$ and is wider than the horizontal antenna spacing $2D_H$. For this reason, for example, an antenna using six elements that are planar patch antennas arranged in a two by three matrix as a sub-array as shown in FIG. 9B is applicable to each of the antenna elements of the transmission array antenna shown in FIG. 8. In FIG. 9B, the antenna width $W_{ANT}<2D_H$, and the antenna height $H_{ANT}<3D_V$.

Figure 9C:
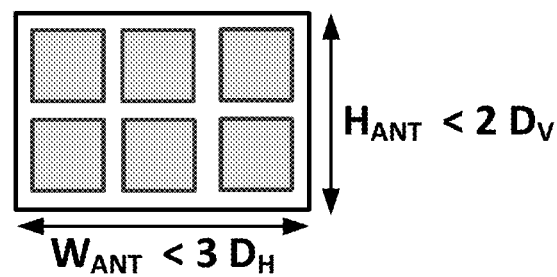
FIG. 9C is a diagram showing an example of a sub-array configuration.

In the case of FIG. 8, the horizontal antenna spacing of the reception array antenna is $3D_H$ and is wider than the vertical antenna spacing $2D_V$. For this reason, for example, an antenna using six elements that are planar patch antennas arranged in a three by two matrix as a sub-array as shown in FIG. 9C is applicable to each of the antenna elements of the reception array antenna shown in FIG. 8. In FIG. 9C, the antenna width $W_{ANT} < 3D_H$, and the antenna height $H_{ANT} < 2D_V$.

In the antenna arrangement shown in FIG. 8, when the antenna with the sub-array configuration shown in FIG. 9A, FIG. 9B, or FIG. 9C is used, the directivity gain of the antenna is improved, so the detection performance (for example, detection distance) in radar apparatus 10 is improved. The sub-array configuration to be applied to the antenna elements shown in FIG. 8 is not limited to the configurations shown in FIGS. 9A, 9B, and 9C and may be a sub-array configuration in which the positions shown in FIG. 8 can be arranged as the phase center of each antenna element (in other words, antenna channel).

Figure 10:
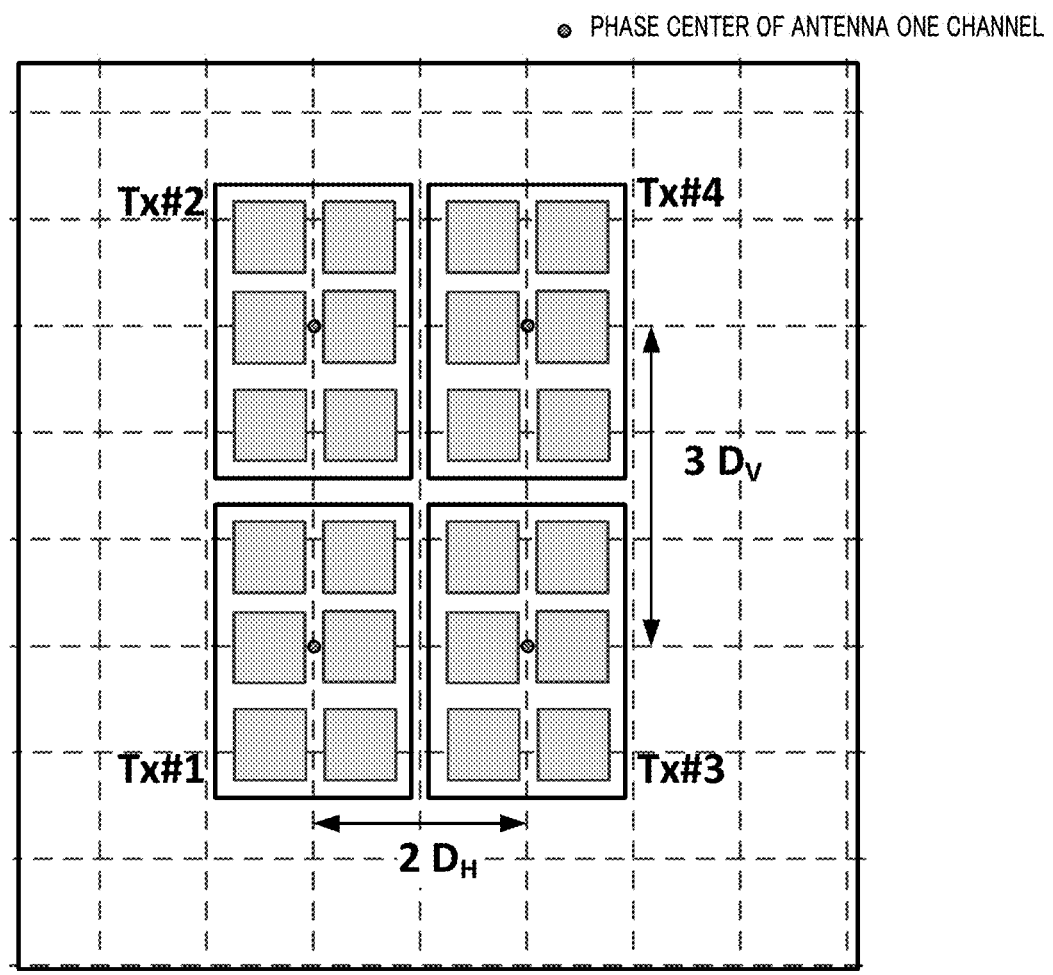
FIG. 10 is a diagram showing a configuration example of a transmission array antenna using sub-arrays.

FIG. 10 shows an example in the case where the sub-array shown in FIG. 9B is applied to each of the antenna elements of the transmission array antenna shown in FIG. 8 as an example. As shown in FIG. 10, the transmission array antenna is made up of antenna elements each made up of a sub-array configuration of a vertical size of $3D_V$ and a horizontal size of $2D_H$.

In this way, according to basic arrangement 1, for example, the antenna element with a size greater than or equal to 12 (for example, in the case where $D_H = D_V = 0.520$ can be applied, and virtual antennas can be densely arranged (for example, at a spacing of DI) or $D_V$) in the horizontal direction and the vertical direction in the virtual reception array. Thus, while grating lobes are reduced (in other words, suppressed), the directivity gain of the antenna is improved.

An example of the antenna arrangement in radar apparatus 10 has been described above.

Direction estimator 214 performs direction estimation processing in the horizontal direction and in the vertical direction as follows by using received signals of the virtual reception array (see, for example, FIG. 8) obtained from the arrangement of the above-described transmission-reception antenna (see, for example, FIG. 8).

The element number (VA #number) of the virtual reception array corresponds to the element number of the column vector of the virtual reception array correlation vector $h_{\_after\_cal}(k, fs, w)$ obtained by correcting the inter-antenna deviations shown in the expression 6. For example, VA #1 shown in FIG. 8 corresponds to the first element $h_1(k, fs, w)$ of the column vector elements of $h_{\_after\_cal}(k, fs, w)$. This also applies to the other VA #2 to VA #16 shown in FIG. 8.

In direction-of-arrival estimation in the horizontal direction and the vertical direction, direction estimator 214 calculates a spatial profile while making an azimuth direction θ and an elevation direction φ in a direction estimation evaluation function value $P(θ, φ, k, fs, w)$ variable within a predetermined angular range. Direction estimator 214 extracts a predetermined number of local maximum peaks of the calculated spatial profile in descending order and outputs the azimuth direction and elevation direction of each local maximum peak as a direction-of-arrival estimate.

An evaluation function value $P(θ, φ, k, fs, w)$ can be obtained by various methods depending on a direction-of-arrival estimation algorithm. An estimation method using the array antenna described in, for example, reference NPL may be used.

(Reference NPL) Direction-of-arrival estimation using signal subspace modeling Cadzow, J. A.; Aerospace and Electronic Systems, IEEE Transactions on Volume: 28, Issue: 1, Publication Year: 1992, Page(s): 64-79

For example, a beam former method can be expressed as the following expression. Other methods such as Capon and MUSIC can be similarly applied.

[8]

$$P(\theta_u, \phi_v, k, fs, w) = |a(\theta_u, \phi_v)^H h_{\_after\_cal}(k, fs, w)|^2 \quad \text{(Expression 8)}$$

Here, a character superscript H is a Hermitian transpose operator. $a(\theta_u, \phi_v)$ represents the directional vector of the virtual reception array for an incoming wave at the azimuth direction θ and the elevation direction φ.

As described above, direction estimator 214 outputs the calculated direction-of-arrival estimate together with the discrete time k and the Doppler frequency $fs\Delta\Phi$ at the time of calculating the direction-of-arrival estimate as a radar positioning result.

The azimuth direction $\theta_u$ is a vector varied at a predetermined azimuth spacing $\beta_1$ within an azimuth range for performing direction-of-arrival estimation. For example, $\theta_u$ is set as follows.

$$\theta_u = \theta \min + u\beta_1, \text{ and } u = 0, \ldots, NU.$$

$$NU = \text{floor}[(\theta \max - \theta \min)/\beta_1] + 1$$

Here, floor(x) is a function that returns a maximum integer value not exceeding real number x.

$\phi_v$ is varied at a predetermined azimuth spacing $\beta_2$ within a predetermined elevation angle range for performing direction-of-arrival estimation. For example, $\phi_v$ is set as follows.

$$\phi_v = \phi \min + v\beta_2, \text{ and } v = 0, \ldots, NV.$$

$$NV = \text{floor}[(\phi \max - \phi \min)/\beta_2] + 1$$

In the present embodiment, the directional vector $a(\theta_u, \phi_v)$ of the virtual reception array is calculated in advance in accordance with the virtual reception array arrangement VA #1, . . . , VA #(Nt×Na). Here, the directional vector $a(\theta_u, \phi_v)$ is an (Nt×Na)th-order column vector containing a complex response of the virtual reception array in the case where a reflected wave comes from the azimuth direction θ and the elevation direction φ as elements. The complex response $a(\theta_u, \phi_v)$ of the virtual reception array represents a phase difference geometrically optically calculated at the interelement spacing between the antennas.

The above-described time information k may be convened to distance information and output. The following expression may be used to convert time information k to distance information R(k). Here, Tw denotes a code transmission interval, L denotes a pulse code length, and $C_0$ denotes a light velocity.

[9]

$$R(k) = k \frac{T_w C_0}{2L} \quad \text{(Expression 9)}$$

Doppler frequency information ($fs\Delta\Phi$) may be converted to a relative speed component and output. The following expression may be used to convert the Doppler frequency $fs\Delta\Phi$ to a relative speed component vd(fs). Here, λ is the wavelength of the carrier frequency of an RF signal output from transmission radio section 105.

$$v_d(f_s) = \frac{\lambda}{2} f_s \Delta\Phi \quad \text{(Expression 10)}$$

Figure 11A:
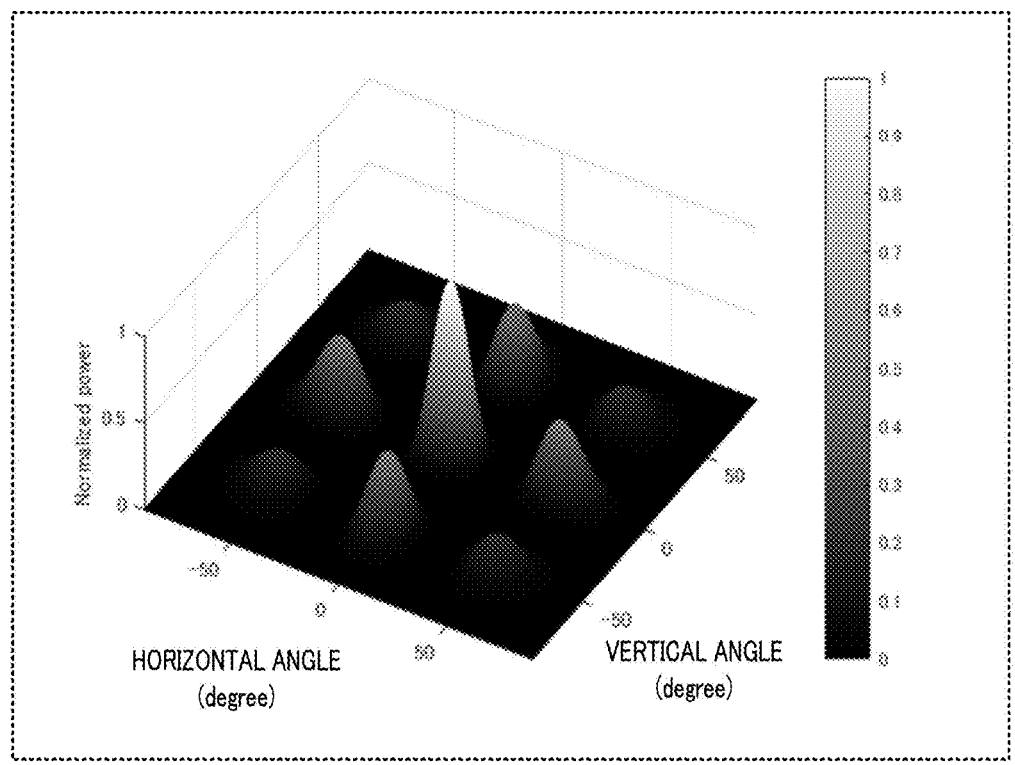
FIG. 11A is a diagram showing an example of a direction estimation result using a transmission-reception antenna arrangement according to basic arrangement 1.
Figure 11B:
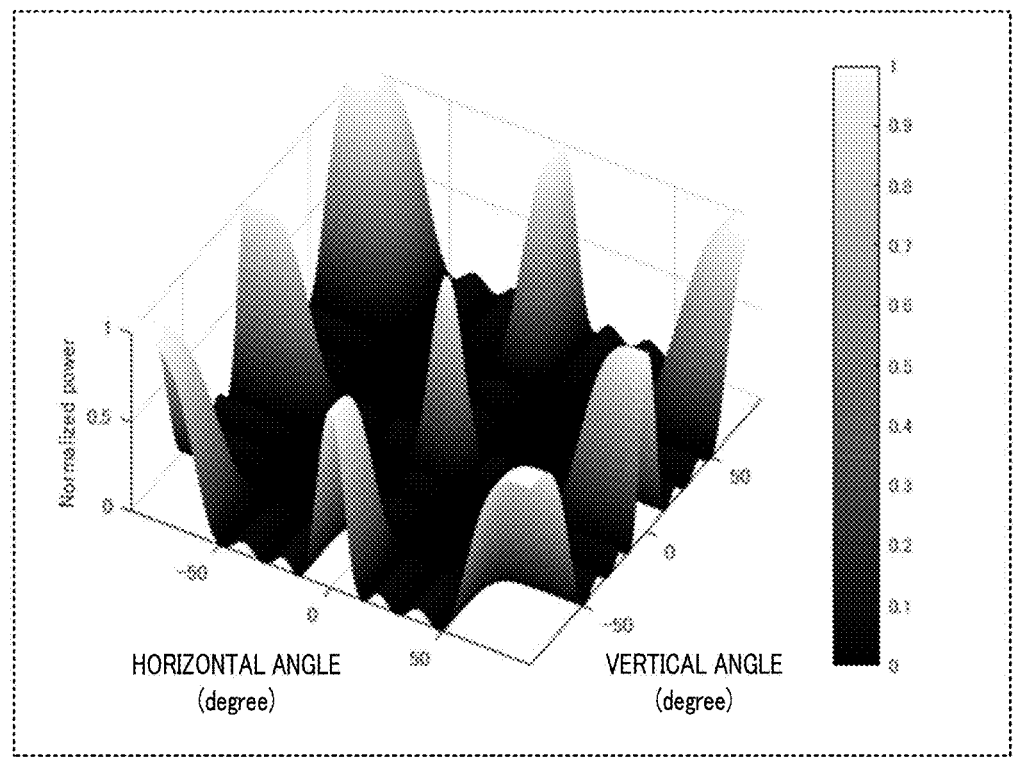
FIG. 11B is a diagram showing an example of a direction estimation result using a transmission-reception antenna arrangement of FIG. 1A.

FIGS. 11A and 11B show examples of a direction estimation result in the case where the beam former method is used in the direction-of-arrival estimation algorithm of direction estimator 214. In FIGS. 11A and 11B outputs of the direction-of-arrival estimation evaluation function value in the range of ±90 degrees in the horizontal direction and in the range of ±90 degrees in the vertical direction in the case where a target true value is set at zero degrees in the horizontal direction and zero degrees in the vertical direction are plotted. The directivity of each antenna is calculated as omnidirectivity.

FIG. 11A shows an example of a direction estimation result in the case where the transmission-reception antenna arrangement (for example, a MIMO array arrangement) shown in FIG. 8 (where $D_H$=0.5λ, and $D_V$=0.5λ) is used. In other words, in FIG. 11A, the condition in which the horizontal and vertical antenna spacings of transmission antennas 106 are greater than or equal to 1λ, and the condition in which the horizontal and vertical antenna spacings of reception antennas 202 are also greater than or equal to lλ are satisfied.

FIG. 11B shows a direction estimation result in the case where the vertical antenna spacing of the transmission antennas is λ and the horizontal antenna spacing of the reception antennas is λ (that is, $d_V$=λ, and $d_H$=λ) in the antenna arrangement of the MIMO radar shown in FIG. 1 as an example for comparison with FIG. 11A.

In FIG. 11B, at directions other than zero degrees in the horizontal direction or zero degrees in the vertical direction, grating lobes are generated in the horizontal direction and in the vertical direction. In contrast, it is identified in FIG. 11A that, at directions other than zero degrees in the horizontal direction or zero degrees in the vertical direction, grating lobes are reduced. For example, in FIG. 11A, the ratio (PSLR) of the peak power level of the highest side lobe, other than a main lobe, at directions other than zero degrees in the horizontal direction or zero degrees in the vertical direction, to the peak power level of the main lobe at the direction of zero degrees in the horizontal direction and zero degrees in the vertical direction is about 0.44.

As described above, by using the MIMO array arrangement shown in FIG. 8, even when the element size of each antenna in the longitudinal direction or in the cross direction, used for the transmission array antenna and the reception array antenna, is about lλ, the arrangement can be performed such that the horizontal and vertical antenna spacings in the virtual reception array include an interelement spacing of about 0.5λ, so grating lobes are reduced. For example, as shown in FIG. 8, the virtual array elements of the virtual reception array are arranged without any overlap, so the aperture length of the virtual reception array is expanded, and angular resolution is improved.

An antenna having a sub-array configuration of which the element size in the longitudinal direction and in the cross direction is at least about lλ can be used as each of the antenna elements for use in transmission antennas 106 and reception antennas 202. Thus, the directivity gain of the antenna is improved, so the detection performance (for example, detection distance) of radar apparatus 10 is improved.

The MIMO array arrangement is not limited to the example shown in FIG. 8. For example, the arrangement in which the horizontal direction and vertical direction of the antenna arrangement shown in FIG. 8 are interchanged may be used. In this case, the arrangement in which the horizontal direction and vertical direction of the arrangement shown in FIG. 8 are interchanged is obtained as the arrangement of a virtual reception array. With this configuration, angular separation performance in which the horizontal direction and the vertical direction in FIG. 8 and FIG. 8 are interchanged is obtained. The arrangement in which the horizontal direction and the vertical direction are interchanged may also be similarly used in the MIMO array arrangements according to the following description.

Modification 1 of Basic Arrangement 1

In basic arrangement 1 (for example, FIG. 8), the case where the number of transmission antennas 106 is four (Nt=4) and the number of reception antennas 202 is four (Nat=4) has been described. The number Nt of transmission antennas and the number Na of reception antennas are not limited to these numbers.

In Modification 1 of basic arrangement 1, a transmission array antenna, as in the case of basic arrangement 1, is made up of a first transmission antenna group and a second transmission antenna group at, for example, a vertical spacing of $3D_V$. Each transmission antenna group, as in the case of basic arrangement 1, includes a plurality of transmission antenna elements of which the positions are the same in the vertical direction and the horizontal antenna spacing is $2D_H$.

In Modification 1 of basic arrangement 1, a reception array antenna, as in the case of basic arrangement 1, is made up of a plurality of reception antenna groups at, for example, a vertical spacing of $2D_V$. Each reception antenna group includes a plurality of reception antenna elements of which the positions are the same in the vertical direction and the horizontal antenna spacing is $3D_H$.

In other words, in Modification 1 of basic arrangement 1, as in the case of basic arrangement 1, the vertical spacing (here, $3D_V$) between the transmission antenna groups and the horizontal antenna spacing (here, $3D_H$) in each reception antenna group are the same. The horizontal antenna spacing (here, $2D_H$) in each transmission antenna group and the vertical spacing (here, $2D_H$) between the reception antenna groups are the same.

Hereinafter, the number of transmission antenna groups is denoted by $N_{TxGroup}$, and the number of transmission antennas included in each transmission antenna group is denoted by $N_{TxGroup\_ANT}$. The number of reception antenna groups is denoted by $N_{RxGroup}$, and the number of transmission antennas included in each reception antenna group is denoted by $N_{RxGroup\_ANT}$.

In Modification 1 of basic arrangement 1, the arrangement in which the number of antennas of the MIMO array is increased according to the values of $N_{TxGroup\_ANT}$ and $N_{RxGroup}$ is possible.

Figure 12:
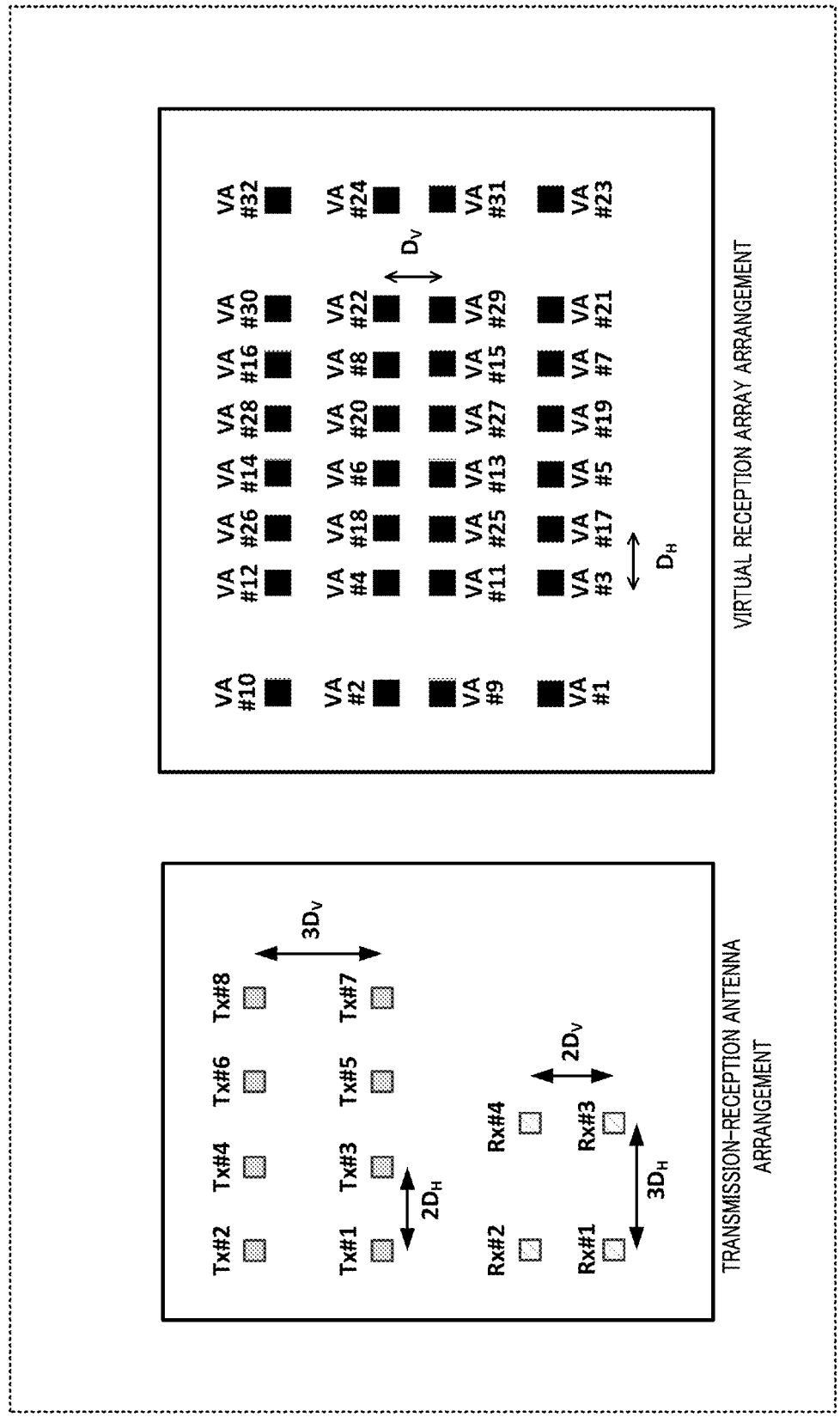
FIG. 12 is a diagram showing an example of an antenna arrangement according to Modification 1 of basic arrangement 1.

FIG. 12 shows an example of the arrangement of transmission antennas 106 and reception antennas 202 in the case where $N_{TxGroup\_ANT}$=4 and $N_{RxGroup}$=2 and an example of the arrangement of a virtual reception array.

Figure 13:
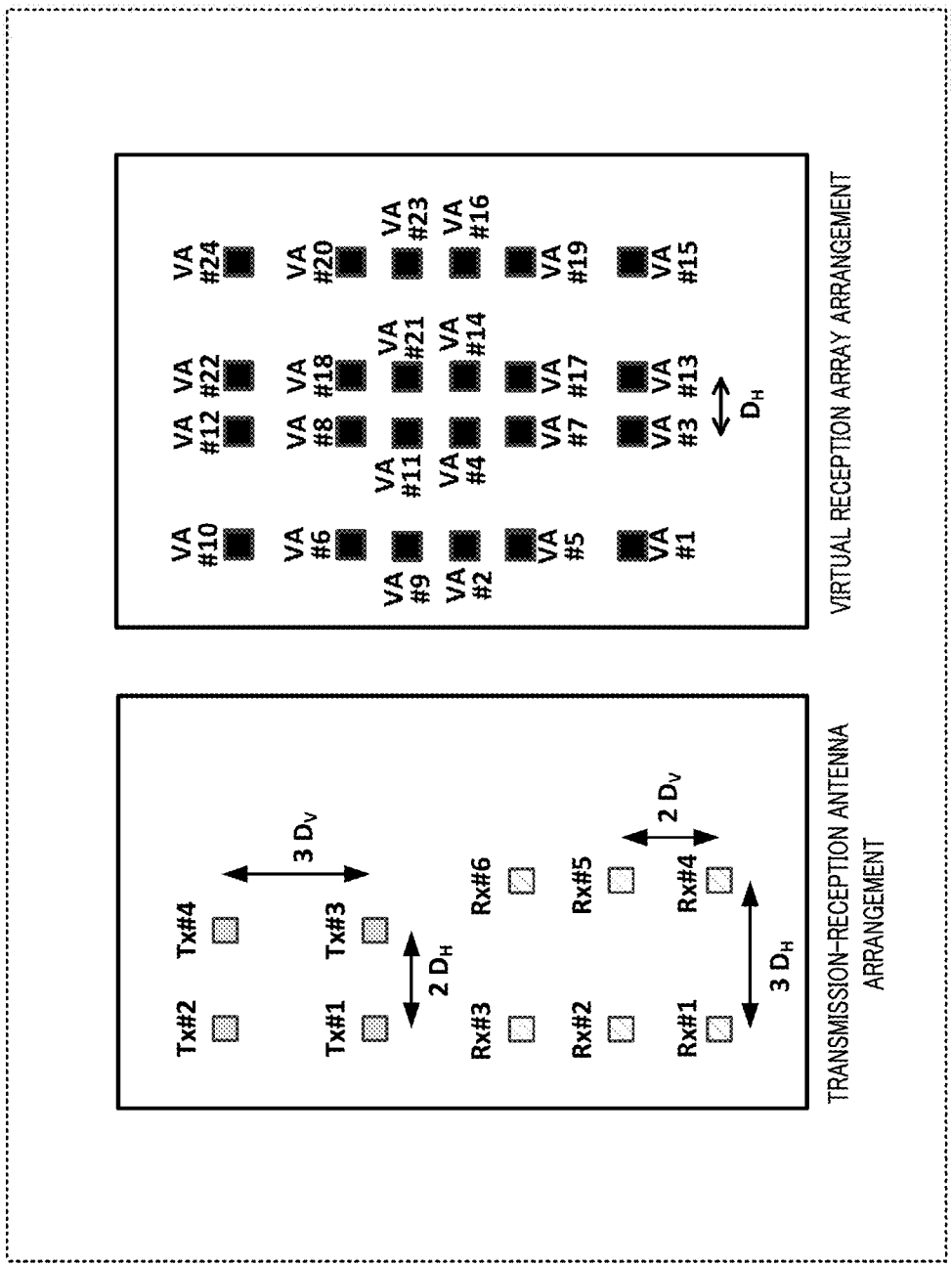
FIG. 13 is a diagram showing an example of an antenna arrangement according to Modification 1 of basic arrangement 1.

FIG. 13 shows an example of the arrangement of transmission antennas 106 and reception antennas 202 in the case where $N_{TxGroup\_ANT}$=2 and $N_{RxGroup}$=3 and an example of the arrangement of a virtual reception array.

Figure 14:
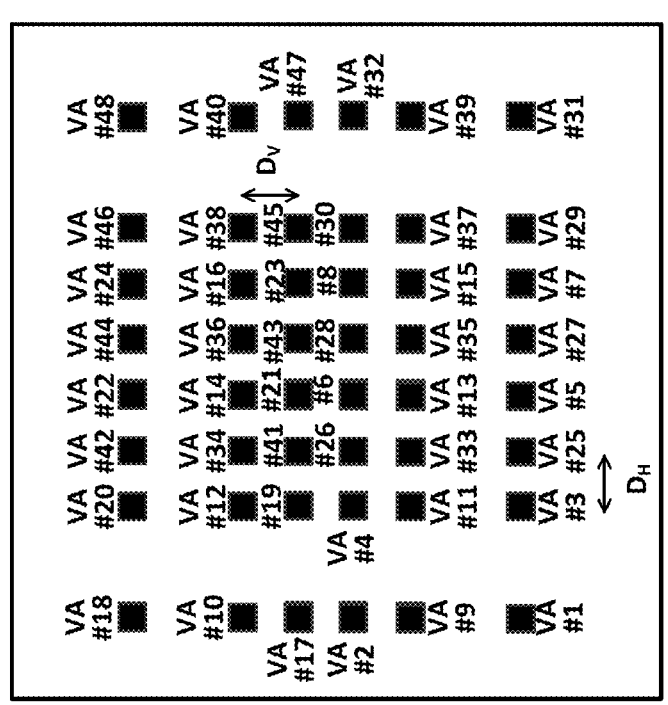
FIG. 14 is a diagram showing an example of an antenna arrangement according to Modification 1 of basic arrangement 1.
Figure 14:
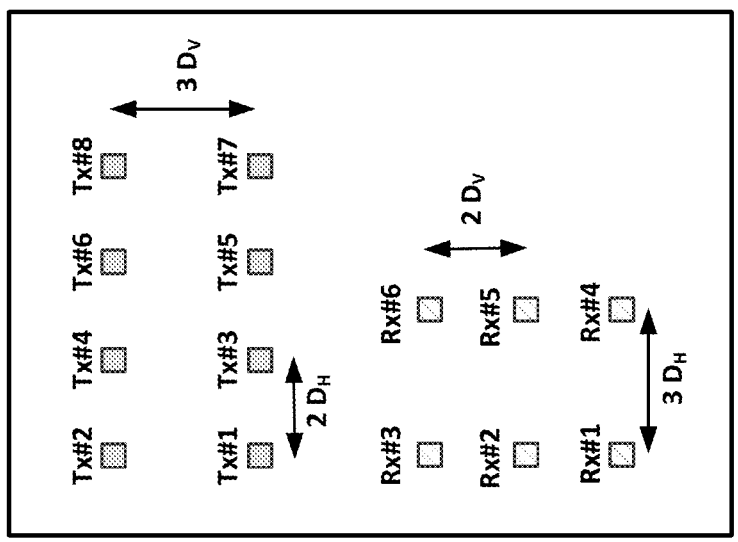

FIG. 14 shows an example of the arrangement of transmission antennas 106 and reception antennas 202 in the case where $N_{TxGroup\_ANT}=4$ and $N_{RxGroup}=3$ and an example of the arrangement of a virtual reception array.

In FIGS. 12, 13, and 14, $N_{TxGroup}=2$, and $N_{RxGroup\_ANT}=2$.

In each of the MIMO array arrangements respectively shown in FIGS. 12, 13, and 14, when, for example, $D_H$ and $D_V$ are set to about 0.5λ, the horizontal and vertical element sizes of each transmission antenna 106 and each reception antenna 202 can be designed to a size greater than or equal to about 1λ.

For example, in each of the virtual reception arrays respectively shown in FIGS. 12, 13, and 14, the virtual array elements are arranged at different positions without any overlap, so the aperture length of the virtual reception array is expanded, and angular resolution is improved.

The virtual array elements positioned around the center of each of the virtual reception arrays respectively shown in FIGS. 12, 13, and 14 are densely arranged at a spacing of $D_H$ and a spacing of $D_V$. The number of virtual array elements densely arranged at a spacing of $D_H$ and a spacing of $D_V$ increases depending on $N_{TxGroup\_ANT}$ and $N_{RxGroup}$.

For example, in a virtual reception array, $((N_{TxGroup\_ANT} \times N_{RxGroup\_ANT})-2)$ virtual array elements are arranged at a spacing of $D_H$ in the horizontal direction, and $((N_{RxGroup} \times N_{TxGroup})-2)$ virtual array elements are arranged at a spacing of $D_V$ in the vertical direction. As the number of virtual array elements densely arranged at a spacing of $D_H$ and a spacing of $D_V$ around the center of the virtual reception array increases, the effect of reducing grating lobes and side lobes is improved.

As $N_{TxGroup\_ANT}$ and/or $N_{RxGroup\_ANT}$ increases, the number of virtual array elements arranged in the horizontal direction increases, so the horizontal aperture length of the virtual reception array is expanded, and horizontal angular resolution is improved. Similarly, as $N_{RxGroup}$ and/or $N_{RxGroup}$ increases, the number of virtual array elements arranged in the vertical direction increases, so the vertical aperture length of the virtual reception array is expanded, and vertical angular resolution is improved.

Figure 15:
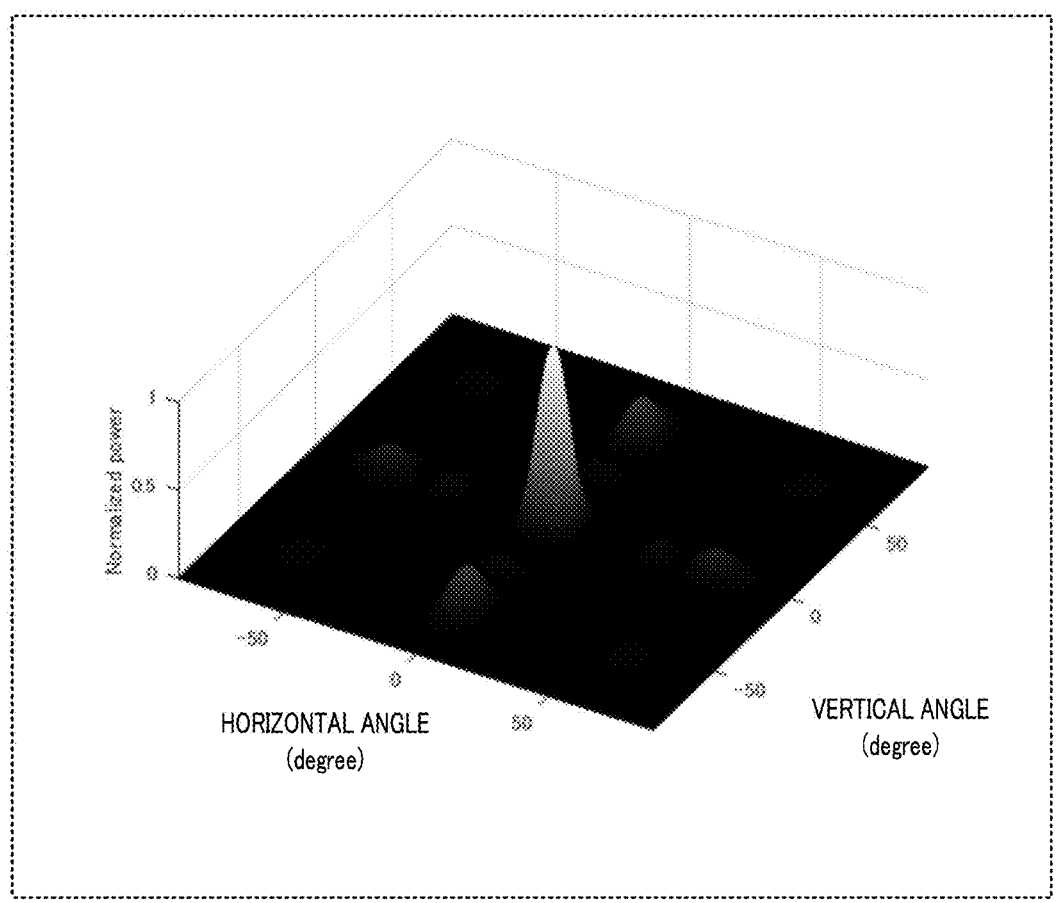
FIG. 15 is a diagram showing an example of the antenna arrangement according to Modification 1 of basic arrangement 1.

FIG. 15 shows an example of a direction estimation result in the case where, when, for example, the MIMO array arrangement in which the number Nt of transmission antennas 106 is eight and the number Na of reception antennas 202 is six ($N_{TxGroup\_ANT}=4$, $N_{TxGroup}=2$, $N_{RxGroup}=3$, $N_{RxGroup\_ANT}=2$, $D_H=0.5λ$, and $D_V=0.5λ$) is used as shown in FIG. 14, a beam former method is used as the direction-of-arrival estimation algorithm of direction estimator 214. The directivity of each antenna is calculated as omnidirectivity.

In FIG. 15, outputs of the direction-of-arrival estimation evaluation function value in the range of ±90 degrees in the horizontal direction and in the range of ±90 degrees in the vertical direction in the case where a target true value is set at zero degrees in the horizontal direction and zero degrees in the vertical direction are plotted.

It is identified in FIG. 15 that, at directions other than zero degrees in the horizontal direction or zero degrees in the vertical direction, grating lobes are reduced as compared to FIG. 11A. For example, in FIG. 15, the ratio (PSLR) of the peak power level of the highest side lobe, other than a main lobe, to the peak power level of the main lobe at the direction of zero degrees in the horizontal direction and zero degrees in the vertical direction is about 0.22.

Thus, it is identified that, in the case of FIG. 14 ($N_{TxGroup\_ANT}=4$, and $N_{RxGroup}=3$), the effect of reducing side lobes is improved by increasing $N_{TxGroup\_ANT}$ and $N_{RxGroup}$ as compared to the case of FIG. 8 ($N_{TxGroup\_ANT}=2$, and $N_{RxGroup}=2$) (see, for example, FIG. 11A) (in the case of both drawings, $N_{TxGroup}=2$, and $N_{RxGroup\_ANT}=2$). It is identified in FIG. 15 that the peak of the main lobe is sharpened as compared to FIG. 11A and the angular resolution is improved as a result of an increase in $N_{TxGroup\_ANT}$ and $N_{RxGroup}$.

Modification 2 of Basic Arrangement 1

Hereinafter, each of antenna arrangement methods 1-2A and 1-2B in Modification 2 of basic arrangement 1 will be described.

Arrangement Method 1-2A

In Modification 1 of basic arrangement 1, the case where the number of virtual array elements arranged in the vertical direction is increased by increasing the number $N_{RxGroup}$ of reception antenna groups included in the reception array antenna has been described. Here, when $N_{RxGroup} \geq 3$ is satisfied, the number of virtual array elements arranged in the vertical direction can be increased in the virtual reception array even by increasing the number $N_{TxGroup}$ of transmission antenna groups in the transmission array antenna.

In this case, the vertical antenna spacing of the transmission antenna groups may be set to, for example, a certain value (for example, $3D_V$); however, depending on the number $N_{RxGroup}$ of reception antenna groups, the virtual reception array arrangement can be the arrangement in which the virtual array elements overlap.

When the arrangement including no overlap virtual array element is applied to the virtual reception array arrangement, the following spacing $D_{TxGroupV}$ may be used as, for example, the even-numbered antenna spacings among the vertical antenna spacings of the transmission antenna groups.

[11]

$$D_{TxGroupV}=D_V(2N_{RxGroup}-3) \quad \text{(Expression 11)}$$

For example, when $N_{RxGroup}=3$, $D_{TxGroupV}=3D_V$, and, when $N_{RxGroup}=4$, $D_{TxGroupV}=5D_V$.

For example, the number $N_{TxGroup}$ of transmission antenna groups is three, the spacings of three transmission antenna groups are set to $\{3D_V, D_{TxGroupV}\}$. When the number $N_{TxGroup}$ of transmission antenna groups is four, the spacings of four transmission antenna groups are set to $\{3D_V, D_{TxGroupV}, 3D_V\}$. Similarly, when the number $N_{RxGroup\_ANT}$ of transmission antenna groups is five, the spacings of five transmission antenna groups are set to $\{3D_V, D_{TxGroupV}, 3D_V, D_{TxGroupV}\}$.

Figure 16:
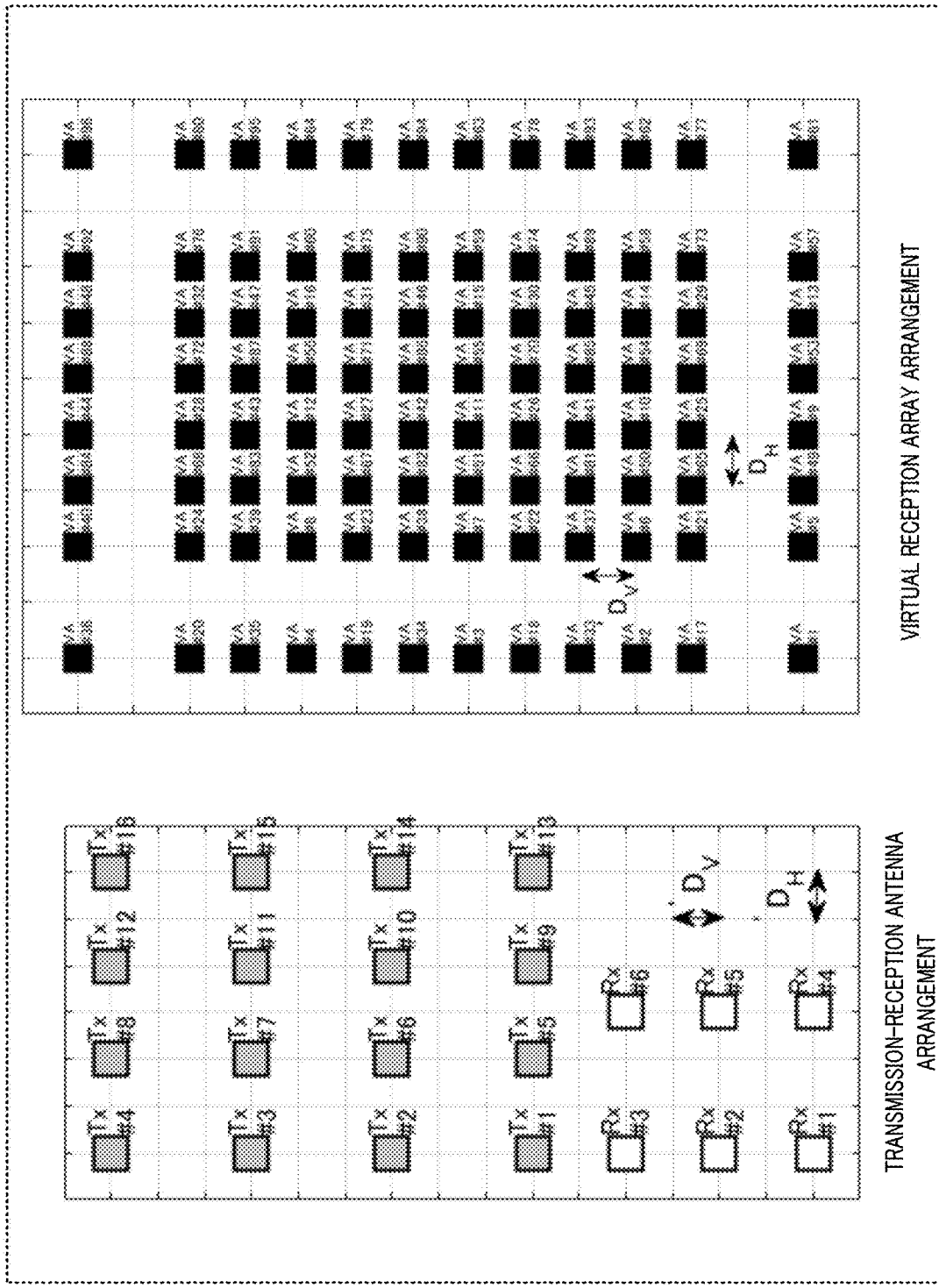
FIG. 16 is a diagram showing an example of an antenna arrangement according to Modification 2 of basic arrangement 1.

FIG. 16 shows an example of the arrangement of transmission antennas 106 and reception antennas 202 in the case where $N_{TxGroup}=4$, $N_{TxGroup\_ANT}=4$, $N_{RxGroup}=3$, and $N_{RxGroup\_ANT}=2$ and an example of the arrangement of a virtual reception array. In FIG. 16, in the expression 11, $D_{TxGroupV}=3D_V$.

Figure 17:
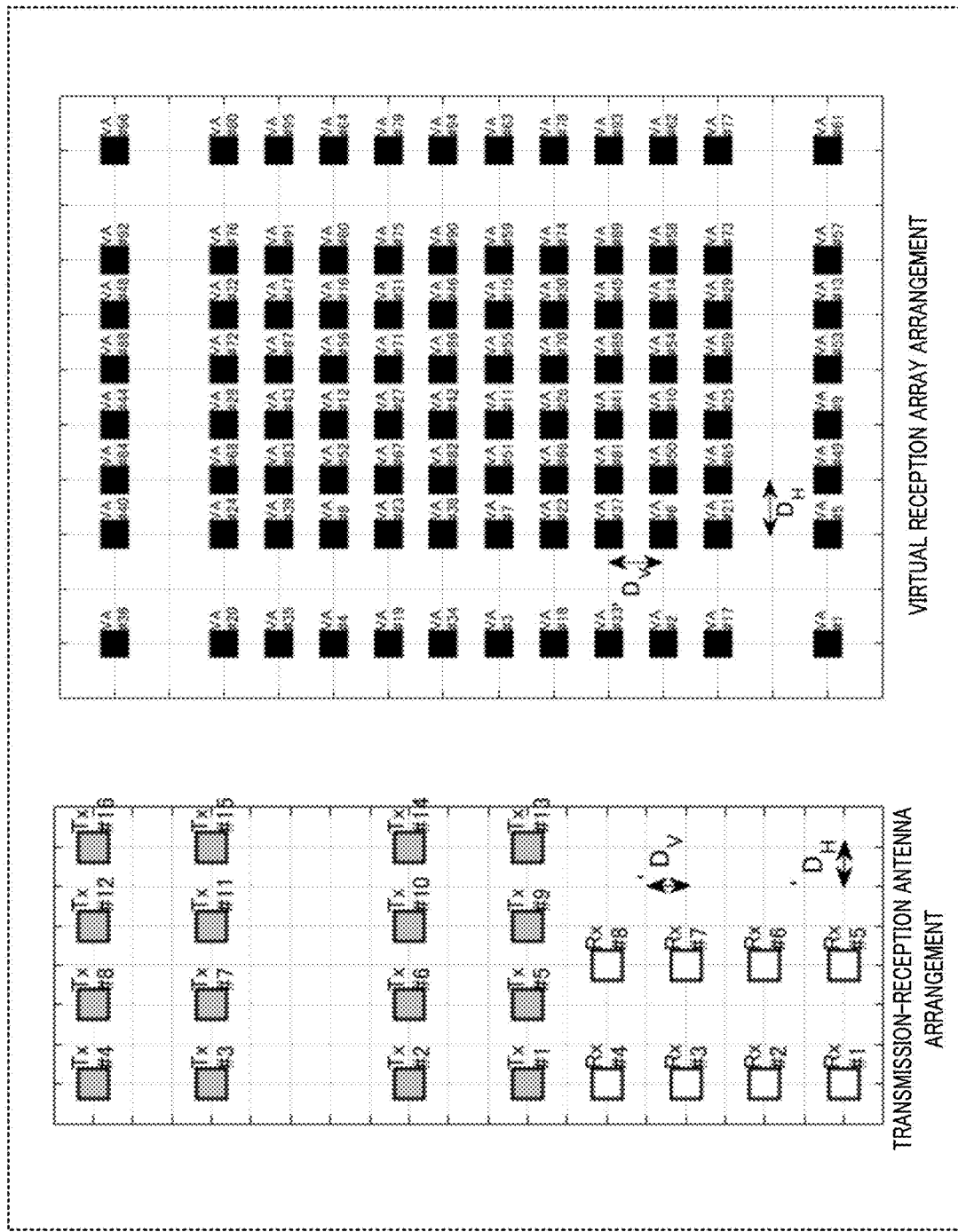
FIG. 17 is a diagram showing an example of an antenna arrangement according to Modification 2 of basic arrangement 1.

FIG. 17 shows an example of the arrangement of transmission antennas 106 and reception antennas 202 in the case where $N_{TxGroup}=4$, $N_{TxGroup\_ANT}=4$, $N_{RxGroup}=4$, and $N_{RxGroup\_ANT}=2$ and an example of the arrangement of a virtual reception array. In FIG. 17, in the expression 11, $D_{TxGroupV}=5D_V$.

When the arrangement with an unequal spacing (for example, the spacing greater than $D_H$ or $D_V$) may be included around the center of the virtual reception array, $D_{TxGroupV}$ may be a value greater than the value of the expression 11.

Arrangement Method 1-2B

In Modification 1 of basic arrangement 1, the case where the number of virtual array elements arranged in the horizontal direction is increased by increasing the number $N_{TxGroup\_ANT}$ of transmission antennas included in each of the transmission antenna groups of the transmission array antenna has been described. Here, when $N_{TxGroup\_ANT} \geq 3$ is satisfied, the number of virtual array elements arranged in the horizontal direction in the virtual reception array can be increased even by increasing the number $N_{RxGroup\_ANT}$ of reception antennas included in each reception antenna group in the reception array antenna.

In this case, the horizontal antenna spacing of each of the reception antenna groups may be set to, for example, a certain value (for example, $3D_H$); however, depending on the number $N_{TxGroup\_ANT}$ of transmission antennas included in each transmission antenna group, the virtual reception array arrangement can be the arrangement in which the virtual array elements overlap.

When the arrangement including no overlap virtual array element is applied to the virtual reception array arrangement, the following spacing $D_{RxAntH}$ may be used as, for example, the even-numbered antenna spacings among the horizontal antenna spacings of the reception antennas included in each reception antenna group.

[12]

$$D_{RxAntH} = D_H(2N_{TxGroup\_ANT} - 3) \quad \text{(Expression 12)}$$

For example, when $N_{TxGroup\_ANT}=3$, $D_{RxAntH}=3D_H$, and, when $N_{TxGroup\_ANT}=4$, $D_{RxAntH}=5D_H$.

When, for example, the number $N_{RxGroup\_ANT}$ of reception antennas included in each reception antenna group is three, the antenna spacings of three reception antennas are set to $\{3D_H, D_{RxAntH}\}$. When the number $N_{RxGroup\_ANT}$ of reception antennas is four, the antenna spacings of four reception antennas are set to $\{3D_H, D_{RxAntH}, 3D_H\}$. Similarly, when the number $N_{RxGroup}$ ANT of reception antennas is five, the antenna spacings of five reception antennas are set to $\{3D_H, D_{RxAntH}, 3D_H, D_{RxAntH}\}$.

Figure 18:
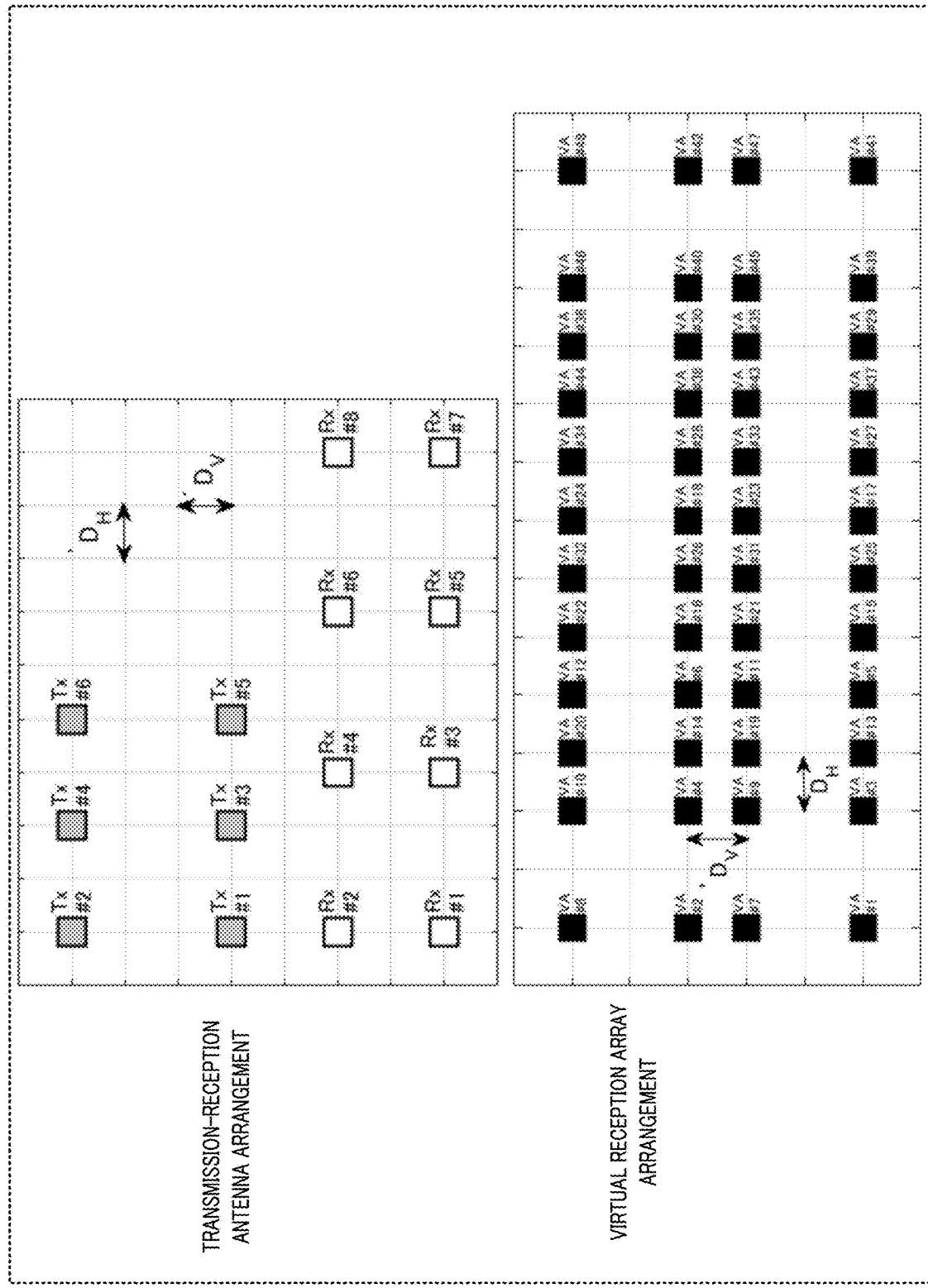
FIG. 18 is a diagram showing an example of an antenna arrangement according to Modification 2 of basic arrangement 1.

FIG. 18 shows an example of the arrangement of transmission antennas 106 and reception antennas 202 in the case where $N_{TxGroup}=2$, $N_{TxGroup\_ANT}=3$, $N_{RxGroup}=2$, and $N_{RxGroup\_ANT}=4$ and an example of the arrangement of a virtual reception array. In FIG. 18, in the expression 12, $D_{RxAntH}=3D_H$.

Figure 19:
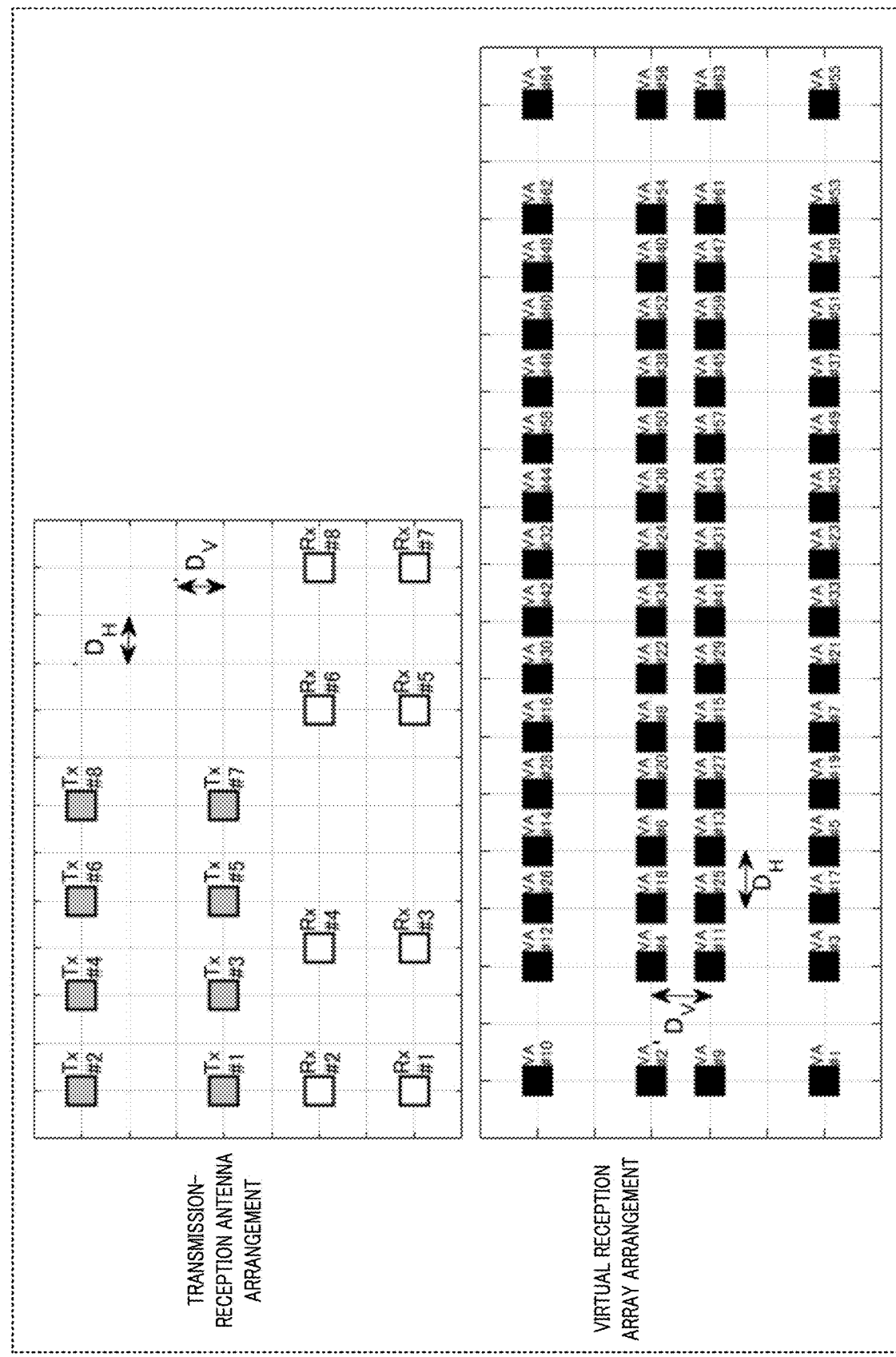
FIG. 19 is a diagram showing an example of an antenna arrangement according to Modification 2 of basic arrangement 1.

FIG. 19 shows an example of the arrangement of transmission antennas 106 and reception antennas 202 in the case where $N_{TxGroup}=2$, $N_{TxGroup\_ANT}=4$, $N_{RxGroup}=2$, and $N_{RxGroup\_ANT}=4$ and an example of the arrangement of a virtual reception array. In FIG. 19, in the expression 12, $D_{RxAntH}=5D_H$.

When the arrangement with an unequal spacing (for example, the spacing greater than $D_H$ or $D_V$) may be included around the center of the virtual reception array, $D_{RxAntH}$ may be a value greater than the value of the expression 12.

Each of antenna arrangement methods 1-2A and 1-2B in Modification 2 of basic arrangement 1 has been described above.

For example, in each of the transmission-reception antenna arrangements (for example, MIMO array arrangements) respectively shown in FIGS. 16 to 19, when $D_H$ and $D_V$ are set to about $0.5\lambda$, the horizontal and vertical element sizes of each transmission antenna 106 and each reception antenna 202 can be designed to a size greater than or equal to about $1\lambda$.

For example, in each of the virtual reception arrays respectively shown in FIGS. 16 to 19, the virtual array elements are arranged at different positions without any overlap, so the aperture length of the virtual reception array is expanded, and angular resolution is improved.

The virtual array elements positioned around the center of each of the virtual reception arrays respectively shown in FIGS. 16 to 19 are densely arranged at a spacing of $D_H$ and a spacing of $D_V$. The number of virtual array elements densely arranged at a spacing of $D_H$ and a spacing of $D_V$ increases depending on $N_{TxGroup}$, $N_{TxGroup\_ANT}$, $N_{RxGroup}$, and $N_{RxGroup\_ANT}$.

For example, in a virtual reception array, $((N_{TxGroup\_ANT} \times N_{RxGroup\_ANT})-2)$ virtual array elements are arranged at a spacing of $D_H$ in the horizontal direction, and $((N_{RxGroup} \times N_{TxGroup})-2)$ virtual array elements are arranged at a spacing of $D_V$ in the vertical direction. As the virtual array elements densely arranged at a spacing of $D_H$ and a spacing of $D_V$ around the center of the virtual reception array increases, the effect of reducing grating lobes and side lobes is improved.

As $N_{TxGroup\_ANT}$ and/or $N_{RxGroup\_ANT}$ increases, the number of virtual array elements arranged in the horizontal direction increases, so the horizontal aperture length of the virtual reception array is expanded, and horizontal angular resolution is improved. Similarly, as $N_{TxGroup}$ and/or $N_{RxGroup}$ increases, the number of virtual array elements arranged in the vertical direction increases, so the vertical aperture length of the virtual reception array is expanded, and vertical angular resolution is improved.

Figure 20:
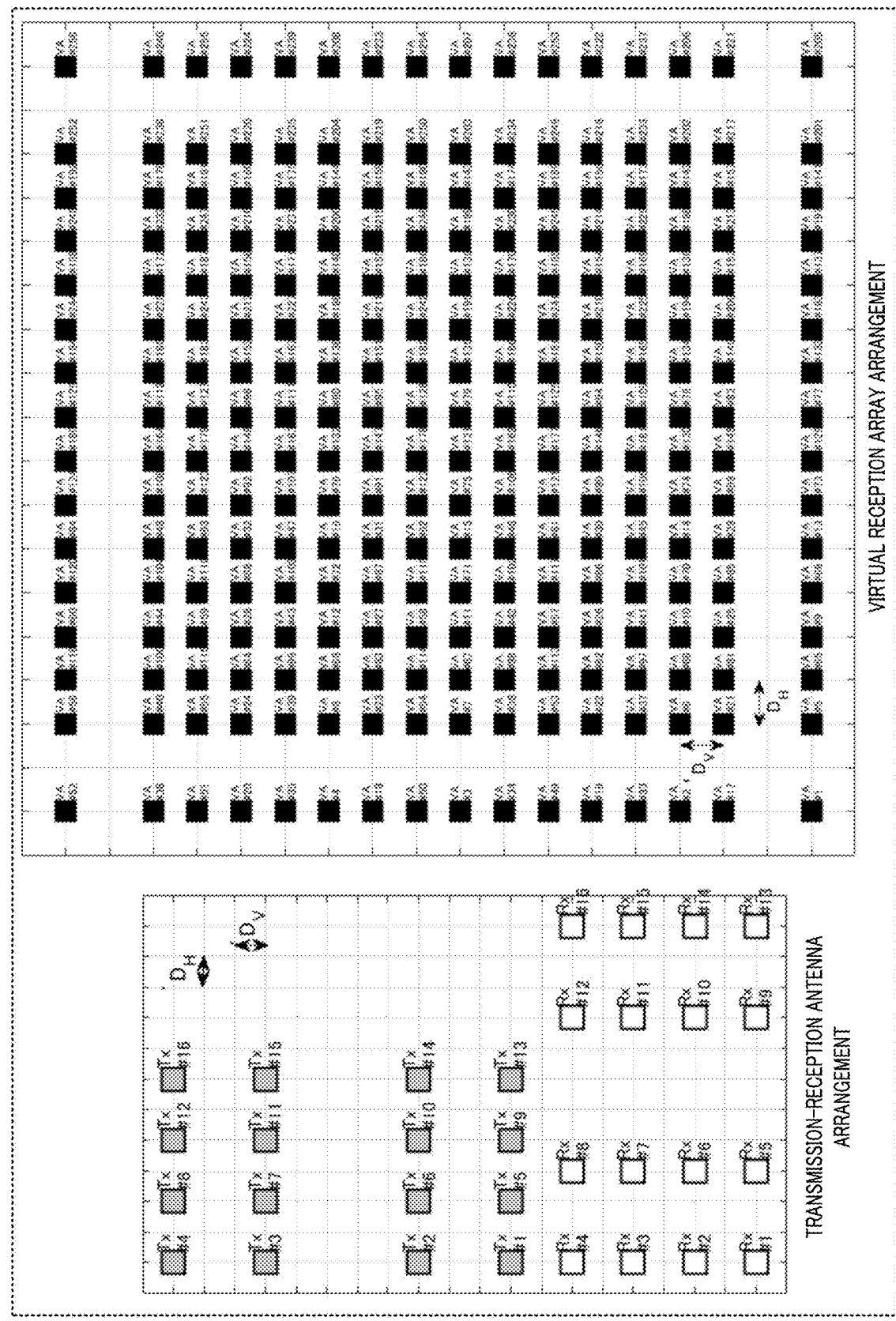
FIG. 20 is a diagram showing an example of an antenna arrangement according to Modification 2 of basic arrangement 1.

In Modification 2 of basic arrangement 1, an arrangement that is a combination of the arrangement method 1-2A and the arrangement method 1-2B is also possible. FIG. 20 shows an example of the arrangement of transmission antennas 106 and reception antennas 202 in the case where $N_{TxGroup}=4$, $N_{TxGroup\_ANT}=4$, $N_{RxGroup}=4$, and $N_{RxGroup\_ANT}=4$ and an example of the arrangement of a virtual reception array. In FIG. 20, in the expression 11, $D_{TxGroupV}=5D_H$, and, in the expression 12, $D_{RxAntH}=5D_H$. With this configuration, the effect of the combination of the arrangement method 1-2A and the arrangement method 1-2B is obtained.

Modification 3 of Basic Arrangement 1

Hereinafter, each of antenna arrangement methods 1-3A, 1-3B and 1-3C in Modification 3 of basic arrangement 1 will be described.

Arrangement Method 1-3A

In basic arrangement 1, the case where the horizontal positions of the transmission antennas included in each transmission antenna group are the same in the transmission array antenna has been described. Not limited to this configuration, the horizontal arrangement positions of the transmission antennas included in each transmission antenna group may be varied among the transmission antenna groups.

For example, in the transmission array antenna, the transmission antennas included in each of the first transmission antenna group and the second transmission antenna group may be arranged so as to shift the horizontal positions by $D_H$.

The direction to shift by $D_H$ in the horizontal direction may be any direction in which the transmission antennas included in the second transmission antenna group are shifted to the right-hand side or to the left-hand side with respect to the transmission antennas included in the first transmission antenna group.

Figure 21:
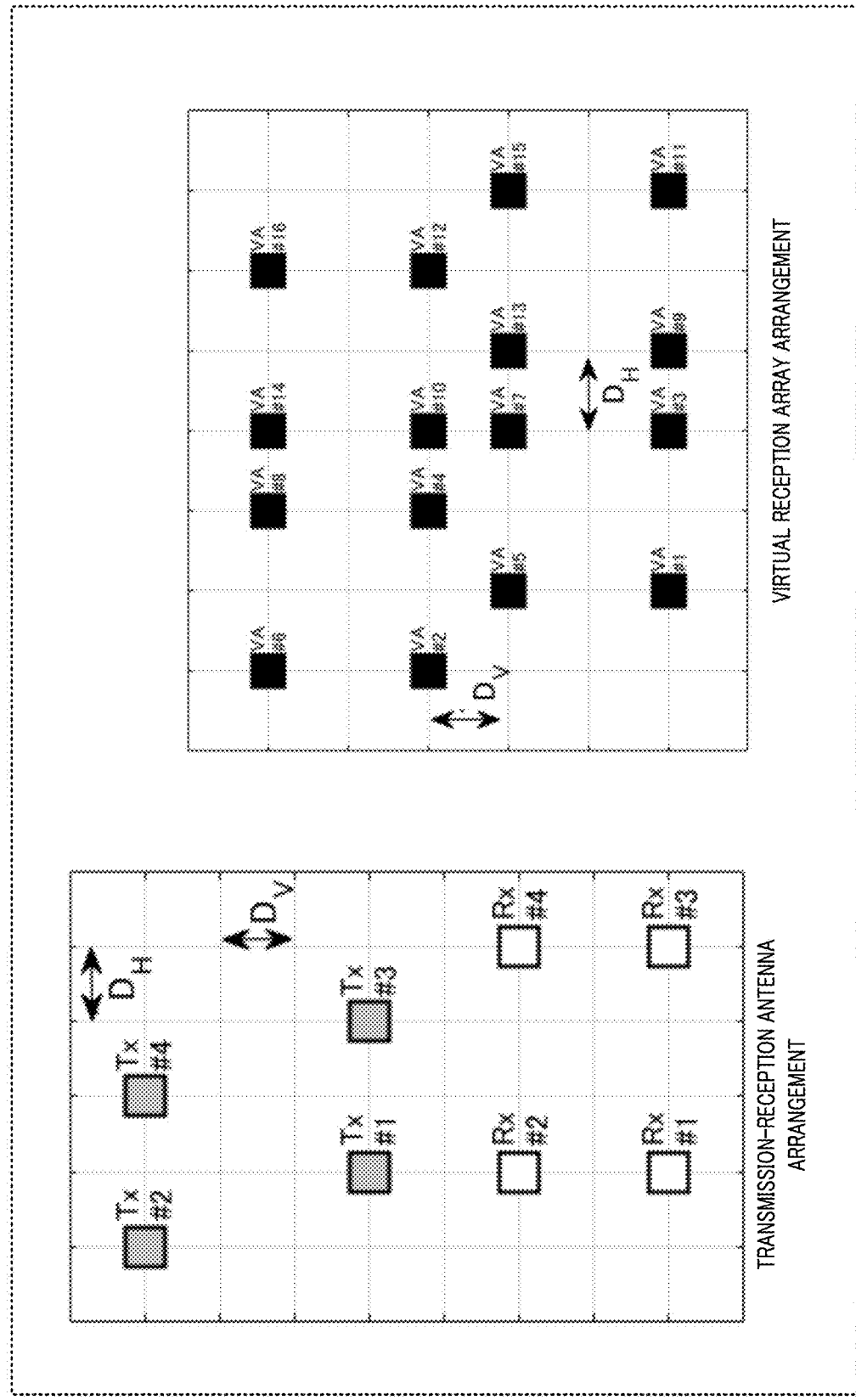
FIG. 21 is a diagram showing an example of an antenna arrangement according to Modification 3 of basic arrangement 1.

FIG. 21 shows an example of the arrangement of transmission antennas 106 and reception antennas 202 in the case where the transmission antennas (for example, Tx #1 and Tx #3) included in the second transmission antenna group are shifted to the right-hand side by $D_H$ with respect to the transmission antennas (for example, Tx #2 and Tx #4) included in the first transmission antenna group in the transmission array antenna and an example of the arrangement of a virtual reception array.

In FIG. 21, the horizontal positions of Tx #1 and Tx #2 are varied by $D_H$. The horizontal positions of Tx #3 and Tx #1 are varied by $D_H$.

Arrangement Method 1-3B

In basic arrangement 1, the case where the horizontal positions of the reception antennas included in each reception antenna group are the same in the reception array antenna has been described. Not limited to this configuration, the horizontal arrangement positions of the reception antennas included in each reception antenna group may be varied among the reception antenna groups.

For example, in the reception array antenna, the reception antennas included in each of the first reception antenna group and the second reception antenna group may be arranged so as to shift the horizontal positions by $D_H$.

The direction to shift by $D_H$ in the horizontal direction may be any direction in which the reception antennas included in the second reception antenna group are shifted to the right-hand side or to the left-hand side with respect to the reception antennas included in the first reception antenna group.

Figure 22:
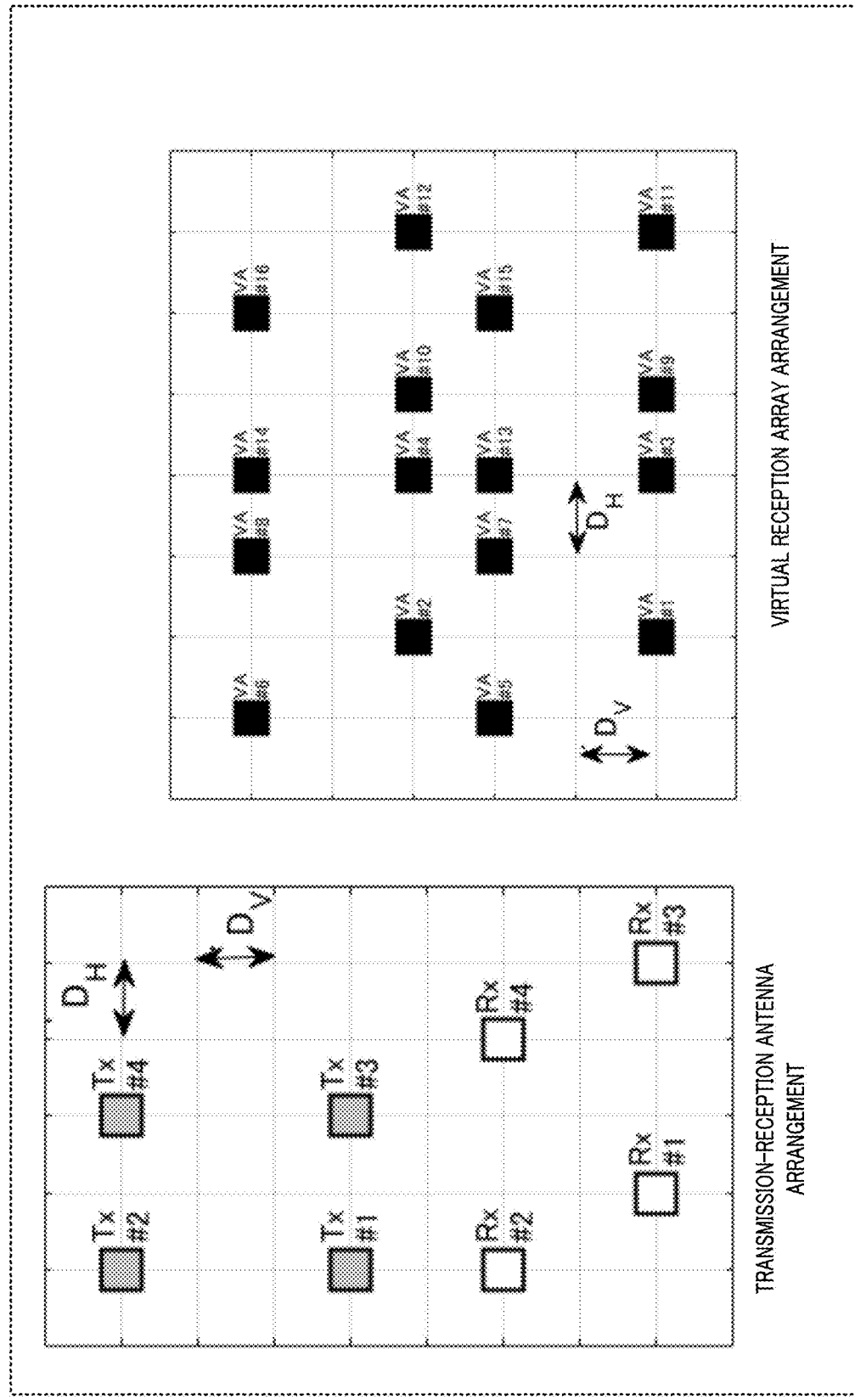
FIG. 22 is a diagram showing an example of an antenna arrangement according to Modification 3 of basic arrangement 1.

FIG. 22 shows an example of the arrangement of transmission antennas 106 and reception antennas 202 in the case where the reception antennas (for example, Rx #1 and Rx #3) included in the second reception antenna group are shifted to the right-hand side by Du with respect to the reception antennas (for example, Rx #2 and Rx #4) included in the first reception antenna group in the reception array antenna and an example of the arrangement of a virtual reception array.

In FIG. 22, the horizontal positions of Rx #1 and Rx #2 are varied by $D_H$. The horizontal positions of Rx #3 and Rx #4 are varied by $D_H$.

Arrangement Method 1-3C

The arrangement method 1-3C is a method that is a combination of the arrangement method 1-3A and the arrangement method 1-3B.

For example, in the transmission array antenna, the transmission antennas are arranged so as to shift the horizontal positions by $D_H$ between the first transmission antenna group and the second transmission antenna group. Similarly, in the reception array antenna, the reception antennas are arranged so as to shift the horizontal positions by $D_H$ between the first reception antenna group and the second reception antenna group.

The direction to shift by $D_H$ in the horizontal direction may be, for example, any direction in which the transmission antennas included in the second transmission antenna group are shifted to the right-hand side or to the left-hand side with respect to the transmission antennas included in the first transmission antenna group. The direction to shift by $D_H$ in the horizontal direction may be, for example, any direction in which the reception antennas included in the second reception antenna group are shifted to the right-hand side or to the left-hand side with respect to the reception antennas included in the first reception antenna group.

Figure 23:
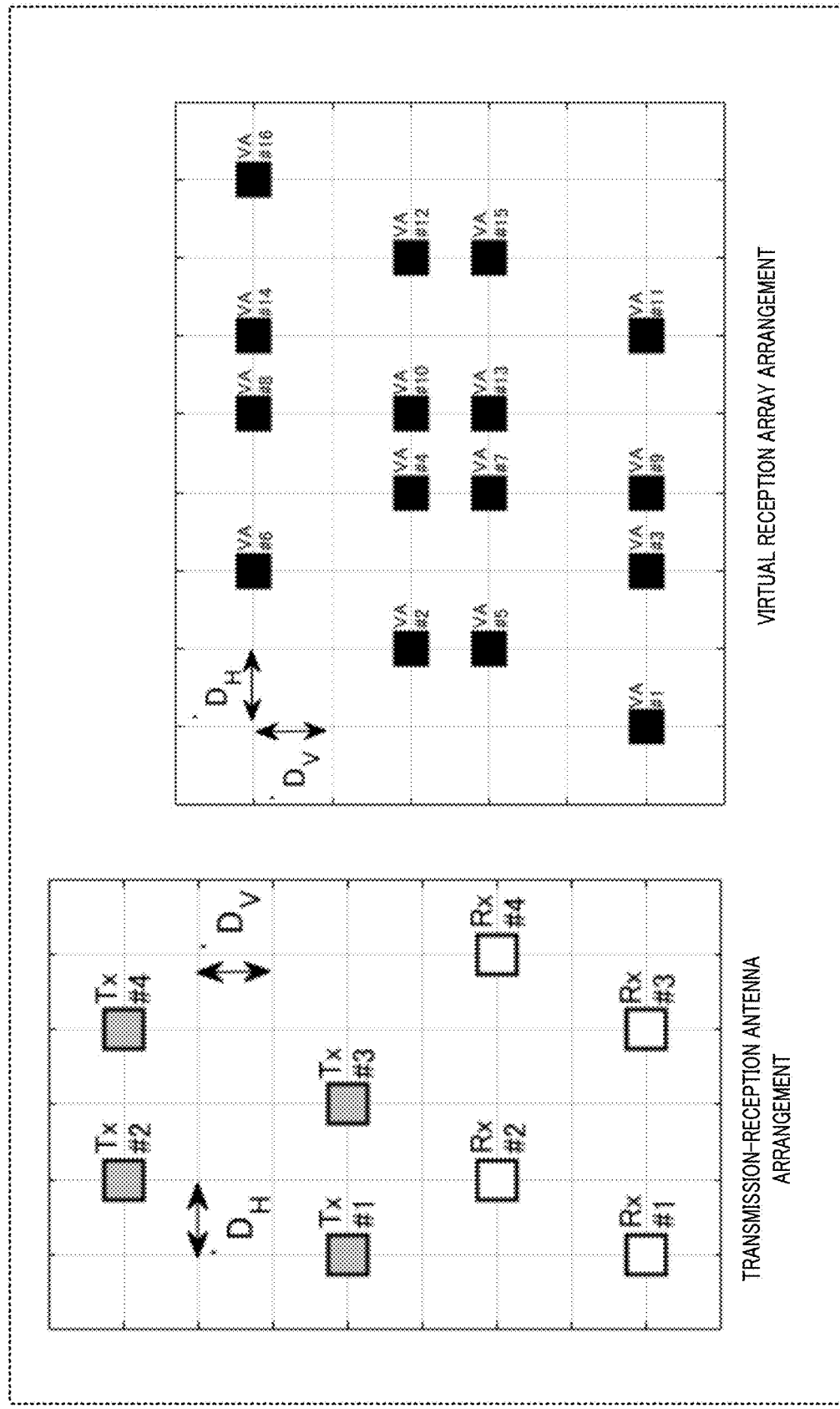
FIG. 23 is a diagram showing an example of an antenna arrangement according to Modification 3 of basic arrangement 1.

FIG. 23 shows an example of the arrangement of transmission antennas 106 and reception antennas 202 and an example of the arrangement of a virtual reception array according to the arrangement method 1-3C. In FIG. 23, in the transmission array antenna, the transmission antennas (for example, Tx #1 and Tx #3) included in the second transmission antenna group are arranged so as to be shifted to the left-hand side by $D_H$ with respect to the transmission antennas (for example, Tx #2 and Tx #4) included in the first transmission antenna group. In FIG. 23, in the reception array antenna, the reception antennas (for example, Rx #1 and Rx #3) included in the second reception antenna group are arranged so as to be shifted to the left-hand side by $D_H$ with respect to the reception antennas (for example, Rx #2 and Rx #4) included in the first reception antenna group.

Figure 24:
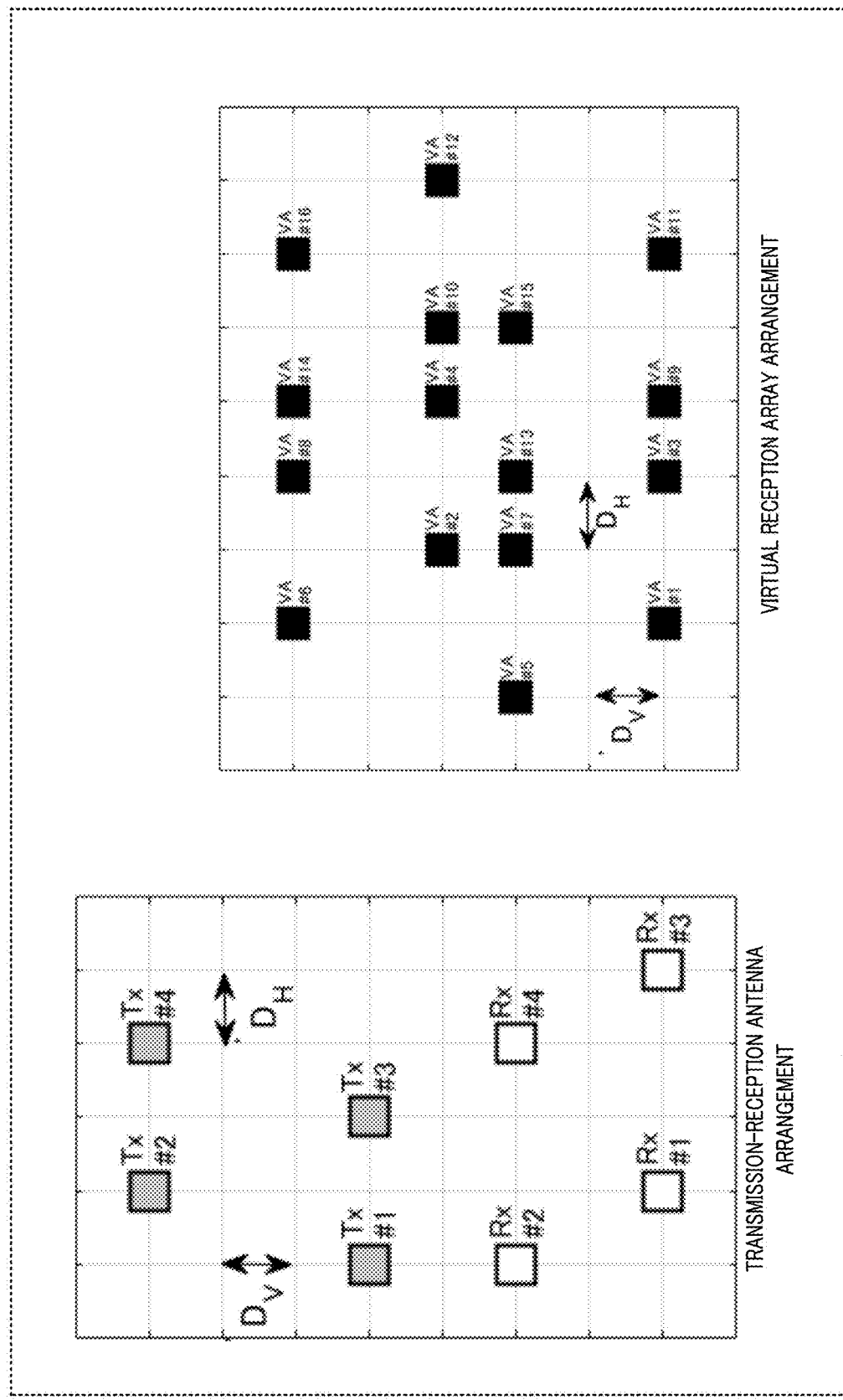
FIG. 24 is a diagram showing an example of an antenna arrangement according to Modification 3 of basic arrangement 1.

FIG. 24 shows an example of the arrangement of transmission antennas 106 and reception antennas 202 and an example of the arrangement of a virtual reception array according to the arrangement method 1-3C. In FIG. 24, in the transmission array antenna, the transmission antennas (for example, Tx #1 and Tx #3) included in the second transmission antenna group are arranged so as to be shifted to the left-hand side by $D_H$ with respect to the transmission antennas (for example, Tx #2 and Tx #4) included in the first transmission antenna group. In FIG. 24, in the reception array antenna, the reception antennas (for example, Rx #1 and Rx #3) included in the second reception antenna group are arranged so as to be shifted to the right-hand side by $D_H$ with respect to the reception antennas (for example, Rx #2 and Rx #4) included in the first reception antenna group.

For example, in comparison with the arrangement (for example, FIG. 24) in which the direction to shift by $D_H$ in the horizontal direction is varied between the reception antenna groups and the transmission antenna groups, the virtual reception array elements are more densely arranged around the center of the virtual reception array arrangement in the arrangement (for example, FIG. 23) in which the direction to shift by $D_H$ in the horizontal direction is the same between the reception antenna groups and the transmission antenna groups, so it is further suitable.

Each of the arrangement methods 1-3A to 1-3C has been described above.

For example, in each of the transmission-reception antenna arrangements (for example, MIMO array arrangements) respectively shown in FIGS. 21 to 24, when $D_H$ and $D_V$ are set to about 0.52 the horizontal and vertical element sizes of each transmission antenna 106 and each reception antenna 202 can be designed to a size of about 1λ.

With this configuration, in Modification 3 of basic arrangement 1, for example, an antenna using a sub-array made up of four elements in which planar patch antennas are arranged in a two by two matrix (where the antenna width $W_{ANT}<2D_H$, and the antenna height $H_{ANT}<2D_V$) as shown in FIG. 9A can be applied (not shown).

The vertical spacing between the transmission antenna groups is $3D_V$, the horizontal spacing between the transmission antennas in each transmission antenna group is $2D_H$, and the vertical spacing is wider than the horizontal spacing in the transmission array antenna. For this reason, in Modification 3 of basic arrangement 1, for example, an antenna using a sub-array made up of six elements in which planar patch antennas are arranged in a two by three matrix (where the antenna width $W_{ANT}<2D_H$, and the antenna height $H_{ANT}<3D_V$) as shown in FIG. 9B can be applied.

In Modification 3 of basic arrangement 1, in at least one of the transmission array antenna and the reception array antenna, the horizontal positions of the transmission antennas included in each transmission antenna group or the reception antennas included in each reception antenna group are different from each other. For this reason, in Modification 3 of basic arrangement 1, when the element size of the sub-array in the cross direction $W_{ANT}$ is less than $D_H$, the element size of the sub-array in the longitudinal direction may be any size.

Figure 25A:
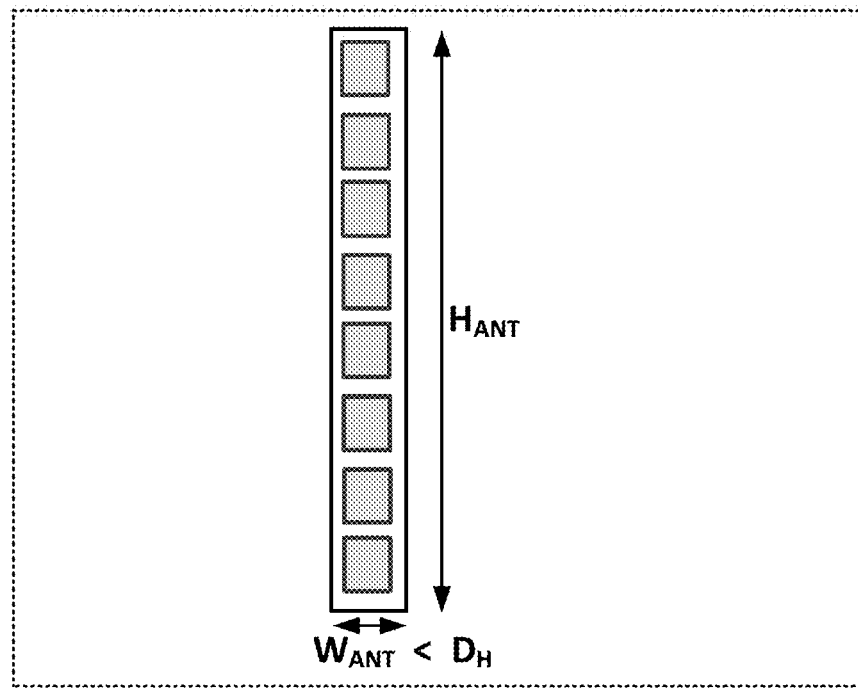
FIG. 25A is a diagram showing a configuration example of a sub-array according to Modification 3 of basic arrangement 1.

For example, FIG. 25A shows an example of a sub-array in which planar patch antennas are arranged in a one by eight matrix. The configuration of the sub-array is not limited to the configuration shown in FIG. 25A.

Figure 25B:
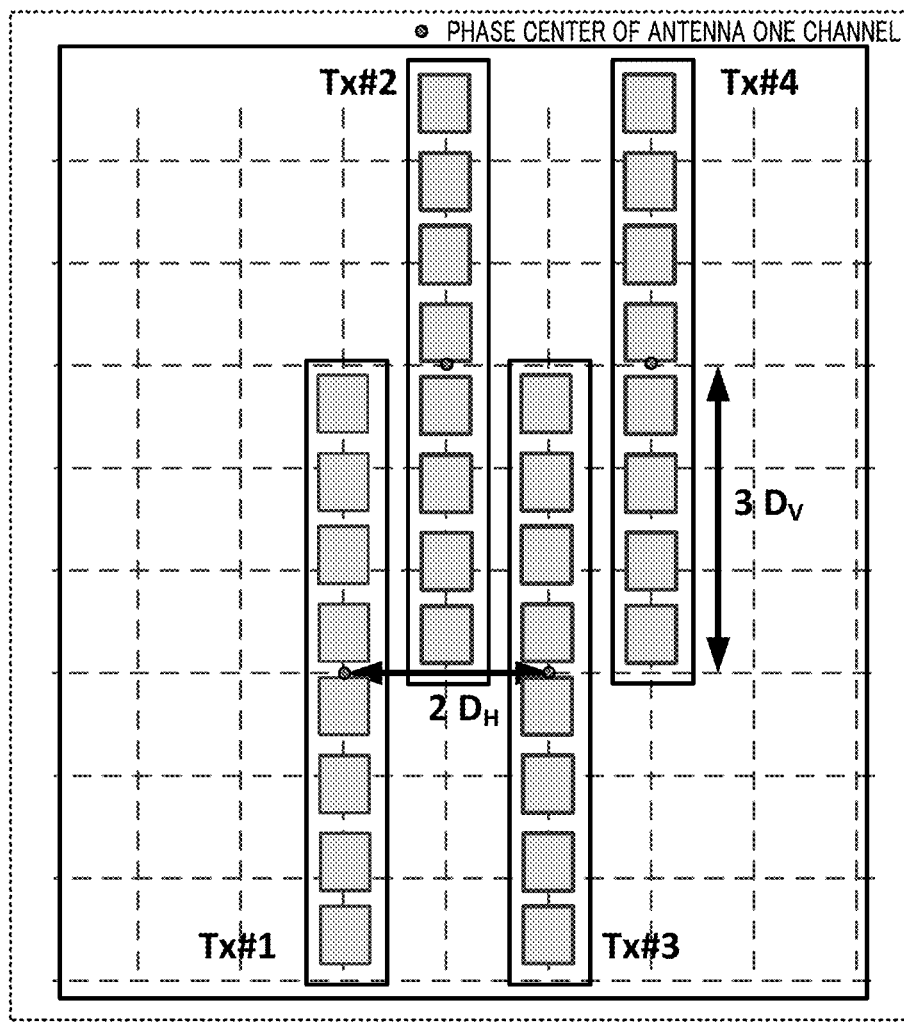
FIG. 25B is a diagram showing a configuration example of a transmission array antenna using the sub-arrays according to Modification 3 of basic arrangement 1.
Figure 25C:
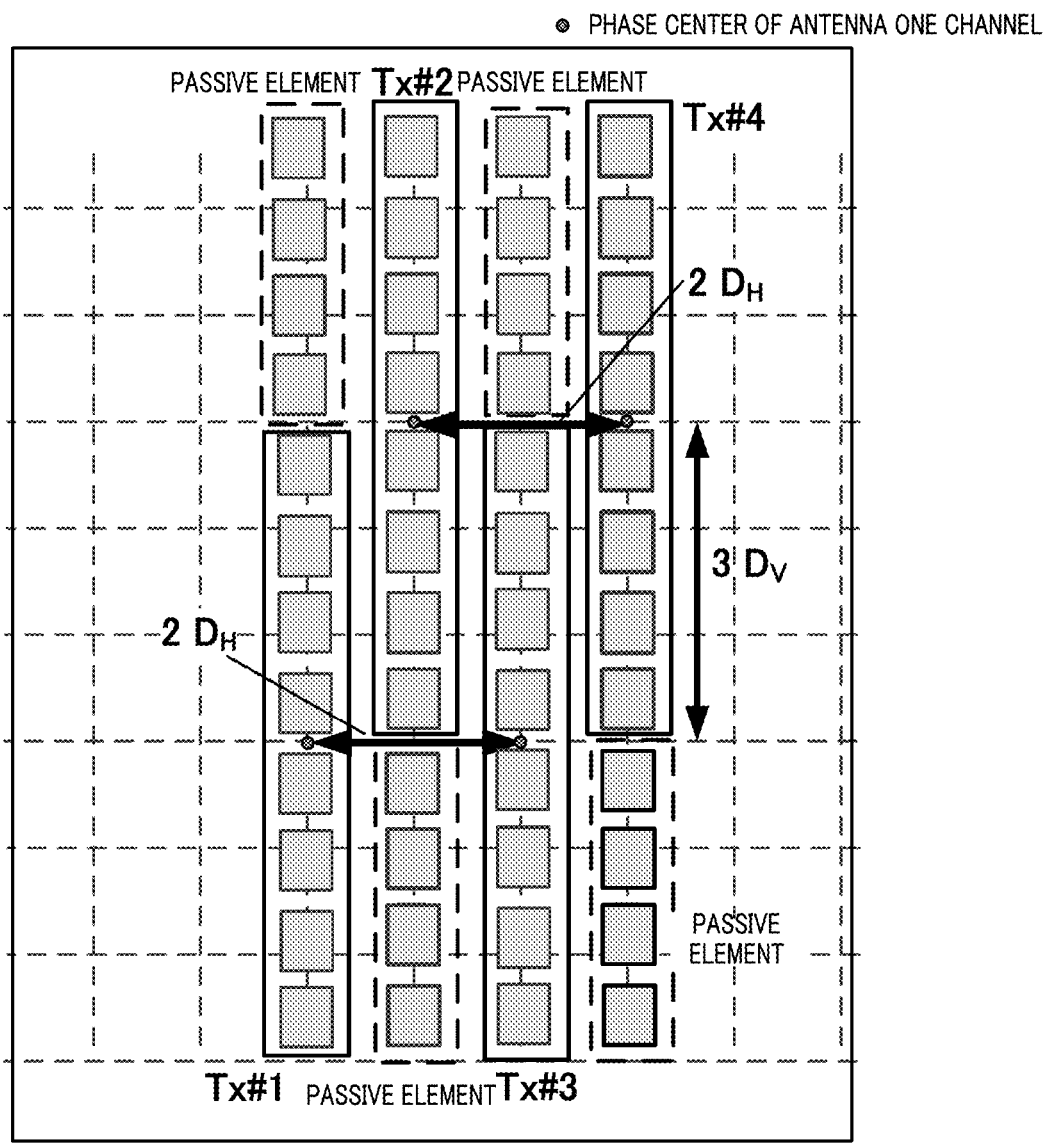
FIG. 25C is a diagram showing a configuration example of a transmission array antenna using the sub-arrays according to Modification 3 of basic arrangement 1.

FIG. 25B shows an example in the case where the sub-array shown in FIG. 25A is applied to the transmission antenna array shown in FIG. 23 or FIG. 24. In addition to the transmission array antenna shown in FIG. 25B, passive elements (dummy elements) may be arranged as shown in FIG. 25C. With the passive elements, the influence of antenna-to-antenna coupling of any adjacent antennas is equalized among the antennas, so the directivity characteristics of each of the transmission antennas (Tx #1 to Tx #4) are equalized. When passive elements are installed, for example, the influences of electrical characteristics of antenna radiation, impedance matching, isolation may be made uniform. The arrangement of passive elements is not limited to FIG. 25C, and passive elements may be arranged at positions in size that do not physically interfere with the antennas.

In this way, in the antenna arrangement according to Modification 3 of basic arrangement 1, when the antenna having a sub-array configuration is used, the directivity gain of the antenna is improved, and the detection performance (for example, detection distance) of radar apparatus 10 is improved.

In Modification 3 of basic arrangement 1, the virtual array elements of the virtual reception array are arranged without any overlap, so the aperture length of the virtual reception array is expanded, and angular resolution is improved.

Combination of Modification 3 and Modification 1

Modification 3 of basic arrangement 1 may be combined with Modification 1 of basic arrangement 1.

For example, in the arrangement of the transmission array antenna according to Modification 1 of basic arrangement 1, the horizontal positions of the transmission antennas included in each transmission antenna group may be arranged so as to be shifted by $D_H$ between the transmission antenna groups.

Similarly, for example, in the configuration of the reception array antenna according to Modification 1 of basic arrangement 1, the horizontal positions of the reception antennas included in each reception antenna group may be arranged so as to be shifted by $D_H$ between the reception antenna groups.

FIG. 26 to FIG. 30 show examples of the antenna arrangement that is a combination of Modification 3 and Modification 1.

Figure 26:
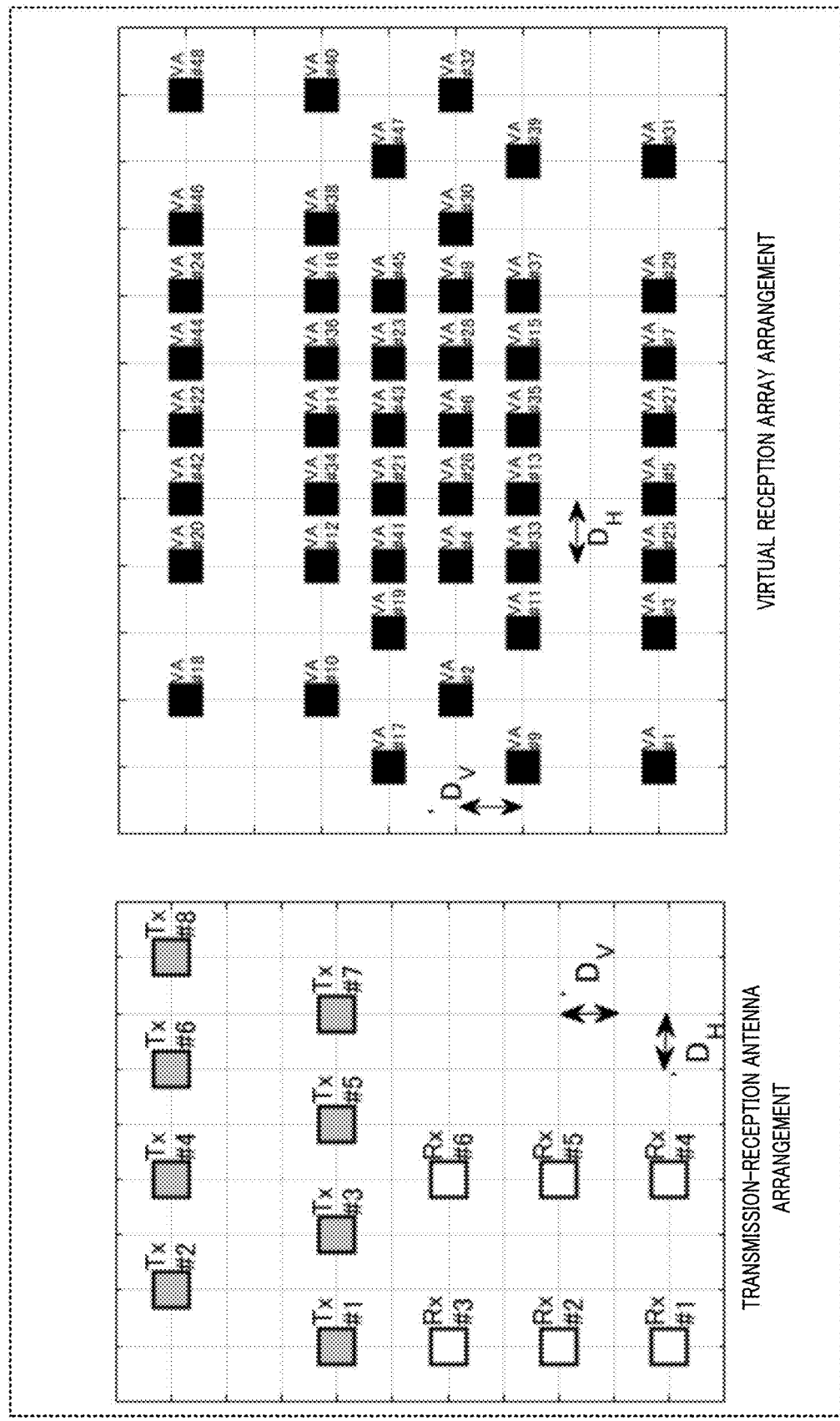
FIG. 26 is a diagram showing an example of an antenna arrangement that is a combination of Modification 3 and Modification 1 of basic arrangement 1.

FIG. 26 shows an example of the arrangement of transmission antennas 106 and reception antennas 202 in the case where $N_{TxGroup}=2$, $N_{TxGroup\_ANT}=4$, $N_{RxGroup}=3$, and $N_{RxGroup\_ANT}=2$ and the horizontal positions of the transmission antennas included in each transmission antenna group are arranged so as to be shifted by $D_H$ and an example of the arrangement of a virtual reception array.

Figure 27:
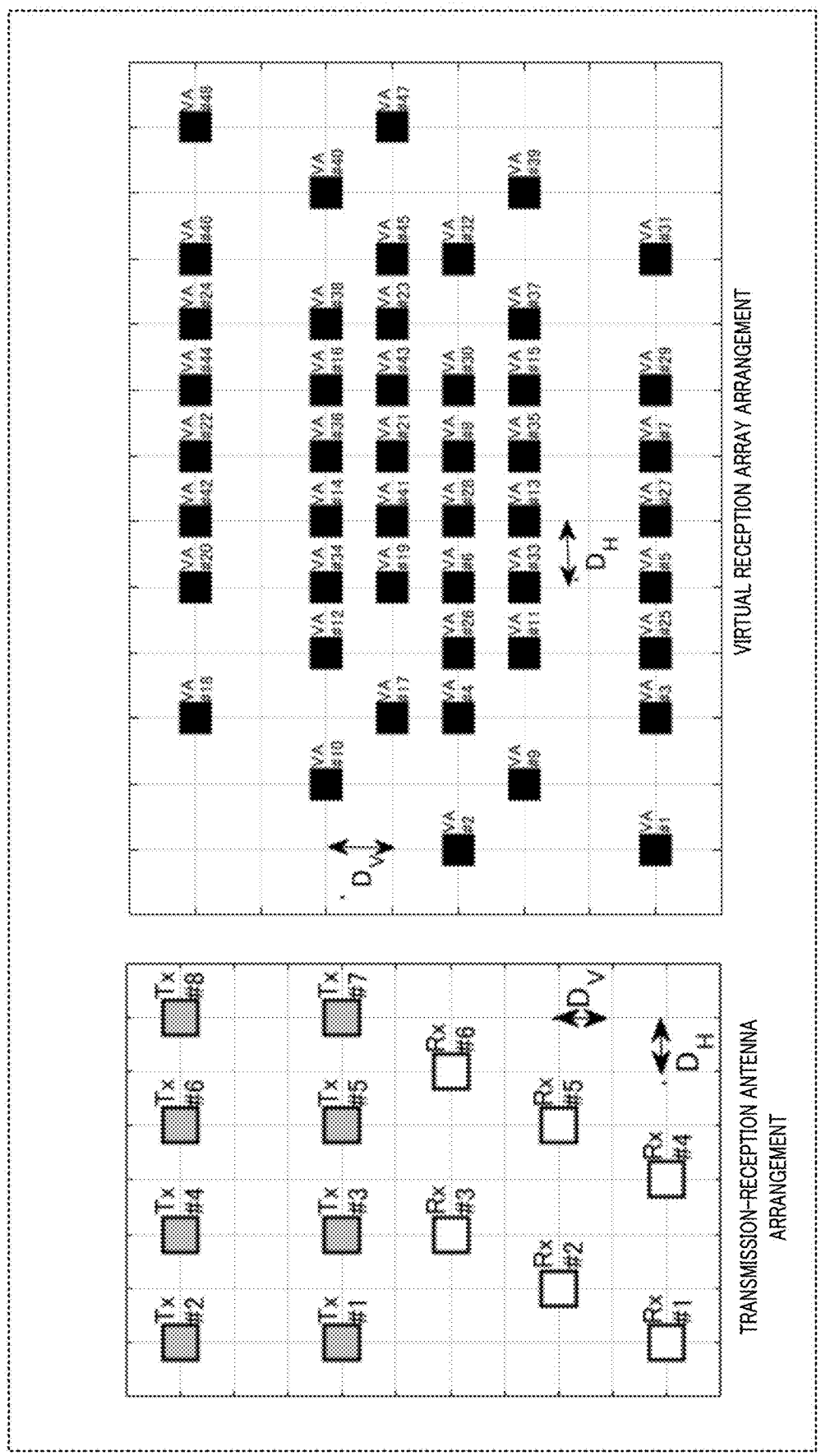
FIG. 27 is a diagram showing an example of an antenna arrangement that is a combination of Modification 3 and Modification 1 of basic arrangement 1.

FIG. 27 shows an example of the arrangement of transmission antennas 106 and reception antennas 202 in the case where $N_{TxGroup}=2$, $N_{TxGroup\_ANT}=4$, $N_{RxGroup}=3$, and $N_{RxGroup\_ANT}=2$ and the horizontal positions of the reception antennas included in each reception antenna group are arranged so as to be shifted by $D_H$ and an example of the arrangement of a virtual reception array.

Figure 28:
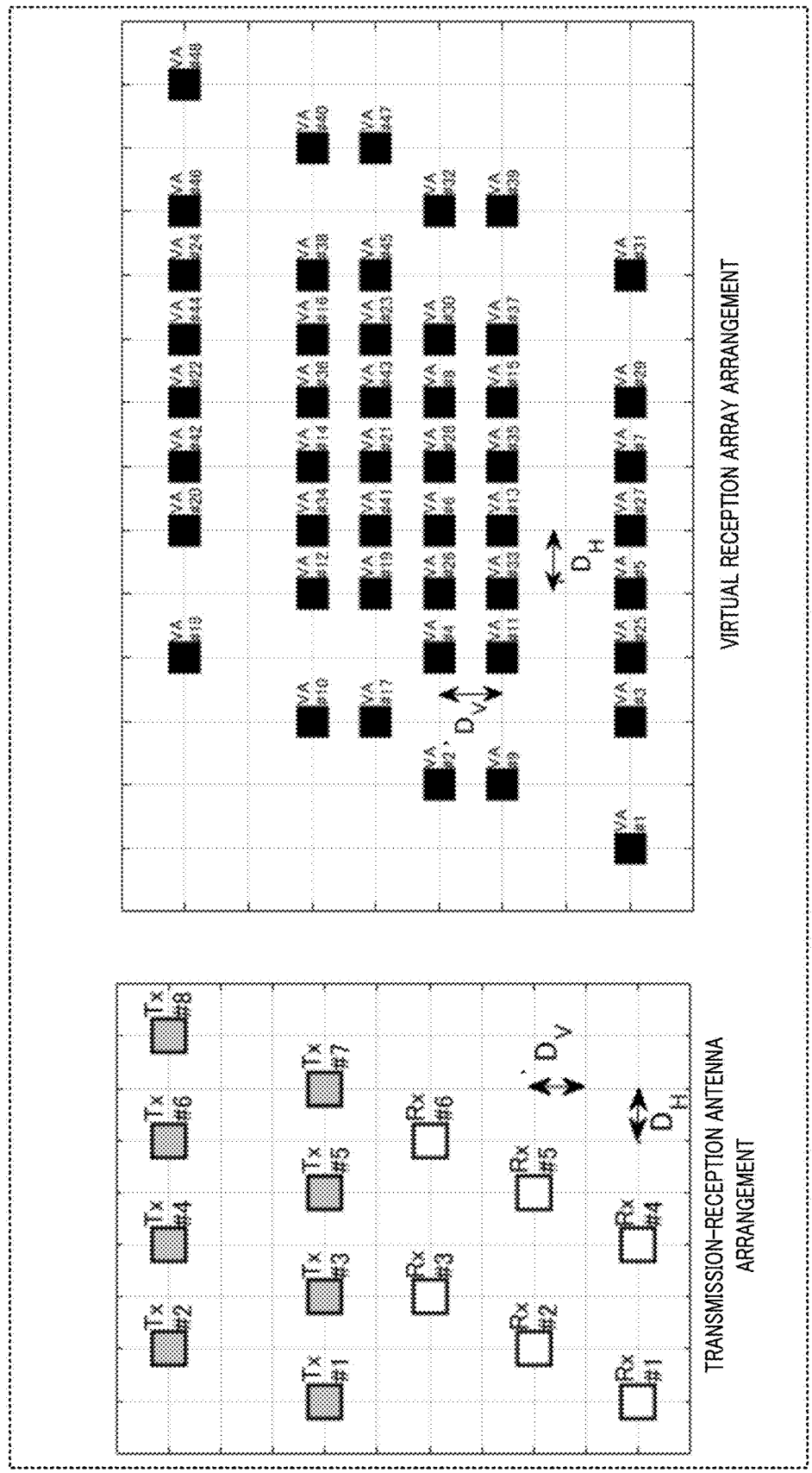
FIG. 28 is a diagram showing an example of an antenna arrangement that is a combination of Modification 3 and Modification 1 of basic arrangement 1.

FIG. 28 shows an example of the arrangement of transmission antennas 106 and reception antennas 202 in the case where $N_{TxGroup}=2$, $N_{TxGroup\_ANT}=4$, $N_{RxGroup}=3$, and $N_{RxGroup\_ANT}=2$, the horizontal positions of the transmission antennas included in each transmission antenna group are arranged so as to be shifted by $D_H$, and the horizontal positions of the reception antennas included in each reception antenna group are arranged so as to be shifted by $D_H$, and an example of the arrangement of a virtual reception array. In FIG. 28, the transmission antennas (for example, Tx #1, Tx #3, Tx #5, and Tx #7) included in the second transmission antenna group are arranged so as to be shifted to the left-hand side by $D_H$ with respect to the transmission antennas (for example, Tx #2, Tx #4, Tx #6, and Tx #8) included in the first transmission antenna group. In FIG. 28, in the reception array antenna, the reception antennas (for example, Rx #2 and Rx #5) included in the second reception antenna group are arranged so as to be shifted to the left-hand side by $D_H$ with respect to the reception antennas (for example, Rx #3 and Rx #6) included in the first reception antenna group. In FIG. 28, the reception antennas (for example, Rx #1 and Rx #4) included in the third reception antenna group are arranged so as to be shifted to the left-hand side by $D_H$ with respect to the reception antennas included in the second reception antenna group.

Figure 29:
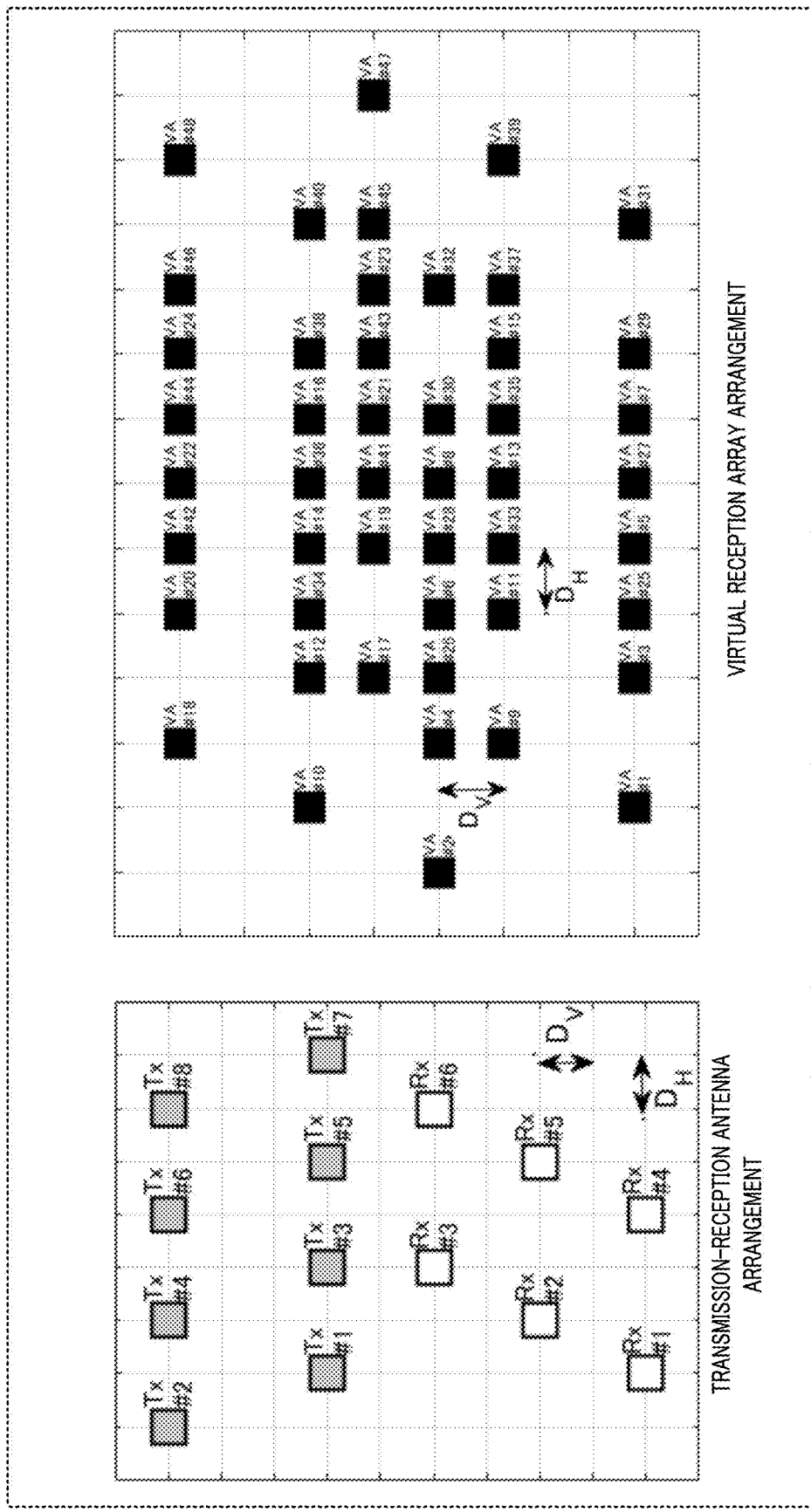
FIG. 29 is a diagram showing an example of an antenna arrangement that is a combination of Modification 3 and Modification 1 of basic arrangement 1.

FIG. 29 shows an example of the arrangement of transmission antennas 106 and reception antennas 202 in the case where $N_{TxGroup}=2$, $N_{TxGroup\_ANT}=4$, $N_{RxGroup}=3$, and $N_{RxGroup\_ANT}=2$, the horizontal positions of the transmission antennas included in each transmission antenna group are arranged so as to be shifted by $D_H$, the horizontal positions of the reception antennas included in each reception antenna group are arranged so as to be shifted by $D_H$, and an example of the arrangement of a virtual reception array. In FIG. 29, the transmission antennas (for example, Tx #1, Tx #3, Tx #5, and Tx #7) included in the second transmission antenna group are arranged so as to be shifted to the right-hand side by $D_H$ with respect to the transmission antennas (for example, Tx #2, Tx #4, Tx #6, and Tx #8) included in the first transmission antenna group. In FIG. 29, in the reception array antenna, the reception antennas (for example, Rx #2 and Rx #5) included in the second reception antenna group are arranged so as to be shifted to the left-hand side by DTI with respect to the reception antennas (for example, Rx #3 and Rx #6) included in the first reception antenna group. In FIG. 29, the reception antennas (for example, Rx #1 and Rx #4) included in the third reception antenna group are arranged so as to be shifted to the left-hand side by $D_H$ with respect to the reception antennas included in the second reception antenna group.

For example, in each of the MIMO array arrangements respectively shown in FIGS. 26 to 29, when $D_H$ and $D_V$ are set to about $0.5\lambda$, the horizontal and vertical element sizes of each transmission antenna 106 and each reception antenna 202 can be designed to a size greater than or equal to $1\lambda$.

For example, in each of the virtual reception arrays respectively shown in FIGS. 26 to 29, the virtual array elements are arranged at different positions without any overlap, so the aperture length of the virtual reception array is expanded, and angular resolution is improved.

Even when the horizontal positions of the transmission antennas are arranged so a to be shifted by $D_H$ between the first transmission antenna group and the second transmission antenna group in the transmission array antenna or when the horizontal positions of the reception antennas are arranged so as to be shifted by $D_H$ between the first reception antenna group and the second reception antenna group in the reception array antenna, the virtual array elements positioned around the center of the virtual reception array are densely arranged at a spacing of $D_H$ and a spacing of $D_V$. The number of virtual array elements densely arranged at a spacing of $D_H$ and a spacing of $D_V$, for example, increases depending on $N_{TxGroup\_ANT}$ and $N_{RxGroup}$.

For example, in a virtual reception array, $((N_{TxGroup\_ANT} \times N_{RxGroup\_ANT})-2)$ virtual array elements are arranged at a spacing of $D_H$ in the horizontal direction, and $((N_{RxGroup} N_{TxGroup})-2)$ virtual array elements are arranged at a spacing of $D_V$ in the vertical direction. As the number of virtual array elements densely arranged at a spacing of $D_H$ and a spacing of $D_V$ around the center of the virtual reception array increases, the effect of reducing grating lobes and side lobes is improved.

As $N_{TxGroup\_ANT}$ increases, the number of virtual array elements arranged in the horizontal direction increases, so the horizontal aperture length of the virtual reception array is expanded, and horizontal angular resolution is improved. Similarly, as $N_{RxGroup}$ increases, the number of virtual array elements arranged in the vertical direction increases, so the vertical aperture length of the virtual reception array is expanded, and vertical angular resolution is improved.

In FIG. 28 and FIG. 29, when the number $N_{RxGroup}$ of reception antenna groups is greater than or equal to three, the case where the horizontal positions of the reception antennas included in each reception antenna group are arranged so as to be shifted in a certain direction (to the right-hand side or to the left-hand side) is shown. The direction to shift the horizontal positions of the reception antennas is not limited to this direction. When, for example, the number $N_{RxGroup}$ of reception antenna groups is greater than or equal to three, the direction to shift the horizontal positions of the reception antennas included in each reception antenna group to the right-hand side or to the left-hand side may be changed for each reception antenna group.

Figure 30:
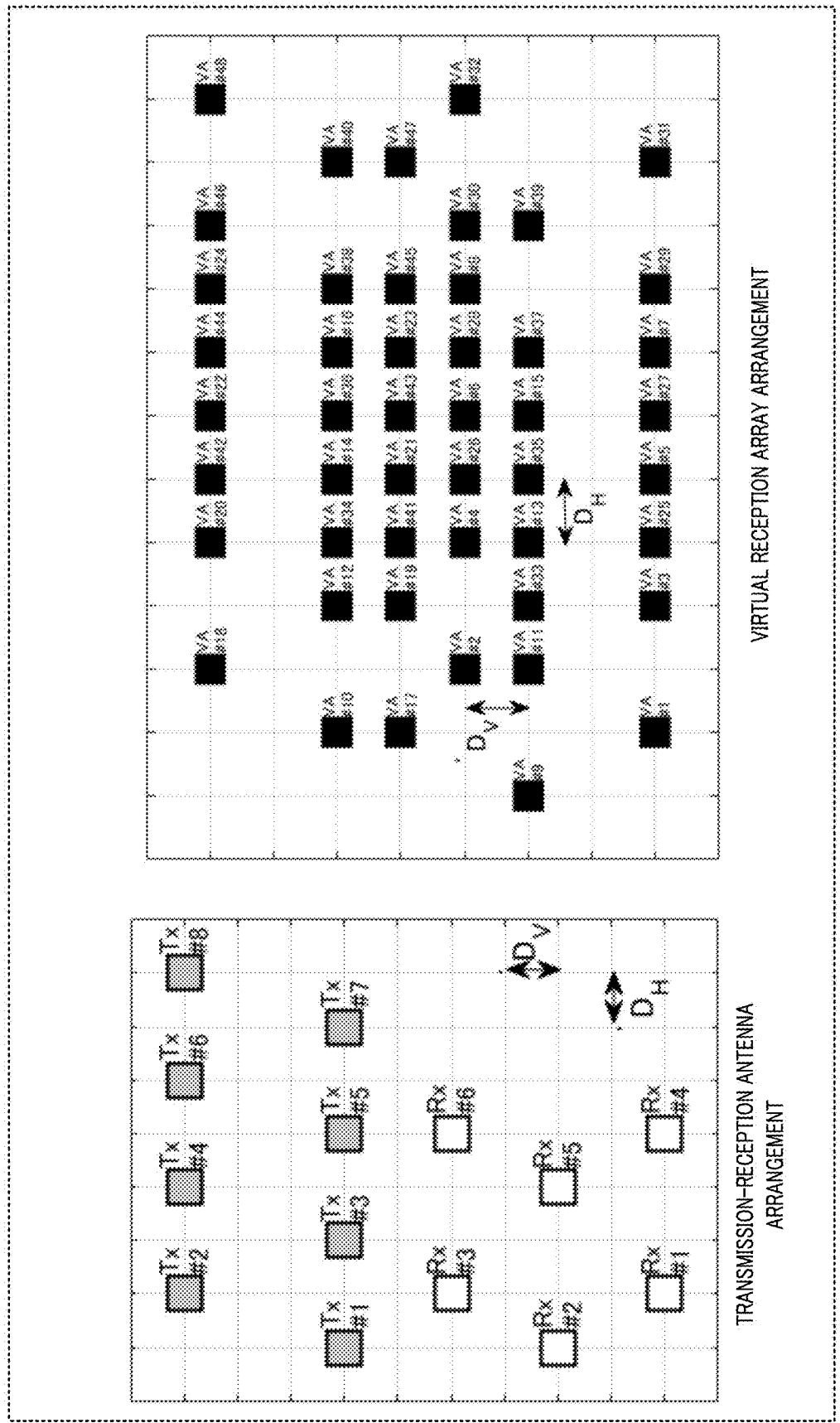
FIG. 30 is a diagram showing an example of an antenna arrangement that is a combination of Modification 3 and Modification 1 of basic arrangement 1.

FIG. 30 shows an example of the arrangement of transmission antennas 106 and reception antennas 202 in the case where $N_{TxGroup}=2$, $N_{TxGroup\_ANT}=4$, $N_{RxGroup}=3$, and $N_{RxGroup\_ANT}=2$, the horizontal positions of the transmission antennas included in each transmission antenna group are arranged so as to be shifted by $D_H$, the horizontal positions of the reception antennas included in each reception antenna group are arranged so as to be shifted by $D_H$, and an example of the arrangement of a virtual reception array. In FIG. 30, the transmission antennas (for example, Tx #1, Tx #3, Tx #5, and Tx #7) included in the second transmission antenna group are arranged so as to be shifted to the left-hand side by $D_H$ with respect to the transmission antennas (for example, Tx #2, Tx #4, Tx #6, and Tx #8) included in the first transmission antenna group. In FIG. 30, in the reception array antenna, the reception antennas (for example, Rx #2, and Rx #5) included in the second reception antenna group are arranged so as to be shifted by $D_H$ to the left-hand side with respect to the reception antennas (for example, Rx #3 and Rx #6) included in the first reception antenna group. In FIG. 30, the reception antennas (for example, Rx #1 and Rx #4) included in the third reception antenna group are arranged so as to be shifted by $D_H$ to the right-hand side with respect to the reception antennas included in the second reception antenna group.

With the antenna arrangement of FIG. 30 as well, the virtual array elements positioned around the center of the virtual reception array are densely arranged at a spacing of $D_H$ and a spacing of $D_V$. The number of virtual array elements densely arranged at a spacing of $D_H$ and a spacing of $D_V$, for example, increases depending on $N_{TxGroup\_ANT}$ and $N_{RxGroup}$. For example, $((N_{TxGroup\_ANT} \times N_{RxGroup\_ANT})-2)$ virtual array elements are arranged at a spacing of $D_H$ in the horizontal direction, and $((N_{RxGroup} \times N_{TxGroup})-2)$ virtual array elements are arranged at a spacing of $D_V$ in the vertical direction. As the virtual array elements densely arranged at a spacing of $D_H$ and a spacing of $D_V$ around the center of the virtual reception array increases, the effect of reducing grating lobes and side lobes is improved.

Combination of Modification 3 and Modification 2

Modification 3 of basic arrangement 1 may be combined with Modification 2 of basic arrangement 1.

For example, in the arrangement of the transmission array antenna according to Modification 2 of basic arrangement 1, the horizontal positions of the transmission antennas included in each transmission antenna group may be arranged so as to be shifted by $D_H$ between the transmission antenna groups.

Similarly, for example, in the arrangement of the reception array antenna according to Modification 2 of basic arrangement 1, the horizontal positions of the reception antennas included in each reception antenna group may be arranged so as to be shifted by $D_H$ between the reception antenna groups.

When the number $N_{TxGroup}$ of transmission antenna groups is greater than or equal to three, the horizontal positions of the transmission antennas included in each transmission antenna group may be arranged so as to be shifted in a certain direction (to the right-hand side or to the left-hand side), and the direction to shift the horizontal positions of the transmission antennas included in each transmission antenna group to the right-hand side or to the left-hand side may be changed for each transmission antenna group.

Figure 31:
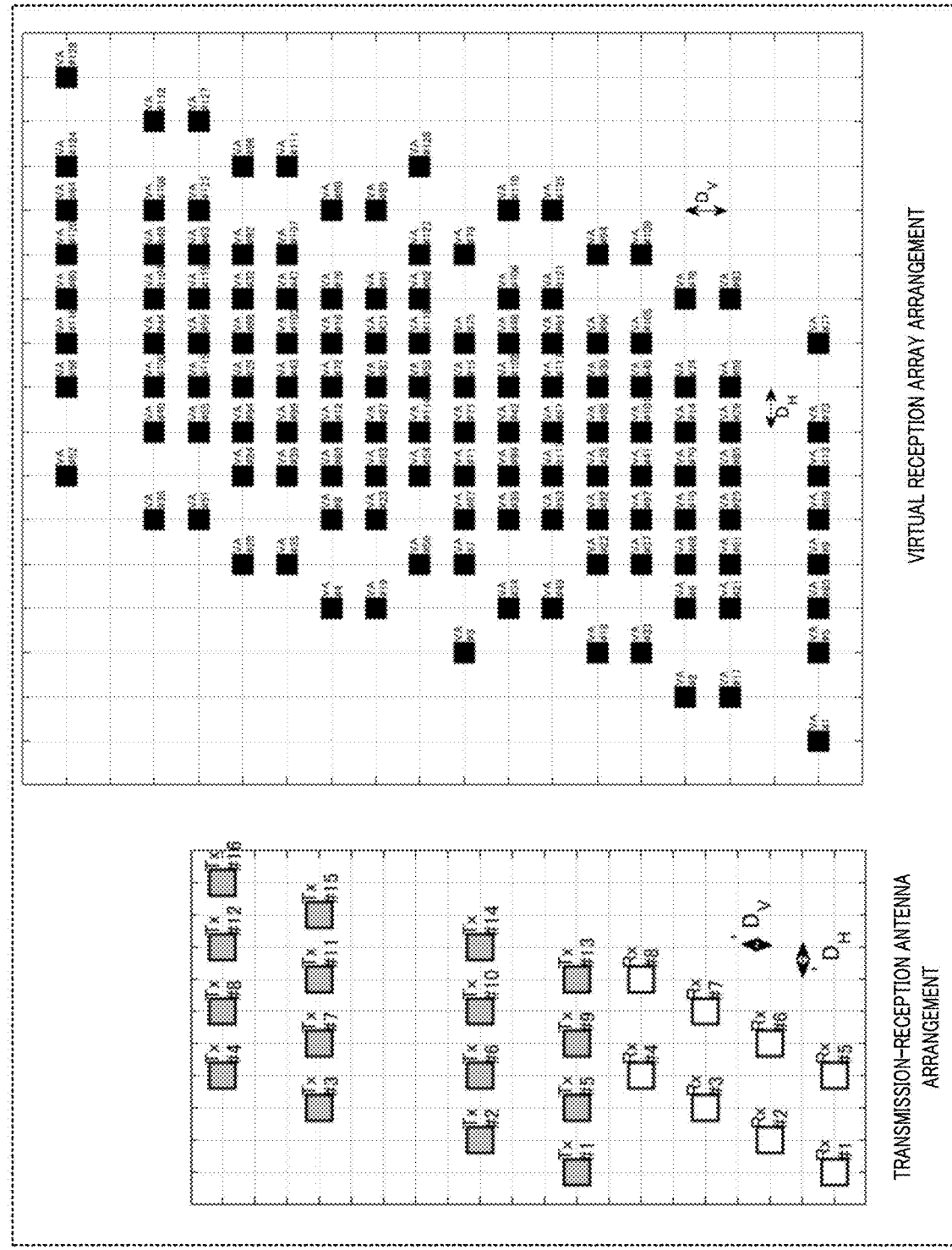
FIG. 31 is a diagram showing an example of an antenna arrangement that is a combination of Modification 3 and Modification 2 of basic arrangement 1.
Figure 32:
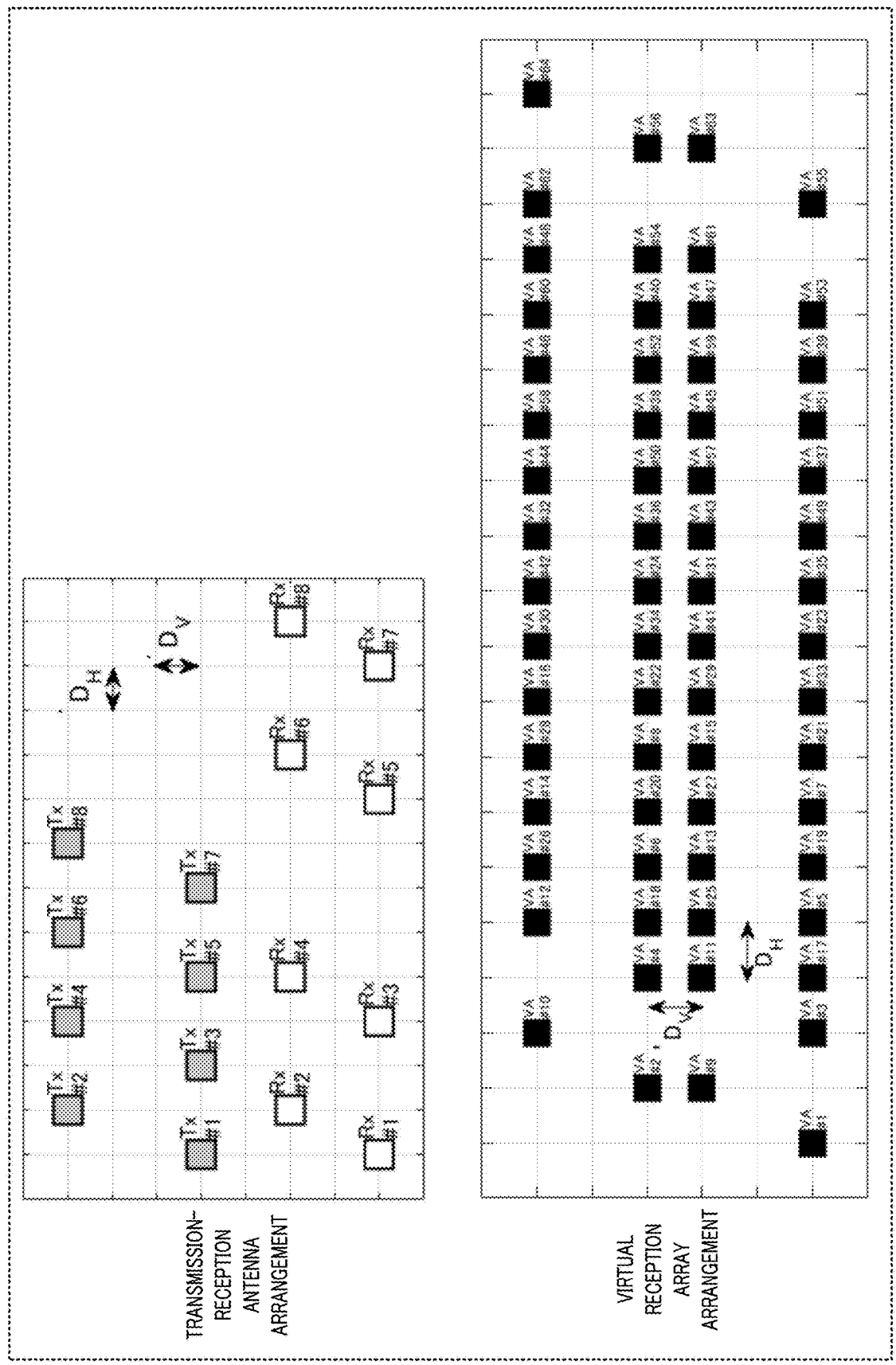
FIG. 32 is a diagram showing an example of an antenna arrangement that is a combination of Modification 3 and Modification 2 of basic arrangement 1.

FIG. 31 and FIG. 32 show examples of the antenna arrangement that is a combination of Modification 3 and Modification 2.

FIG. 31 shows an example of the arrangement of transmission antennas 106 and reception antennas 202 in the case where $N_{TxGroup}=4$, $N_{TxGroup\_ANT}=4$, $N_{RxGroup}=4$, and $N_{RxGroup\_ANT}=2$ and the horizontal positions of the antennas included in each transmission antenna group and each reception antenna group are arranged so as to be shifted by $D_H$ and an example of the arrangement of a virtual reception array. In FIG. 31, in the expression 11, $D_{TxGroupV}=5D_V$.

In FIG. 31, in the transmission array antenna, the transmission antennas (for example, Tx #3, Tx #7, Tx #11, and Tx #15) included in the second transmission antenna group are arranged so as to be shifted by $D_H$ to the left-hand side with respect to the transmission antennas (for example, Tx #4, Tx #8, Tx #12, and Tx #16) included in the first transmission antenna group. In FIG. 31, the transmission antennas (for example, Tx #2, Tx #6, Tx #10, and Tx #14) included in the third transmission antenna group are arranged so as to be shifted by $D_H$ to the left-hand side with respect to the transmission antennas included in the second transmission antenna group. In FIG. 31, the transmission antennas (for example, Tx #1, Tx #5, Tx #9, and Tx #13) included in the fourth transmission antenna group are arranged so as to be shifted by $D_H$ to the left-hand side with respect to the transmission antennas included in the third transmission antenna group.

In FIG. 31, in the reception array antenna, the reception antennas (for example, Rx #3 and Rx #7) included in the second reception antenna group are arranged so as to be shifted by $D_H$ to the left-hand side with respect to the reception antennas (for example, Rx #4 and Rx #8) included in the first reception antenna group. In FIG. 31, the reception antennas (for example, Rx #2 and Rx #6) included in the third reception antenna group are arranged so as to be shifted by $D_H$ to the left-hand side with respect to the reception antennas included in the second reception antenna group. In FIG. 31, the reception antennas (for example, Rx #1 and Rx #5) included in the fourth reception antenna group are arranged so as to be shifted by $D_H$ to the left-hand side with respect to the reception antennas included in the third reception antenna group.

Next, FIG. 32 shows an example of the arrangement of transmission antennas 106 and reception antennas 202 in the case where $N_{TxGroup}=2$, $N_{TxGroup\_ANT}=4$, $N_{RxGroup}=2$, and $N_{RxGroup\_ANT}=4$ and the horizontal positions of the antennas included in each transmission antenna group and each reception antenna group are arranged so as to be shifted by $D_H$ and an example of the arrangement of a virtual reception array. In FIG. 32, in the expression 12, $D_{RxGroupH}=5D_H$.

In FIG. 32, the transmission antennas (for example, Tx #1, Tx #3, Tx #5, and Tx #7) included in the second transmission antenna group are arranged so as to be shifted by $D_H$ to the left-hand side with respect to the transmission antennas (for example, Tx #2, Tx #4, Tx #6, and Tx #8) included in the first transmission antenna group. In FIG. 32, in the reception array antenna, the reception antennas (for example, Rx #1, Rx #3, Rx #5, and Rx #7) included in the second reception antenna group are arranged so as to be shifted by $D_H$ to the left-hand side with respect to the reception antennas (for example, Rx #2, Rx #4, Rx #6, and Rx #8) included in the first reception antenna group.

For example, in each of the MIMO array arrangements respectively shown in FIGS. 31 and 32, when $D_H$ and $D_V$ are set to about 0.5λ, the horizontal and vertical element sizes of each transmission antenna 106 and each reception antenna 202 can be greater than or equal to 1λ.

For example, in each of the virtual reception arrays respectively shown in FIGS. 31 and 32, the virtual array elements are arranged at different positions without any overlap, so the aperture length of the virtual reception array is expanded, and angular resolution is improved.

The virtual array elements positioned around the center of each of the virtual reception arrays respectively shown in FIGS. 31 and 32 are densely arranged at a spacing of $D_H$ and a spacing of $D_V$. The number of virtual array elements densely arranged at a spacing of $D_H$ and a spacing of $D_V$, for example, increases depending on $N_{TxGroup}$, $N_{TxGroup\_ANT}$, $N_{RxGroup}$, and $N_{RxGroup\_ANT}$.

For example, $((N_{TxGroup\_ANT} \times N_{RxGroup\_ANT})-2)$ virtual array elements are arranged at a spacing of $D_H$ in the horizontal direction, and $((N_{RxGroup} \times N_{TxGroup})-2)$ virtual array elements are arranged at a spacing of $D_V$ in the vertical direction. As the number of virtual array elements densely arranged at a spacing of $D_H$ and a spacing of $D_V$ around the center of the virtual reception array increases, the effect of reducing grating lobes and side lobes is improved.

As $N_{TxGroup\_ANT}$ and/or $N_{RxGroup\_ANT}$ increases, the number of virtual array elements arranged in the horizontal direction increases, so the horizontal aperture length of the virtual reception array is expanded, and horizontal angular resolution is improved. Similarly, as $N_{TxGroup}$ and/or $N_{RxGroup}$ increases, the number of virtual array elements arranged in the vertical direction increases, so the vertical aperture length of the virtual reception array is expanded, and vertical angular resolution is improved.

Modification 3 of basic arrangement 1 may have, for example, an arrangement in which, in the arrangement that is a combination of the arrangement methods A and B in Modification 2 of basic arrangement 1 shown in FIG. 20, the horizontal positions of the antennas are shifted by $D_H$ between the transmission antenna groups and between the reception antenna groups in each transmission array antenna and each reception array antenna.

Figure 33:
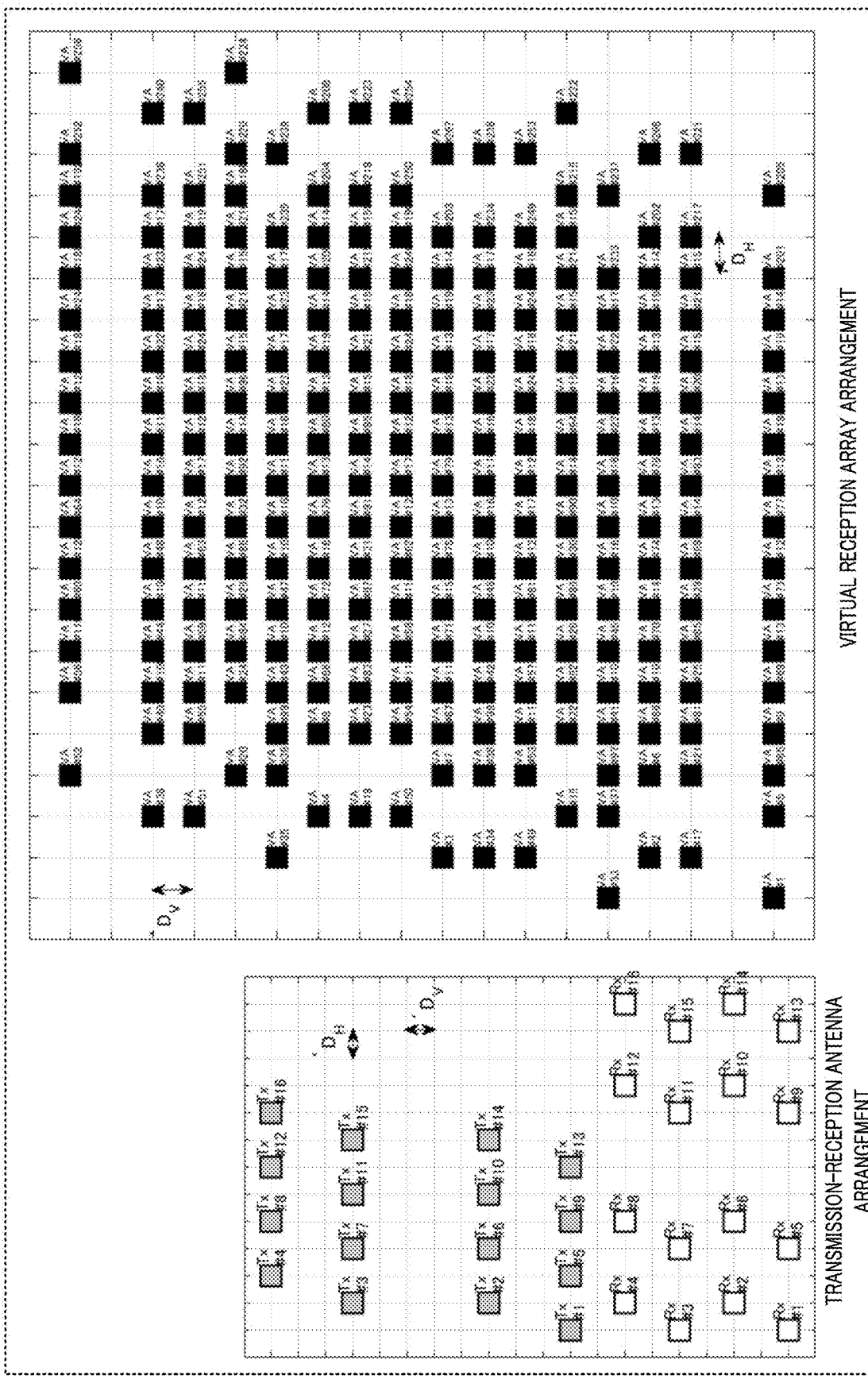
FIG. 33 is a diagram showing an example of an antenna arrangement that is a combination of Modification 3 and Modification 2 of basic arrangement 1.

FIG. 33 shows an example of the arrangement of transmission antennas 106 and reception antennas 202 in the case where $N_{TxGroup}=4$, $N_{TxGroup\_ANT}=4$, $N_{RxGroup}=4$, and $N_{RxGroup\_ANT}=4$ and the horizontal positions of the antennas included in each transmission antenna group and each reception antenna group are arranged so as to be shifted by $D_H$ and an example of the arrangement of a virtual reception array. In FIG. 33, in the expression 11, $D_{TxGroupV}=5D_V$, and, in the expression 12, $D_{RxGroupH}=5D_H$.

In FIG. 33, in the transmission array antenna, the transmission antennas (for example, Tx #3, Tx #7, Tx #11, and Tx #15) included in the second transmission antenna group are arranged so as to be shifted by $D_H$ to the left-hand side with respect to the transmission antennas (for example, Tx #4, Tx #8, Tx #12, and Tx #16) included in the first transmission antenna group. In FIG. 33, the transmission antennas (for example, Tx #2, Tx #6, Tx #10, and Tx #14) included in the third transmission antenna group are arranged at the same positions in the horizontal direction with respect to the transmission antennas included in the second transmission antenna group. In FIG. 33, the transmission antennas (for example, Tx #1, Tx #5, Tx #9, and Tx #13) included in the fourth transmission antenna group are arranged so as to be shifted by $D_H$ to the left-hand side with respect to the transmission antennas included in the third transmission antenna group.

In FIG. 33, in the reception array antenna, the reception antennas (for example, Rx #3, Rx #7, Rx #11, and Rx #15) included in the second reception antenna group are arranged so as to be shifted by $D_H$ to the left-hand side with respect to the reception antennas (for example, Rx #4, Rx #8, Rx #12, and Rx #16) included in the first reception antenna group. In FIG. 33, the reception antennas (for example, Rx #2, Rx #6, Rx #10, and Rx #14) included in the third reception antenna group are arranged so as to be shifted by $D_H$ to the right-hand side with respect to the reception antennas included in the second reception antenna group. In FIG. 33, the reception antennas (for example, Rx #1, Rx #5, Rx #9, and Rx #13) included in the fourth reception antenna group are arranged so as to be shifted by $D_H$ to the left-hand side with respect to the reception antennas included in the third reception antenna group.

With this configuration, in addition to the effect obtained by Modification 3 of basic arrangement 1, the effect of the combination of the arrangement methods 1-2A and 1-2B in Modification 2 of basic arrangement 1 is obtained.

Basic Arrangement 2

Figure 34:
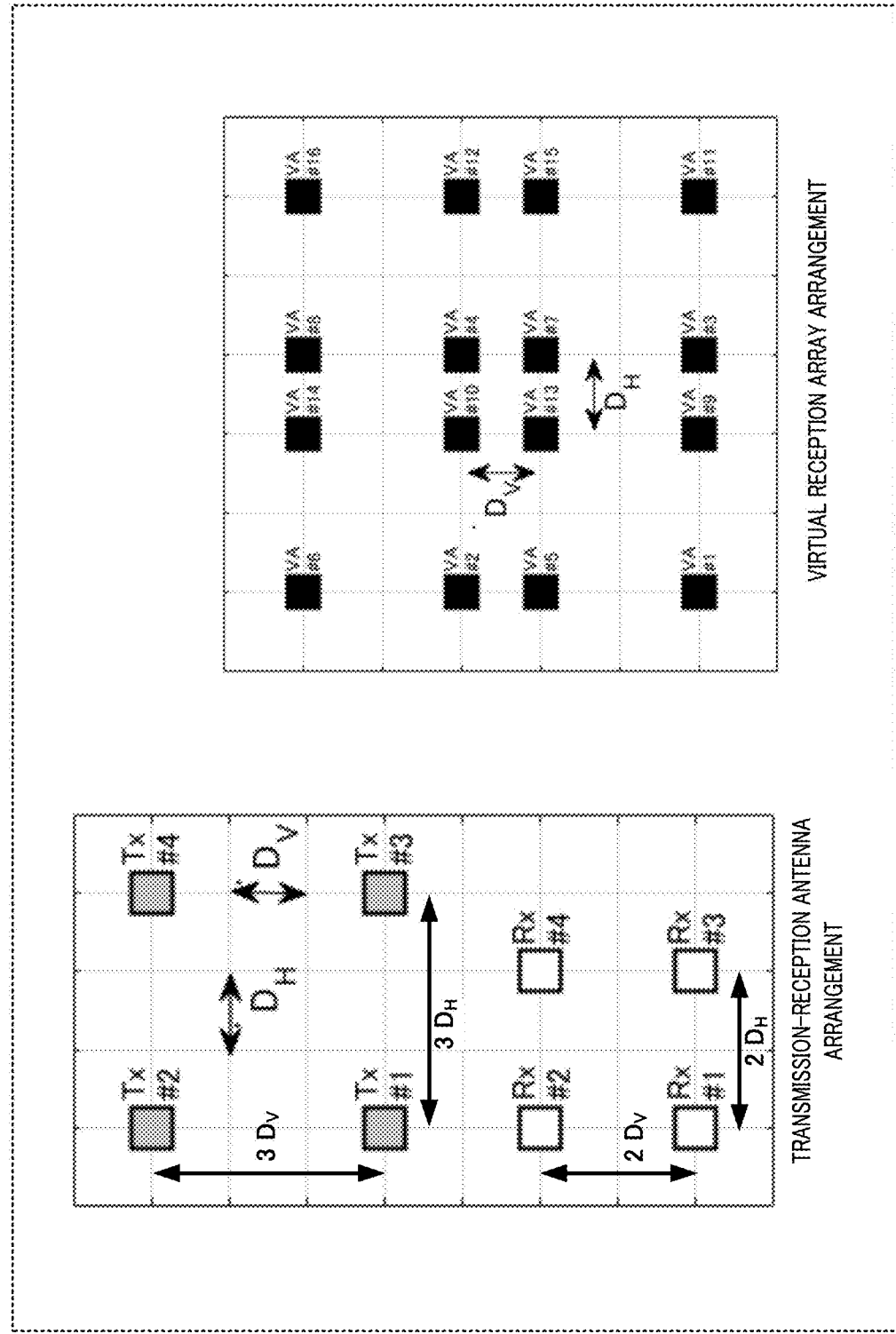
FIG. 34 is a diagram showing an example of an antenna arrangement according to basic arrangement 2.

FIG. 34 shows an example of the arrangement of transmission antennas 106 and reception antennas 202 and an example of the arrangement of a virtual reception array according to basic arrangement 2.

(1) Arrangement of Transmission-Reception Antenna

In FIG. 34, the number Nt of transmission antennas 106 in the transmission array antenna is four (Tx #1, Tx #2, Tx #3, and Tx #4), and the number Na of reception antennas 202 in the reception array antenna is four (Rx #1, Rx #2, Rx #3, and Rx #4).

The transmission array antenna shown in FIG. 34 is made up of a first transmission antenna group (Tx #2 and Tx #4 in FIG. 34) and a second transmission antenna group (Tx #1 and Tx #3 in FIG. 34). Each transmission antenna group includes two transmission antenna elements of which the positions are the same in the vertical direction and the antenna spacing in the horizontal direction (the cross direction in FIG. 34) is $3D_H$. The spacing in the vertical direction (the longitudinal direction in FIG. 34) between the first transmission antenna group and the second transmission antenna group is, for example, $3D_V$.

The reception array antenna shown in FIG. 34 is made up of a first reception antenna group (Rx #2 and Rx #4 in FIG. 34) and a second reception antenna group (Rx #1 and Rx #3 in FIG. 34). Each reception antenna group includes two reception antenna elements of which the positions are the same in the vertical direction and the horizontal antenna spacing is $2D_H$. The vertical spacing between the first reception antenna group and the second reception antenna group is, for example, $2D_V$.

In this way, in the transmission-reception antenna arrangement shown in FIG. 34, the transmission array antenna is made up of a plurality of transmission antenna groups, and each of the plurality of transmission antenna groups, for example, includes a plurality of transmission antennas arranged at a spacing (here, $3D_H$) that is an integer multiple of $D_H$ in the horizontal direction. The plurality of transmission antenna groups is arranged at a spacing of $3D_V$ in the vertical direction. In other words, the vertical antenna spacing between the transmission antenna groups ($3D_V$ in FIG. 34) and the horizontal antenna spacing in each transmission antenna group ($3D_H$ in FIG. 34) are the same.

In the transmission-reception antenna arrangement shown in FIG. 34, the reception array antenna is made up of a plurality of reception antenna groups, and each of the plurality of reception antenna groups, for example, includes a plurality of reception antennas arranged at a spacing (here, $2D_H$) that is an integer multiple of $D_H$ in the horizontal direction. The plurality of reception antenna groups is arranged at a spacing of $2D_V$ in the vertical direction. In other words, the horizontal antenna spacing in each reception antenna group ($2D_H$ in FIG. 34) and the vertical antenna spacing between the reception antenna groups ($2D_H$ in FIG. 34) are the same.

In FIG. 34, the antenna spacing of transmission antennas 106 ($3D_H$ in FIG. 34) is different from the antenna spacing of reception antennas 202 ($2D_H$ inn FIG. 34), and, for example, the difference is $D_H$. In FIG. 34, the difference between the spacing $3D_V$ (the spacing that is an integer multiple of $D_V$) at which the plurality of transmission antenna groups is arranged and the spacing $2D_V$ (the spacing that is an integer multiple of $D_V$) at which the plurality of reception antenna groups is arranged is $D_V$.

For example, it is assumed that the horizontal direction (cross direction) shown in FIG. 34 corresponds to X-axis, and the vertical direction (longitudinal direction) shown in FIG. 34 corresponds to Y-axis direction.

In the case of the antenna arrangement shown in FIG. 34, the position coordinates of each of transmission antennas 106 that make up the transmission array antenna are expressed as the position coordinates $(X_{T\_\#2}, Y_{T\_\#2}) = (X_{T\_\#1}, Y_{T\_\#1}+3D_V)$ of transmission antenna Tx #2, the position coordinates $(X_{T\_\#3}, Y_{T\_\#3}) = (X_{T\_\#1}+3D_H, Y_{T\_\#1})$ of transmission antenna Tx #3, and the position coordinates $(X_{T\_\#4}, Y_{T\_\#4}) = (X_{T\_\#1}+3D_H, Y_{T\_\#1}+3D_V)$ of transmission antenna Tx #4 with reference to the position coordinates $(X_{T\_\#1}, Y_{T\_\#1})$ of transmission antenna Tx #1.

Similarly, the position coordinates of each of reception antennas 202 that make up the reception array antenna are expressed as the position coordinates $(X_{R\_\#2}, Y_{R\_\#2}) = (X_{R\_\#1}, Y_{R\_\#1}+2D_V)$ of reception antenna Rx #2, the position coordinates $(X_{R\_\#3}, Y_{R\_\#3}) = (X_{R\_\#1}+2D_H, Y_{R\_\#1})$ of reception antenna Rx #3, and the position coordinates $(X_{R\_\#4}, Y_{R\_\#4}) = (X_{R\_\#1}+2D_H, Y_{R\_\#1}+2D_V)$ of reception antenna Rx #4 with reference to the position coordinates $(X_{R\_\#1}, Y_{R\_\#1})$ of reception antenna Rx #1.

(2) Arrangement of Virtual Reception Array

The arrangement of the virtual reception array (virtual antennas VA #1 to VA #16), provided in accordance with the above-described transmission-reception antenna arrangement shown in FIG. 34, has the following features.

With the arrangement of the transmission array antenna and the arrangement of the reception array antenna, shown in FIG. 34, each set of the position coordinates $(X_{V\_\#1}, Y_{V\_\#1})$ to $(X_{V\_\#16}, Y_{V\_\#16})$ of virtual reception arrays VA #1 to VA #16 is as follows. Here, VA #1 is expressed as the position reference (0, 0) of the virtual reception array.

(0, 0), (0, $3D_V$), ($3D_H$, 0), ($3D_H$, $3D_V$), (0, $2D_V$), (0, $5D_V$), ($3D_H$, $2D_V$), ($3D_H$, $5D_V$), ($2D_H$, 0), ($2D_H$, $3D_V$), ($5D_H$, 0), ($5D_H$, $3D_V$), ($2D_H$, $2D_V$), ($2D_H$, $5D_V$), ($5D_H$, $2D_V$), and ($5D_H$, $5D_V$)

In this way, in the arrangement of the virtual reception array shown in FIG. 34, the virtual reception array elements are arranged at different positions without any overlap. For this reason, the aperture length of the virtual reception array is expanded, so the main lobe narrows, and angular resolution is improved.

As shown in FIG. 34, virtual array elements VA #4, VA #7, VA #10, and VA #13 positioned around the center of the virtual reception array are densely arranged at a spacing of $D_H$ in the horizontal direction and a spacing of $D_V$ in the vertical direction. For example, in FIG. 34, when the spacing $D_H$ and the spacing $D_V$ are set to about 0.5λ, virtual array elements VA #4, VA #7, VA #10, and VA #13 are arranged at a spacing of $D_H$=0.5λ in the horizontal direction and a spacing of $D_V$=0.5λ in the vertical direction. With this configuration, as in the case of basic arrangement 1 (see, for example, FIG. 8), grating lobes are reduced.

For example, in the MIMO array arrangement shown in FIG. 34, when the spacing $D_H$ and the spacing $D_V$ are set to about 0.5λ, the horizontal and vertical element sizes of each transmission antenna 106 and each reception antenna 202 can be designed to a size greater than or equal to 1λ.

With this configuration, for example, an antenna using four elements that are planar patch antennas arranged in a two by two matrix as a sub-array (where the antenna width $W_{ANT}$<2$D_H$, and the antenna height $H_{ANT}$<2$D_V$) as shown in FIG. 9A is applicable to each antenna element of at least one of the transmission array antenna and the reception array antenna shown in FIG. 34.

In FIG. 34, in the transmission array antenna, the horizontal antenna spacing is $3D_H$, and the vertical antenna spacing is $3D_V$. In other words, the antenna spacings ($3D_H$ and $3D_V$) of the transmission array antenna shown in FIG. 34 are wider than the antenna spacings ($2D_H$ and $2D_V$) of the reception array antenna. The horizontal antenna spacing ($3D_H$) of the transmission array antenna shown in FIG. 34 is wider than the horizontal antenna spacing (for example, $2D_H$ in FIG. 8) of the transmission array antenna in basic arrangement 1.

Figure 35:
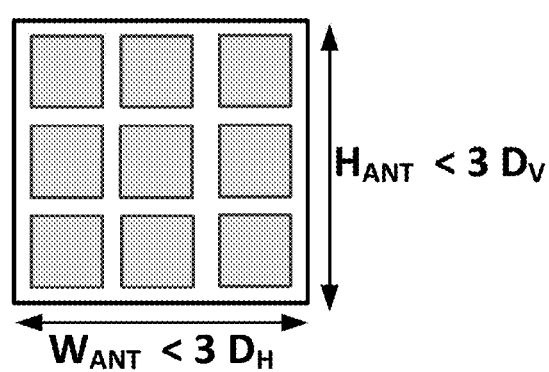
FIG. 35 is a diagram showing a configuration example of a sub-array according to basic arrangement 2.

Thus, for example, an antenna using nine elements that are planar patch antennas arranged in a three by three matrix as a sub-array, as shown in FIG. 35, wider in spacing in the longitudinal direction and in the cross direction than the four-element sub-array shown in FIG. 9A (where the antenna width $W_{ANT} < 3D_H$, and the antenna height $H_{ANT} < 3D_V$), can be applied to the transmission array antenna shown in FIG. 34.

Direction estimator 214 performs direction estimation processing in the horizontal direction and in the vertical direction by using received signals of the virtual reception array obtained from the above-described transmission-reception antenna arrangement (see, for example, FIG. 34). For example, the virtual reception array of basic arrangement 2 shown in FIG. 34 has a similar configuration to that of the virtual reception array of basic arrangement 1 (see, for example, FIG. 8), so similar performance is obtained.

As described above, when the MIMO array arrangement shown in FIG. 34 is used, even the element size of each antenna in the longitudinal direction or in the cross direction, used for the transmission array antenna and the reception array antenna, is about 1λ, the arrangement can be performed such that the horizontal and vertical antenna spacings in the virtual reception array include an interelement spacing of about 0.5λ, so grating lobes are reduced. For example, as shown in FIG. 34, the virtual array elements of the virtual reception array are arranged without any overlap, so the aperture length of the virtual reception array is expanded, and angular resolution is improved.

An antenna having a sub-array configuration of which the element size in the longitudinal direction and in the cross direction is at least about 1λ can be used as each of the antenna elements for use in transmission antennas 106 and reception antennas 202. Thus, the directivity gain of the antenna is improved, so the detection performance (for example, detection distance) of radar apparatus 10 is improved.

In basic arrangement 2, the antenna spacing can be set wider in any one of the transmission array antenna and the reception array antenna (the transmission array antenna in FIG. 34) than in the other. With this configuration, in one of the array antennas, a sub-array with a larger size can be applied, so the directivity gain of the antenna is improved.

Modification 1 of Basic Arrangement 2

In basic arrangement 2 (for example, FIG. 34), the case where the number of transmission antennas 106 is four (Nt=4) and the number of reception antennas 202 is four (Na=4) has been described. The number Nt of transmission antennas and the number Na of reception antennas are not limited to these numbers.

In Modification 1 of basic arrangement 2, a transmission array antenna, as in the case of basic arrangement 2 (for example, FIG. 34), is made up of a first transmission antenna group and a second transmission antenna group at, for example, a vertical spacing of $3D_V$. Each transmission antenna group, as in the case of basic arrangement 2, includes two transmission antenna elements of which the positions are the same in the vertical direction and the horizontal antenna spacing is $3D_H$.

In Modification 1 of basic arrangement 2, a reception array antenna, as in the case of basic arrangement 2, is made up of $N_{RxGroup}$ reception antenna groups (for example, first to $N_{RxGroup}$-th reception antenna groups) at, for example, a vertical spacing of $2D_V$. Each reception antenna group includes $N_{RxGroup\_ANT}$ reception antenna elements of which the positions are the same in the vertical direction and the horizontal antenna spacing is $2D_H$.

In Modification 1 of basic arrangement 2, the arrangement in which the number of antennas of the MIMO array (for example, the number Na of reception antennas) is increased according to the values of $N_{RxGroup}$ and $N_{RxGroup\_ANT}$ is possible.

Figure 36:
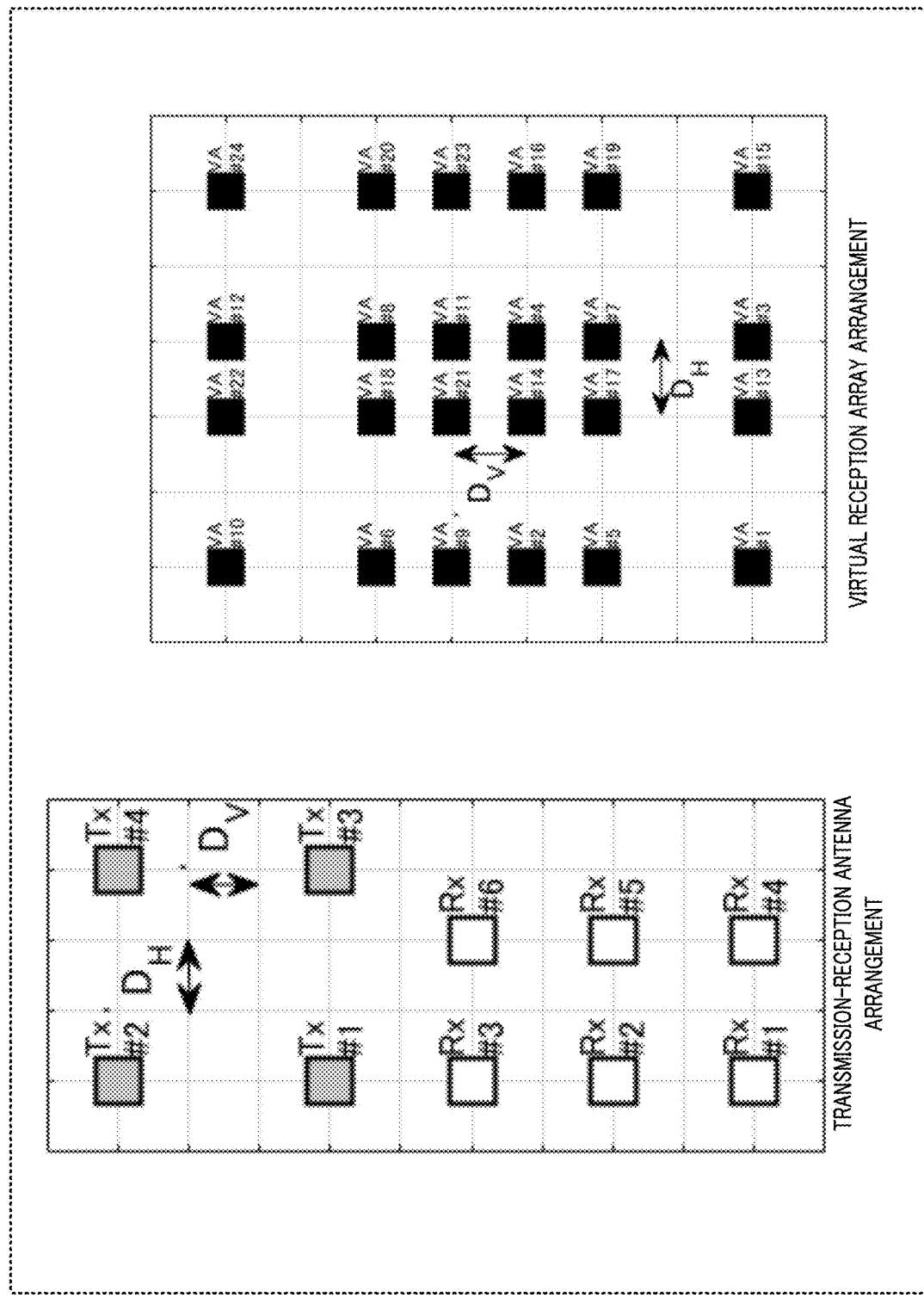
FIG. 36 is a diagram showing an example of an antenna arrangement according to Modification 1 of basic arrangement 2.

FIG. 36 shows an example of the arrangement of transmission antennas 106 and reception antennas 202 in the case where $N_{RxGroup}=3$ and $N_{RxGroup\_ANT}=2$ and an example of the arrangement of a virtual reception array.

Figure 37:
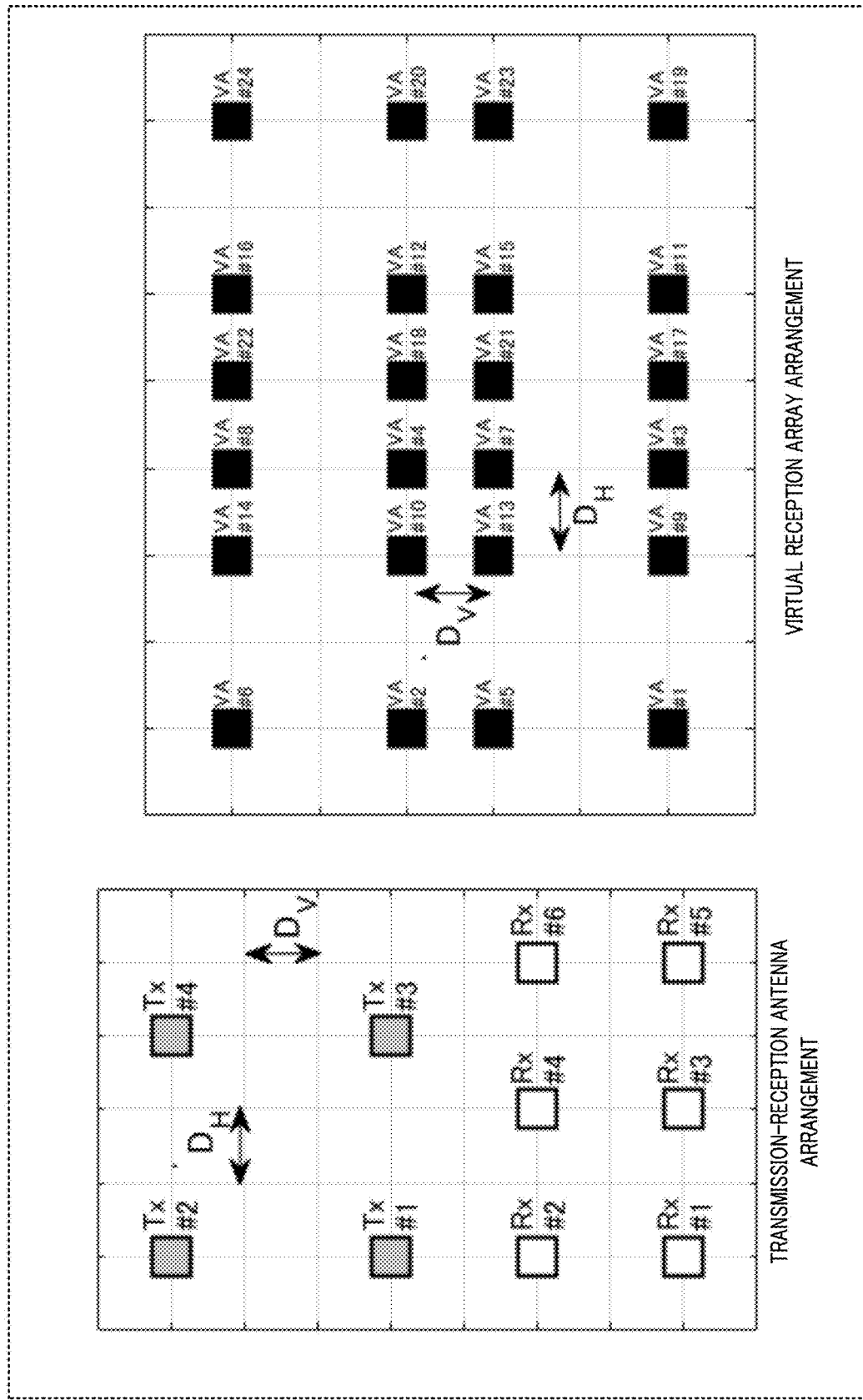
FIG. 37 is a diagram showing an example of an antenna arrangement according to Modification 1 of basic arrangement 2.

FIG. 37 shows an example of the arrangement of transmission antennas 106 and reception antennas 202 in the case where $N_{RxGroup}=2$ and $N_{RxGroup\_ANT}=3$ and an example of the arrangement of a virtual reception array.

Figure 38:
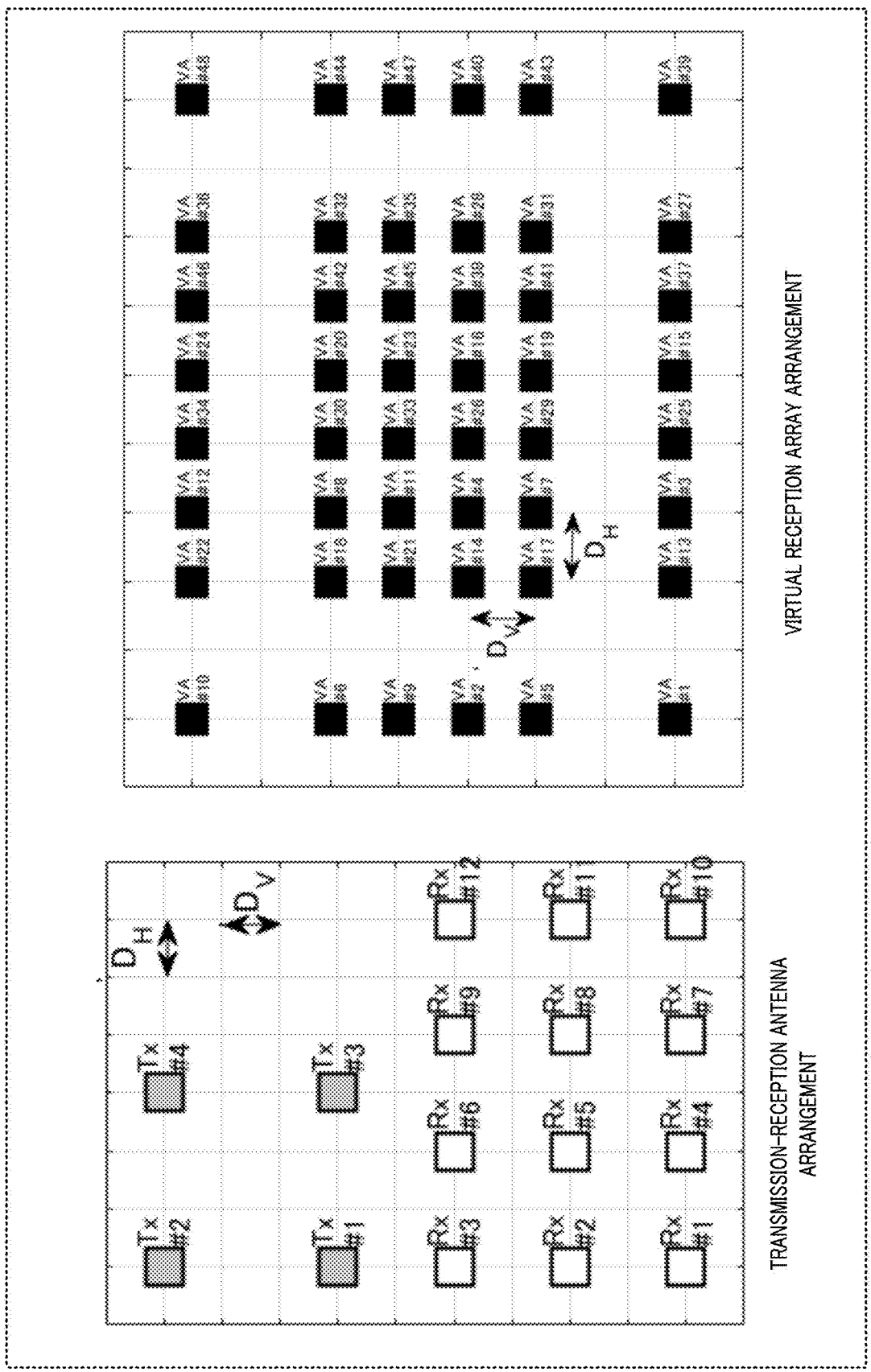
FIG. 38 is a diagram showing an example of an antenna arrangement according to Modification 1 of basic arrangement 2.

FIG. 38 shows an example of the arrangement of transmission antennas 106 and reception antennas 202 in the case where $N_{RxGroup}=3$ and $N_{RxGroup\_ANT}=4$ and an example of the arrangement of a virtual reception array.

In FIGS. 36, 37, and 38, $N_{TxGroup}=2$, and $N_{TxGroup\_ANT}=2$.

In each of the MIMO array arrangements respectively shown in FIGS. 36, 37, and 38, when, for example, $D_H$ and $D_V$ are set to about 0.52λ, the horizontal and vertical element sizes of each transmission antenna 106 and each reception antenna 202 can be designed to a size greater than or equal to about 1λ.

For example, in each of the virtual reception arrays respectively shown in FIGS. 36, 37, and 38, the virtual array elements are arranged at different positions without any overlap, so the aperture length of the virtual reception array is expanded, and angular resolution is improved.

The virtual array elements positioned around the center of each of the virtual reception arrays respectively shown in FIGS. 36, 37, and 38 are densely arranged at a spacing of $D_H$ and a spacing of $D_V$. The number of virtual array elements densely arranged at a spacing of $D_H$ and a spacing of $D_V$ increases depending on $N^{RxGroup}$ and $N_{RxGroup\_ANT}$.

For example, in a virtual reception array, (($N_{RxGroup\_ANT} \times N_{TxGroup\_ANT}$)−2) virtual array elements are arranged at a spacing of $D_H$ in the horizontal direction, and (($N_{RxGroup} \times N_{TxGroup\_ANT}$)−2) virtual array elements are arranged at a spacing of $D_V$ in the vertical direction. As the number of virtual array elements densely arranged at a spacing of $D_H$ and a spacing of $D_V$ around the center of the virtual reception array increases, the effect of reducing grating lobes and side lobes is improved.

As $N_{RxGroup\_ANT}$ increases, the number of virtual array elements arranged in the horizontal direction increases, so the horizontal aperture length of the virtual reception array is expanded, and horizontal angular resolution is improved. Similarly, as $N_{RxGroup}$ increases, the number of virtual array elements arranged in the vertical direction increases, so the vertical aperture length of the virtual reception array is expanded, and vertical angular resolution is improved.

Modification 2 of Basic Arrangement 2

Hereinafter, each of antenna arrangement methods 2-2A and 2-2B in Modification 2 of basic arrangement 2 will be described.

Arrangement Method 2-2A

In Modification 1 of basic arrangement 2, the case where the number of virtual array elements arranged in the vertical direction is increased by increasing the number $N_{RxGroup}$ of reception antenna groups included in the reception array antenna has been described. Here, when $N_{RxGroup} \geq 3$ is satisfied, the number of virtual array elements arranged in the vertical direction can be increased in the virtual reception array even by increasing the number $N_{TxGroup}$ of transmission antenna groups in the transmission array antenna.

In this case, the vertical antenna spacing of the transmission antenna groups may be set to, for example, a certain value (for example, $3D_V$); however, depending on the number $N_{RxGroup}$ of reception antenna groups, the virtual reception array arrangement can be the arrangement in which the virtual array elements overlap.

When the arrangement including no overlap virtual array element is applied to the virtual reception array arrangement, the following spacing $D_{TxGroupV2}$ may be used as, for example, the even-numbered antenna spacings among the vertical antenna spacings of the transmission antenna groups.

[13]

$$D_{TxGroupV2} = D_V(2N_{RxGroup} - 3) \quad \text{(Expression 13)}$$

For example, when $N_{RxGroup}=3$, $D_{TxGroupV2}=3D_V$, and, when $N_{RxGroup}=4$, $D_{TxGroupV2}=5D_V$.

For example, the number $N_{TxGroup}$ of transmission antenna groups is three, the spacings of three transmission antenna groups are set to $\{3D_V, D_{TxGroupV2}\}$. When the number $N_{TxGroup}$ of transmission antenna groups is four, the spacings of four transmission antenna groups are set to $\{3D_V, D_{TxGroupV2}, 3D_V\}$. When the number $N_{RxGroup\_ANT}$ of transmission antenna groups is five, the spacings of five transmission antenna groups are set to $\{3D_V, D_{TxGroupV2}, 3D_V, D_{TxGroupV2}\}$.

Figure 39:
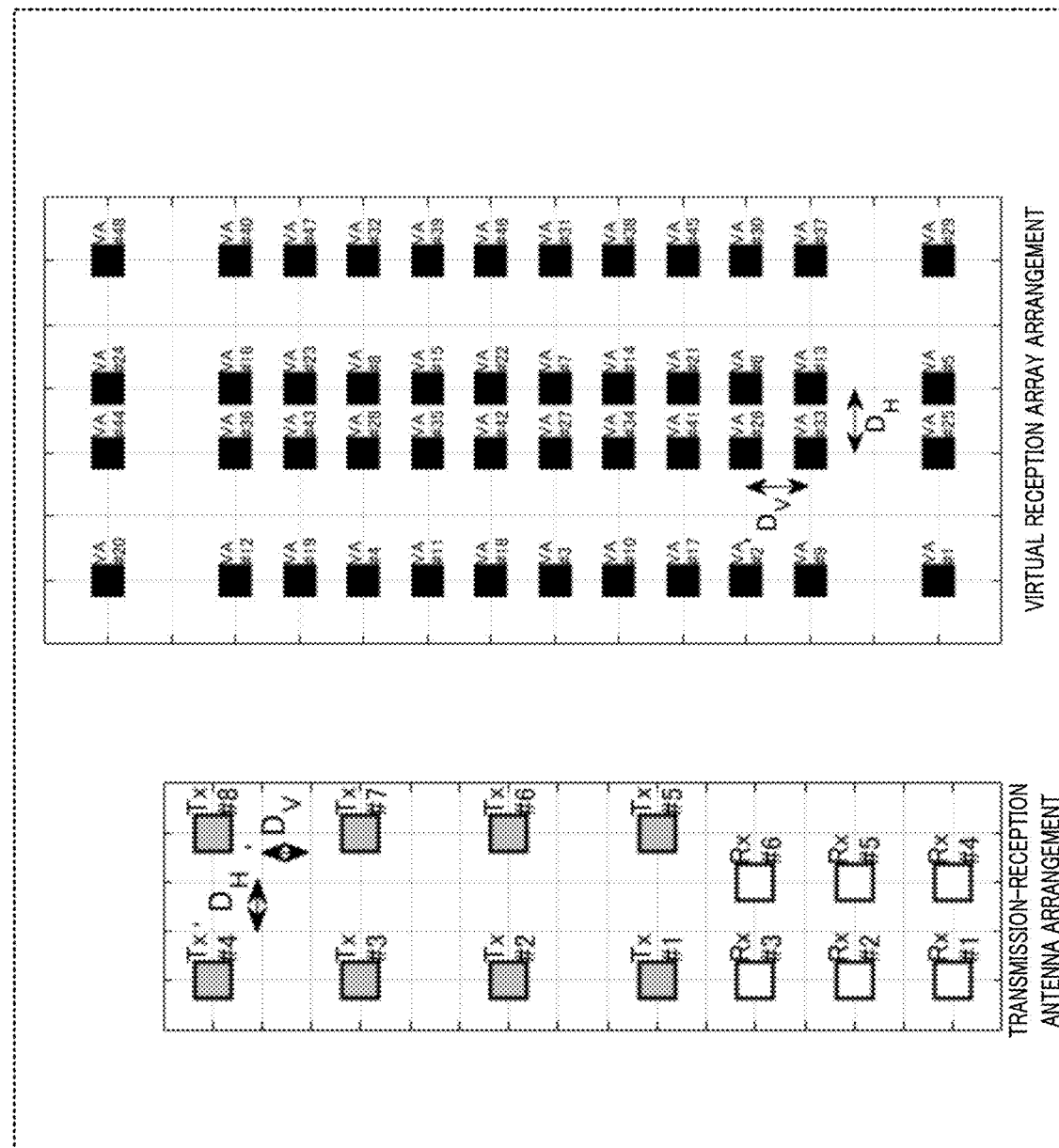
FIG. 39 is a diagram showing an example of an antenna arrangement according to Modification 2 of basic arrangement 2.

FIG. 39 shows an example of the arrangement of transmission antennas 106 and reception antennas 202 in the case where $N_{TxGroup}=4$, $N_{TxGroup\_ANT}=2$, $N_{RxGroup}=3$, and $N_{RxGroup\_ANT}=2$ and an example of the arrangement of a virtual reception array. In FIG. 39, in the expression 13, $D_{TxGroupV2}=3D_V$.

Figure 40:
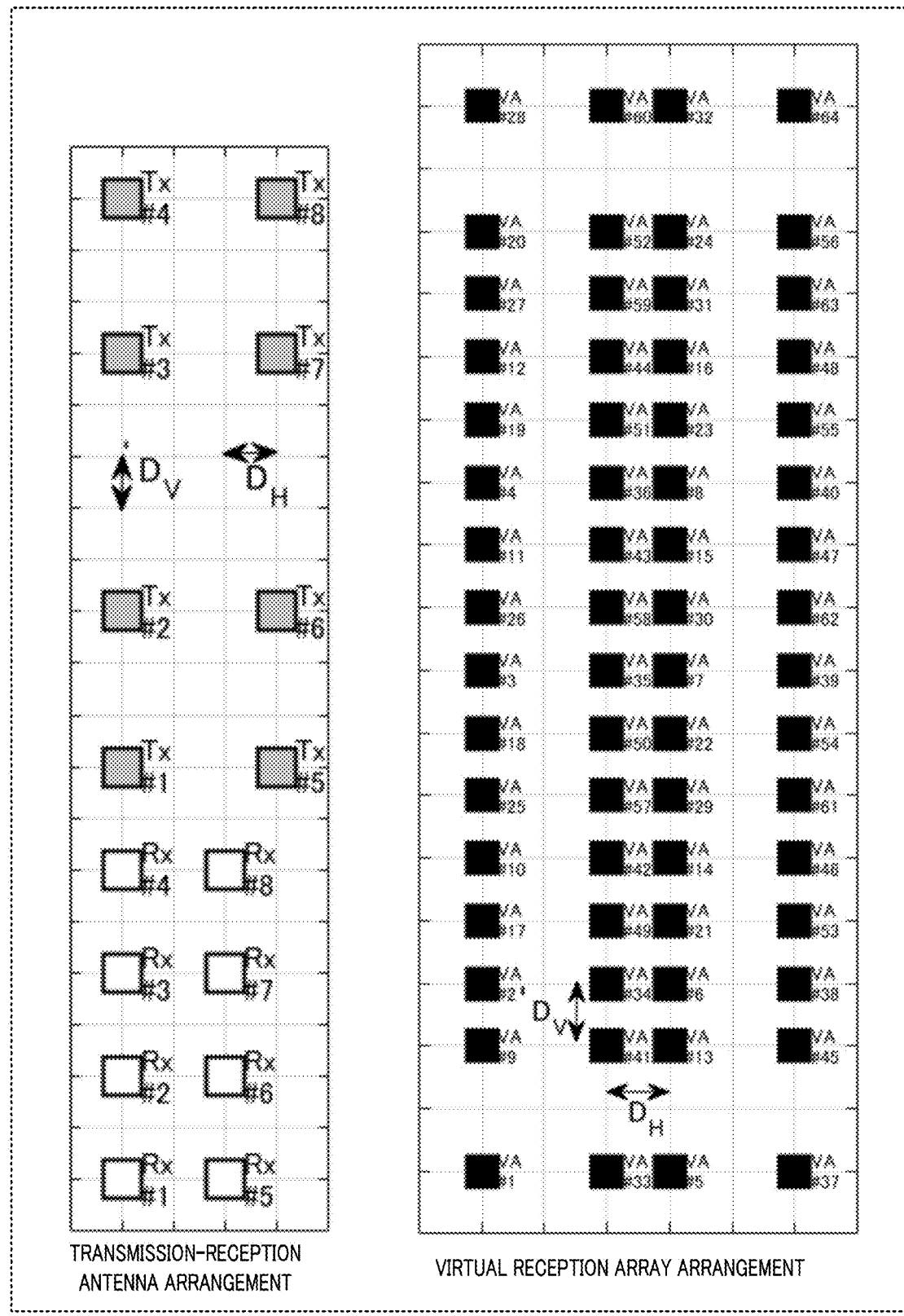
FIG. 40 is a diagram showing an example of an antenna arrangement according to Modification 2 of basic arrangement 2.

FIG. 40 shows an example of the arrangement of transmission antennas 106 and reception antennas 202 in the case where $N_{TxGroup}=4$, $N_{TxGroup\_ANT}=4$, $N_{RxGroup}=4$, and $N_{RxGroup\_ANT}=2$ and an example of the arrangement of a virtual reception array. In FIG. 40, in the expression 13, $D_{TxGroupV2}=5D_V$.

When the arrangement with an unequal spacing (for example, the spacing greater than $D_H$ or $D_V$) may be included around the center of the virtual reception array, $D_{TxGroupV2}$ may be a value greater than the value of the expression 13.

Arrangement Method 2-2B

In Modification 1 of basic arrangement 2, the case where the number of virtual array elements arranged in the horizontal direction is increased by increasing the number $N_{RxGroup\_ANT}$ of reception antennas included in each of the reception antenna groups of the reception array antenna has been described. Here, when $N_{RxGroup\_ANT} \geq 3$ is satisfied, the number of virtual array elements arranged in the horizontal direction in the virtual reception array can be increased even by increasing the number $N_{TxGroup\_ANT}$ of transmission antennas included in each transmission antenna group in the transmission array antenna.

In this case, the horizontal antenna spacing of the reception antenna groups may be set to, for example, a certain value (for example, $3D_H$); however, depending on the number $N_{RxGroup\_ANT}$ of reception antennas included in each reception antenna group, the virtual reception array arrangement can be the arrangement in which the virtual array elements overlap.

When the arrangement including no overlap virtual array element is applied to the virtual reception array arrangement, the following spacing may be used as, for example, the even-numbered antenna spacings among the horizontal antenna spacings of the transmission antennas included in each transmission antenna group.

[14]

$$D_{TxAntH} = D_H(2N_{RxGroup\_ANT} - 3) \quad \text{(Expression 14)}$$

For example, when $N_{RxGroup\_ANT}=3$, $D_{TxAntH}=3D_H$, and, when $N_{RxGroup\_ANT}=4$, $D_{TxAntH}=5D_H$.

For example, when the number $N_{TxGroup\_ANT}$ of transmission antennas included in each transmission antenna group is three, the antenna spacings of three transmission antennas are set to $\{3D_H, D_{TxAntH}\}$. When the number $N_{TxGroup\_ANT}$ of transmission antennas is four, the antenna spacings of four transmission antennas are set to $\{3D_H, D_{TxAntH}, 3D_H\}$. When the number $N_{TxGroup\_ANT}$ of transmission antennas is five, the antenna spacings of five transmission antennas are set to $\{3D_H, D_{TxAntH}, 3D_H, D_{TxAntH}\}$.

Figure 41:
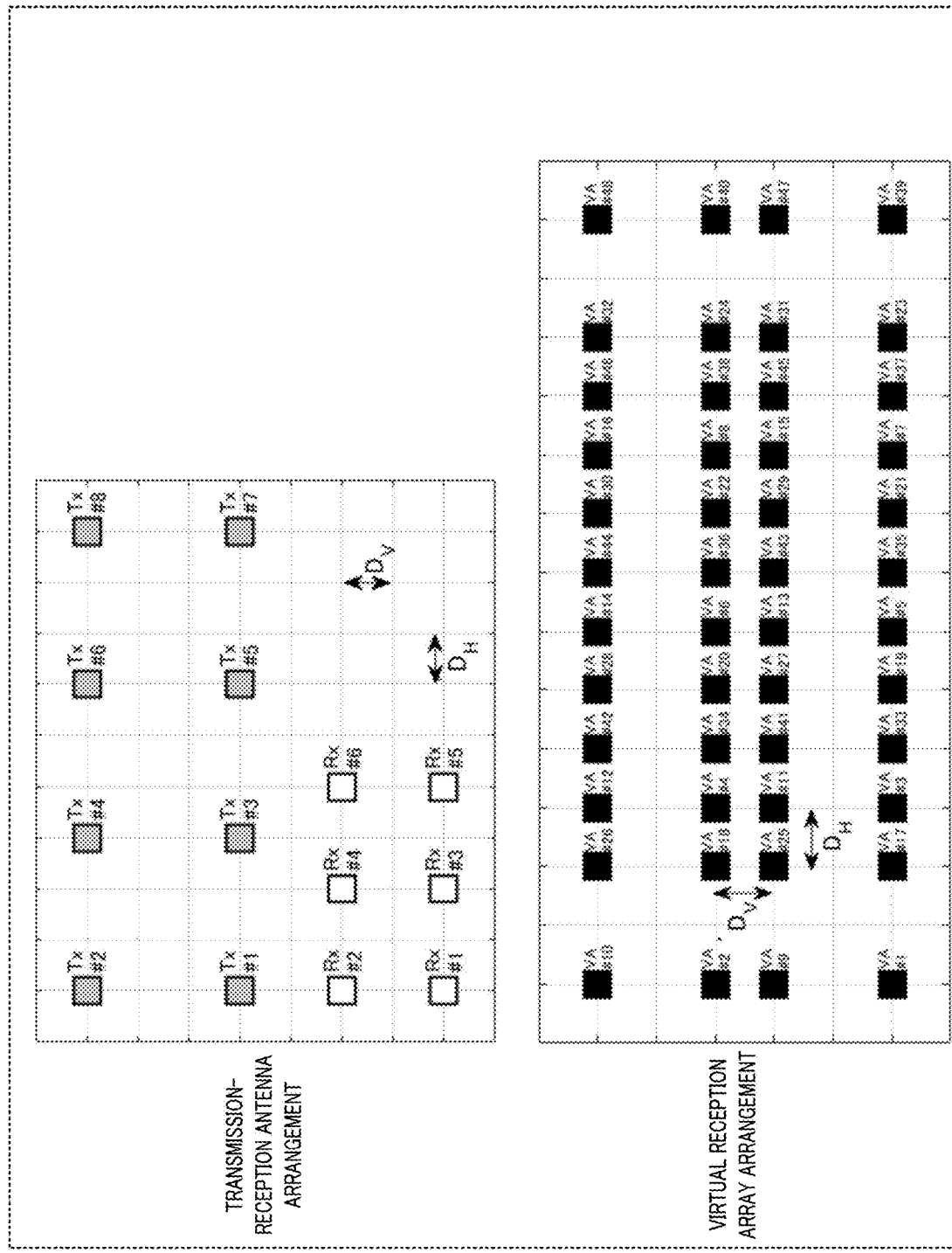
FIG. 41 is a diagram showing an example of an antenna arrangement according to Modification 2 of basic arrangement 2.

FIG. 41 shows an example of the arrangement of transmission antennas 106 and reception antennas 202 in the case where $N_{TxGroup}=2$, $N_{TxGroup\_ANT}=4$, $N_{RxGroup}=2$, and $N_{RxGroup\_ANT}=3$ and an example of the arrangement of a virtual reception array. In FIG. 41, in the expression 14, $D_{TxAntH}=3D_H$.

Figure 42:
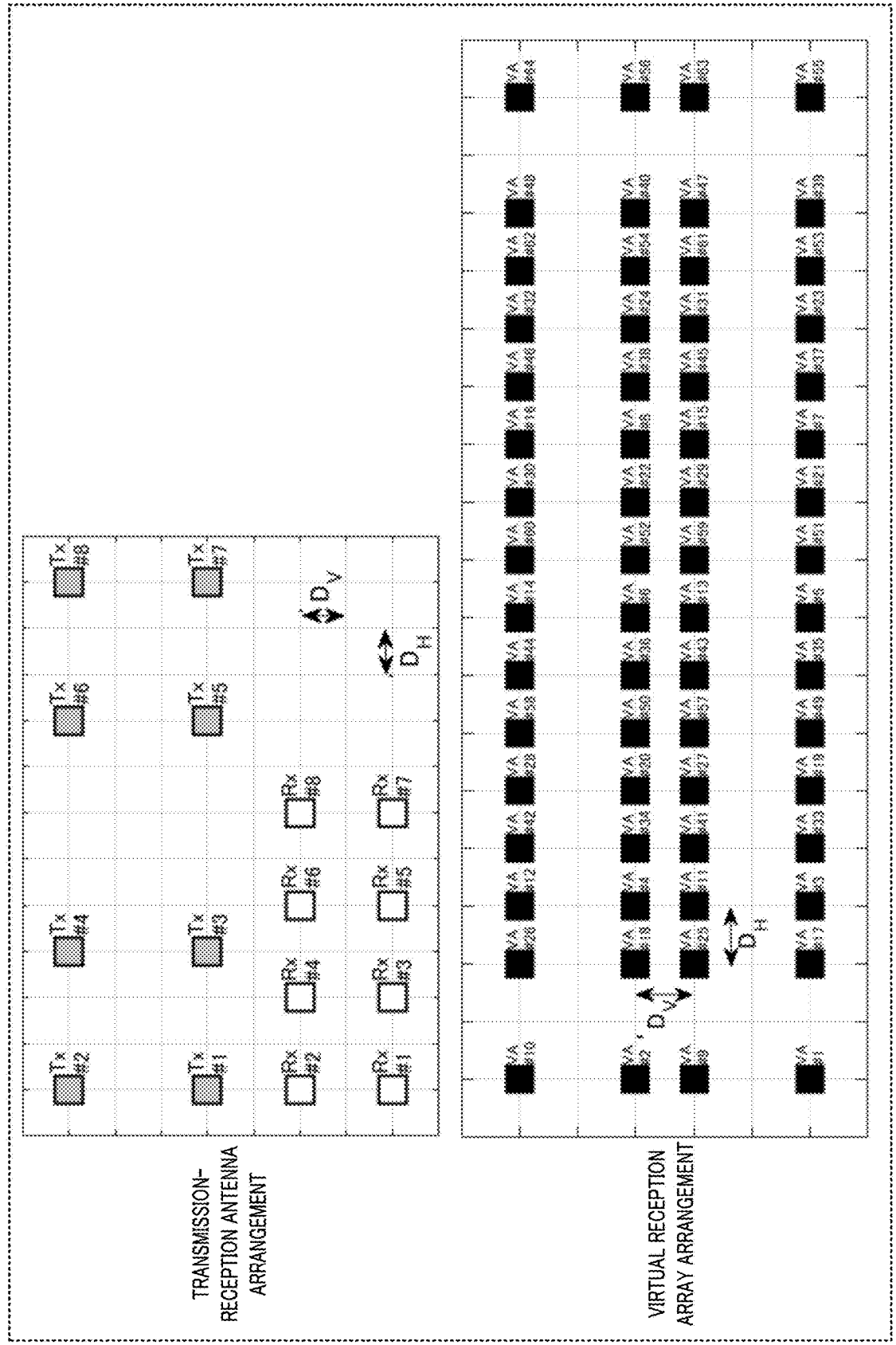
FIG. 42 is a diagram showing an example of an antenna arrangement according to Modification 2 of basic arrangement 2.

FIG. 42 shows an example of the arrangement of transmission antennas 106 and reception antennas 202 in the case where $N_{TxGroup}=2$, $N_{TxGroup\_ANT}=4$, $N_{RxGroup}=2$, and $N_{RxGroup\_ANT}=4$ and an example of the arrangement of a virtual reception array. In FIG. 41, in the expression 14, $D_{TxAntH}=5D_H$.

When the arrangement with an unequal spacing (for example, the spacing greater than $D_H$ or $D_V$) may be included around the center of the virtual reception array, $D_{TxAntH}$ may be a value greater than the value of the expression 14.

Each of the antenna arrangement methods 2-2A and 2-2B in Modification 2 of basic arrangement 2 has been described above.

For example, in each of the transmission-reception antenna arrangements (for example, MIMO array arrangements) respectively shown in FIGS. 39 to 42, when $D_H$ and $D_V$ are set to about $0.5\lambda$, the horizontal and vertical element sizes of each transmission antenna 106 and each reception antenna 202 can be designed to a size greater than or equal to about $1\lambda$.

For example, in each of the virtual reception arrays respectively shown in FIGS. 39 to 42, the virtual array elements are arranged at different positions without any overlap, so the aperture length of the virtual reception array is expanded, and angular resolution is improved.

The virtual array elements positioned around the center of each of the virtual reception arrays respectively shown in FIGS. 39 to 42 are densely arranged at a spacing of $D_H$ and a spacing of $D_V$. The number of virtual array elements densely arranged at a spacing of $D_H$ and a spacing of $D_V$ increases depending on $N_{TxGroup}$, $N_{TxGroup\_ANT}$, $N_{RxGroup}$, and $N_{RxGroup\_ANT}$.

For example, in a virtual reception array, $((N_{RxGroup\_ANT} \times N_{TxGroup\_ANT})-2)$ virtual array elements are arranged at a spacing of $D_H$ in the horizontal direction, and $((N_{RxGroup} \times N_{TxGroup})-2)$ virtual array elements are arranged at a spacing of $D_V$ in the vertical direction. As the virtual array elements densely arranged at a spacing of $D_H$ and a spacing of $D_V$ around the center of the virtual reception array increases, the effect of reducing grating lobes and side lobes is improved.

As $N_{TxGroup\_ANT}$ and/or $N_{RxGroup\_ANT}$ increases, the number of virtual array elements arranged in the horizontal direction increases, so the horizontal aperture length of the virtual reception array is expanded, and horizontal angular resolution is improved. Similarly, as $N_{TxGroup}$ and/or $N_{RxGroup}$ increases, the number of virtual array elements arranged in the vertical direction increases, so the vertical aperture length of the virtual reception array is expanded, and vertical angular resolution is improved.

Figure 43:
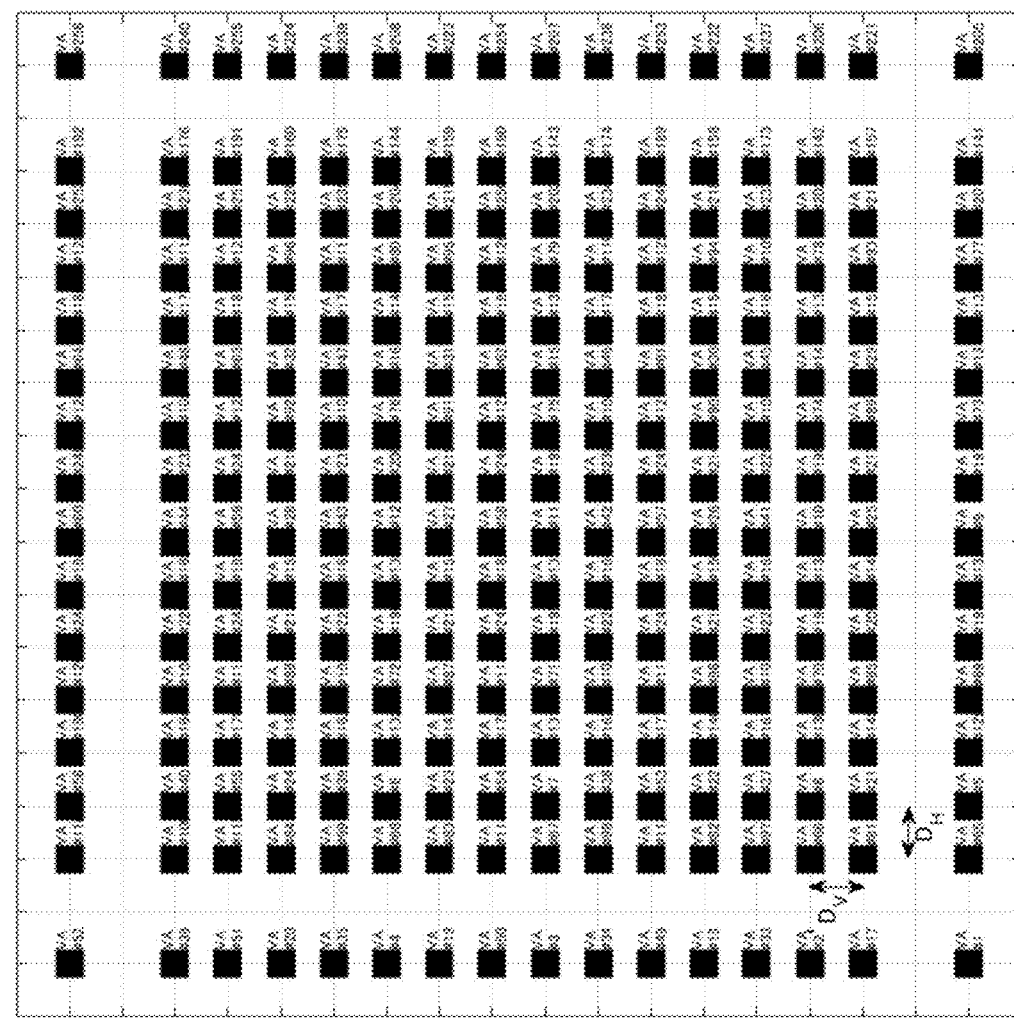
FIG. 43 is a diagram showing an example of an antenna arrangement according to Modification 2 of basic arrangement 2.
Figure 43:
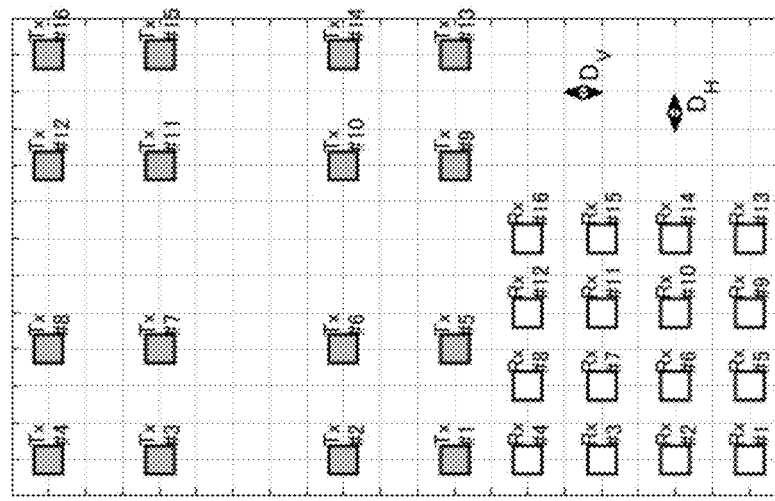

In Modification 2 of basic arrangement 2, an arrangement that is a combination of the arrangement method 2-2A and the arrangement method 2-2B is also possible. FIG. 43 shows an example of the arrangement of transmission antennas 106 and reception antennas 202 in the case where $N_{TxGroup}=4$, $N_{TxGroup\_ANT}=4$, $N_{RxGroup}=4$, and $N_{RxGroup\_ANT}=4$ and an example of the arrangement of a virtual reception array. In FIG. 43, in the expression 13, $D_{TxGroupV2}=5D_H$, and, in the expression 14, $D_{TxAntH}=5D_H$. With this configuration, the effect of the combination of the arrangement method 2-2A and the arrangement method 2-2B is obtained.

Modification 3 of Basic Arrangement 2

Hereinafter, each of antenna arrangement methods 2-3λ, 2-3B and 2-3C in Modification 3 of basic arrangement 2 will be described.

Arrangement Method 2-3A

In basic arrangement 2, the case where the horizontal positions of the transmission antennas included in each transmission antenna group are the same in the transmission array antenna has been described. Not limited to this configuration, the horizontal arrangement positions of the transmission antennas included in each transmission antenna group may be varied among the transmission antenna groups.

For example, in the transmission array antenna, the transmission antennas included in each of the first transmission antenna group and the second transmission antenna group may be arranged so as to shift the horizontal positions by $D_H$.

The direction to shift by $D_H$ in the horizontal direction may be any direction in which the transmission antennas included in the second transmission antenna group are shifted to the right-hand side or to the left-hand side with respect to the transmission antennas included in the first transmission antenna group.

Figure 44:
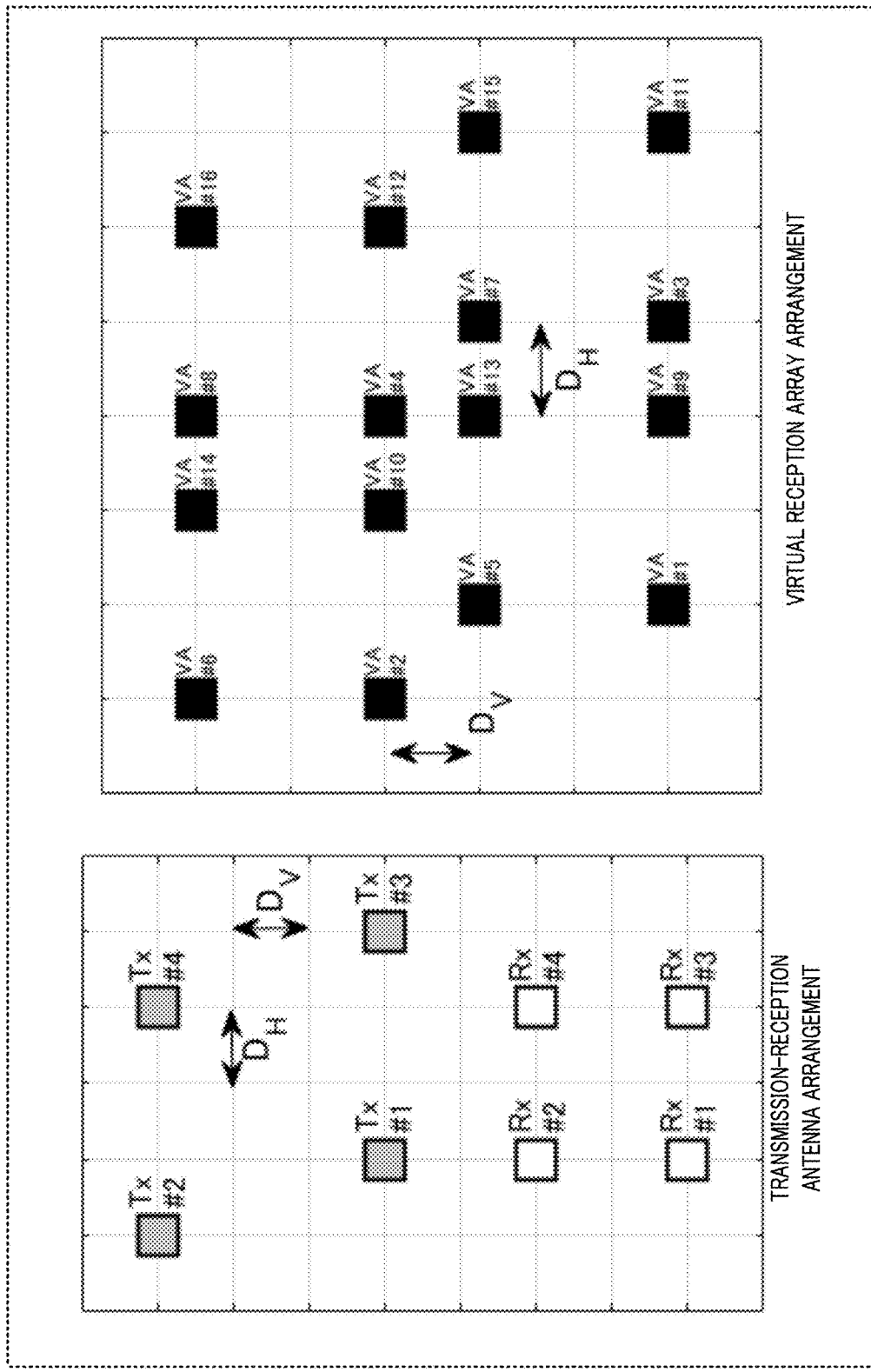
FIG. 44 is a diagram showing an example of an antenna arrangement according to Modification 3 of basic arrangement 2.

FIG. 44 shows an example of the arrangement of transmission antennas 106 and reception antennas 202 in the case where the transmission antennas (for example, Tx #1 and Tx #3) included in the second transmission antenna group are shifted to the right-hand side by $D_H$ with respect to the transmission antennas (for example, Tx #2 and Tx #4) included in the first transmission antenna group in the transmission array antenna and an example of the arrangement of a virtual reception array.

In FIG. 44, the horizontal positions of Tx #1 and Tx #2 are varied by $D_H$. The horizontal positions of Tx #3 and Tx #4 are varied by $D_H$.

Arrangement Method 2-3B

In basic arrangement 2, the case where the horizontal positions of the reception antennas included in each reception antenna group are the same in the reception array antenna has been described. Not limited to this configuration, the horizontal arrangement positions of the reception antennas included in each reception antenna group may be varied among the reception antenna groups.

For example, in the reception array antenna, the reception antennas included in each of the first reception antenna group and the second reception antenna group may be arranged so as to shift the horizontal positions by $D_H$.

The direction to shift by $D_H$ in the horizontal direction may be any direction in which the reception antennas included in the second reception antenna group are shifted to the right-hand side or to the left-hand side with respect to the reception antennas included in the first reception antenna group.

Figure 45:
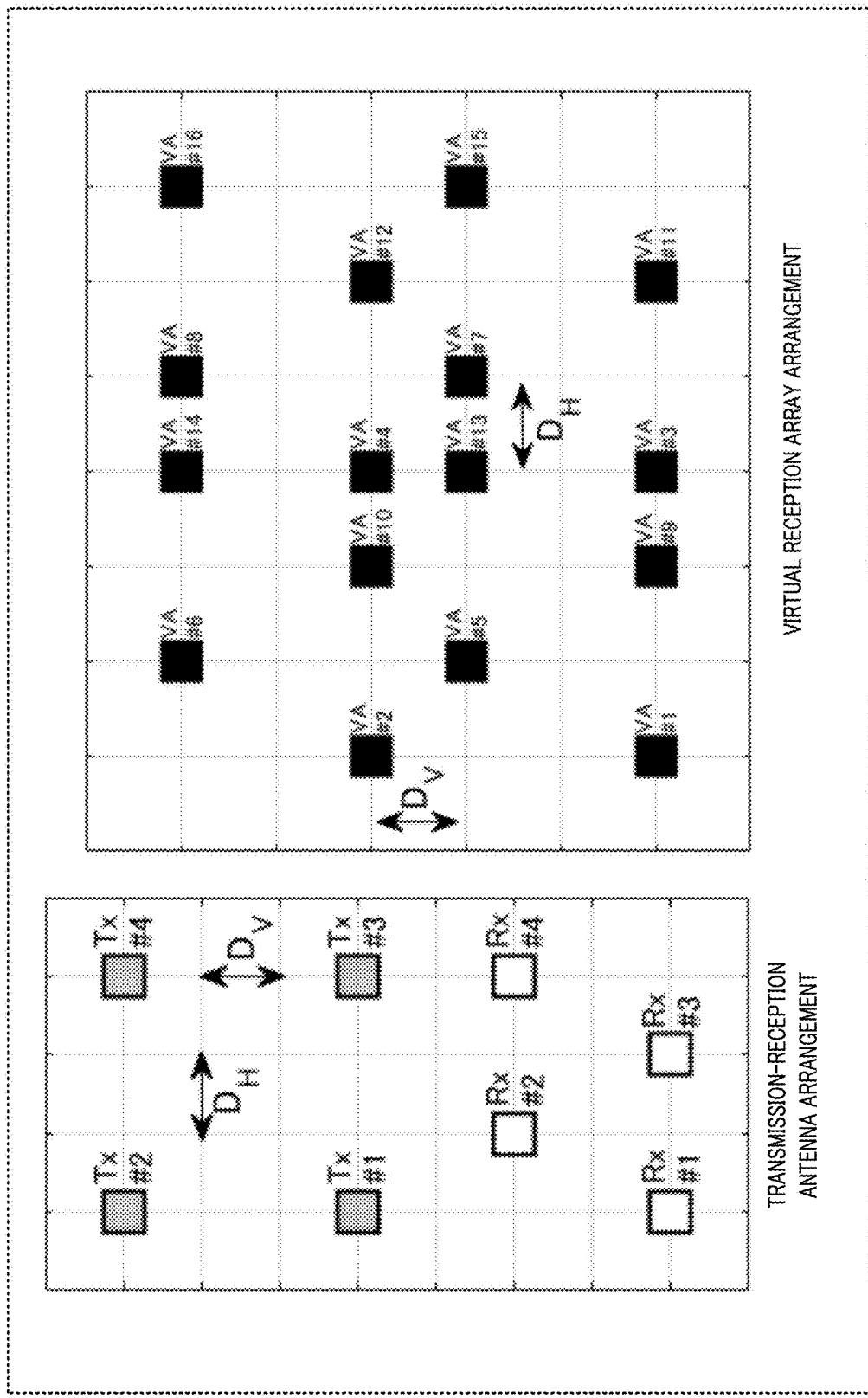
FIG. 45 is a diagram showing an example of an antenna arrangement according to Modification 3 of basic arrangement 2.

FIG. 45 shows an example of the arrangement of transmission antennas 106 and reception antennas 202 in the case where the reception antennas (for example, Rx #1 and Rx #3) included in the second reception antenna group are shifted to the left-hand side by $D_H$ with respect to the reception antennas (for example, Rx #2 and Rx #4) included in the first reception antenna group in the reception array antenna and an example of the arrangement of a virtual reception array.

In FIG. 45, the horizontal positions of Rx #1 and Rx #2 are varied by $D_H$. The horizontal positions of Rx #3 and Rx #4 are varied by $D_H$.

Arrangement Method 2-3C

The arrangement method 2-3C is a method that is a combination of the arrangement method 2-3A and the arrangement method 2-3B.

For example, in the transmission array antenna, the transmission antennas are arranged so as to shift the horizontal positions by $D_H$ between the first transmission antenna group and the second transmission antenna group. Similarly, in the reception array antenna, the reception antennas are arranged so as to shift the horizontal positions by $D_H$ between the first reception antenna group and the second reception antenna group.

The direction to shift by Du in the horizontal direction may be, for example, any direction in which the transmission antennas included in the second transmission antenna group are shifted to the right-hand side or to the left-hand side with respect to the transmission antennas included in the first transmission antenna group. The direction to shift by $D_H$ in the horizontal direction may be, for example, any direction in which the reception antennas included in the second reception antenna group are shifted to the right-hand side or to the left-hand side with respect to the reception antennas included in the first reception antenna group.

Figure 46:
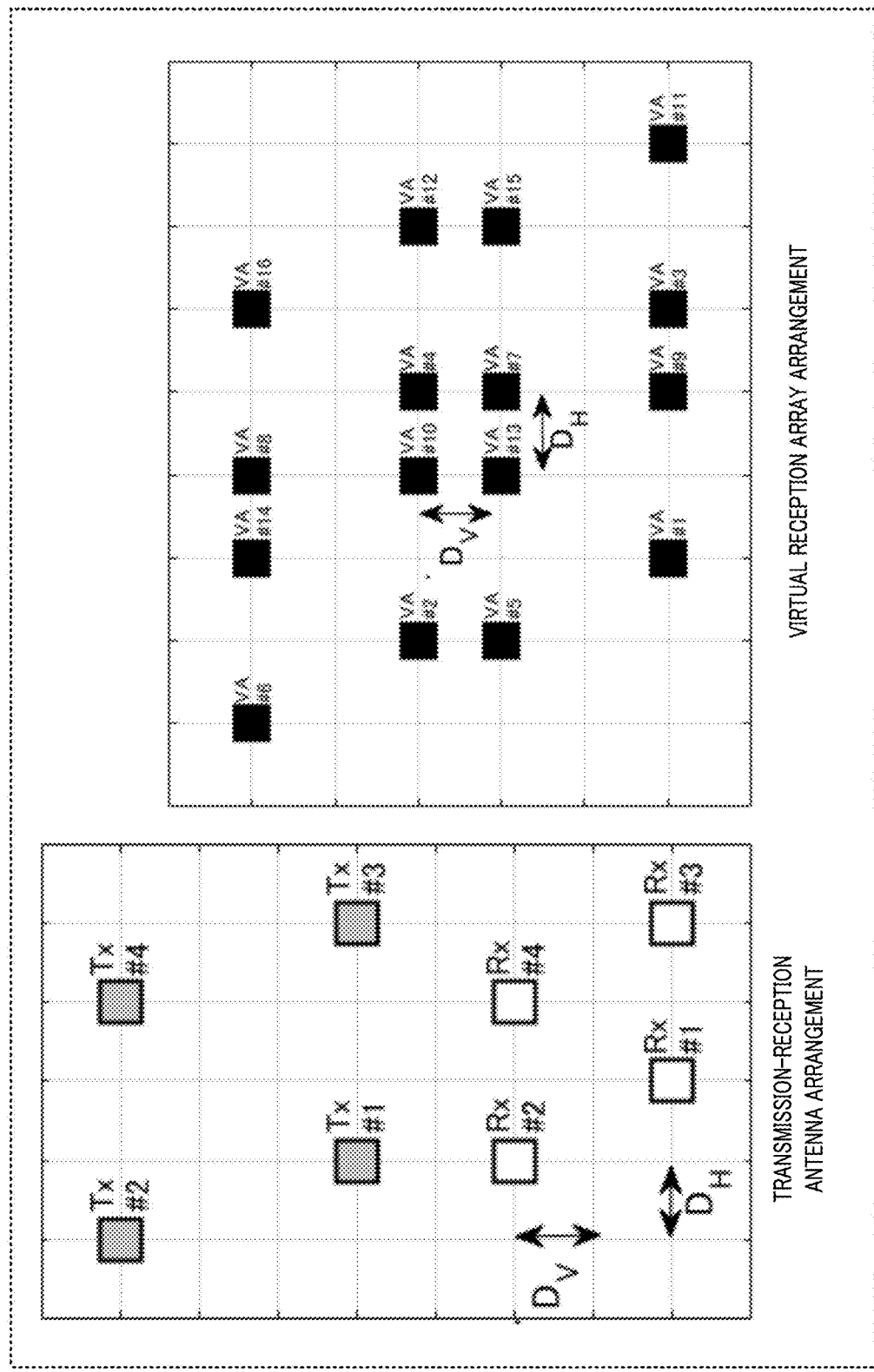
FIG. 46 is a diagram showing an example of an antenna arrangement according to Modification 3 of basic arrangement 2.

FIG. 46 shows an example of the arrangement of transmission antennas 106 and reception antennas 202 and an example of the arrangement of a virtual reception array according to the arrangement method 2-3C. In FIG. 46, in the transmission array antenna, the transmission antennas (for example, Tx #1 and Tx #3) included in the second transmission antenna group are arranged so as to be shifted by Du to the right-hand side with respect to the transmission antennas (for example, Tx #2 and Tx #4) included in the first transmission antenna group. In FIG. 46, in the reception array antenna, the reception antennas (for example, Rx #1 and Rx #3) included in the second reception antenna group are arranged so as to be shifted by $D_H$ to the right-hand side with respect to the reception antennas (for example, Rx #2 and Rx #4) included in the first reception antenna group.

Figure 47:
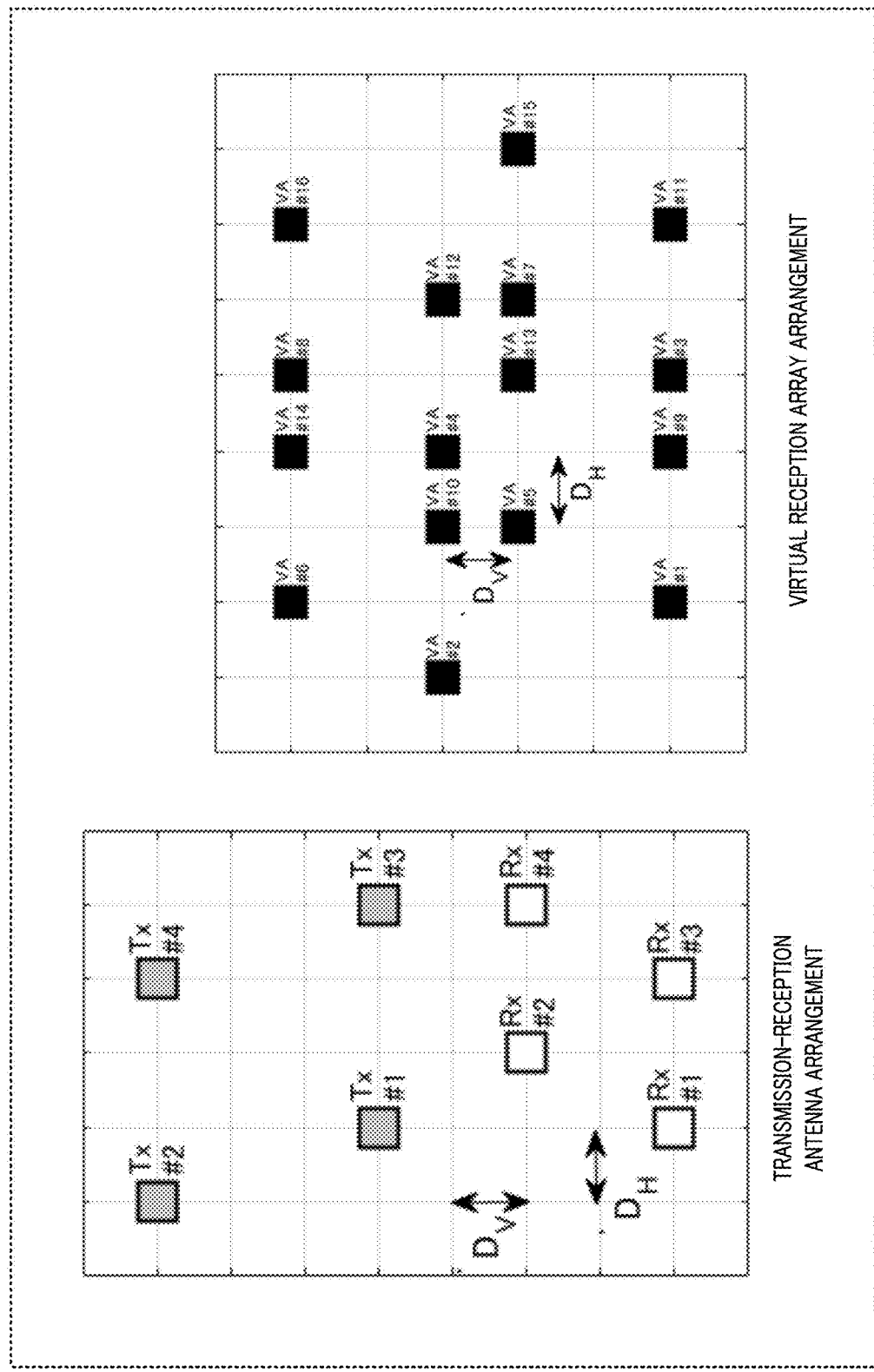
FIG. 47 is a diagram showing an example of an antenna arrangement according to Modification 3 of basic arrangement 2.

FIG. 47 shows an example of the arrangement of transmission antennas 106 and reception antennas 202 and an example of the arrangement of a virtual reception array according to the arrangement method 2-3C. In FIG. 47, in the transmission array antenna, the transmission antennas (for example, Tx #1 and Tx #3) included in the second transmission antenna group are arranged so as to be shifted by $D_H$ to the right-hand side with respect to the transmission antennas (for example, Tx #2 and Tx #4) included in the first transmission antenna group. In FIG. 47, in the reception array antenna, the reception antennas (for example, Rx #1 and Rx #3) included in the second reception antenna group are arranged so as to be shifted by $D_H$ to the left-hand side with respect to the reception antennas (for example, Rx #2 and Rx #4) included in the first reception antenna group.

For example, in comparison with the configuration (for example, FIG. 47) in which the direction to shift by $D_H$ in the horizontal direction is varied between the reception antenna groups and the transmission antenna groups, the virtual reception array elements are more densely arranged around the center of the virtual reception array arrangement in the arrangement (for example, FIG. 46) in which the direction to shift by Du in the horizontal direction is the same between the reception antenna groups and the transmission antenna groups, so it is further suitable.

Each of the arrangement methods 2-3A to 2-3C has been described above.

For example, in each of the transmission-reception antenna arrangements (for example, MIMO array arrangements) respectively shown in FIGS. 45 to 47, when $D_H$ and $D_V$ are set to about 0.5λ, the horizontal and vertical element sizes of each transmission antenna 106 and each reception antenna 202 can be designed to a size of about 1λ.

With this configuration, in Modification 3 of basic arrangement 1, for example, an antenna using a sub-array made up of four elements in which planar patch antennas are arranged in a two by two matrix (where the antenna width $W_{ANT}<2D_H$, and the antenna height $H_{ANT}<2D_V$) as shown in FIG. 9A can be applied (not shown).

For example, an antenna using nine elements that are planar patch antennas arranged in a three by three matrix as a sub-array, as shown in FIG. 9A, wider in spacing in the longitudinal direction and in the cross direction than the four-element sub-array (where the antenna width $W_{ANT}<3D_H$, and the antenna height $H_{ANT}<3D_V$) can be applied to the transmission array antennas respectively shown in FIGS. 45 to 47.

In Modification 3 of basic arrangement 2, in at least one of the transmission array antenna and the reception array antenna, the horizontal positions of the transmission antennas included in each transmission antenna group or the reception antennas included in each reception antenna group are different from each other. For this reason, in Modification 3 of basic arrangement 2, when the element size of the sub-array in the cross direction $W_{ANT}$ is less than $D_H$, the element size of the sub-array in the longitudinal direction may be any size. For example, in each of the transmission array antennas of FIGS. 45 to 47, a sub-array in which planar patch antennas are arranged in a one by eight matrix as shown in FIG. 25A may be used.

Combination of Modification 3 and Modification 1 or Combination of Modification 3 and Modification 2

Modification 3 of basic arrangement 2 may be combined with Modification 1 or Modification 2 of basic arrangement 2.

For example, in the arrangement of the transmission array antenna according to Modification 1 or Modification 2 of basic arrangement 2, the horizontal positions of the transmission antennas included in each transmission antenna group may be arranged so as to be shifted by $D_H$ between the transmission antenna groups.

Similarly, for example, in the arrangement of the reception array antenna according to Modification 1 or Modification 2 of basic arrangement 2, the horizontal positions of the reception antennas included in each reception antenna group may be arranged so as to be shifted by $D_H$ between the reception antenna groups.

FIGS. 48, 49, 50A, 50B, 51A, and 51B show examples of the antenna arrangement that is a combination of Modification 3 and Modification 2.

Figure 48:
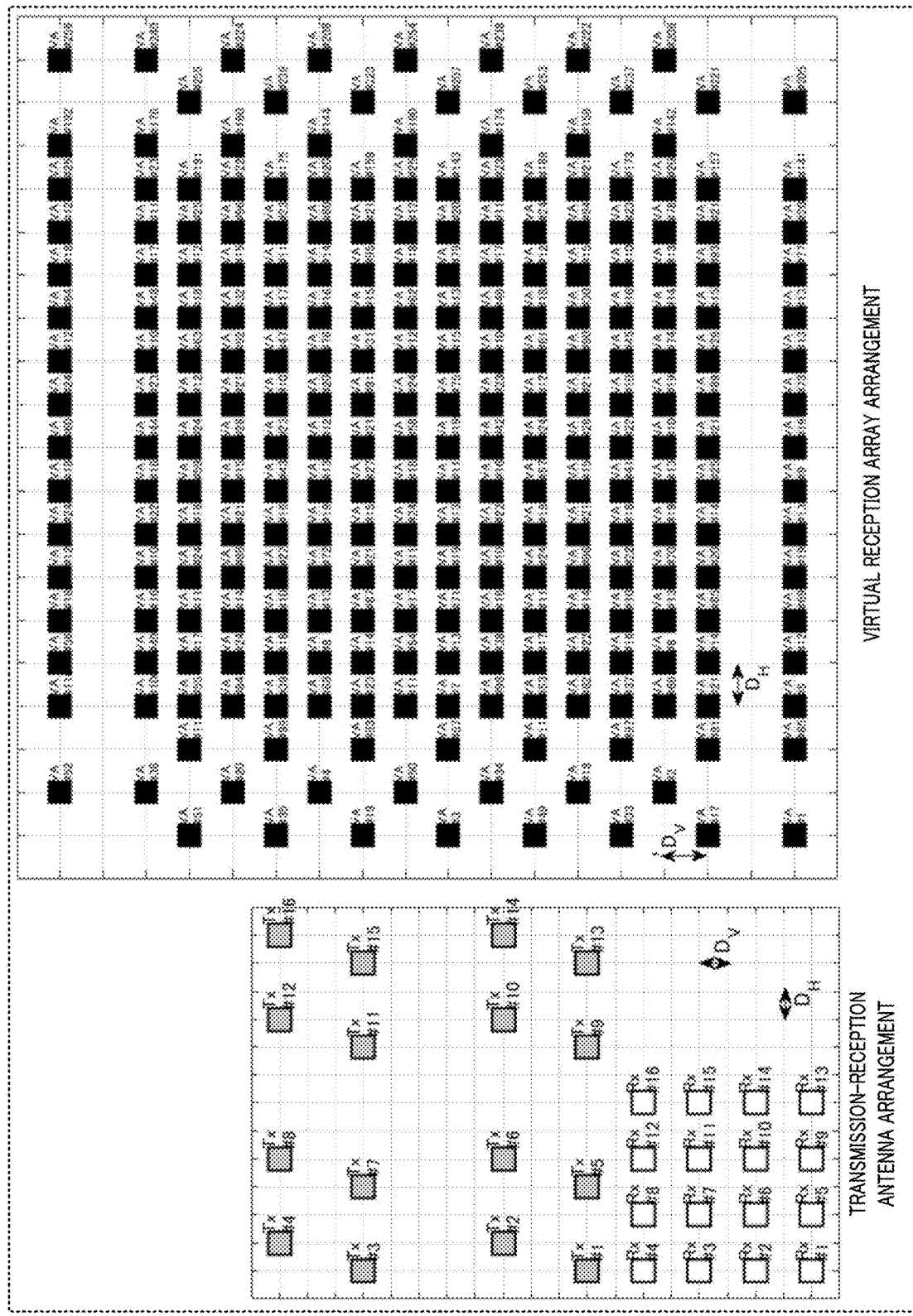
FIG. 48 is a diagram showing an example of an antenna arrangement that is a combination of Modification 3 and Modification 2 of basic arrangement 2.

FIG. 48 shows an example of the arrangement of transmission antennas 106 and reception antennas 202 in the case where $N_{TxGroup}=4$, $N_{TxGroup\_ANT}=4$, $N_{RxGroup}=4$, and $N_{RxGroup\_ANT}=4$ and the horizontal positions of the antennas included in each transmission antenna group are arranged so as to be shifted by $D_H$ and an example of the arrangement of a virtual reception array. In FIG. 48, in the expression 13, $D_{TxGroupV2}=5D_H$, and, in the expression 14, $D_{TxAntH}=5D_H$.

Figure 49:
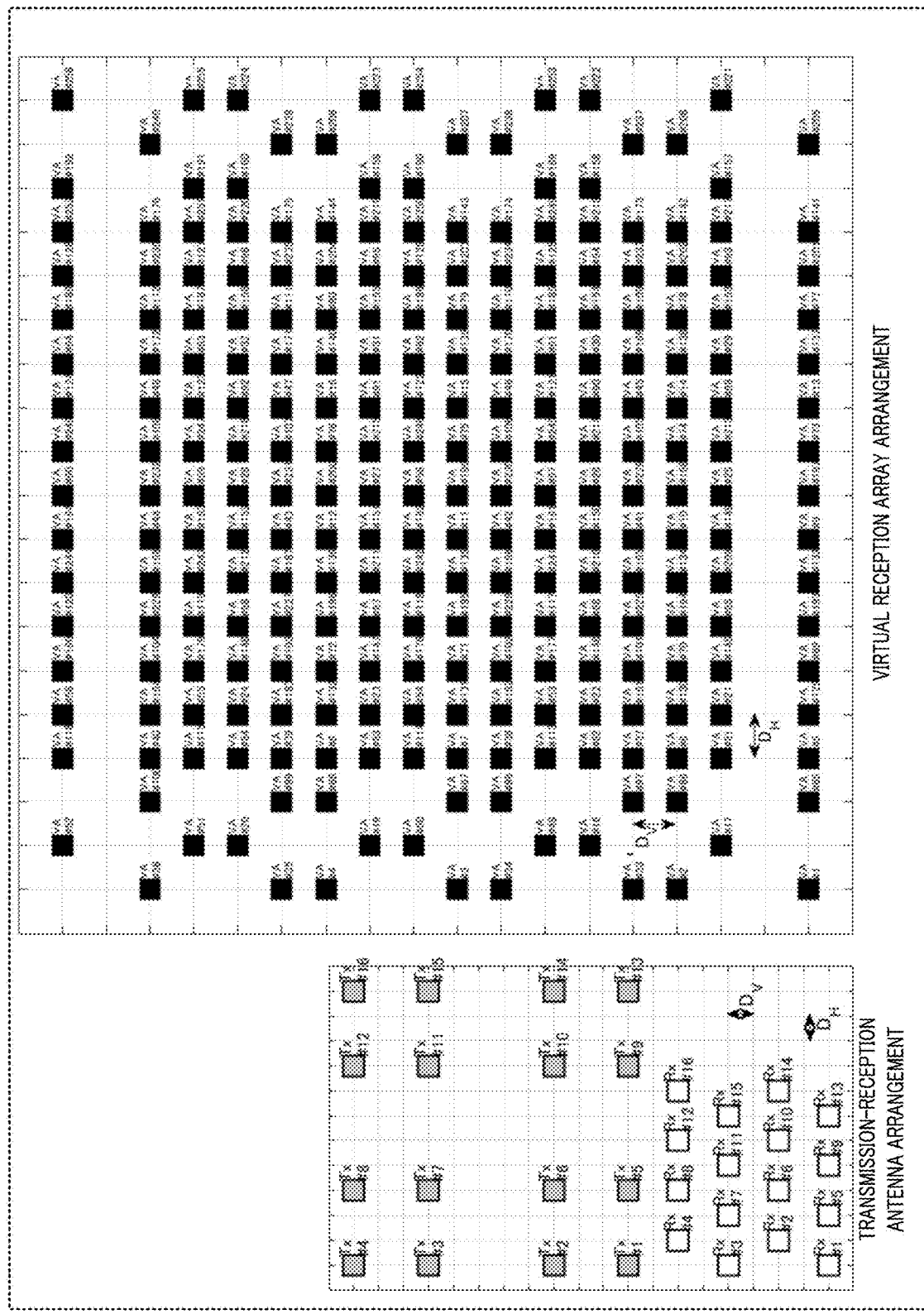
FIG. 49 is a diagram showing an example of an antenna arrangement that is a combination of Modification 3 and Modification 2 of basic arrangement 2.

FIG. 49 shows an example of the arrangement of transmission antennas 106 and reception antennas 202 in the case where $N_{TxGroup}=4$, $N_{TxGroup\_ANT}=4$, $N_{RxGroup}=4$, and $N_{RxGroup\_ANT}=4$ and the horizontal positions of the antennas included in each reception antenna group are arranged so as to be shifted by $D_H$ and an example of the arrangement of a virtual reception array. In FIG. 49, in the expression 13, $D_{TxGroupV2}=5D_H$, and, in the expression 14, $D_{TxAntH}=5D_H$.

In FIG. 49, in the reception array antenna, the reception antennas (for example, Rx3, Rx #7, Rx #11, and Rx #15) included in the second reception antenna group are arranged so as to be shifted by $D_H$ to the left-hand side with respect to the reception antennas (for example, Rx #4, Rx #8, Rx #12, and Rx #16) included in the first reception antenna group. In FIG. 49, the reception antennas (for example, Rx2, Rx #6, Rx #10, and Rx #14) included in the third reception antenna group are arranged so as to be shifted by $D_H$ to the right-hand side with respect to the reception antennas included in the second reception antenna group. In FIG. 49, the reception antennas (for example, Rx1, Rx #5, Rx #9, and Rx #13) included in the fourth reception antenna group are arranged so as to be shifted by $D_H$ to the left-hand side with respect to the reception antennas included in the third reception antenna group.

Figure 50A:
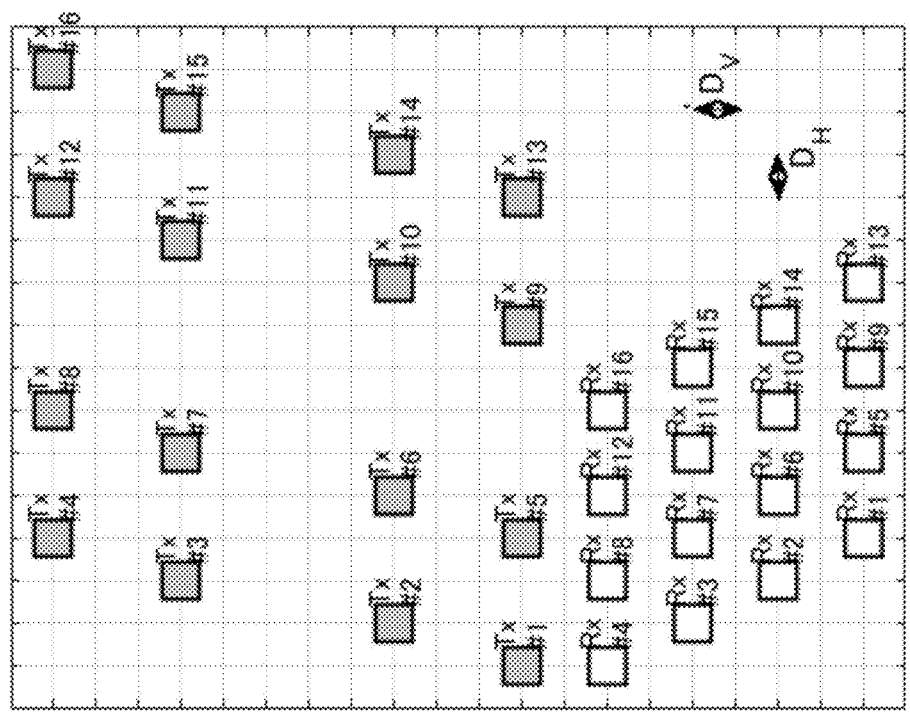
FIG. 50A is a diagram showing an example of an antenna arrangement that is a combination of Modification 3 and Modification 2 of basic arrangement 2.
Figure 50B:
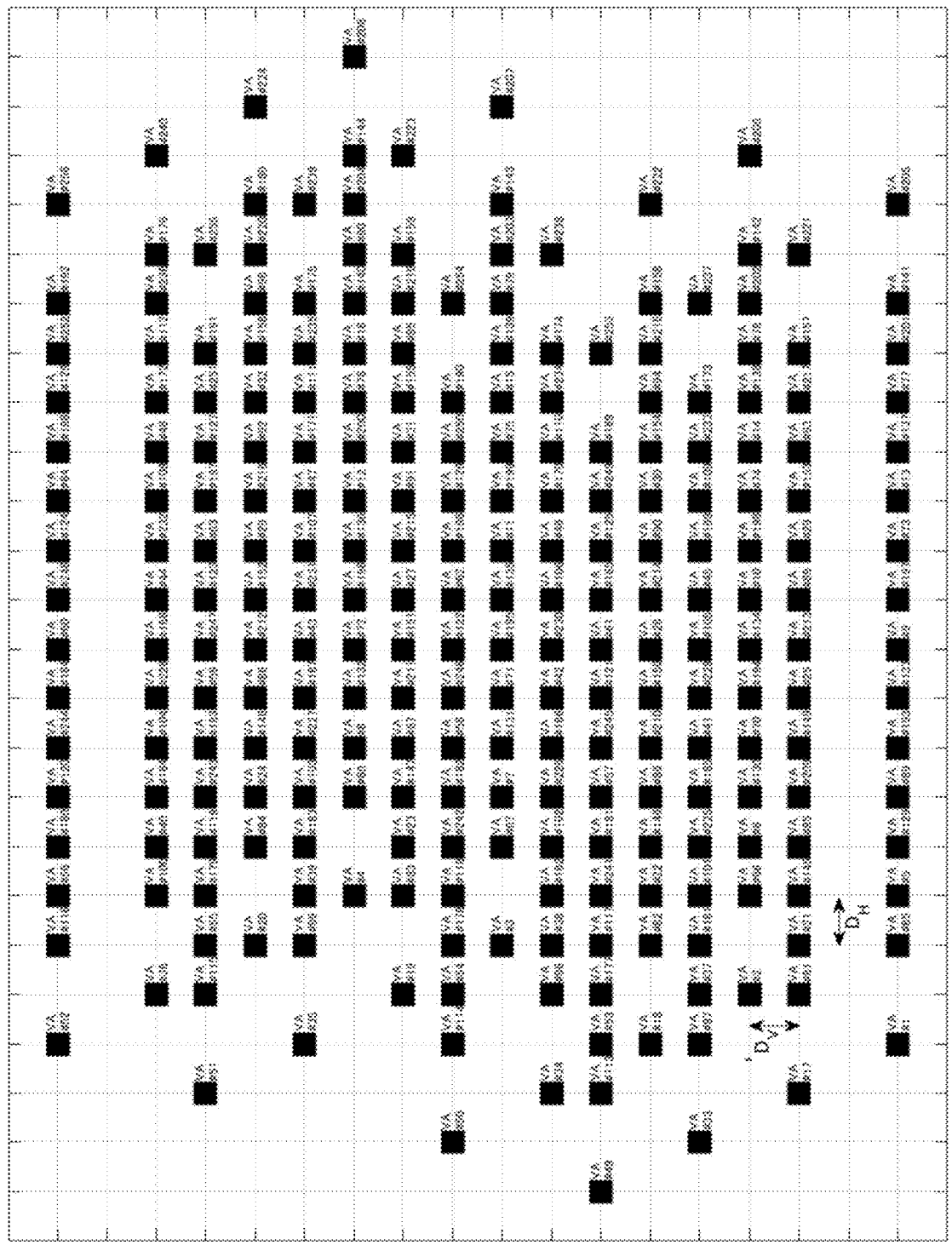
FIG. 50B is a diagram showing an example of an antenna arrangement that is a combination of Modification 3 and Modification 2 of basic arrangement 2.

FIG. 50A shows an example of the arrangement of transmission antennas 106 and reception antennas 202 in the case where $N_{TxGroup}=4$, $N_{TxGroup\_ANT}=4$, $N_{RxGroup}=4$, and $N_{RxGroup\_ANT}=4$ and the horizontal positions of the antennas included in each transmission antenna group and each reception antenna group are arranged so as to be shifted by $D_H$, and FIG. 50B shows an example of the arrangement of a virtual reception array. In FIG. 50A, in the expression 13, $D_{TxGroupV2}=5D_H$, and, in the expression 14, $D_{TxAntH}=5D_H$.

In FIG. 50A, in the transmission array antenna, the transmission antennas (for example, Tx3, Tx #7, Tx #11, and Tx #15) included in the second transmission antenna group are arranged so as to be shifted by $D_H$ to the left-hand side with respect to the transmission antennas (for example, Tx #4, Tx #8, Tx #12, and Tx #16) included in the first transmission antenna group. In FIG. 50A, the transmission antennas (for example, Tx2, Tx #6, Tx #10, and Tx #14) included in the third transmission antenna group are arranged so as to be shifted by $D_H$ to the left-hand side with respect to the transmission antennas included in the second transmission antenna group. In FIG. 50A, the transmission antennas (for example, Tx1, Tx #5, Tx #9, and Tx #13) included in the fourth transmission antenna group are arranged so as to be shifted by $D_H$ to the left-hand side with respect to the transmission antennas included in the third transmission antenna group.

In FIG. 50A, in the reception array antenna, the reception antennas (for example, Rx #3, Rx #7, Rx #11, and Rx #15) included in the second reception antenna group are arranged so as to be shifted by $D_H$ to the right-hand side with respect to the reception antennas (for example, Rx #4, Rx #8, Rx #12, and Rx #16) included in the first reception antenna group. In FIG. 50A, the reception antennas (for example, Rx #2, Rx #6, Rx #10, and Rx #14) included in the third reception antenna group are arranged so as to be shifted by $D_H$ to the right-hand side with respect to the reception antennas included in the second reception antenna group. In FIG. 50A, the reception antennas (for example, Rx #1, Rx #5, Rx #9, and Rx #13) included in the fourth reception antenna group are arranged so as to be shifted by $D_H$ to the right-hand side with respect to the reception antennas included in the third reception antenna group.

Figure 51A:
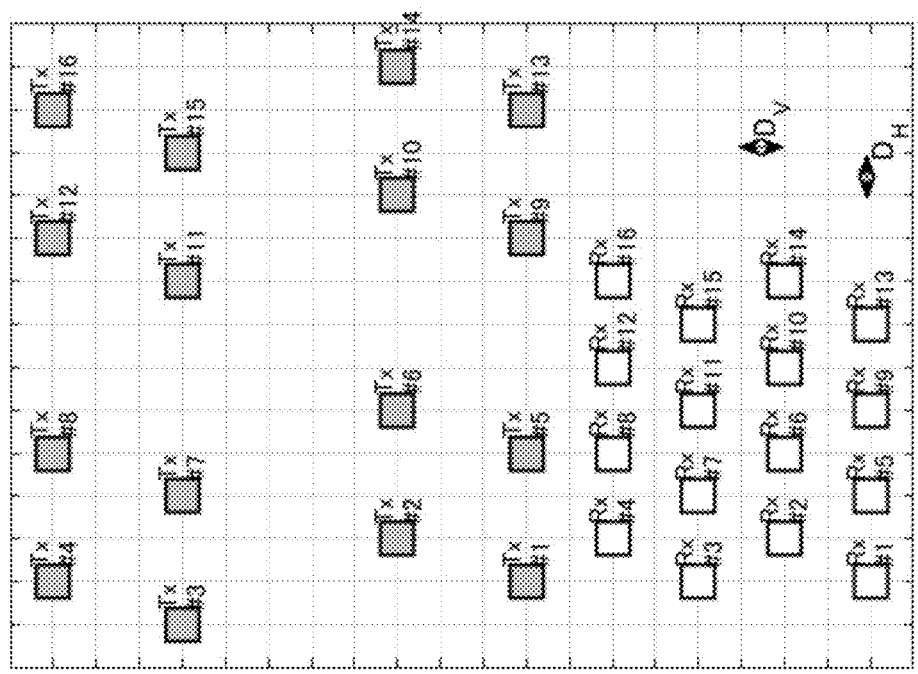
FIG. 51A is a diagram showing an example of an antenna arrangement that is a combination of Modification 3 and Modification 2 of basic arrangement 2.
Figure 51B:
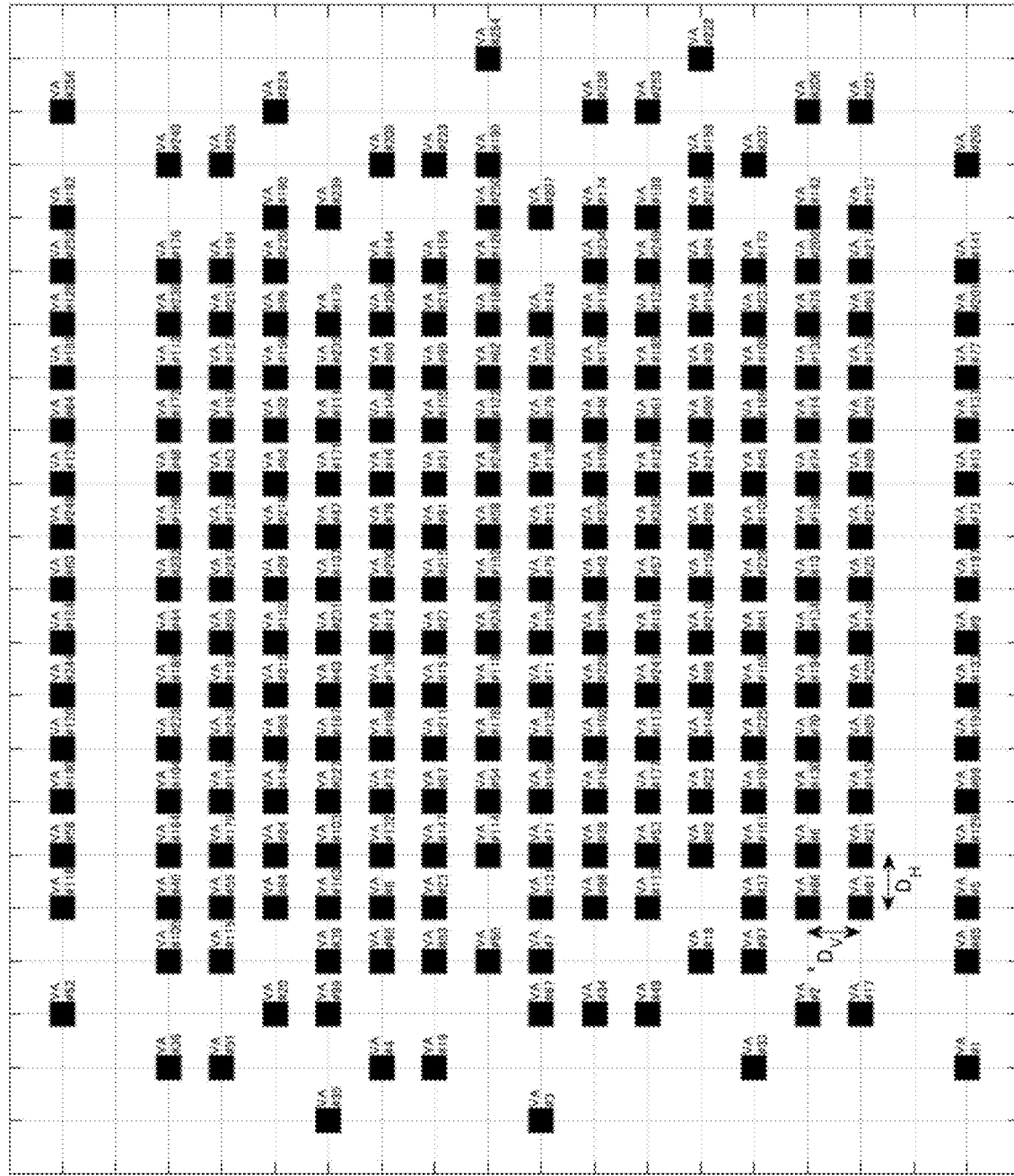
FIG. 51B is a diagram showing an example of an antenna arrangement that is a combination of Modification 3 and Modification 2 of basic arrangement 2.

FIG. 51A shows an example of the arrangement of transmission antennas 106 and reception antennas 202 in the case where $N_{TxGroup}=4$, $N_{TxGroup\_ANT}=4$, $N_{RxGroup}=4$, and $N_{RxGroup\_ANT}=4$ and the horizontal positions of the antennas included in each transmission antenna group and each reception antenna group are arranged so as to be shifted by $D_H$, and FIG. 51B shows an example of the arrangement of a virtual reception array. In FIG. 50A, in the expression 13, $D_{TxGroupV2}=5D_H$, and, in the expression 14, $D_{TxAntH}=5D_H$.

In FIG. 51A, in the transmission array antenna, the transmission antennas (for example, Tx3, Tx #7, Tx #11, and Tx #15) included in the second transmission antenna group are shifted by $D_H$ to the left-hand side with respect to the transmission antennas (for example, Tx #4, Tx #8, Tx #12, and Tx #16) included in the first transmission antenna group. In FIG. 51A, the transmission antennas (for example, Tx2, Tx #6, Tx #10, and Tx #14) included in the third transmission antenna group are arranged so as to be shifted by $D_H$ to the right-hand side with respect to the transmission antennas included in the first transmission antenna group. In FIG. 51A, the transmission antennas (for example, Tx1, Tx #5, Tx #9, and Tx #13) included in the fourth transmission antenna group are arranged so as to be shifted by $D_H$ to the left-hand side with respect to the transmission antennas included in the third transmission antenna group.

In FIG. 51A, in the reception array antenna, the reception antennas (for example, Rx #3, Rx #7, Rx #11, and Rx #15) included in the second reception antenna group are arranged so as to be shifted by $D_H$ to the left-hand side with respect to the reception antennas (for example, Rx #4, Rx #8, Rx #12, and Rx #16) included in the first reception antenna group. In FIG. 51A, the reception antennas (for example, Rx #2, Rx #6, Rx #10, and Rx #14) included in the third reception antenna group are arranged so as to be shifted by $D_H$ to the right-hand side with respect to the reception antennas included in the second reception antenna group. In FIG. 51A, the reception antennas (for example, Rx #1, Rx #5, Rx #9, and Rx #13) included in the fourth reception antenna group are arranged so as to be shifted by $D_H$ to the left-hand side with respect to the reception antennas included in the third reception antenna group.

For example, in each of the MIMO array arrangements respectively shown in FIGS. 48, 49, 50A and 51A, when $D_H$ and $D_V$ are set to about 0.5λ, the horizontal and vertical element sizes of each transmission antenna 106 and each reception antenna 202 can be designed to a size greater than or equal to 1λ.

For example, in each of the virtual reception arrays respectively shown in FIGS. 48, 49, 50B, and 51B, the virtual array elements are arranged at different positions without any overlap, so the aperture length of the virtual reception array is expanded, and angular resolution is improved.

When the number $N_{TxGroup}$ of transmission antenna groups is greater than or equal to three, the horizontal positions of the transmission antennas included in each transmission antenna group may be arranged so as to be shifted in a certain direction (to the right-hand side or to the left-hand side), and the direction to shift the horizontal positions of the transmission antennas included in each transmission antenna group to the right-hand side or to the left-hand side may be changed for each transmission antenna group. Similarly, when the number $N_{RxGroup}$ of reception antenna groups is greater than or equal to three, the horizontal positions of the reception antennas included in each reception antenna group may be arranged so as to be shifted in a certain direction (to the right-hand side or to the left-hand side), and the direction to shift the horizontal positions of the reception antennas included in each reception antenna group to the right-hand side or to the left-hand side may be changed for each reception antenna group.

Even with any antenna arrangement, the virtual array elements positioned around the center of the virtual reception array are densely arranged at a spacing of $D_H$ and a spacing of $D_V$. The number of virtual array elements densely arranged at a spacing of $D_H$ and a spacing of $D_V$, for example, increases depending on $N_{TxGroup}$, $N_{TxGroup\_ANT}$, $N_{RxGroup}$, and $N_{RxGroup\_ANT}$.

For example, $((N_{TxGroup\_ANT} \times N_{RxGroup\_ANT})-2)$ virtual array elements are arranged at a spacing of $D_H$ in the horizontal direction, and $((N_{RxGroup} \times N_{TxGroup})-2)$ virtual array elements are arranged at a spacing of $D_V$ in the vertical direction. As the virtual array elements densely arranged at a spacing of $D_H$ and a spacing of $D_V$ around the center of the virtual reception array increases, the effect of reducing grating lobes and side lobes is improved.

As $N_{TxGroup\_ANT}$ and/or $N_{RxGroup\_ANT}$ increases, the number of virtual array elements arranged in the horizontal direction increases, so the horizontal aperture length of the virtual reception array is expanded, and horizontal angular resolution is improved. Similarly, as $N_{TxGroup}$ and/or $N_{RxGroup}$ increases, the number of virtual array elements arranged in the vertical direction increases, so the vertical aperture length of the virtual reception array is expanded, and vertical angular resolution is improved.

Basic Arrangement 3

FIG. 52A to 52D show examples of the arrangement of transmission antennas 106 and reception antennas 202 and examples of the arrangement of a virtual reception array according to basic arrangement 3.

(1) Arrangement of Transmission-Reception Antenna

In each of FIGS. 52A to 52D, the number Nt of transmission antennas 106 in the transmission array antenna is four (Tx #1, Tx #2, Tx #3, and Tx #4), and the number Na of reception antennas 202 in the reception array antenna is four (Rx #1, Rx #2, Rx #3, and Rx #4).

The transmission array antennas respectively shown in FIGS. 52A to 52D each are made up of a first transmission antenna group (Tx #2 and Tx #4 in each of FIGS. 52A to 52D) and a second transmission antenna group (Tx #1 and Tx #3 in each of FIGS. 52A to 52D). Each transmission antenna group includes two transmission antenna elements of which the positions are the same in the vertical direction and the antenna spacing in the horizontal direction (the cross direction in each of FIGS. 52A to 52D) is $2D_H$. The spacing in the vertical direction (the longitudinal direction in each of FIGS. 52A to 52D) between the first transmission antenna group and the second transmission antenna group is, for example, $2D_V$.

In each of FIGS. 52A to 52D, the horizontal positions of the transmission antennas included in the first transmission antenna group and the horizontal positions of the transmission antennas included in the second transmission antenna group are positions different from each other and shifted by D. For example, the horizontal positions of the transmission antennas included in the second transmission antenna group are arranged so as to be shifted by $+D_H$ or by $-D_H$ from the horizontal positions of the transmission antennas included in the first transmission antenna group.

The reception array antenna shown in each of FIGS. 52A to 52D is made up of a first reception antenna group (Rx #1 and Rx #2 in each of FIGS. 52A to 52D) and a second reception antenna group (Rx #3 and Rx #4 in each of FIGS. 52A to 52D). Each reception antenna group includes two reception antenna elements of which the positions are the same in the horizontal direction and the vertical antenna spacing is $2D_V$. The horizontal spacing between the first reception antenna group and the second reception antenna group is, for example, $2D_H$.

In each of FIGS. 52A to 52D, the vertical positions of the reception antennas included in the first reception antenna group and the vertical positions of the reception antennas included in the second reception antenna group are positions different from each other and shifted by $D_V$. For example, the vertical positions of the reception antennas included in the second reception antenna group are arranged so as to be shifted by $+D_V$ or by $-D_V$ from the vertical positions of the reception antennas included in the first reception antenna group.

Figure 52A:
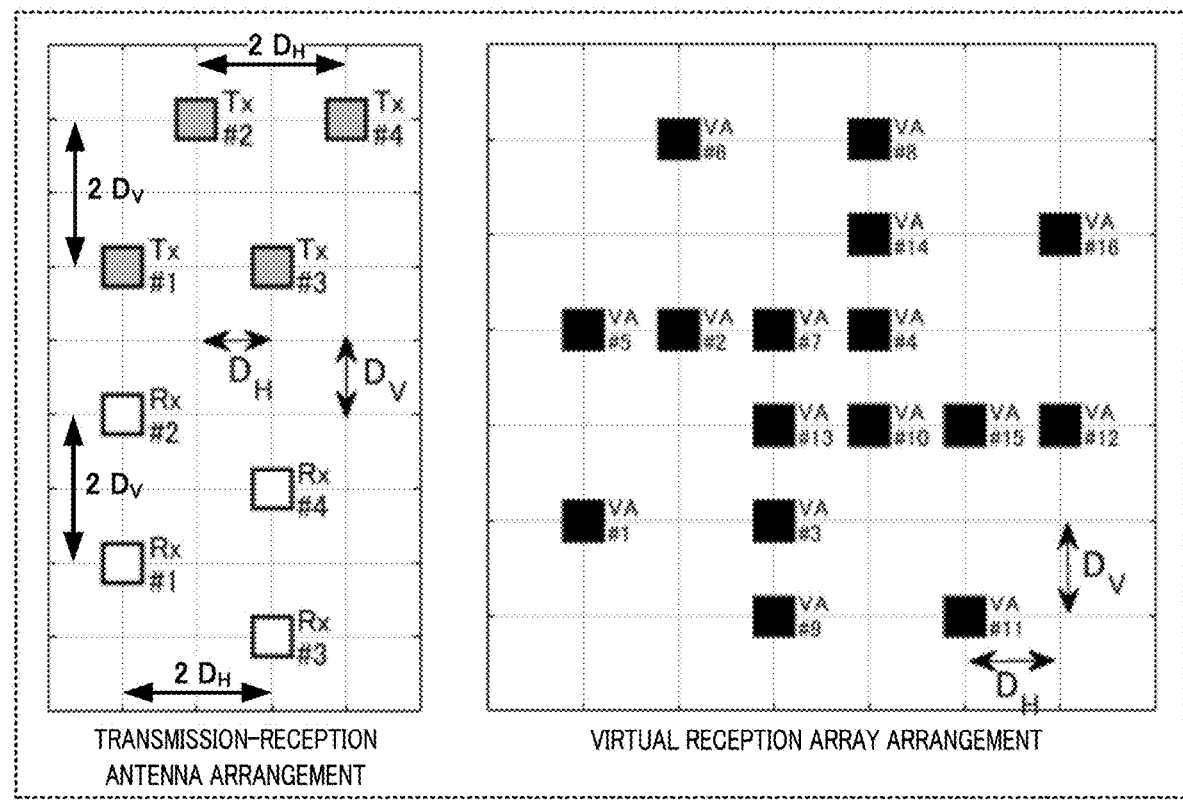
FIG. 52A is a diagram showing an example of an antenna arrangement according to basic arrangement 3.
Figure 52B:
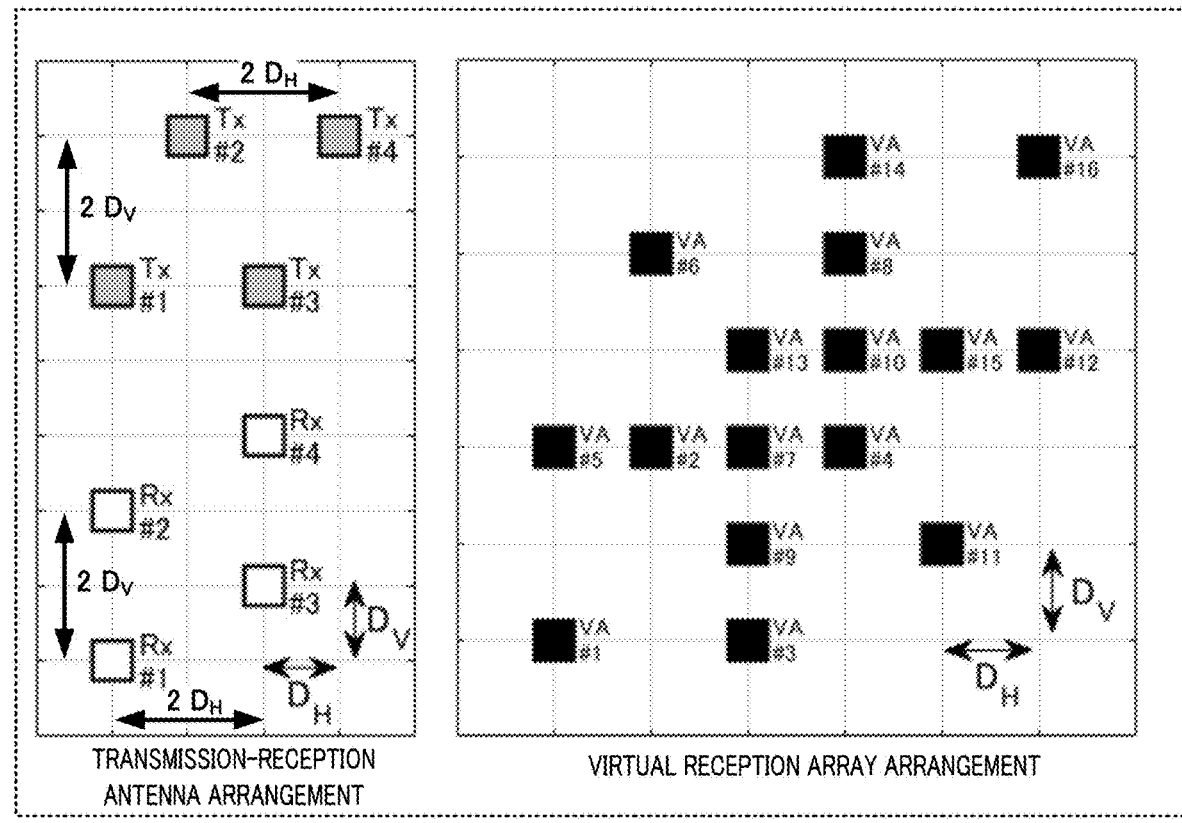
FIG. 52B is a diagram showing an example of an antenna arrangement according to basic arrangement 3.
Figure 52C:
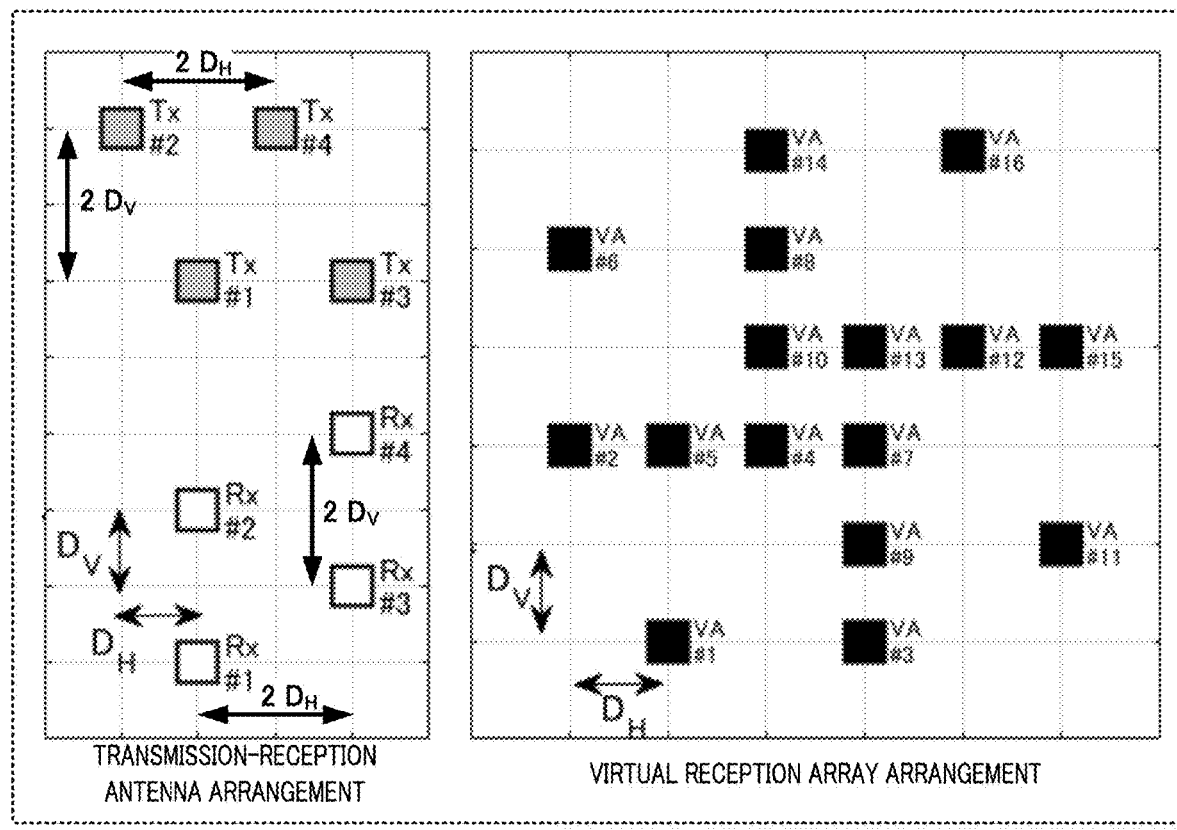
FIG. 52C is a diagram showing an example of an antenna arrangement according to basic arrangement 3.

For example, in the transmission-reception antenna arrangement shown in each of FIGS. 52A and 52C, the arrangement positions of the transmission antennas included in the transmission array antenna and the arrangement positions of the reception antennas included in the reception array antenna are, for example, in a relationship rotated by +90° or −90° in a two-dimensional plane composed of the horizontal direction and the vertical direction.

Figure 52D:
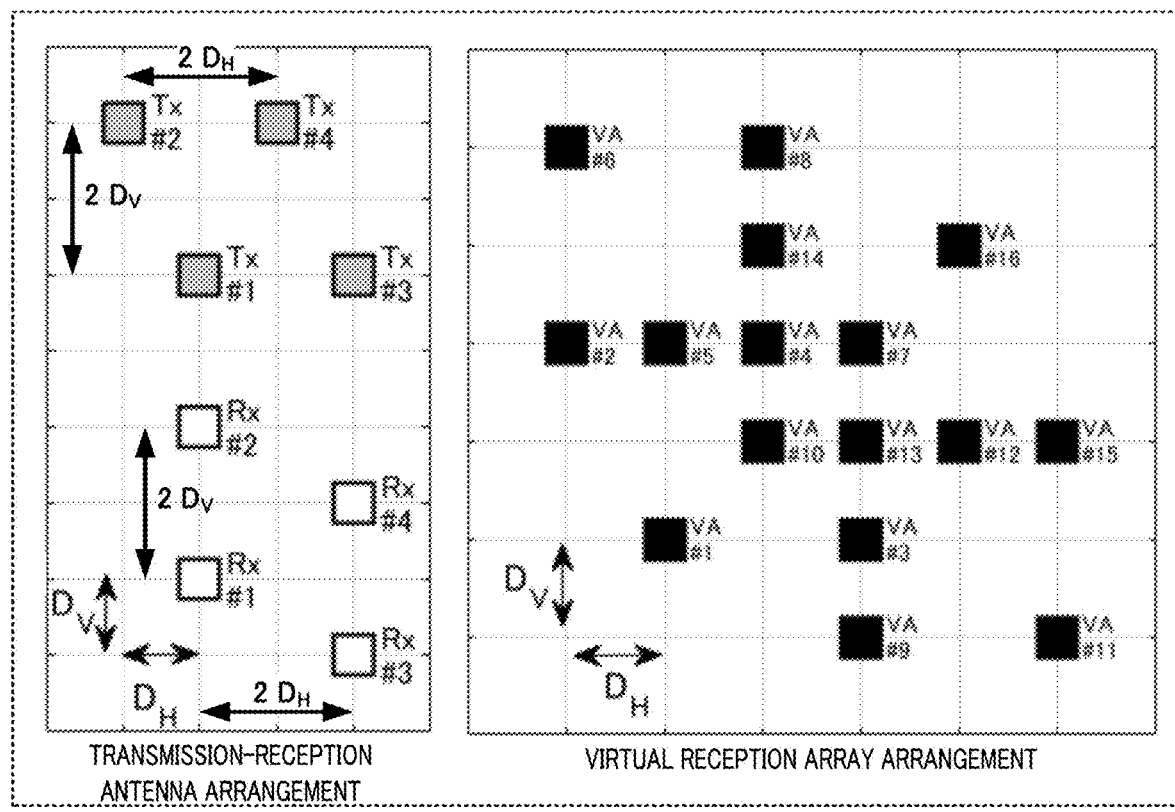
FIG. 52D is a diagram showing an example of an antenna arrangement according to basic arrangement 3.

In the transmission-reception antenna arrangement shown in each of FIGS. 52B and 52D, the arrangement positions of the transmission antennas included in the transmission array antenna and the arrangement positions of the reception antennas included in the reception array antenna are, for example, in a relationship rotated by +90° or −90° and inverted in a two-dimensional plane composed of the horizontal direction and the vertical direction.

Any combination of one of two types ($+D_H$, $-D_H$) of the horizontal shift amount $\Delta H_{Tx}$ of the second transmission antenna group with respect to the first transmission antenna group and one of two types ($+D_V$, $-D_V$) of the vertical shift amount $\Delta V_{Rx}$ of the second reception antenna group with respect to the first reception antenna group may be applied. Here, for example, in each of FIGS. 52A to 52D, $+D_H$ direction is the right-hand side, and $-D_H$ is the left-hand side. In each of FIGS. 52A to 52D, $+D_V$ direction is the upper side, and $-D_V$ is the lower side.

For example, any one of four-type combination configurations ($\Delta H_{Tx}$, $\Delta V_{Rx}$)=($+D_H$, $+D_V$), ($+D_H$, $-D_V$), ($-D_H$, $+D_V$), ($D_H$, $-D_V$). For example, FIGS. 52A to 52D each show a MIMO array arrangement and the arrangement of a virtual reception array in the case where ($\Delta H_{Tx}$, $\Delta V_{Rx}$)=($-D_H$, $-D_V$), ($-D_H$, $+D_V$), ($+D_H$, $+D_V$), or ($+D_H$, $-D_V$).

Virtual reception array arrangements respectively obtained from MIMO array arrangements in the case of antenna group shift amounts respectively shown in FIGS. 52A to 52D are rotation symmetrical arrangements and provide characteristics of similar angle measurement performance.

For example, it is assumed that the horizontal direction (cross direction) shown in FIG. 52A corresponds to X-axis, and the vertical direction (longitudinal direction) shown in FIG. 52A corresponds to Y-axis direction.

For example, in the case of the antenna arrangement shown in FIG. 52A, the position coordinates of each of transmission antennas 106 that make up the transmission array antenna are expressed as the position coordinates $(X_{T\_\#2}, Y_{T\_\#2})=(X_{T\_\#1}+D_H, Y_{T\_\#1}+2D_V)$ of transmission antenna Tx #2, the position coordinates $(X_{T\_\#3}, Y_{T\_\#3})=(X_{T\_\#1}+2D_H, Y_{T\_\#1})$ of transmission antenna Tx #3, and the position coordinates $(X_{T\_\#4}, Y_{T\_\#4})=(X_{T\_\#1}+3D_H, Y_{T\_\#1}+2D_V)$ of transmission antenna Tx #4 with reference to the position coordinates $(X_{T\_\#1}, Y_{T\_\#1})$ of transmission antenna Tx #1.

Similarly, the position coordinates of each of reception antennas 202 that make up the reception array antenna are expressed as the position coordinates $(X_{R\_\#2}, Y_{R\_\#2})=(X_{R\_\#1}, Y_{R\_\#1}+2D_V)$ of reception antenna Rx #2, the position coordinates $(X_{R\_\#3}, Y_{R\_\#3})=(X_{R\_\#1}+2D_H, Y_{R\_\#1}-D_V)$ of reception antenna Rx #3, and the position coordinates $(X_{R\_\#4}, Y_{R\_\#4})=(X_{R\_\#1}+2D_H, Y_{R\_\#1}+D_V)$ of reception antenna Rx #4 with reference to the position coordinates $(X_{R\_\#1}, Y_{R\_\#1})$ of reception antenna Rx #1.

(2) Arrangement of Virtual Reception Array

The arrangement of the virtual reception array (virtual antennas VA #1 to VA #16), provided in accordance with each of the above-described transmission-reception antenna arrangements respectively shown in FIGS. 52A to 52D, has the following features.

With the arrangement of the transmission array antenna and the arrangement of the reception array antenna, shown in FIG. 52A, each set of the position coordinates $(X_{V\_\#1},$ $Y_{V\_\#1}$) to ($X_{V\_\#16}$, $Y_{V\_\#16}$) of virtual reception array VA #1 to VA #16 is as follows. Here, VA #1 is expressed as the position reference (0, 0) of the virtual reception array.
(0, 0), ($D_H$, $2D_V$), ($2D_H$, 0), ($3D_H$, $2D_V$), (0, $2D_V$), ($D_H$, $4D_V$), ($2D_H$, $2D_V$), ($3D_H$, 4v), ($2D_H$, $-D_V$), ($3D_H$, $D_V$), ($4D_H$, $-D_V$), ($5D_H$, $D_V$), ($2D_H$, $D_V$), ($3D_H$, $3D_V$), ($4D_H$, $D_V$), and ($5D_H$, $3D_V$)

In this way, in the arrangements of the virtual reception arrays respectively shown in FIGS. 52A to 52D, the virtual reception array elements are arranged at different positions without any overlap. For this reason, the aperture length of each of the virtual reception arrays is expanded, so the main lobe narrows, and angular resolution is improved.

Virtual array elements VA #4, VA #7, VA #10, and VA #13 positioned around the center of the virtual reception array shown in each of FIGS. 52A to 52D are densely arranged at a spacing of $D_H$ in the horizontal direction and a spacing of $D_V$ in the vertical direction. For example, in each of FIGS. 52A to 52D, when the spacing $D_H$ and the spacing $D_V$ are set to about 0.5λ, the virtual array elements positioned around the center of the virtual reception array are arranged at a spacing of $D_H$=0.5λ in the horizontal direction and a spacing of $D_V$=0.5λ in the vertical direction. With this configuration, as in the case of basic arrangement 1 (see, for example, FIG. 8), grating lobes are reduced.

For example, in the MIMO array arrangement shown in each of FIGS. 52A to 52D, when the spacing $D_H$ and the spacing $D_V$ are set to about 0.5λ, the horizontal and vertical element sizes of each transmission antenna 106 and each reception antenna 202 can be designed to a size greater than or equal to 1λ.

With this configuration, for example, an antenna using four elements that are planar patch antennas arranged in a two by two matrix as a sub-array (where the antenna width $W_{ANT}$<$2D_H$, and the antenna height $H_{ANT}$<$2D_V$) as shown in FIG. 9A is applicable to each antenna of at least one of the transmission array antenna and the reception array antenna shown in each of FIGS. 52A to 52D.

The number (hereinafter, referred to as $N_{TxHGroup1\_ANT}$) of transmission antennas included in the first transmission antenna group and the number (hereinafter, referred to as $N_{TxHGroup2\_ANT}$) of transmission antennas included in the second transmission antenna group may be equal to each other or different by one antenna. For example, it is defined that $|N_{TxHGroup1\_ANT}-N_{TxHGroup2\_ANT}|$=0 or 1.

The number (hereinafter, referred to as $N_{RxVGroup1\_ANT}$) of reception antennas included in the first reception antenna group and the number (hereinafter, referred to as $N_{RxVGroup2\_ANT}$) of reception antennas included in the second reception antenna group may be equal to each other or different by one antenna. For example, it is defined that $|N_{RxVGroup1\_ANT}-N_{RxVGroup2\_ANT}|$=0 or 1.

FIGS. 53A to 53D each show an example of the configuration in which the number of MIMO array antennas is minimum in the case where there is one antenna difference between the number $N_{TxHGroup1\_ANT}$ of transmission antennas included in the first transmission antenna group and the number $N_{TxHGroup2\_ANT}$ of transmission antennas included in the second transmission antenna group and the number $N_{RxVGroup1\_ANT}$ of reception antennas included in the first reception antenna group and the number $N_{RxVGroup2\_ANT}$ of reception antennas included in the second reception antenna group are equal to each other.

As shown in FIGS. 53A to 53D, the configuration in which the number of MIMO array antennas is minimum in the case where $|N_{TxHGroup1\_ANT}-N_{TxHGroup2\_ANT}|$=1 and $|N_{RxVGroup1\_ANT}-N_{RxVGroup2\_ANT}|$=0 is a configuration in which the number of transmission antennas is three and the number of reception antennas is four ($N_{RxVGroup1\_ANT}$=$N_{RxVGroup2\_ANT}$=2), and there are, for example, four patterns of FIGS. 53A to 53D.

Figure 53A:
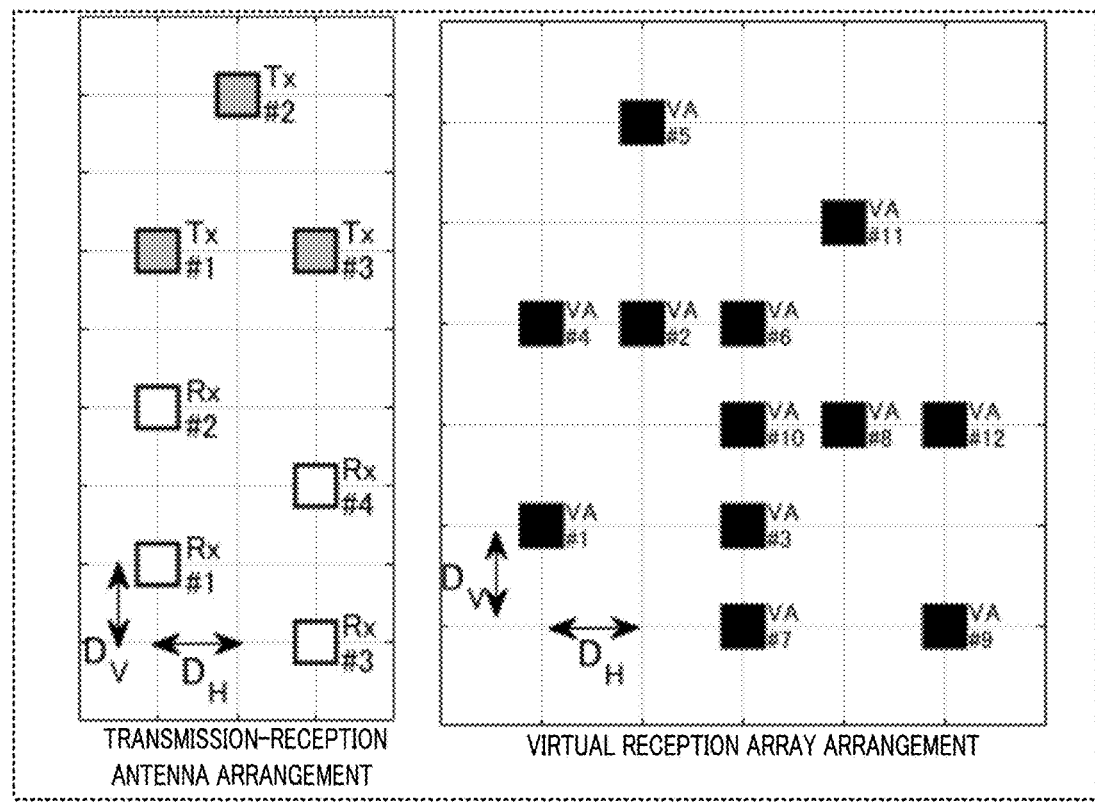
FIG. 53A is a diagram showing an example of an antenna arrangement according to basic arrangement 3.

FIG. 53A shows an example of a MIMO array arrangement in the case where $N_{TxHGroup1\_ANT}$=1 (Tx #2), $N_{TxHGroup2\_ANT}$=2 (Tx #1 and Tx #3), and ($\Delta H_{Tx}$, $\Delta V_{Rx}$)=($-D_H$, $-D_V$) and an example of the arrangement of a virtual reception array.

Figure 53B:
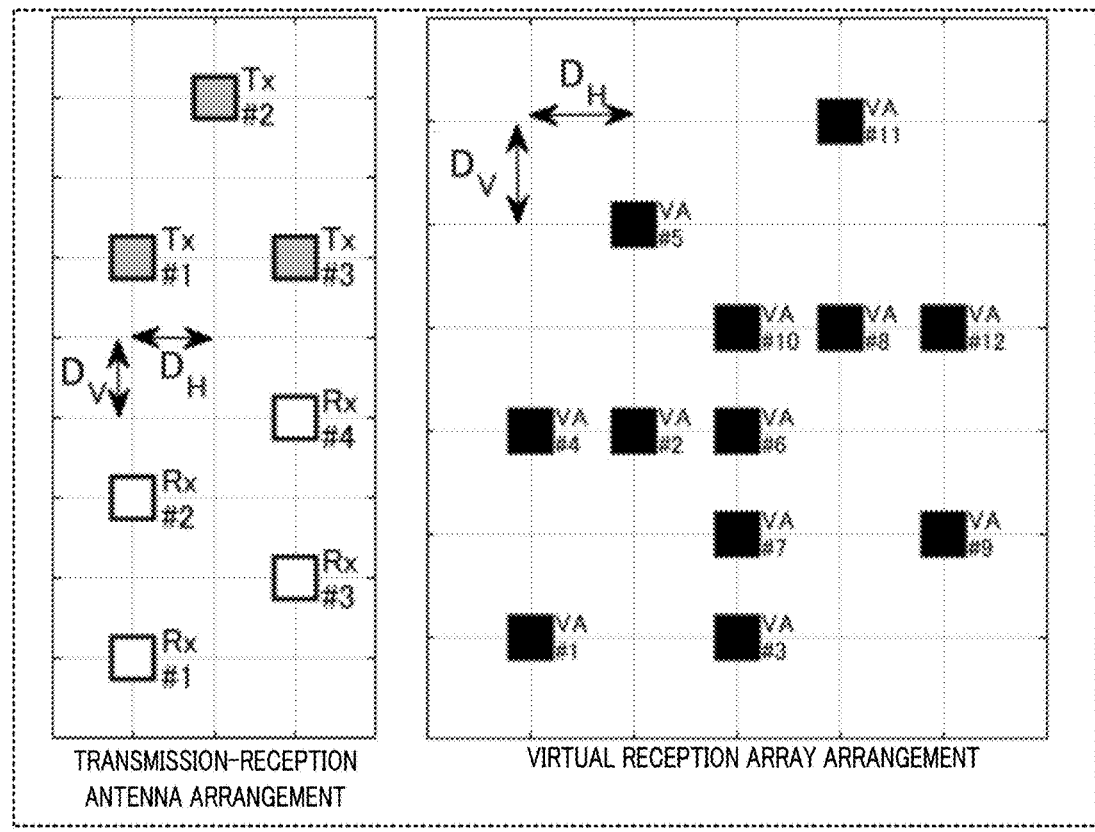
FIG. 53B is a diagram showing an example of an antenna arrangement according to basic arrangement 3.

FIG. 53B shows an example of a MIMO array arrangement in the case where $N_{TxHGroup1\_ANT}$=1 (Tx #2), $N_{TxHGroup2\_ANT}$=2 (Tx #1 and Tx #3), and ($\Delta H_{Tx}$, $\Delta V_{Rx}$)=($-D_H$, $+D_V$) and an example of the arrangement of a virtual reception array.

Figure 53C:
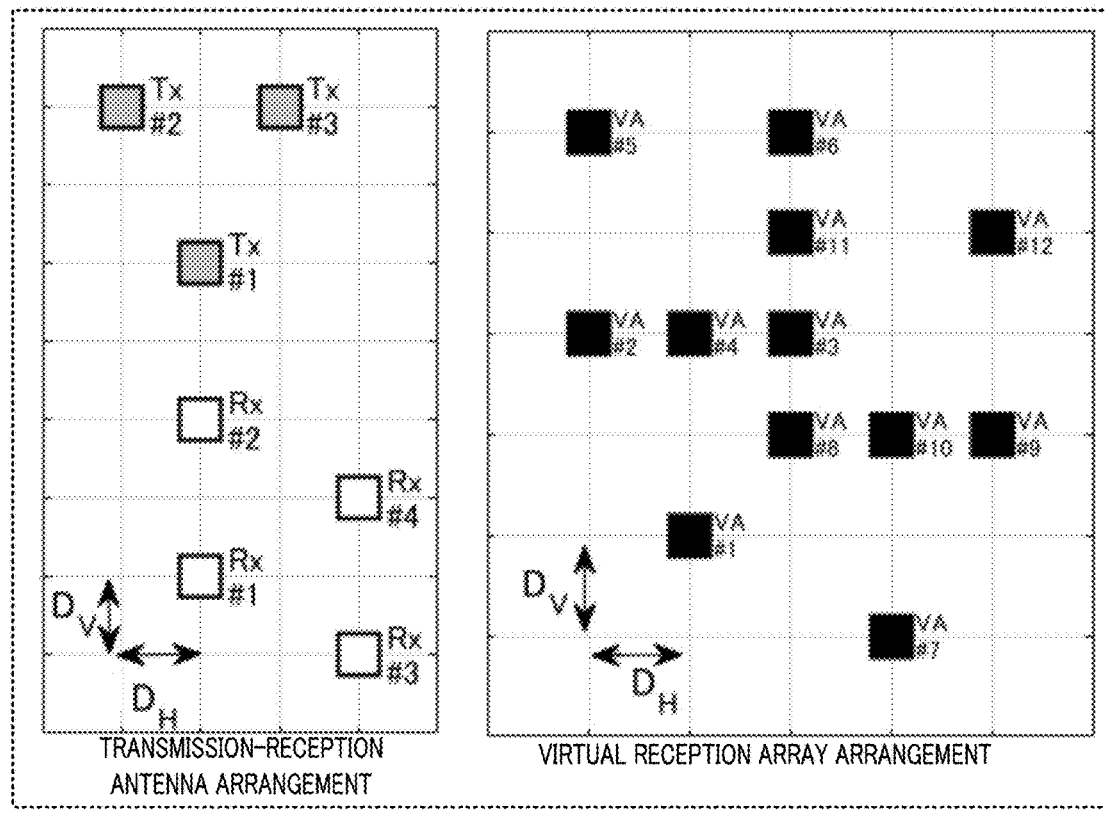
FIG. 53C is a diagram showing an example of an antenna arrangement according to basic arrangement 3.

FIG. 53C shows an example of a MIMO array arrangement in the case where $N_{TxHGroup1\_ANT}$=2 (Tx #2 and Tx #3), $N_{TxHGroup2\_ANT}$=1 (Tx #1), and ($\Delta H_{Tx}$, $\Delta V_{Rx}$)=($D_H$, $-D_V$) and an example of the arrangement of a virtual reception array.

Figure 53D:
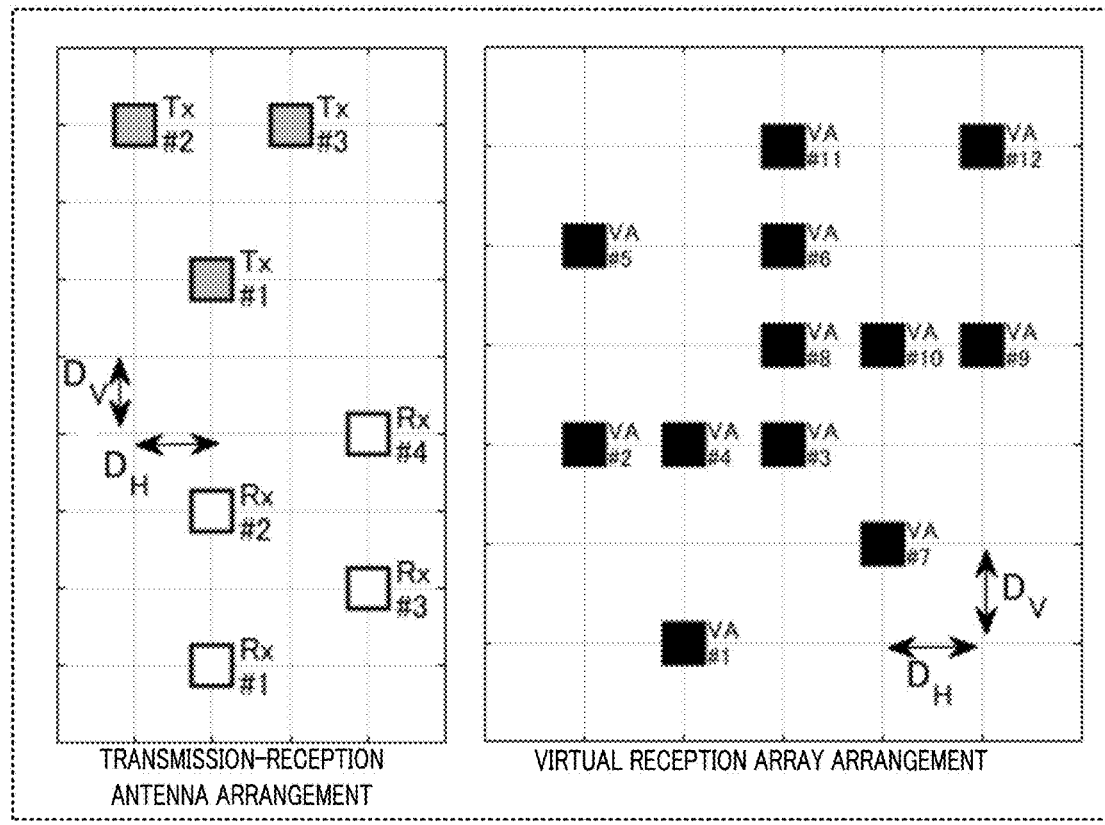
FIG. 53D is a diagram showing an example of an antenna arrangement according to basic arrangement 3.

FIG. 53D shows an example of a MIMO array arrangement in the case where $N_{TxHGroup1\_ANT}$=2 (Tx #2 and Tx #3), $N_{TxHGroup2\_ANT}$=1 (Tx #1), and ($\Delta H_{Tx}$, $\Delta V_{Rx}$)=($+D_H$, $+D_V$) and an example of the arrangement of a virtual reception array.

FIGS. 54A to 54D each show an example of the configuration in which the number of MIMO array antennas is minimum in the case where the number $N_{TxHGroup1\_ANT}$ of transmission antennas included in the first transmission antenna group and the number $N_{TxHGroup2\_ANT}$ of transmission antennas included in the second transmission antenna group are equal to each other and there is one antenna difference between the number $N_{RxVGroup1\_ANT}$ of reception antennas included in the first reception antenna group and the number $N_{RxVGroup2\_ANT}$ of reception antennas included in the second reception antenna group.

As shown in FIGS. 54A to 54D, the configuration in which the number of MIMO array antennas is minimum in the case where $|N_{TxHGroup1\_ANT}-N_{TxHGroup2\_ANT}|$=0 and $|N_{RxVGroup1\_ANT}-N_{RxVGroup2\_ANT}|$=1 is a configuration in which the number of transmission antennas is four ($N_{TxVGroup1\_ANT}$=$N_{TxVGroup2\_ANT}$=2) and the number of reception antennas is three, and there are, for example, four patterns of FIGS. 54A to 54D.

Figure 54A:
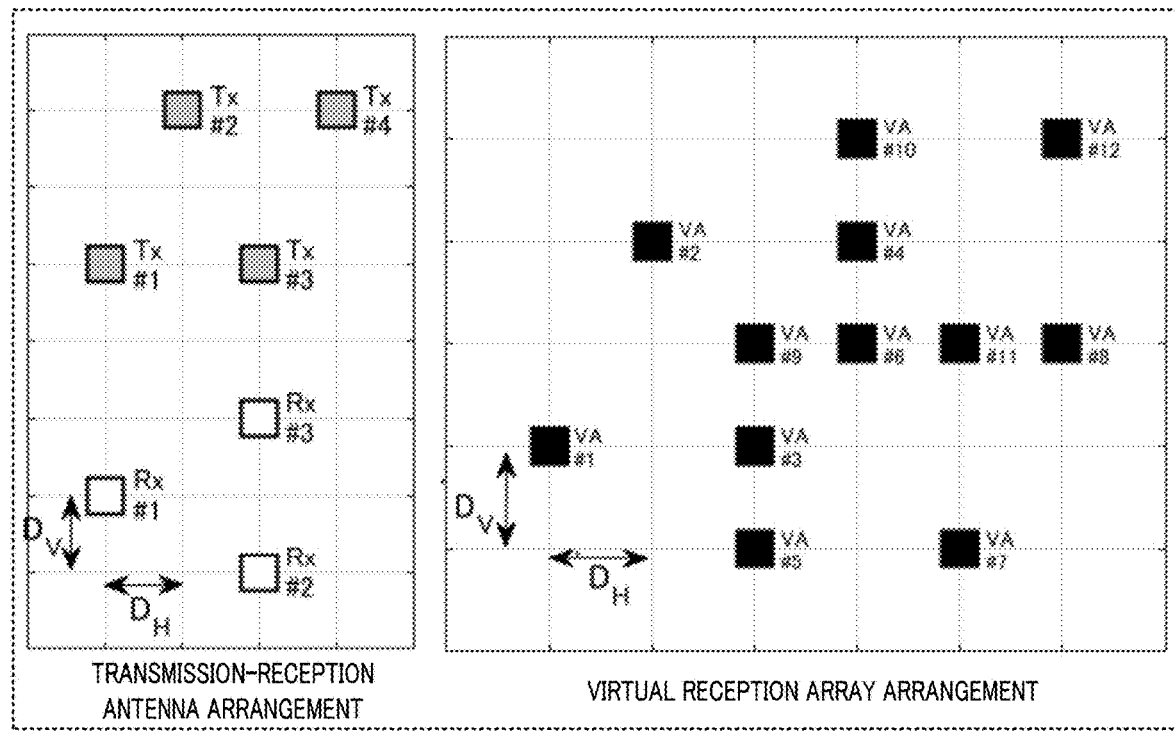
FIG. 54A is a diagram showing an example of an antenna arrangement according to basic arrangement 3.

FIG. 54A shows an example of a MIMO array arrangement in the case where $N_{RxHGroup1\_ANT}$=1 (Rx #1), $N_{RxHGroup2\_ANT}$=2 (Rx #2 and Rx #3), and ($\Delta H_{Tx}$, $\Delta V_{Rx}$)=($-D_H$, $+D_V$) and an example of the arrangement of a virtual reception array.

Figure 54B:
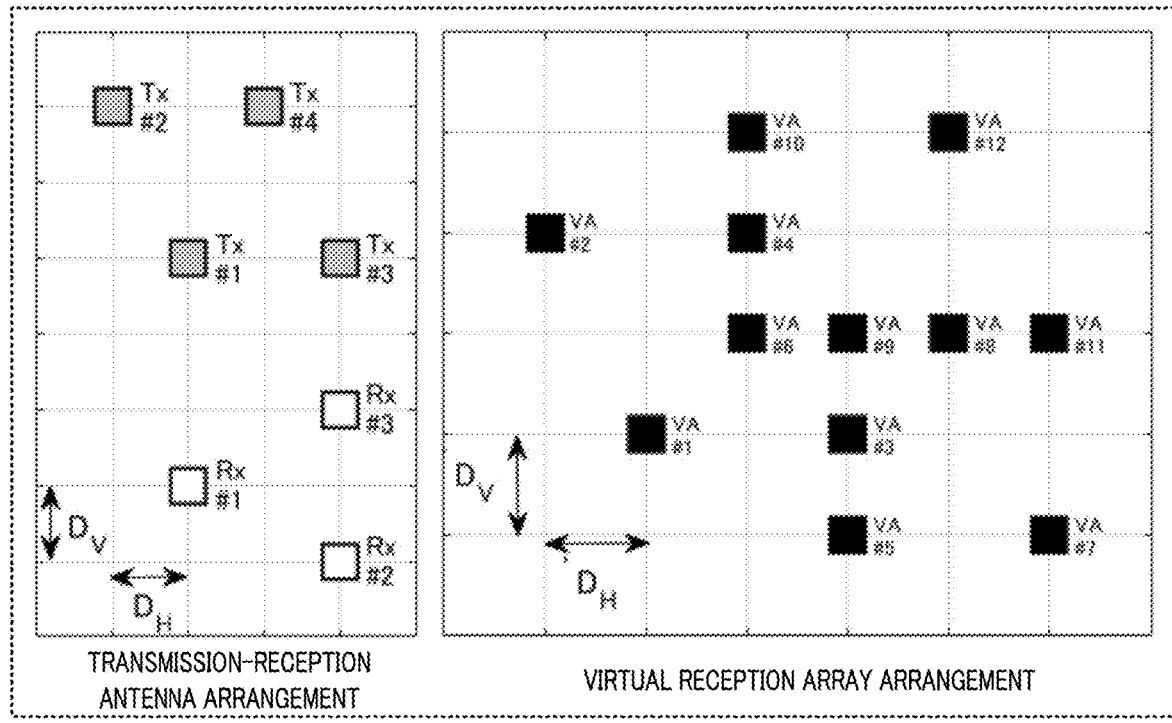
FIG. 54B is a diagram showing an example of an antenna arrangement according to basic arrangement 3.

FIG. 54B shows an example of a MIMO array arrangement in the case where $N_{RxHGroup1\_ANT}$=1 (Rx #1), $N_{RxHGroup2\_ANT}$=2 (Rx #2 and Rx #3), and ($\Delta H_{Tx}$, $\Delta V_{Rx}$)=($+D_H$, $+D_V$) and an example of the arrangement of a virtual reception array.

Figure 54C:
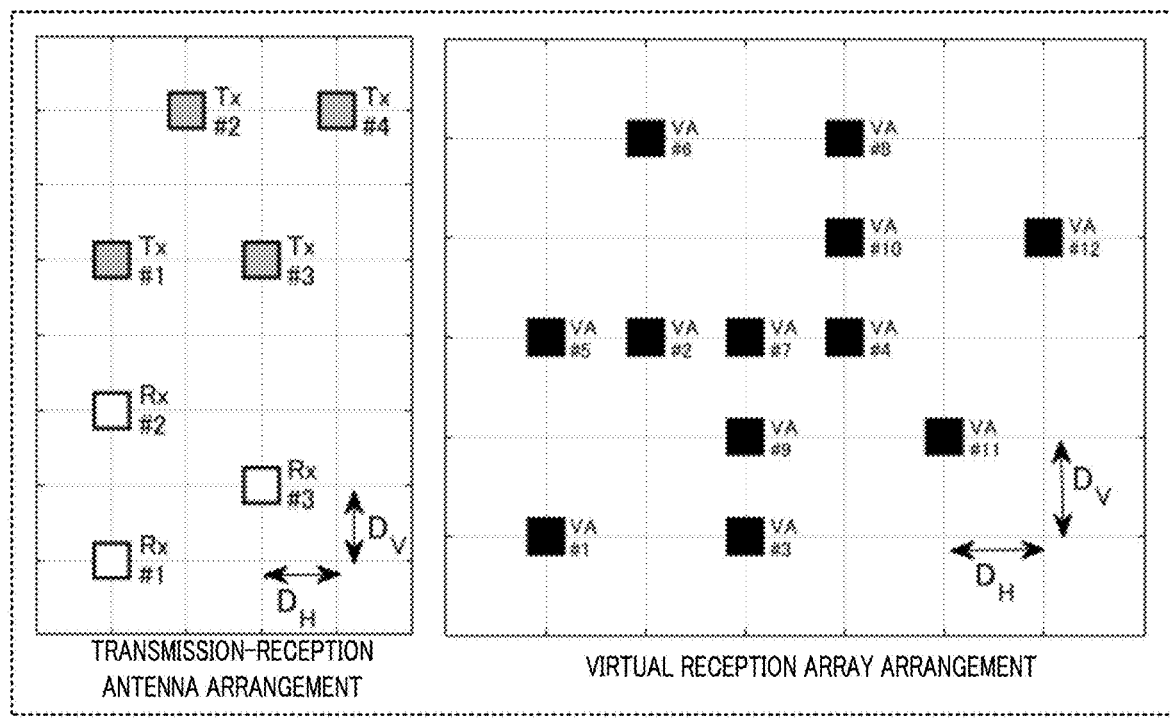
FIG. 54C is a diagram showing an example of an antenna arrangement according to basic arrangement 3.

FIG. 54C shows an example of a MIMO array arrangement in the case where $N_{RxHGroup1\_ANT}$=2 (Rx #1 and Rx #2), $N_{RxHGroup2\_ANT}$=1 (Rx #3), and ($\Delta H_{Tx}$, $\Delta V_{Rx}$)=($-D_H$, $-D_V$) and an example of the arrangement of a virtual reception array.

Figure 54D:
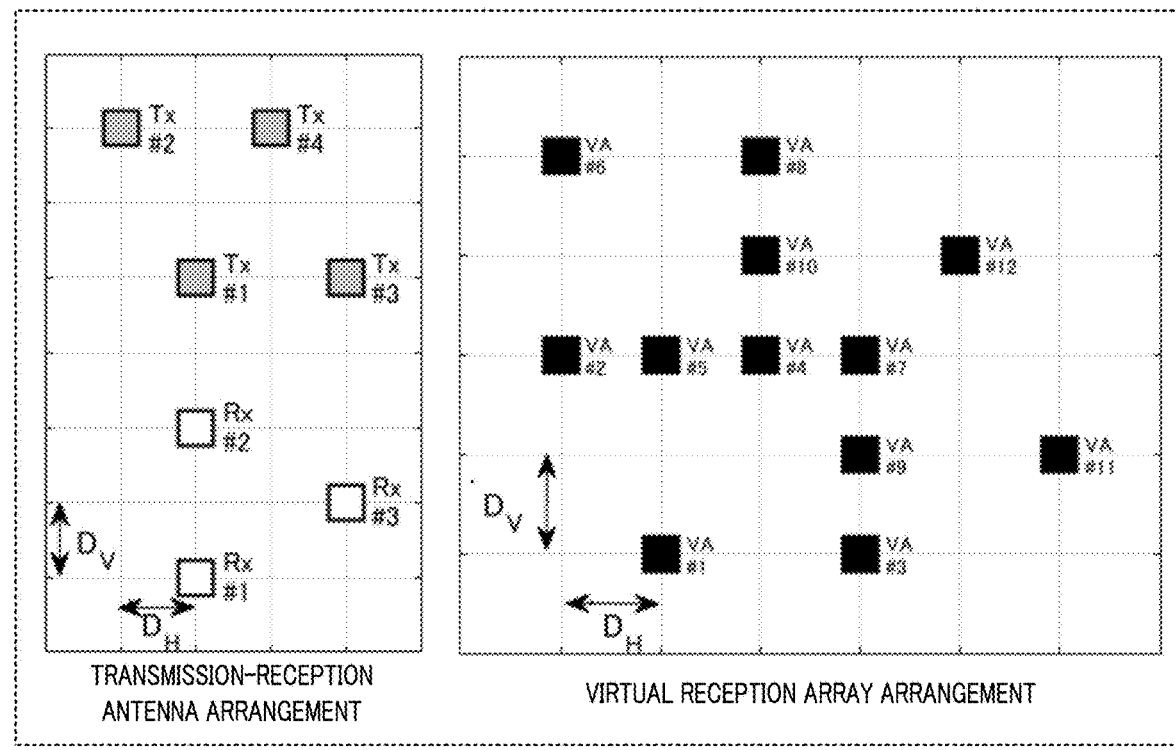
FIG. 54D is a diagram showing an example of an antenna arrangement according to basic arrangement 3.

FIG. 54D shows an example of a MIMO array arrangement in the case where $N_{RxHGroup1\_ANT}$=2 (Rx #1 and Rx #2), $N_{RxHGroup2\_ANT}$=1 (Rx #3), and ($\Delta H_{Tx}$, $\Delta V_{Rx}$)=($+D_H$, $-D_V$) and an example of the arrangement of a virtual reception array.

FIGS. 55A to 55D each show an example of the configuration in which the number of MIMO array antennas is minimum in the case where there is one antenna difference between the number $N_{TxHGroup1\_ANT}$ of transmission antennas included in the first transmission antenna group and the number $N_{TxHGroup2\_ANT}$ of transmission antennas included in the second transmission antenna group and there is one antenna difference between the number $N_{RxVGroup1\_ANT}$ of reception antennas included in the first reception antenna group and the number $N_{RxVGroup2\_ANT}$ of reception antennas included in the second reception antenna group.

As shown in FIGS. 55A to 55D, the configuration in which the number of MIMO array antennas is minimum in the case where $|N_{TxHGroup1\_ANT}-N_{TxHGroup2\_ANT}|=1$ and $|N_{RxVGroup1\_ANT}-N_{RxVGroup2\_ANT}|=1$ is a configuration in which the number of transmission antennas is three and the number of reception antennas is three, and there are, for example, four patterns of FIGS. 55A to 55D.

Figure 55A:
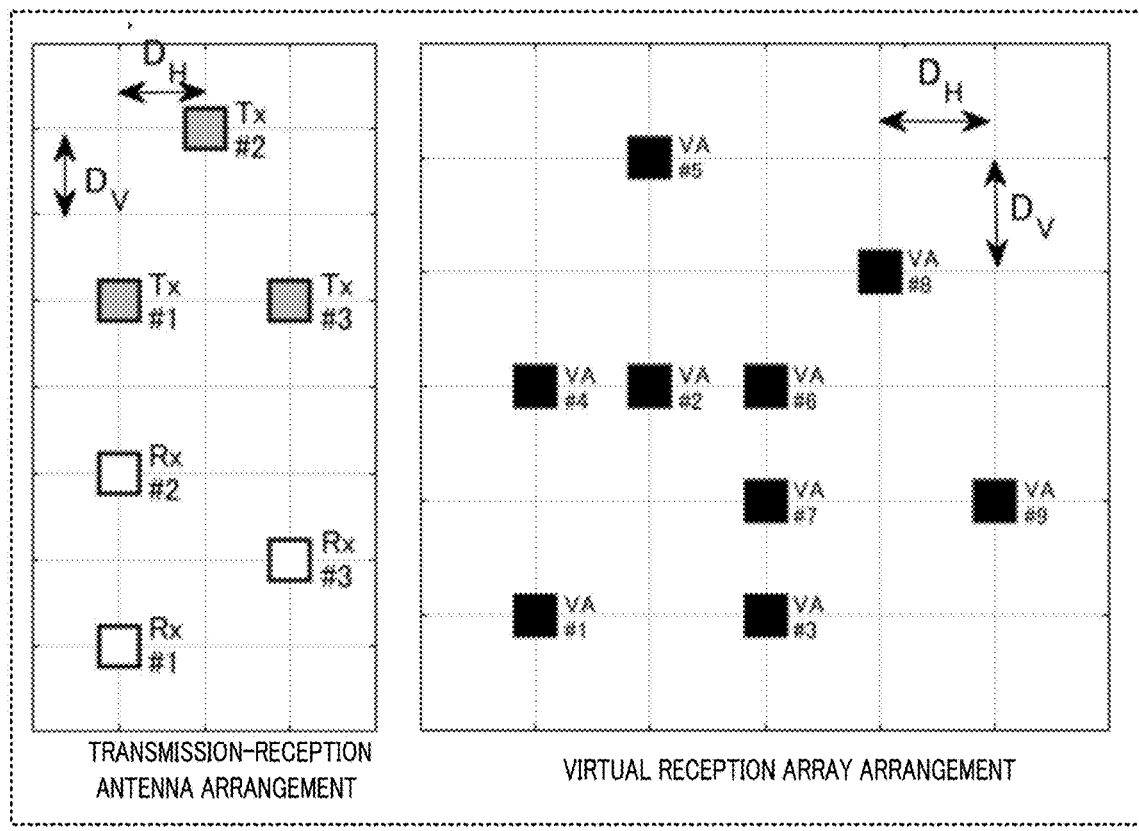
FIG. 55A is a diagram showing an example of an antenna arrangement according to basic arrangement 3.

FIG. 55A shows an example of a MIMO array arrangement in the case where $N_{TxVGroup1\_ANT}=1$ (Tx #2), $N_{TxVGroup2\_ANT}=2$ (Tx #1 and Tx #3), $N_{RxHGroup1\_ANT}=2$ (Rx #1 and Rx #2), $N_{RxHGroup2\_ANT}=1$ (Rx #3), and $(\Delta H_{Tx}, \Delta V_{Rx})=(-D_H, -D_V)$ and an example of the arrangement of a virtual reception array.

Figure 55B:
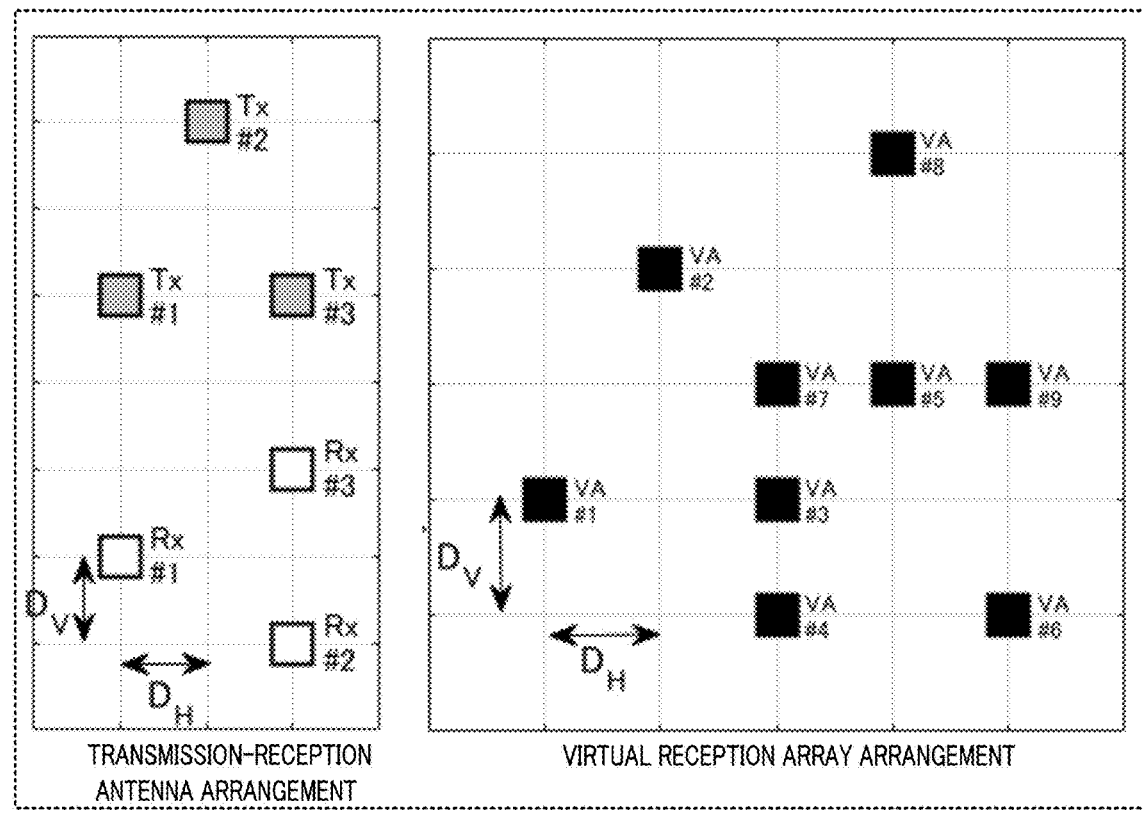
FIG. 55B is a diagram showing an example of an antenna arrangement according to basic arrangement 3.

FIG. 55B shows an example of a MIMO array arrangement in the case where $N_{TxVGroup1\_ANT}=1$ (Tx #2), $N_{TxVGroup2\_ANT}=2$ (Tx #1 and Tx #3), $N_{RxHGroup1\_ANT}=2$ (Rx #1), $N_{RxHGroup2\_ANT}=2$ (Rx #2 and Rx #3), and $(\Delta H_{Tx}, \Delta V_{Rx})=(-D_H, +D_V)$ and an example of the arrangement of a virtual reception array.

Figure 55C:
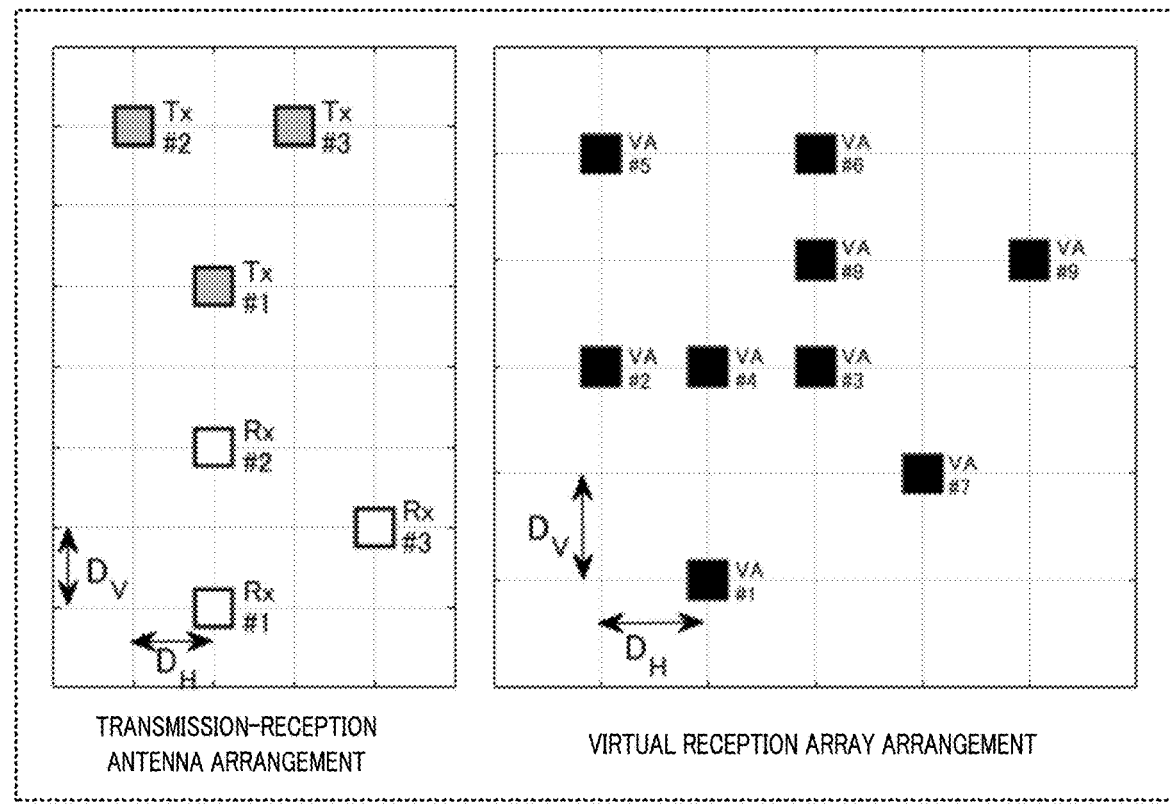
FIG. 55C is a diagram showing an example of an antenna arrangement according to basic arrangement 3.

FIG. 55C shows an example of a MIMO array arrangement in the case where $N_{TxVGroup1\_ANT}=2$ (Tx #2 and Tx #3), $N_{TxVGroup2\_ANT}=1$ (Tx #1), $N_{RxHGroup1\_ANT}=2$ (Rx #1 and Rx #2), $N_{RxHGroup2\_ANT}=1$ (Rx #3), and $(\Delta H_{Tx}, \Delta V_{Rx})=(+D_H, -D_V)$ and an example of the arrangement of a virtual reception array.

Figure 55D:
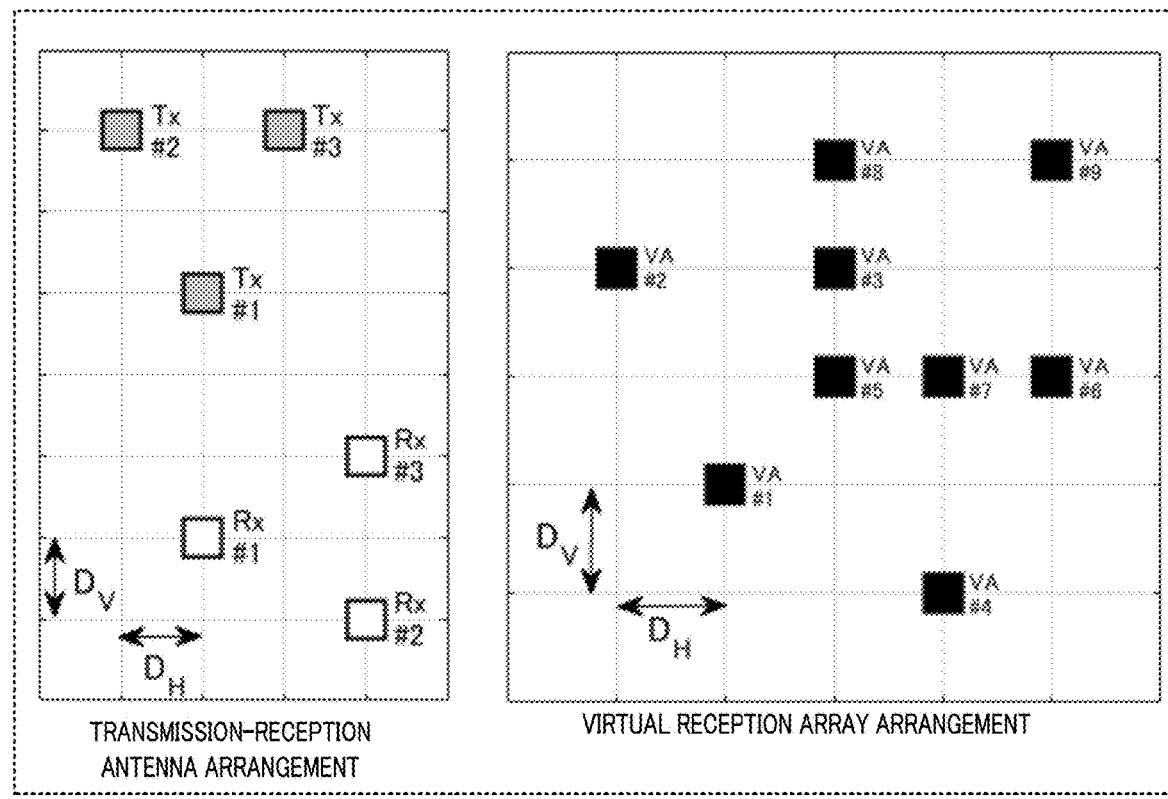
FIG. 55D is a diagram showing an example of an antenna arrangement according to basic arrangement 3.

FIG. 55D shows an example of a MIMO array arrangement in the case where $N_{TxVGroup1\_ANT}=2$ (Tx #2 and Tx #3), $N_{TxVGroup2\_ANT}=1$ (Tx #1), $N_{RxHGroup1\_ANT}=2$ (Rx #1), $N_{RxHGroup2\_ANT}=2$ (Rx #2 and Rx #3), and $(\Delta H_{Tx}, \Delta V_{Rx})=(-D_H, +D_V)$ and an example of the arrangement of a virtual reception array.

For example, in each of FIGS. 55A to 55D, the transmission array antenna includes three transmission antennas, and the reception array antenna includes three reception antennas, Two transmission antennas of the three transmission antennas (for example, transmission antennas included in one transmission antenna group) are, for example, arranged $2D_H$ apart (in other words, twice as long as the spacing of $D_H$) in the horizontal direction. The remaining one transmission antenna of the three transmission antennas is, for example, arranged at a spacing of $D_H$ apart from each of the two transmission antennas (in other words, a middle position) in the horizontal direction and is arranged at a spacing of $2D_V$ apart (in other words, twice as long as the spacing of $D_V$) from the two transmission antennas in the vertical direction.

Similarly, two reception antennas of the three reception antennas (for example, reception antennas included in one reception antenna group) are, for example, arranged $2D_V$ apart (in other words, twice as long as the spacing of $D_V$) in the vertical direction. The remaining one reception antenna of the three reception antennas is, for example, arranged at a spacing of $D_V$ apart from each of the two reception antennas (in other words, a middle position) in the vertical direction and is arranged at a spacing of $2D_H$ apart (in other words, twice as long as the spacing of $D_H$) from the two reception antennas in the horizontal direction.

In other words, in each of FIGS. 55A to 55D, the arrangement positions of the three transmission antennas and the arrangement positions of the three reception antennas are in a relationship rotated in a two-dimensional plane composed of the horizontal direction (for example, X-axis) and the vertical direction (for example, Y-axis). For example, in each of FIGS. 52A to 52D, the transmission array antenna and the reception array antenna are in a relationship rotated by ±90 degrees.

The transmission-reception antenna arrangement according to each of basic arrangement 3 and the modifications of basic arrangement 3 includes at least an antenna arrangement having an arrangement relationship of the above-described three transmission antennas or three reception antennas.

The virtual array elements of each of the virtual reception arrays respectively shown in FIGS. 52A to 52D, 53A to 53D, 54A to 54D, and 55A to 55D are respectively arranged at different positions without any overlap, so the aperture length of the virtual reception array is expanded, and angular resolution is improved.

The virtual array elements positioned around the center of the virtual reception array are densely arranged at a spacing of $D_H$ and a spacing of $D_V$. For example, in each of FIGS. 52A to 52D, 53A to 53D, 54A to 54D, and 55A to 55D, when the spacing $D_H$ and the spacing $D_V$ are set to about $0.5\lambda$, the virtual array elements located around the center of the virtual reception array are arranged at a spacing of $D_H=0.5\lambda$ in the horizontal direction and a spacing of $D_V=0.5\lambda$, in the vertical direction. With this configuration, grating lobes are reduced.

For example, in the MIMO array arrangement of basic arrangement 3, when the spacing $D_H$ and the spacing $D_V$ are set to about $0.5\lambda$, the horizontal and vertical element sizes of each transmission antenna 106 and each reception antenna 202 can be designed to a size greater than or equal to about 12.

With this configuration, for example, an antenna using four elements that are planar patch antennas arranged in a two by two matrix as a sub-array (where the antenna width $W_{ANT}<2D_H$, and the antenna height $H_{ANT}<2D_V$) as shown in FIG. 9A is applicable to each antenna element of at least one of the transmission array antennas and the reception array antennas shown in FIGS. 52A to 52D, 53A to 53D, 54A to 54D, and 55A to 55D.

In the case of each transmission antenna 106, when the element size in the cross direction $W_{ANT}$ is less than $D_H$, an antenna with any size in the longitudinal direction may be used.

Figure 56A:
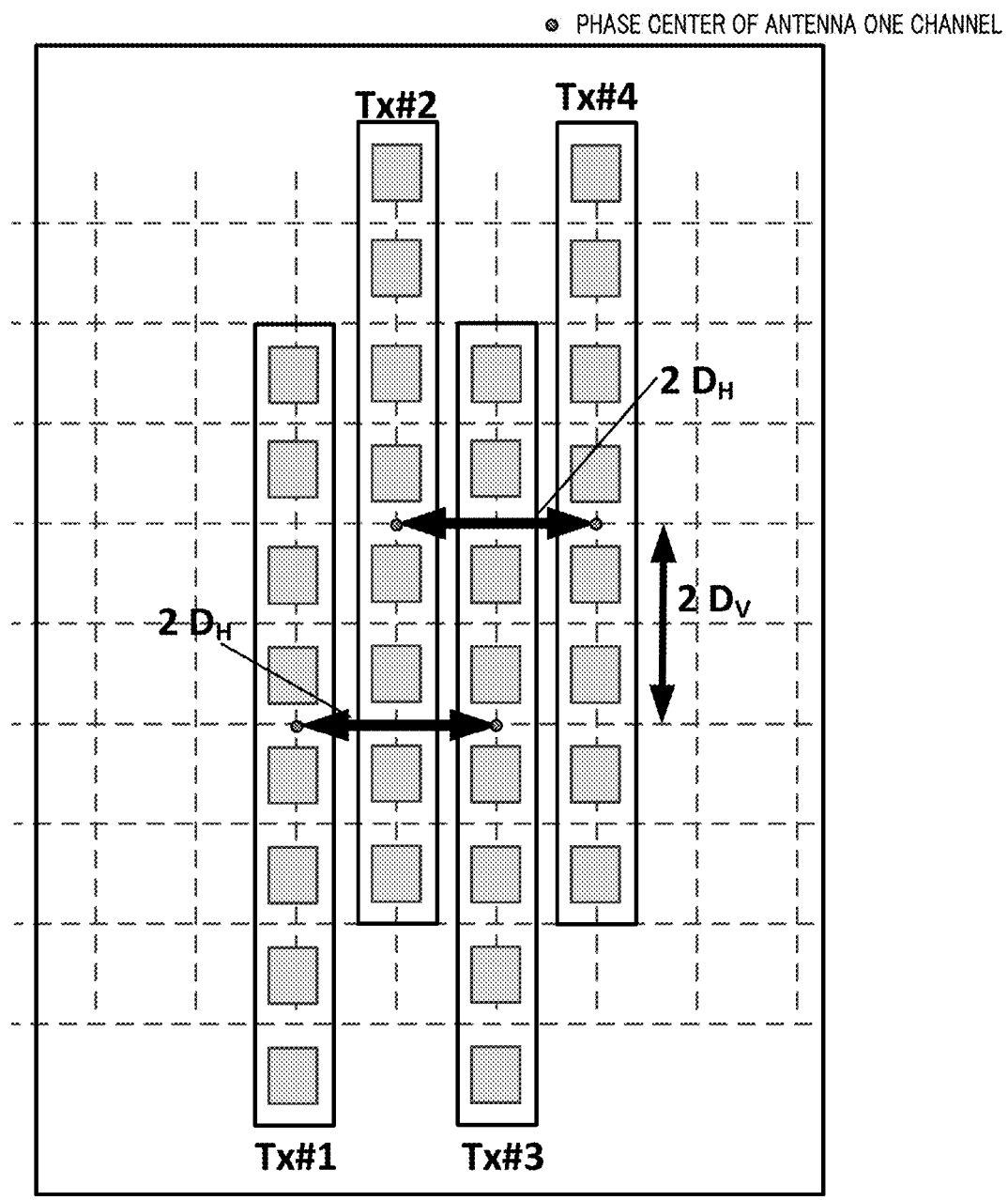
FIG. 56A is a diagram showing a configuration example of a transmission array antenna using sub-arrays according to basic arrangement 3.
Figure 56B:
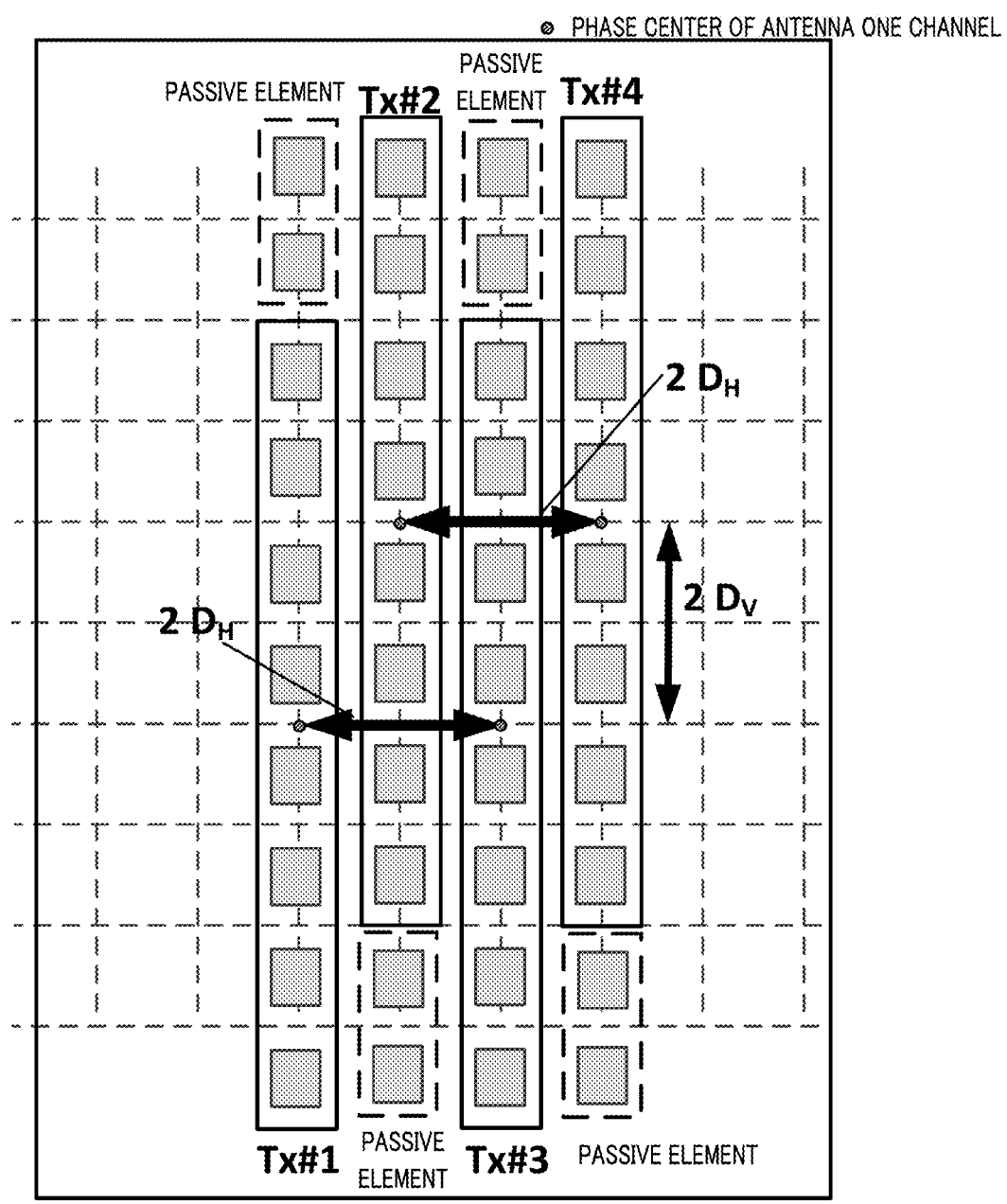
FIG. 56B is a diagram showing a configuration example of a transmission array antenna using the sub-arrays according to basic arrangement 3.

For example, FIG. 56A shows an example in which a sub-array in which planar patch antennas are arranged in a one by eight matrix as shown in FIG. 25A is applied to the antenna arrangement shown in FIG. 52A. As shown in FIG. 56B, in addition to the transmission array antenna shown in FIG. 56A, passive elements (dummy elements) may be arranged. With the passive elements, the influence of antenna-to-antenna coupling of any adjacent antennas is equalized among the antennas, so the directivity characteristics of each of the transmission antennas (Tx #1 to Tx #4) are equalized.

In this way, in the antenna arrangement according to basic arrangement 3, when the antenna having a sub-array configuration is used, the directivity gain of the antenna is improved, and the detection performance (for example, detection distance) of radar apparatus 10 is improved.

Direction estimator 214 performs direction estimation processing in the horizontal direction and in the vertical direction by using received signals of the virtual reception array obtained from the above-described transmission-reception antenna arrangement. Processing on the virtual reception array of basic arrangement 3 in direction estimator 214 is similar to that of basic arrangement 1, so the description thereof will not be repeated here.

Figure 57:
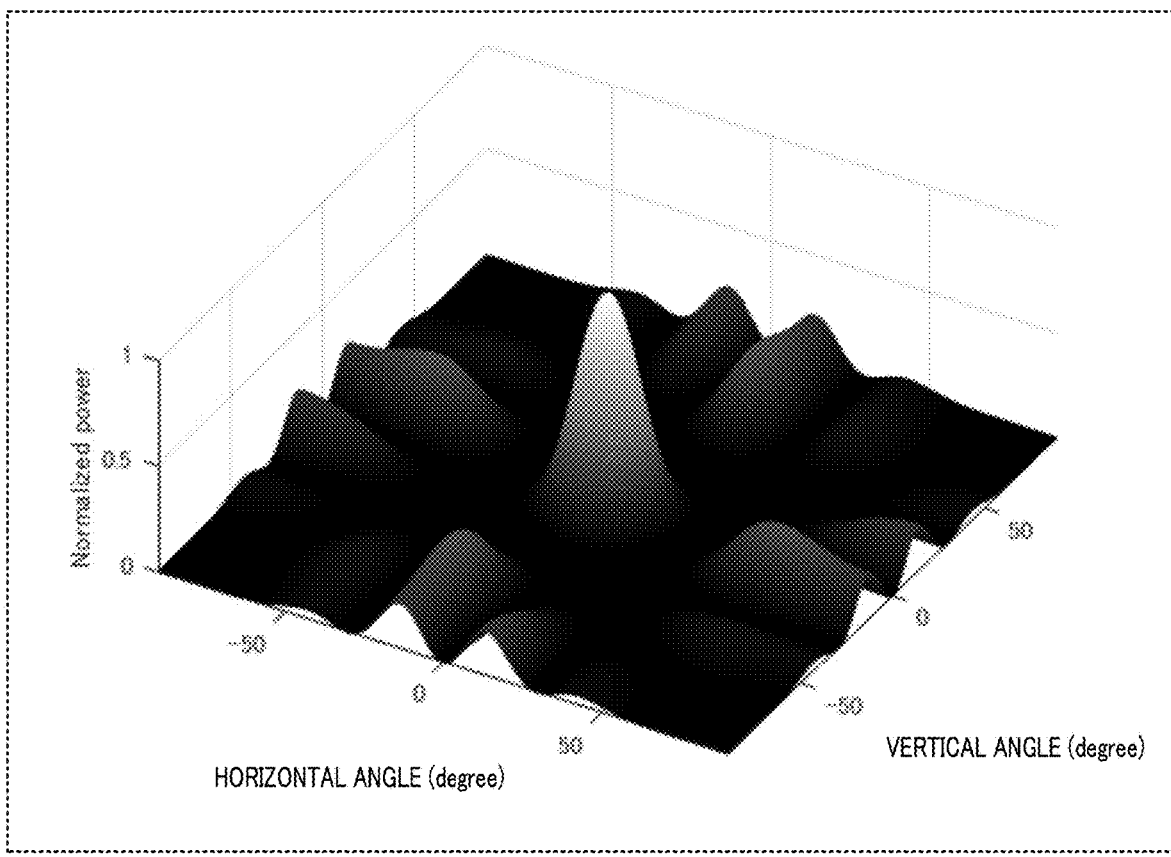
FIG. 57 is a diagram showing an example of a direction estimation result using a transmission-reception antenna arrangement according to basic arrangement 3.

FIG. 57 shows an example of a direction estimation result in the case where, when, for example, the MIMO array arrangement in which the number Nt of transmission antennas 106 is four and the number Na of reception antennas 202 is four ($D_H$=0.5λ, and $D_V$=0.5λ) is used as shown in FIG. 52A, a beam former method is used as the direction-of-arrival estimation algorithm of direction estimator 214. In other words, in FIG. 57, the horizontal and vertical antenna spacings of each transmission antenna 106 are greater than or equal to 1λ and the horizontal and vertical antenna spacings of each reception antenna 202 are also greater than or equal to 1 h. The directivity of each antenna is calculated as omnidirectivity.

In FIG. 57, outputs of the direction-of-arrival estimation evaluation function value in the range of ±90 degrees in the horizontal direction and in the range of ±90 degrees in the vertical direction in the case where a target true value is set at zero degrees in the horizontal direction and zero degrees in the vertical direction are plotted.

It is identified in FIG. 57 that, at directions other than zero degrees in the horizontal direction or zero degrees in the vertical direction, grating lobes are reduced as compared to FIG. 1A. For example, in FIG. 57, the ratio (PSLR) of the peak power level of the highest side lobe, other than a main lobe, at directions other than zero degrees in the horizontal direction or zero degrees in the vertical direction, to the peak power level of the main lobe at the direction of zero degrees in the horizontal direction and zero degrees in the vertical direction is about 0.3.

As described above, when the MIMO array arrangement according to basic arrangement 3 is used, even the element size of each antenna in the longitudinal direction or in the cross direction, used for the transmission array antenna and the reception array antenna, is about 1λ, the arrangement can be performed such that the horizontal and vertical antenna spacings in the virtual reception array include an interelement spacing of about 0.5λ, so grating lobes are reduced. For example, the virtual array elements of the virtual reception array shown in FIG. 52A are arranged without any overlap, so the aperture length of the virtual reception array is expanded, and angular resolution is improved.

Modification 1 of Basic Arrangement 3

In basic arrangement 3, the configuration in which the number of transmission antennas 106 and the number of reception antennas 202 are respectively four transmission elements (Nt=4) and four reception elements (Na=4) (for example, FIGS. 52A to 52D), the configuration in which the number of transmission antennas 106 and the number of reception antennas 202 are respectively three transmission elements (Nt=3) and four reception elements (Na=4) (for example, FIGS. 53A to 53D), the configuration in which the number of transmission antennas 106 and the number of reception antennas 202 are respectively four transmission elements (Nt=4) and three reception elements (Na=3) (for example, FIGS. 54A to 54D), and the configuration in which the number of transmission antennas 106 and the number of reception antennas 202 are respectively three transmission elements (Nt=3) and three reception elements (Na=3) as a minimum configuration (for example, FIGS. 55A to 55D) are described. The number Nt of transmission antennas and the number Na of reception antennas are not limited to these numbers.

In Modification 1 of basic arrangement 3, the arrangement in which the number of antennas of the MIMO array is increased in basic arrangement 3 will be described.

For example, in a transmission array antenna, the number $N_{TxHGroup1\_ANT}$ of transmission antennas included in a first transmission antenna group and the number $N_{TxHGroup2\_ANT}$ of antennas included in a second transmission antenna group may be increased. In a reception array antenna, the number $N_{RxVGroup1\_ANT}$ of antennas included in a first reception antenna group and the number $N_{RxVGroup1\_ANT}$ of antennas included in a second receive vertical antenna group may be increased.

Figure 58:
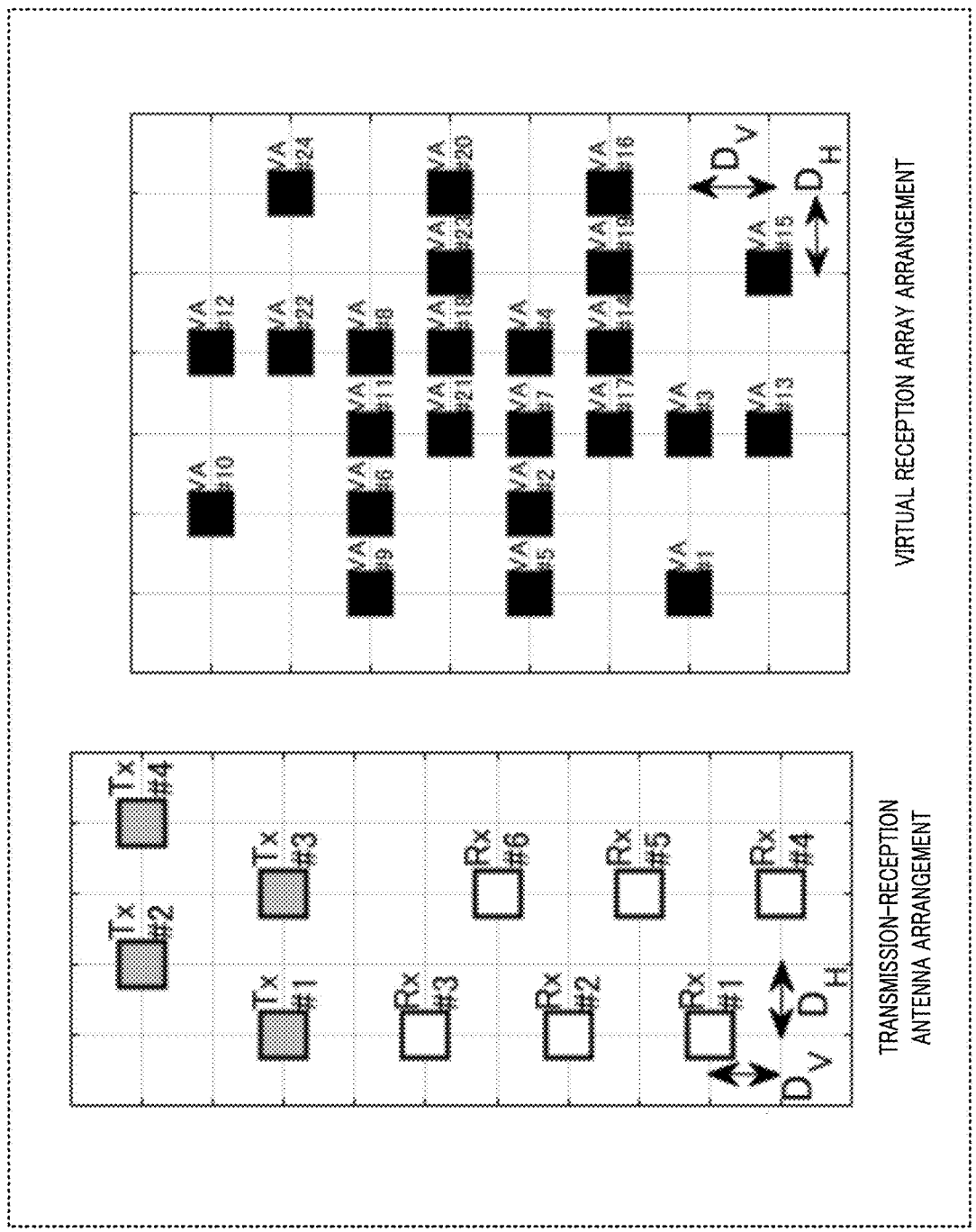
FIG. 58 is a diagram showing an example of an antenna arrangement according to Modification 1 of basic arrangement 3.

FIG. 58 shows an example of a MIMO array arrangement in the case where $N_{TxHGroup1\_ANT}$=2 (Tx #2 and Tx #4), $N_{TxHGroup2\_ANT}$=2 (Tx #1 and Tx #3), $N_{RxVGroup1\_ANT}$=3 (Rx #1, Rx #2, and Rx #3), and $N_{RxVGroup2\_ANT}$=3 (Rx #4, Rx #5, and Rx #6) and an example of the arrangement of a virtual reception array. FIG. 58 shows the case where ($\Delta H_{Tx}$, $\Delta V_{Rx}$)=($-D_H$, $-D_V$). Alternatively, the configuration may be ($\Delta H_{Tx}$, $\Delta V_{Rx}$)=($-D_H$, $+D_V$), ($+D_H$, $-D_V$), or ($+D_H$, $+D_V$).

Figure 59:
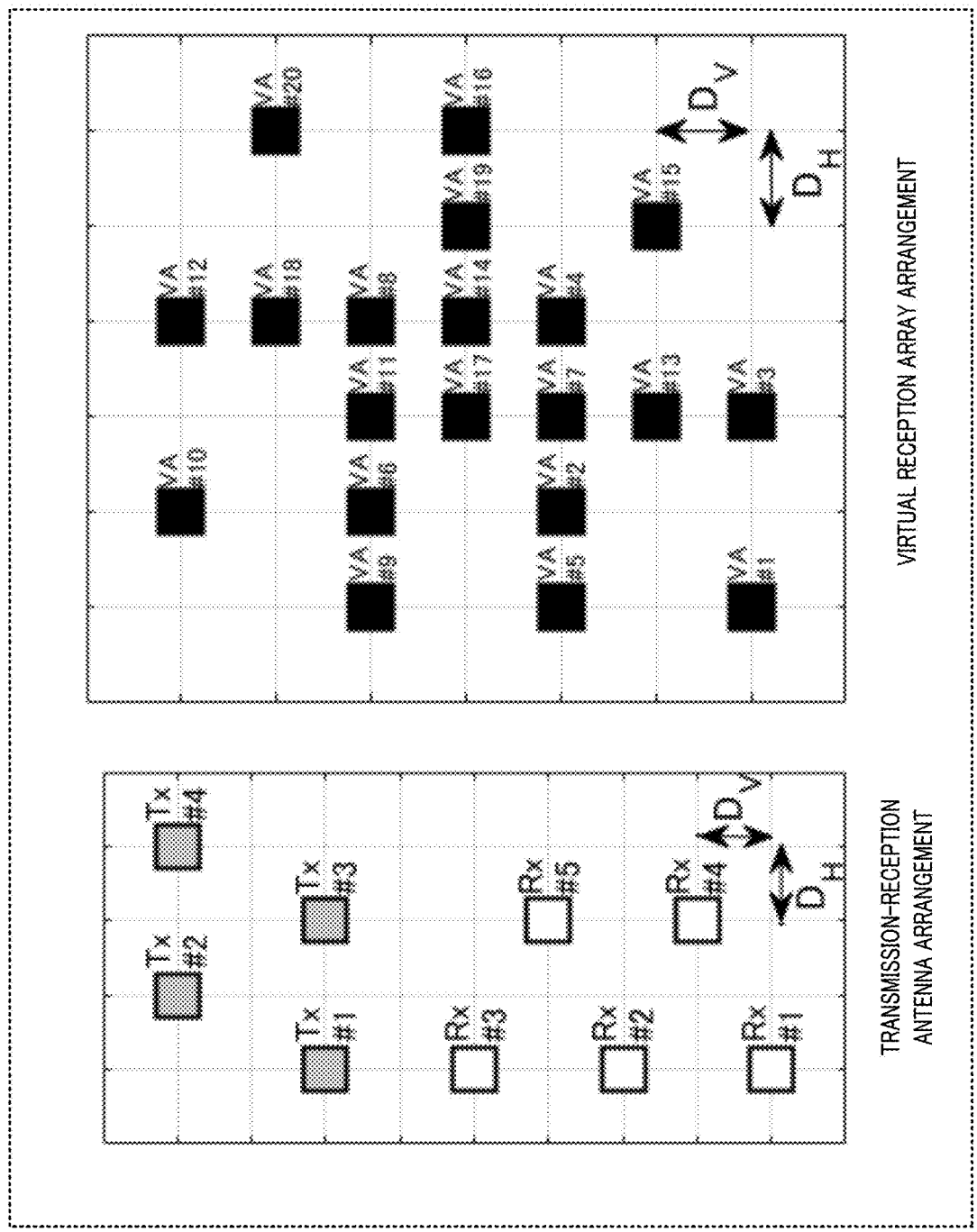
FIG. 59 is a diagram showing an example of an antenna arrangement according to Modification 1 of basic arrangement 3.

FIG. 59 shows an example of a MIMO array arrangement in the case where $N_{TxHGroup1\_ANT}$=2 (Tx #2 and Tx #4), $N_{TxHGroup2\_ANT}$=2 (Tx #1 and Tx #3), $N_{RxVGroup1\_ANT}$=3 (Rx #1, Rx #2, and Rx #3), and $N_{RxVGroup2\_ANT}$=2 (Rx #4, and Rx #5) and an example of the arrangement of a virtual reception array. FIG. 59 shows the case where ($\Delta H_{Tx}$, $\Delta V_{Rx}$)=($-D_H$, $-D_V$). Alternatively, the configuration may be ($\Delta H_{Tx}$, $\Delta V_{Rx}$)=($+D_H$, $-D_V$).

Figure 60:
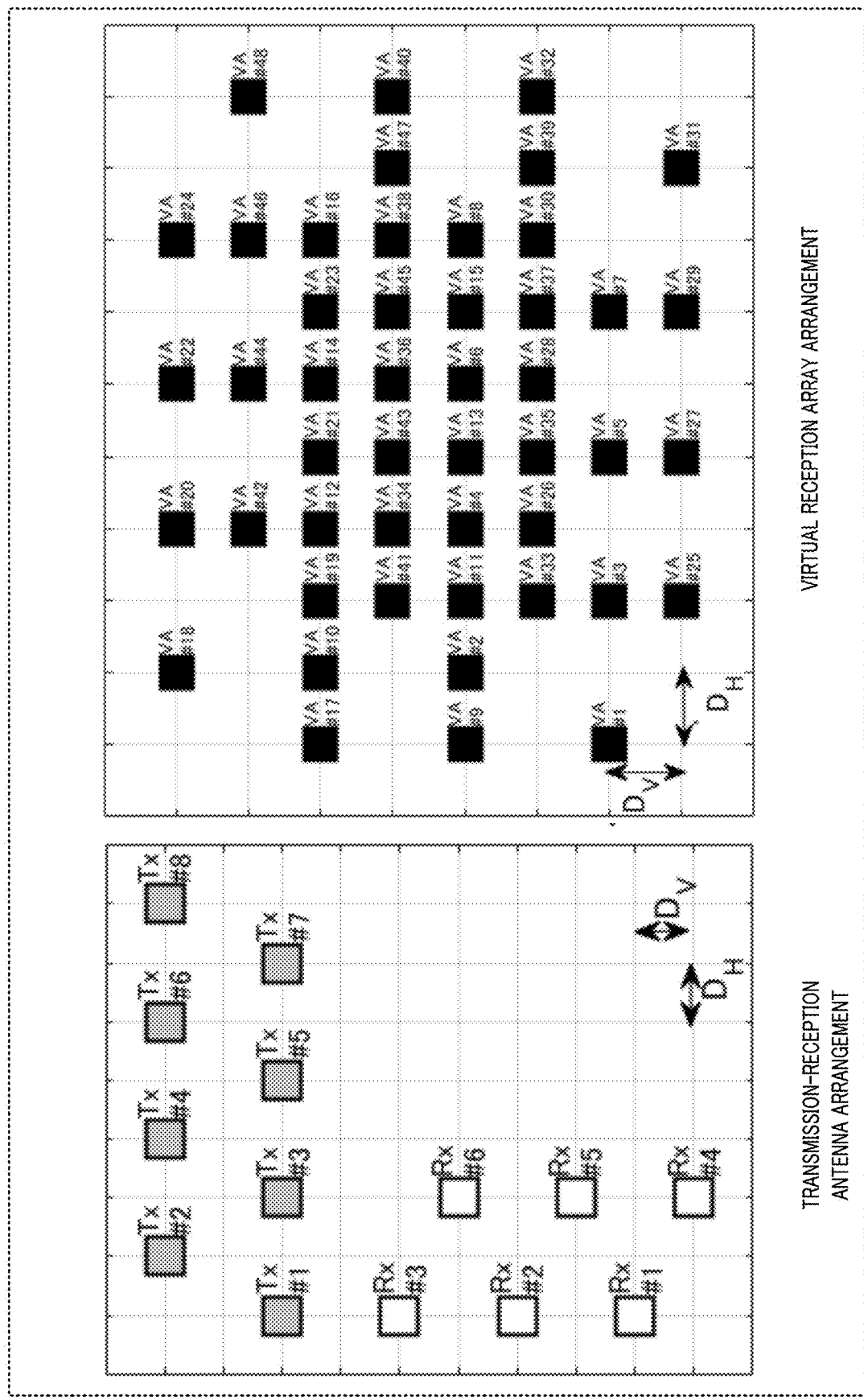
FIG. 60 is a diagram showing an example of an antenna arrangement according to Modification 1 of basic arrangement 3.

FIG. 60 shows an example of a MIMO array arrangement in the case where $N_{TxHGroup1\_ANT}$=4 (Tx #2, Tx #4, Tx #6, and Tx #8), $N_{TxHGroup2\_ANT}$=4 (Tx #1, Tx #3, Tx #5, and Tx #7) $N_{RxVGroup1\_ANT}$=3 (Rx #1, Rx #2, and Rx #3), and $N_{RxVGroup2\_ANT}$=3 (Rx #4, Rx #5, and Rx #6) and an example of the arrangement of a virtual reception array. FIG. 60 shows the case where ($\Delta H_{Tx}$, $\Delta V_{Rx}$)=($-D_H$, $-D_V$). Alternatively, the configuration may be ($\Delta H_{TX}$, $\Delta V_{Rx}$)=($-D_H$, $+D_V$), ($+D_H$, $-D_V$), or ($+D_H$, $+D_V$).

Figure 61:
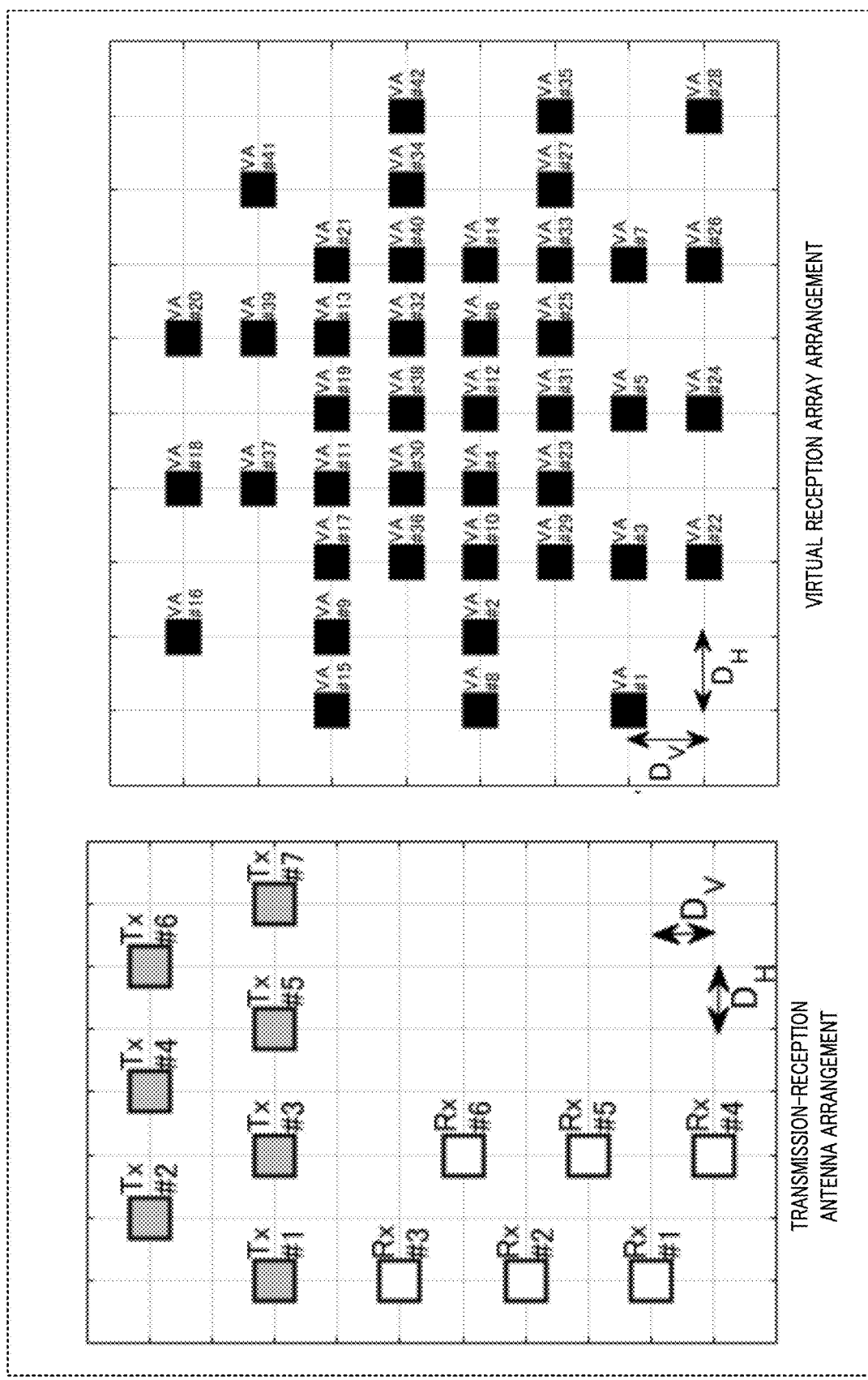
FIG. 61 is a diagram showing an example of an antenna arrangement according to Modification 1 of basic arrangement 3.

FIG. 61 shows an example of a MIMO array arrangement in the case where $N_{TxHGroup1\_ANT}$=3 (Tx #2, Tx #4, and Tx #6), $N_{TxHGroup2\_ANT}$=4 (Tx #1, Tx #3, Tx #5, and Tx #7), $N_{RxVGroup1\_ANT}$=3(Rx #1, Rx #2, and Rx #3), $N_{RxVGroup2\_ANT}$=3 (Rx #4, Rx #5, and Rx #6) and an example of the arrangement of a virtual reception array. FIG. 61 shows the case where ($\Delta H_{Tx}$, $\Delta V_{Rx}$)=($-D_R$, $-D_V$). Alternatively, the configuration may be ($\Delta H_{Tx}$, $\Delta V_{Rx}$)=($-D_H$, $+D_V$).

In each of the MEM array arrangements respectively shown in FIGS. 58 to 61, when, for example, $D_H$ and $D_V$ are set to about 0.52λ, the horizontal and vertical element sizes of each transmission antenna 106 and each reception antenna 202 can be designed to a size greater than or equal to about 1λ.

For example, in each of the virtual reception arrays respectively shown in FIGS. 58 to 61, the virtual array elements are arranged at different positions without any overlap, so the aperture length of the virtual reception array is expanded, and angular resolution is improved.

The virtual array elements positioned around the center of each of the virtual reception arrays respectively shown in FIGS. 58 to 61 are densely arranged at a spacing of $D_H$ and a spacing of $D_V$. The number of virtual array elements densely arranged at a spacing of $D_H$ and a spacing of $D_V$ increases depending on $N_{TxHGroup1\_ANT}$, $N_{TxHGroup2\_ANT}$, $N_{RxVGroup1\_ANT}$, and $N_{RxVGroup2\_ANT}$.

For example, in a virtual reception array, ($N_{TxHGroup1\_ANT}+N_{TxHGroup2\_ANT}$) virtual array elements are arranged at a spacing of $D_H$ in the horizontal direction, and ($N_{RxVGroup1\_ANT}+N_{RxVGroup1\_ANT}$) virtual array elements are arranged at a spacing of $D_V$ in the vertical direction. In a virtual reception array (($N_{TxHGroup1\_ANT}+N_{TxHGroup2\_ANT}$)−2) virtual array elements are arranged at a spacing of $D_H$ in the horizontal direction, and (($N_{RxVGroup1\_ANT}+N_{RxVGroup2\_ANT}$)−2) virtual array elements are arranged at a spacing of $D_V$ in the vertical direction.

As the number of virtual array elements densely arranged at a spacing of $D_H$ and a spacing of $D_V$ around the center of the virtual reception array increases, the effect of reducing grating lobes and side lobes is improved.

As $N_{TxGroup1\_ANT}$ and/or $N_{TxHGroup2\_ANT}$ increases, the number of virtual array elements arranged in the horizontal direction increases, so the horizontal aperture length of the virtual reception array is expanded, and horizontal angular resolution is improved. Similarly, as $N_{RxVGroup1\_ANT}$ and/or $N_{RxVGroup2\_ANT}$ increases, the number of virtual array elements arranged in the vertical direction increases, so the vertical aperture length of the virtual reception array is expanded, and vertical angular resolution is improved.

Figure 62:
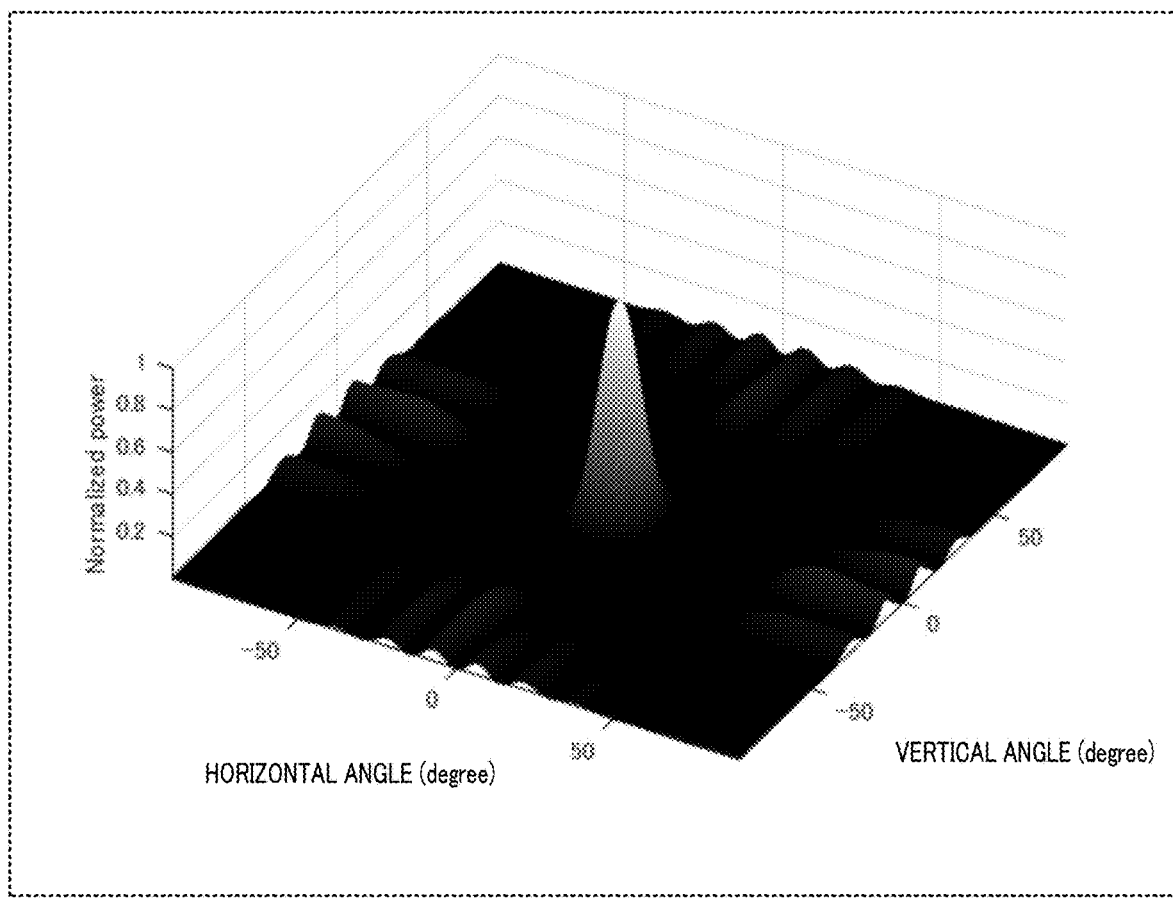
FIG. 62 is a diagram showing an example of a direction estimation result using a transmission-reception antenna arrangement according to Modification 1 of basic arrangement 3.

FIG. 62 shows an example of a direction estimation result in the case where, when, for example, the MIMO array arrangement in which the number Nt of transmission antennas 106 is eight and the number Na of reception antennas 202 is six ($N_{TxGroup1\_ANT}$=4, $N_{TxGroup2\_ANT}$=4, $N_{RxGroup1\_ANT}$=3, $N_{RxGroup2\_ANT}$=3, $D_H$=0.5λ, and $D_V$=0.5λ) is used as shown in FIG. 60, a beam former method is used as the direction-of-arrival estimation algorithm of direction estimator 214. The directivity of each antenna is calculated as omnidirectivity.

In FIG. 62, outputs of the direction-of-arrival estimation evaluation function value in the range of ±90 degrees in the horizontal direction and in the range of ±90 degrees in the vertical direction in the case where a target true value is set at zero degrees in the horizontal direction and zero degrees in the vertical direction are plotted.

It is identified in FIG. 62 that, at directions other than zero degrees in the horizontal direction or zero degrees in the vertical direction, grating lobes are reduced. For example, in FIG. 62, the ratio (PSLR) of the peak power level of the highest side lobe, other than a main lobe, to the peak power level of the main lobe at the direction of zero degrees in the horizontal direction and zero degrees in the vertical direction is about 0.13. It is identified that, as compared to, for example, FIG. 52A, the effect of reducing side lobes is improved by increasing $N_{TxHGroup1\_ANT}$, $N_{TxHGroup2\_ANT}$, $N_{RxVGroup1\_ANT}$, and $N_{RxVGroup2\_ANT}$. It is identified in FIG. 62 that the peak of the main lobe is sharpened as compared to FIG. 57 and the angular resolution is improved as a result of an increase in $N_{TxHGroup1\_ANT}$, $N_{TxHGroup2\_ANT}$, $N_{RxVGroup1\_ANT}$, and $N_{RxVGroup2\_ANT}$.

Modification 2 of Basic Arrangement 3

Hereinafter, each of antenna arrangement methods 3-2A and 3-2B in Modification 2 of basic arrangement 3 will be described.

Arrangement Method 3-2A

In Modification 1 of basic arrangement 3, the case where the number of virtual array elements arranged in the vertical direction is increased by increasing the number $N_{RxVGroup1\_ANT}$ of reception antennas and the number $N_{RxVGroup2\_ANT}$ of reception antennas, included in the reception antenna groups of the reception array antenna, has been described. Not limited to this configuration, the number of virtual array elements arranged in the vertical direction can be increased in the virtual reception array even by, for example, increasing the number $N_{TxGroup}$ of transmission antenna groups in the transmission array antenna.

In this case, the vertical antenna spacing of the transmission antenna groups may be set to, for example, a certain value (for example, $2D_V$); however, depending on the number $N_{RxVGroup1\_ANT}$ of reception antennas and the number $N_{RxVGroup2\_ANT}$ of reception antennas, included in the reception antenna groups, the virtual reception array arrangement can be the arrangement in which the virtual array elements overlap.

When the arrangement including no overlap virtual array element is applied to the virtual reception array arrangement, the following spacing $D_{TxHGroupV}$ may be used as, for example, the even-numbered antenna spacings among the vertical antenna spacings of the transmission antenna groups.

[15]

$$D_{TxHGroupV}=D_V(N_{RxVGroup1\_ANT}+N_{RxVGroup2\_ANT}-2) \text{ (Expression 15)}$$

For example, when $N_{RxVGroup1\_ANT}=N_{RxVGroup2\_ANT}=2$, $D_{TxHGroupV}=2D_V$, and, when $N_{RxVGroup1\_ANT}=N_{RxVGroup2\_ANT}=3$, $D_{TxHGroupV}=4D_V$.

For example, when the number $N_{TxHGroup}$ of transmission antenna groups is three, the spacings of three transmission antenna groups are set to $\{2D_V, D_{TxHGroupV}\}$ When the number $N_{TxHGroup}$ of transmission antennas is four, the spacings of four transmission antenna groups are set to $\{2D_V, D_{TxHGroupV}, 2D_V\}$ Similarly, when $N_{RxGroup\_ANT}=5$, the spacings of five transmission antenna groups are set to $\{2D_V, D_{TxHGroupV}, 2D_V, D_{TxHGroupV}\}$.

Figure 63:
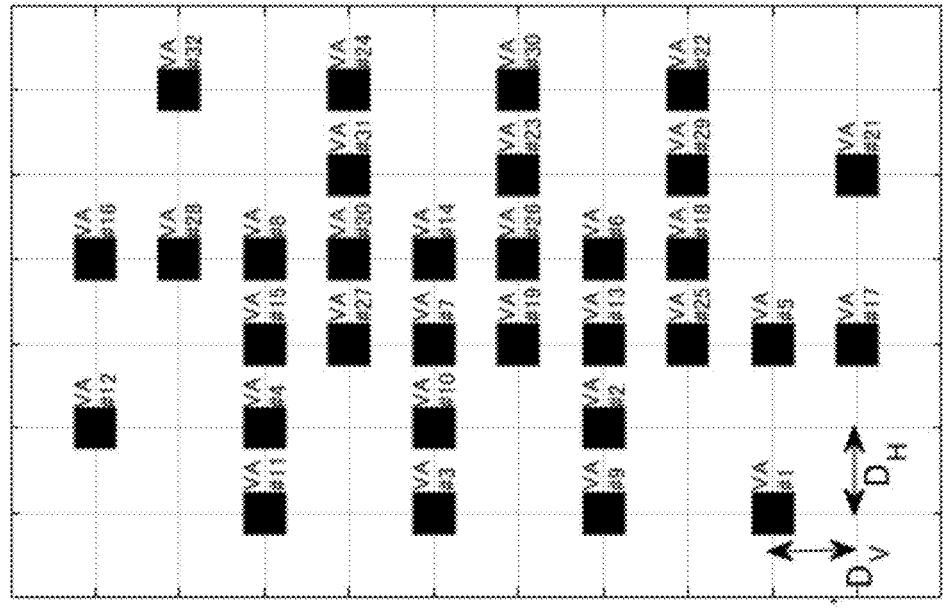
FIG. 63 is a diagram showing an example of an antenna arrangement according to Modification 2 of basic arrangement 3.
Figure 63:
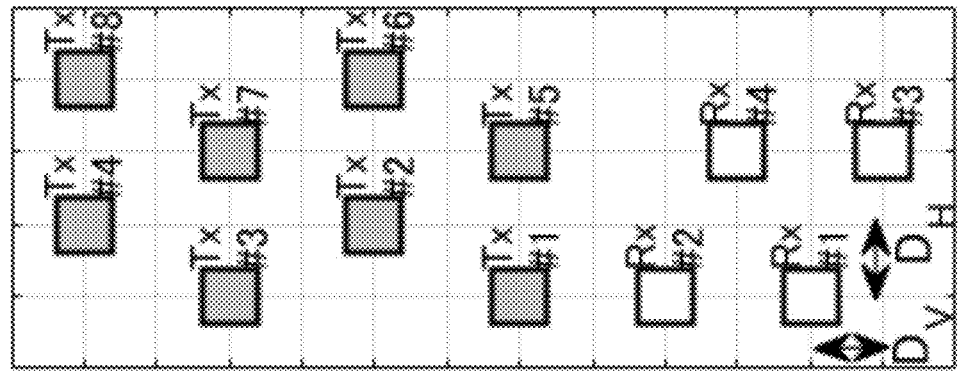

FIG. 63 shows an example of a MIMO array arrangement in the case where $N_{RxVGroup}=2$, $N_{TxHGroup}=4$, $N_{TxHGroup1\_ANT}=2$, $N_{TxHGroup2\_ANT}=2$, $N_{TxHGroup3\_ANT}=2$, $N_{TxHGroup4\_ANT}=2$, $N_{RxVGroup1\_ANT}=2$, and $N_{RxVGroup2\_ANT}=2$ and an example of a virtual reception array. $N_{TxHGroup3\_ANT}$ denotes the number of transmission antennas included in a third transmission antenna group, and $N_{TxHGroup4\_ANT}$ denotes the number of transmission antennas included in a fourth transmission antenna group. In FIG. 63, in the expression 15, $D_{TxHGroupV}=2D_V$.

In FIG. 63, the shift amount $\Delta V_{Rx(2,1)}$ of a second reception antenna group (Rx #3, Rx #4) with respect to a first reception antenna group (Rx #1, Rx #2) is in the case where $\Delta V_{Rx(2,1)}=-D_V$. Alternatively, the shift amount $\Delta V_{Rx(2,1)}$ may be set such that $\Delta V_{Rx(2,1)}=+D_V$.

In FIG. 63, the shift amount $\Delta H_{Tx(2,1)}$ of a second transmission antenna group (Tx #3 and Tx #7) with respect to a first transmission antenna group (Tx #4 and Tx #8) is set to $-D_H$, the shift amount $\Delta H_{Tx(3,2)}$ of the third transmission antenna group (Tx #2 and Tx #6) with respect to the second transmission antenna group is set to $+D_H$, and the shift amount $\Delta H_{Tx(4,3)}$ of the fourth transmission antenna group (Tx #1 and Tx #5) with respect to the third transmission antenna group is set to $-D_H$. Each shift amount may be any combination of two types ($+D_V$, $-D_V$). In FIG. 63, $+D_V$ direction is the upper side, $-D_V$ is the lower side, $+D_H$ direction is the right-hand side, and $-D_H$ is the left-hand side.

Figure 64:
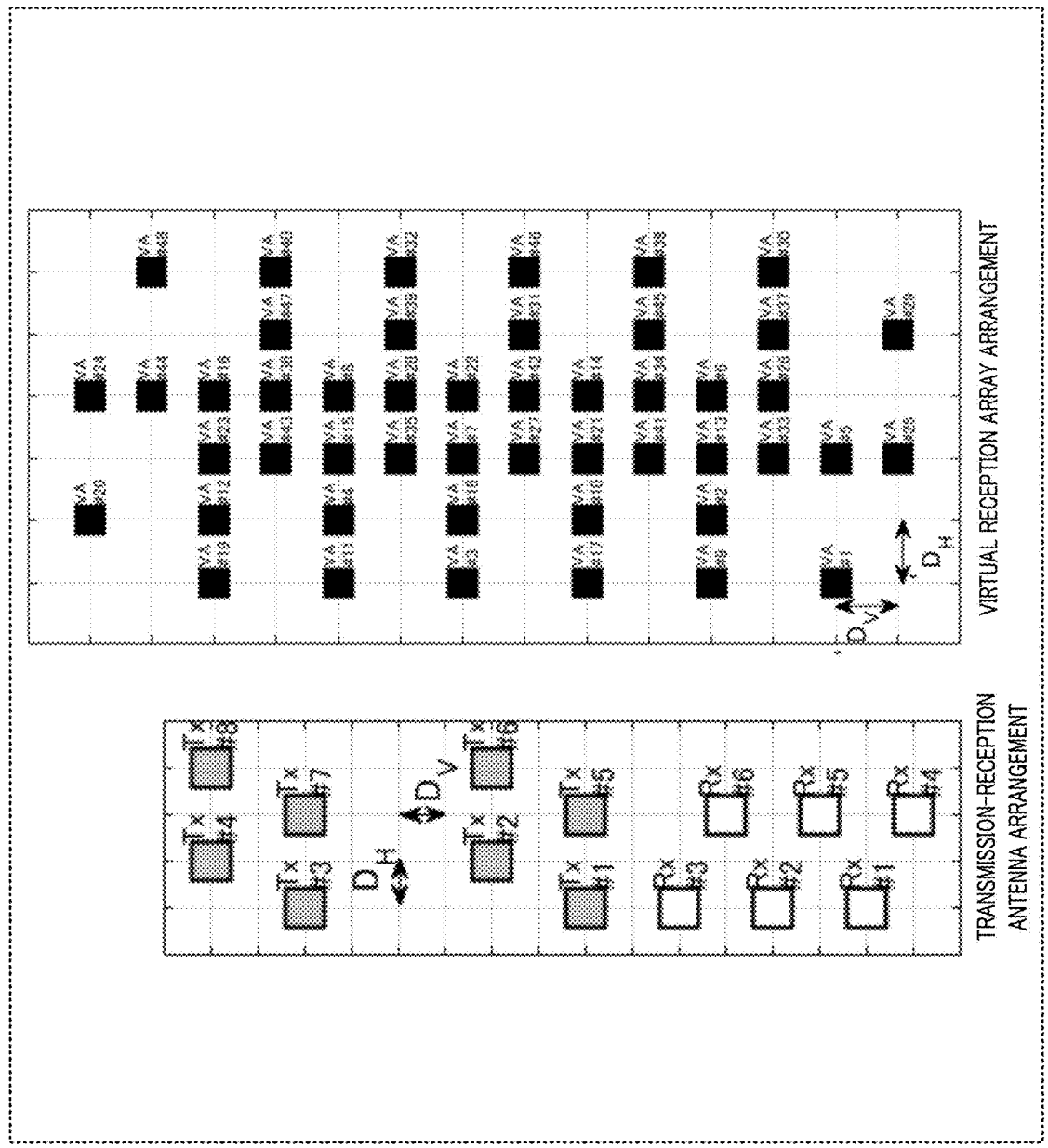
FIG. 64 is a diagram showing an example of an antenna arrangement according to Modification 2 of basic arrangement 3.

FIG. 64 shows an example of a MIMO array arrangement in the case where $N_{RxVGroup}=2$, $N_{TxHGroup}=4$, $N_{TxHGroup1\_ANT}=2$, $N_{TxHGroup2\_ANT}=2$, $N_{TxHGroup3\_ANT}=2$, $N_{TxHGroup4\_ANT}=2$, $N_{RxVGroup1\_ANT}=3$, and $N_{RxVGroup2\_ANT}=3$ and an example of a virtual reception array. In FIG. 64, in the expression 15, $D_{TxHGroupV}=4D_V$.

In FIG. 64, the shift amount $\Delta V_{Rx(2,1)}$ of a second reception antenna group (Rx #4, Rx #5, and Rx #6) with respect to a first reception antenna group (Rx #1, Rx #2, and Rx #3) is in the case where $\Delta V_{Rx(2,1)}=-D_V$. Alternatively, the shift amount $\Delta V_{Rx(2,1)}$ may be set such that $\Delta V_{Rx(2,1)}=+D_V$.

In FIG. 64, the shift amount $\Delta H_{Tx(2,1)}$ of a second transmission antenna group (Tx #3 and Tx #7) with respect to a first transmission antenna group (Tx #4 and Tx #8) is set to $-D_H$, the shift amount $\Delta H_{Tx(3,2)}$ of a third transmission antenna group (Tx #2 and Tx #6) with respect to the second transmission antenna group is set to $+D_H$, and the shift amount $\Delta H_{Tx(4,3)}$ of a fourth transmission antenna group (Tx #1 and Tx #5) with respect to the third transmission antenna group is set to $-D_H$. Each shift amount may be any combination of two types ($+D_V$, $-D_V$). In FIG. 64, $+D_V$ direction is the upper side, $-D_V$ is the lower side, $+D_H$ direction is the right-hand side, and $-D_H$ is the left-hand side.

When the arrangement with an unequal spacing (for example, the spacing greater than $D_H$ or $D_V$) may be included around the center of the virtual reception array, $D_{TxHGroupV}$ may be a value greater than the value of the expression 15.

Arrangement Method 3-2B

In Modification 1 of basic arrangement 3, the case where the number of virtual array elements arranged in the horizontal direction is increased by increasing the number $N_{TxHGroup1\_ANT}$ of transmission antennas and the number $N_{TxHGroup2\_ANT}$ of transmission antennas, included in the transmission antenna groups of the transmission array antenna, has been described. Not limited to this configuration, the number of virtual array elements arranged in the horizontal direction can be increased in the virtual reception array even by, for example, increasing the number $N_{RxVGroup}$ of reception antenna groups in the reception array antenna.

In this case, the horizontal antenna spacing of the reception antenna groups may be set to, for example, a certain value (for example, $2D_H$); however, depending on the number $N_{TxHGroup1\_ANT}$ of transmission antennas or the number $N_{TxHGroup2\_ANT}$ of transmission antennas, included in the transmission antenna groups, the virtual reception array arrangement can be the arrangement in which the virtual array elements overlap.

When the arrangement including no overlap virtual array element is applied to the virtual reception array arrangement, the following spacing $D_{RxVGroupH}$ may be used as, for example, the even-numbered spacings among the horizontal spacings of the reception antenna groups.

[16]

$$D_{RxVGroupH}=D_H(N_{TxHGroup1\_ANT}+N_{TxHGroup2\_ANT}-2) \text{ (Expression 16)}$$

For example, when $N_{TxHGroup1\_ANT}=N_{TxHGroup2\_ANT}=2$, $D_{RxVGroupH}=2D_H$, and, when $N_{TxHGroup1\_ANT}=N_{TxHGroup2\_ANT}=3$, $D_{RxVGroupH}=4D_H$.

For example, when the number $N_{RxVGroup}$ of reception antenna groups is three, the horizontal spacings of three reception antenna groups are set to $\{2D_H, D_{RxVGroupH}\}$. When the number $N_{RxVGroup}$ of reception antenna groups is four, the horizontal spacings of four reception antenna groups are set to $\{2D_H, D_{RxVGroupH}, 2D_H\}$. Similarly, when the number $N_{RxVGroup}$ of reception antenna groups is five, the horizontal spacings of five reception antenna groups are set to $\{2D_H, D_{RxVGroupH}, 2D_H, D_{RxVGroupH}\}$.

Figure 65:
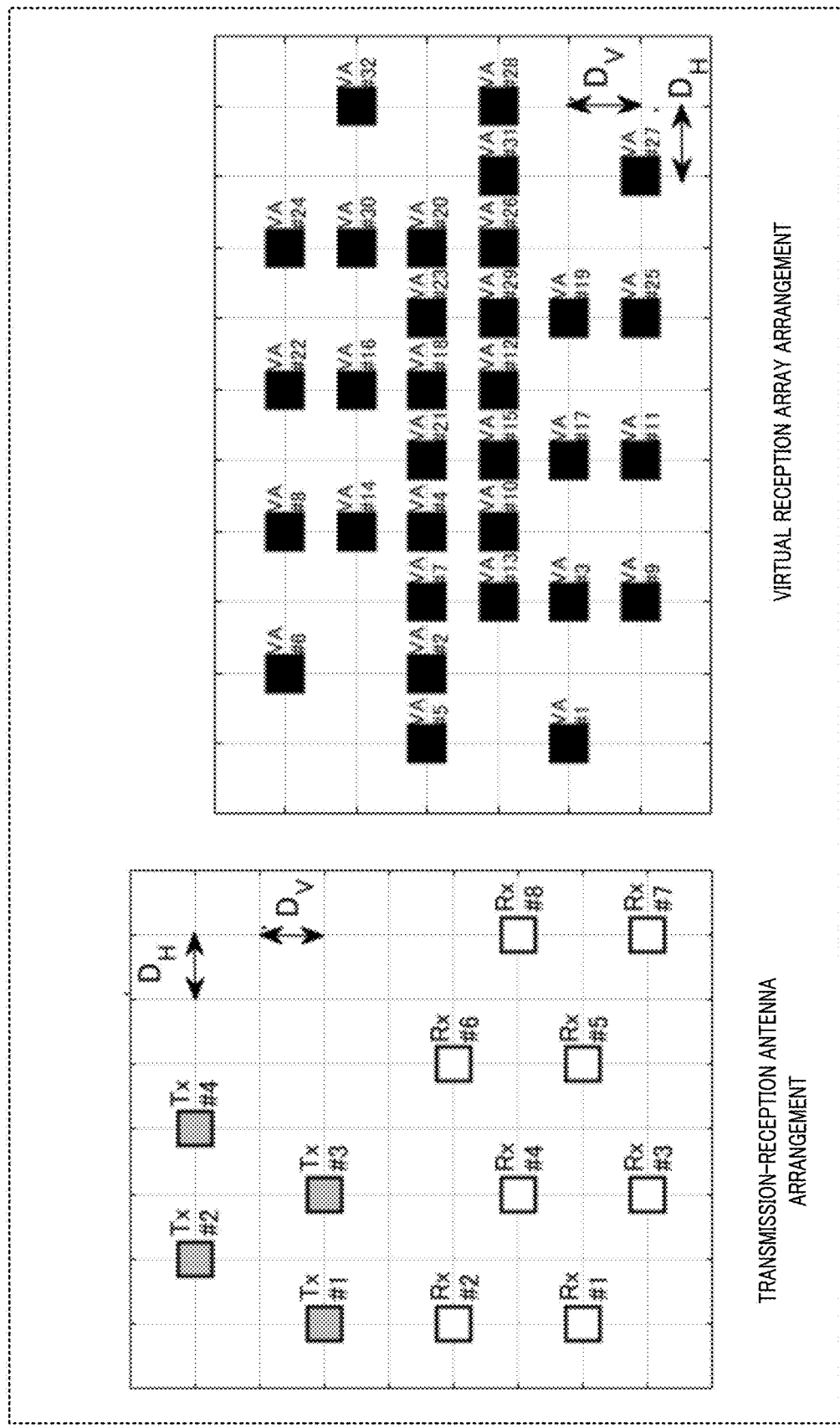
FIG. 65 is a diagram showing an example of an antenna arrangement according to Modification 2 of basic arrangement 3.

FIG. 65 shows an example of a MIMO array arrangement in the case where $N_{TxHGroup}=2$, $N_{RxVGroup}=4$, $N_{TxHGroup1\_ANT}=2$, $N_{TxHGroup2\_ANT}=2$, $N_{RxVGroup1\_ANT}=2$, $N_{RxVGroup2\_ANT}=2$, $N_{RxVGroup3\_ANT}=2$, and $N_{RxVGroup4\_ANT}=2$ and an example of a virtual reception array. $N_{RxVGroup3\_ANT}$ denotes the number of reception antennas included in a third reception antenna group, and $N_{RxVGroup4\_ANT}$ denotes the number of reception antennas included in a fourth reception antenna group. In FIG. 65, in the expression 16, $D_{RxVGroupH}=2D_H$.

In FIG. 65, the shift amount $\Delta H_{Tx(2,1)}$ of a second transmission antenna group (Tx #1 and Tx #3) with respect to a first transmission antenna group (Tx #2 and Tx #4) is in the case where $\Delta H_{Tx(2,1)}=-D_H$. Alternatively, the shift amount $\Delta H_{Tx(2,1)}$ may be set such that $\Delta H_{Tx(2,1)}=+D_H$.

In FIG. 65, the shift amount $\Delta V_{Rx(2,1)}$ of a second reception antenna group (Rx #3 and Rx #4) with respect to a first reception antenna group (Rx #1 and Rx #2) is set to $-D_V$, the shift amount $\Delta V_{Rx(3,7)}$ of a third reception antenna group (Rx #5 and Rx #6) with respect to the second reception antenna group is set to $+D_V$, and the shift amount $\Delta V_{Rx(4,3)}$ of a fourth reception antenna group (Rx #7 and Rx #8) with respect to the third reception antenna group is set to $-D_V$. Each shift amount may be any combination of two types ($+D_V$, $-D_V$). In FIG. 65, $+D_V$ direction is the upper side, and $-D_V$ is the lower side.

Figure 66:
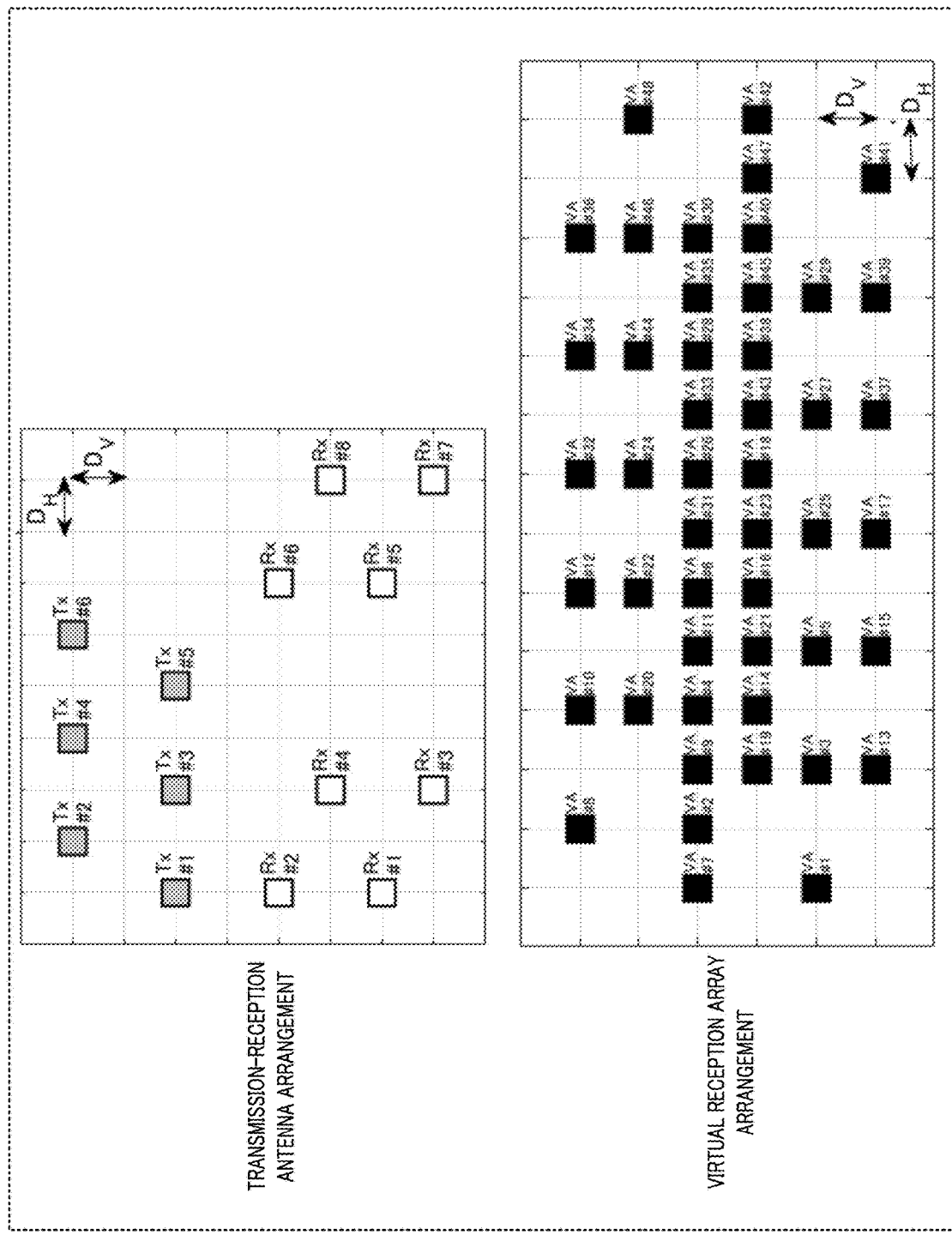
FIG. 66 is a diagram showing an example of an antenna arrangement according to Modification 2 of basic arrangement 3.

FIG. 66 shows an example of a MIMO array arrangement in the case where $N_{TxHGroup}=2$, $N_{RxVGroup}=4$, $N_{TxHGroup1\_ANT}=3$, $N_{TxHGroup2\_ANT}=3$, $N_{RxVGroup1\_ANT}=2$, $N_{RxVGroup2\_ANT}=2$, $N_{RxVGroup3\_ANT}=2$, and $N_{RxVGroup4\_ANT}=2$ and an example of a virtual reception array. In FIG. 66, in the expression 16, $D_{RxVGroupH}=4D_H$.

The shift amount $\Delta H_{Tx(2,1)}$ of a second transmission antenna group (Tx #1, Tx #3, and Tx #5) with respect to a first transmission antenna group (Tx #2, Tx #4, and Tx #6) is in the case where $\Delta H_{Tx(2,1)}=-D_H$. Alternatively, the shift amount $\Delta H_{Tx(2,1)}$ may be set such that $\Delta H_{Tx(2,1)}=+D_H$.

In FIG. 66, the shift amount $\Delta V_{Rx(2,1)}$ of a second reception vertical antenna group (Rx #3 and Rx #4) with respect to a first reception antenna group (Rx #1 and Rx #2) is set to $-D_V$, the shift amount $\Delta V_{Rx(3,7)}$ of a third reception antenna group (Rx #5 and Rx #6) with respect to the second reception antenna group is set to $+D_V$, and the shift amount $\Delta V_{Rx(4,3)}$ of a fourth reception antenna group (Rx #7 and Rx #8) with respect to the third reception antenna group is set to $-D_V$. Each shift amount may be any combination of two types ($+D_V$, $-D_V$). In FIG. 66, $+D_V$ direction is the upper side, $-D_V$ is the lower side, $+D_H$ direction is the right-hand side, and $-D_H$ is the left-hand side.

When the arrangement with an unequal spacing (for example, the spacing greater than $D_H$ or $D_V$) may be included around the center of the virtual reception array $D_{RxVGroupH}$ may be a value greater than the value of the expression 16.

Each of the antenna arrangement methods 3-2A and 3-2B in Modification 2 of basic arrangement 3 has been described above.

For example, in each of the transmission-reception antenna arrangements (for example, MIMO array arrangements) respectively shown in FIGS. 63 to 66, when, for example, $D_H$ and $D_V$ are set to about $0.5\lambda$, the horizontal and vertical element sizes of each transmission antenna 106 and each reception antenna 202 can be designed to a size greater than or equal to about $1\lambda$.

For example, in each of the virtual reception arrays respectively shown in FIGS. 63 to 66, the virtual array elements are arranged at different positions without any overlap, so the aperture length of the virtual reception array is expanded, and angular resolution is improved.

The virtual array elements positioned around the center of each of the virtual reception arrays respectively shown in FIGS. 63 to 66 are densely arranged at a spacing of $D_H$ and a spacing of $D_V$. The number of virtual array elements densely arranged at a spacing of $D_H$ and a spacing of $D_V$ increases depending on the number $N_{TxHGroup}$ of transmission antenna groups and the number $N_{TxHGroup(ntvg)\_ANT}$ of transmission antennas included in each transmission antenna group (here, ntvg=1, . . . , $N_{TxHGroup}$) and the number $N_{RxVGroup}$ of reception antenna groups and the number $N_{RxVGroup(nrhg)\_ANT}$ of reception antennas included in each reception antenna group (here, nrhg=1, . . . , $N_{RxVGroup}$).

For example, in a virtual reception array, (0.5× $(N_{TxHGroup1\_ANT}+N_{TxHGroup2\_ANT})\times N_{RxVGroup}$) virtual array elements are arranged in lines at a spacing of $D_H$ in the horizontal direction, and (0.5×$(N_{RxVGroup1\_ANT}+N_{RxVGroup2\_ANT})\times N_{TxHGroup}$) virtual array elements are arranged in lines at a spacing of $D_V$ in the vertical direction. $(0.5\times(N_{TxHGroup1\_ANT}+N_{TxHGroup2\_ANT})\times N_{RxVGroup}-2)$ virtual array elements are arranged at a spacing of $D_H$ in the horizontal direction, and (0.5× $(N_{RxVGroup1\_ANT}+N_{RxVGroup2\_ANT})\times N_{TxHGroup}-2)$ virtual array elements are arranged at a spacing of $D_V$ in the vertical direction.

As the virtual array elements densely arranged at a spacing of $D_H$ and a spacing of $D_V$ around the center of the virtual reception array increases, the effect of reducing grating lobes and side lobes is improved.

As the number $N_{TxHGroup(ntvg)\_ANT}$ of transmission antennas included in each transmission antenna group and/or the number $N_{RxVGroup}$ of reception antenna groups increases, the number of virtual array elements arranged in the horizontal direction increases, so the horizontal aperture length of the virtual reception array is expanded, and horizontal angular resolution is improved. Similarly, as the number $N_{RxVGroup(nrhg)\_ANT}$ of reception antennas included in each reception antenna group and/or the number $N_{TxHGroup}$ of transmission antenna groups increases, the number of virtual array elements arranged in the vertical direction increases, so the vertical aperture length of the virtual reception array is expanded, and vertical angular resolution is improved.

In Modification 2 of basic arrangement 3, an arrangement that is a combination of the arrangement method 3-2A and the arrangement method 3-2B is also possible.

Figure 67:
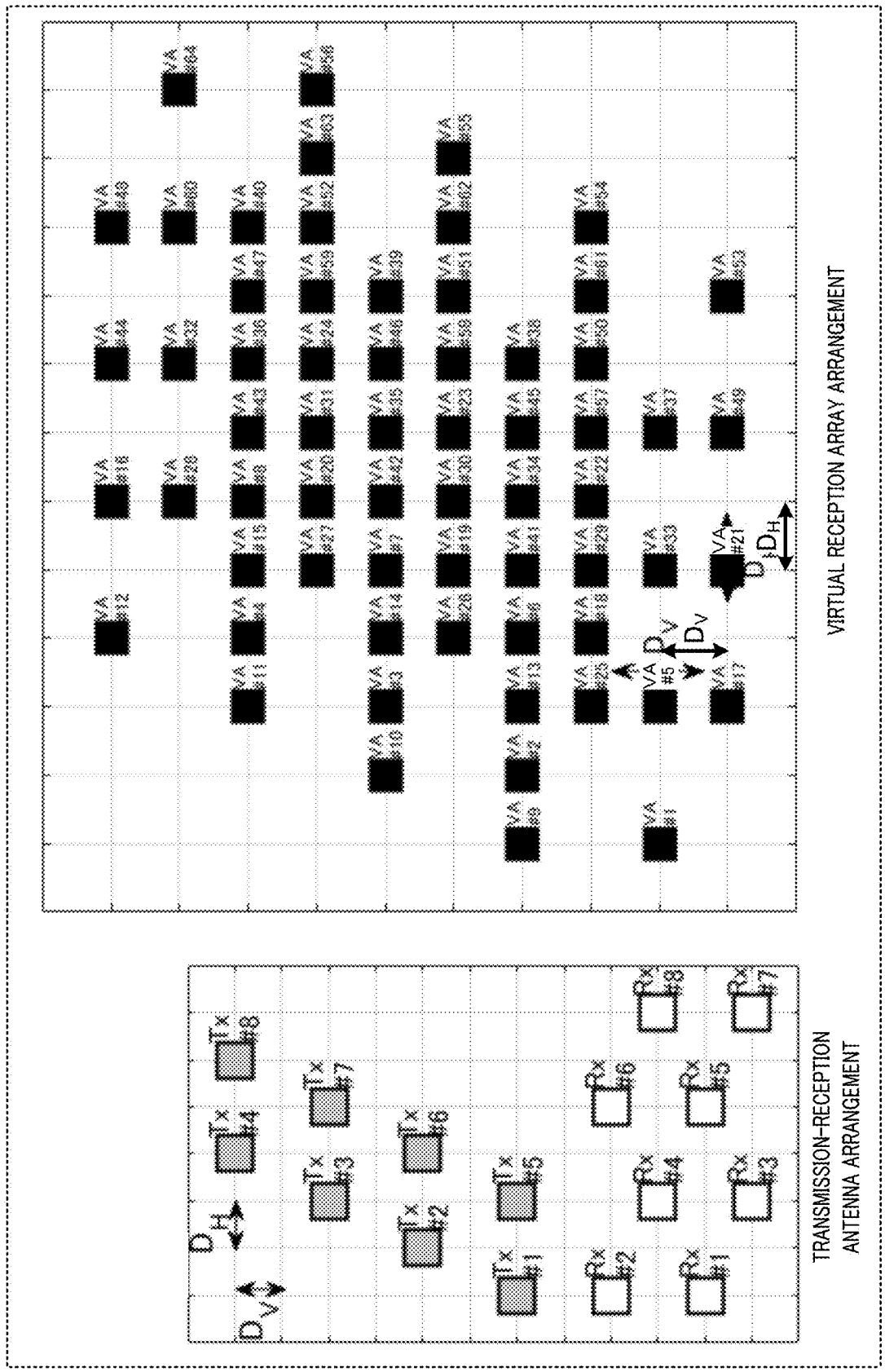
FIG. 67 is a diagram showing an example of an antenna arrangement according to Modification 2 of basic arrangement 3.

FIG. 67 shows an example of a MIMO array arrangement in the case where $N_{RxVGroup}=N_{TxHGroup}=4$, $N_{TxHGroup1\_ANT}=N_{TxHGroup2\_ANT}=N_{TxHGroup3\_ANT}=N_{TxHGroup4\_ANT}=2$, $N_{RxVGroup1\_ANT}=N_{RxVGroup2\_ANT}=N_{RxVGroup3\_ANT}=N_{RxVGroup4\_ANT}=2$ and an example of the arrangement of a virtual reception array. In FIG. 67, in the expression 15 $D_{TxHGroupV}=2D_V$, and, in the expression 16, $D_{RxVGroupH}=2D_H$.

In FIG. 67, the shift amount $\Delta H_{Tx(2,1)}$ of a second transmission antenna group (Tx #3 and Tx #7) with respect to a first transmission antenna group (Tx #4 and Tx #8) is set to $-D_H$, the shift amount $\Delta H_{Tx(3,2)}$ of a third transmission antenna group (Tx #2 and Tx #6) with respect to the second transmission antenna group is set to $-D_H$, and the shift amount $\Delta H_{Tx(4,3)}$ of a fourth transmission antenna group (Tx #1 and Tx #5) with respect to the third transmission antenna group is set to $-D_H$. Each shift amount may be any combination of two types ($+D_V$, $-D_V$).

In FIG. 67, the shift amount $\Delta V_{Rx(2,1)}$ of a second reception antenna group (Rx #3 and Rx #4) with respect to a first reception antenna group (Rx #1 and Rx #2) is set to $-D_V$, the shift amount $\Delta V_{Rx(3,7)}$ of a third reception antenna group (Rx #5 and Rx #6) with respect to the second reception antenna group is set to $+D_V$, and the shift amount $\Delta V_{Rx(4,3)}$ of a fourth reception antenna group (Rx #7 and Rx #8) with respect to the third reception antenna group is set to $-D_V$. Each shift amount may be any combination of two types ($+D_V$, $-D_V$).

In FIG. 67, $+D_V$ direction is the upper side, $-D_V$ direction is the lower side, $+D_H$ direction is the right-hand side, and $-D_H$ direction is the left-hand side.

Figure 68A:
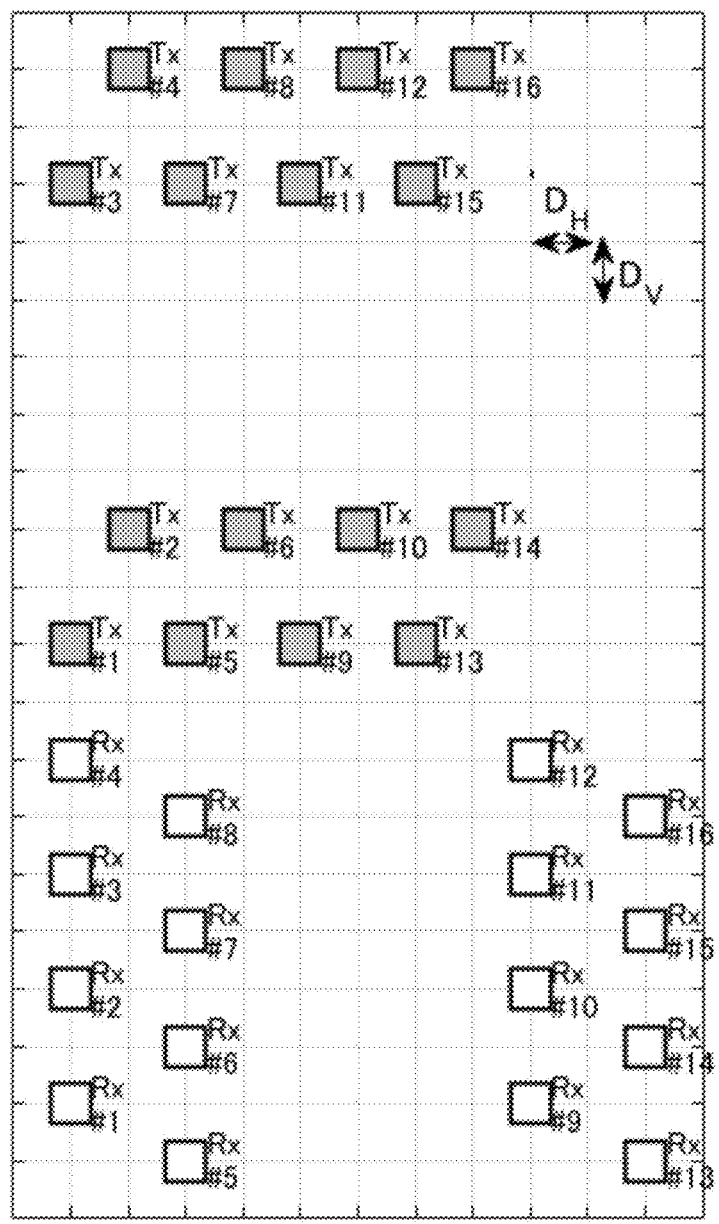
FIG. 68A is a diagram showing an example of an antenna arrangement according to Modification 2 of basic arrangement 3.
Figure 68B:
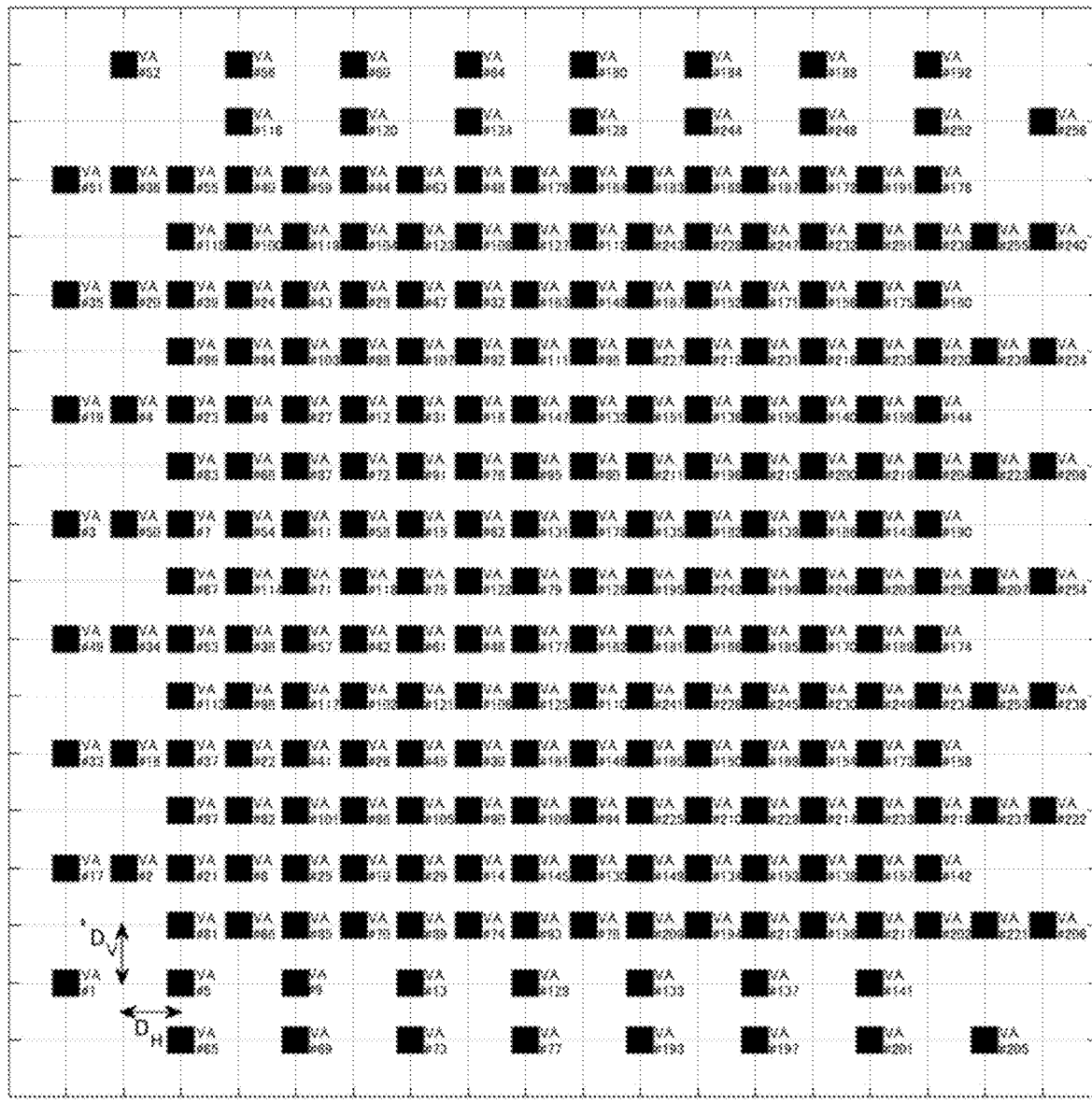
FIG. 68B is a diagram showing an example of an antenna arrangement according to Modification 2 of basic arrangement 3.

FIG. 68A shows an example of a MIMO array arrangement in the case where $N_{RxVGroup}=N_{TxHGroup}=4$, $N_{TxHGroup1\_ANT}=N_{TxHGroup2\_ANT}=N_{TxHGroup3\_ANT}=N_{TxHGroup4\_ANT}=4$, $N_{RxVGroup1\_ANT}=N_{RxVGroup2\_ANT}=N_{RxVGroup3\_ANT}=N_{RxVGroup4\_ANT}=4$. FIG. 68B shows an example of the arrangement of a virtual reception array. In FIG. 68A, in the expression 15, $D_{TxHGroupV}=6D_V$, and, in the expression 16, $D_{RxVGroupH}=6D_H$.

In FIG. 68A, the shift amount $\Delta H_{Tx(2,1)}$ of a second transmission antenna group (Tx #3, Tx #7, Tx #11, and Tx #15) with respect to a first transmission antenna group (Tx #4, Tx #8, Tx #12, and Tx #16) is set to $-D_H$, the shift amount $\Delta H_{Tx(3,2)}$ of a third transmission antenna group (Tx #2, Tx #6, Tx #10, and Tx #14) with respect to the second transmission antenna group is set to $+D_H$, and the shift amount $\Delta H_{Tx(4,3)}$ of a fourth transmission antenna group (Tx #1, Tx #5, Tx #9, and Tx #13) with respect to the third transmission antenna group is set to $-D_H$. Each shift amount may be any combination of two types ($+D_V$, $-D_V$).

In FIG. 68A, the shift amount $\Delta V_{Rx(2,1)}$ of a second reception antenna group (Rx #5, Rx #6, Rx #7, and Rx #8) with respect to a first reception antenna group (Rx #1, Rx #2, Rx #3, and Rx #4) is set to $-D_V$, the shift amount $\Delta V_{Rx(3,2)}$ of a third reception antenna group (Rx #9, Rx #10, Rx #11, and Rx #12) with respect to the second reception antenna group is set to $+D_V$, and the shift amount $\Delta V_{Rx(4,3)}$ of a fourth reception antenna group (Rx #13, Rx #14, Rx #15, and Rx #16) with respect to the third reception antenna group is set to $-D_V$. Each shift amount may be any combination of two types ($+D_V$, $-D_V$).

In FIGS. 68A and 68B, $+D_V$ direction is the upper side, $-D_V$ direction is the lower side, $+D_H$ direction is the right-hand side, and $-D_H$ direction is the left-hand side.

Basic Arrangement 4

Figure 69:
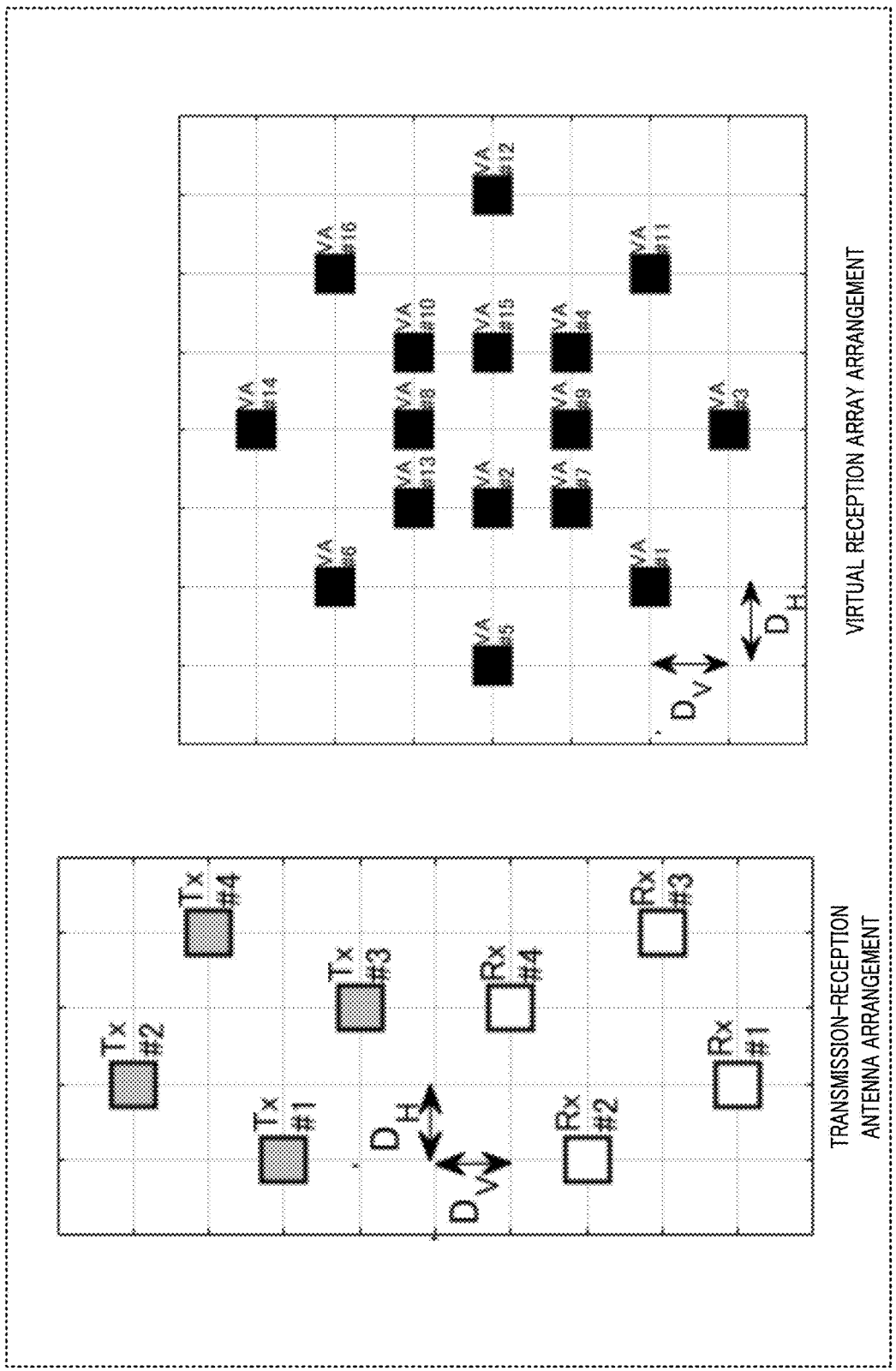
FIG. 69 is a diagram showing an example of an antenna arrangement according to basic arrangement 4.

FIG. 69 shows an example of the arrangement of transmission antennas 106 and reception antennas 202 and an example of the arrangement of a virtual reception array according to basic arrangement 4.

(1) Arrangement of Transmission-Reception Antenna

In FIG. 69, the number Nt of transmission antennas 106 in the transmission array antenna is four (Tx #1, Tx #2, Tx #3, and Tx #4), and the number Na of reception antennas 202 in the reception array antenna is four (Rx #1, Rx #2, Rx #3, and Rx #4).

The transmission array antenna shown in FIG. 69 is made up of, for example, a first transmission antenna group (Tx #2 and Tx #4 in FIG. 69) and a second transmission antenna group (Tx #1 and Tx #3 in FIG. 69). Each transmission antenna group includes two transmission antenna elements of which the horizontal spacing is $2D_H$ and the vertical spacing is $D_V$. In each of the transmission antenna groups shown in FIG. 69, any adjacent transmission antennas are arranged at a spacing of $2D_H$ (in other words, twice as long as the spacing of $D_H$) apart in the horizontal direction and arranged at a spacing of $D_V$ apart in the vertical direction. In other words, in FIG. 69, the transmission antennas included in each transmission antenna group are linearly arranged to the lower right diagonal side (in other words, to the upper left diagonal side) at an antenna spacing of $2D_H$ in the horizontal direction and an antenna spacing of $D_V$ in the vertical direction.

In FIG. 69, the second transmission antenna group is arranged with a shift of $D_H$ to the left-hand side in the horizontal direction and arranged with a shift of $2D_V$ to the lower side in the vertical direction with respect to the first transmission antenna group. In other words, the adjacent transmission antenna groups shown in FIG. 69 are in a relationship shifted by a spacing of $D_H$ in the horizontal direction and $2D_V$ (in other words, twice as long as the spacing of $D_V$) in the vertical direction.

The reception array antenna shown in FIG. 69 is made up of a first reception antenna group (Rx #2 and Rx #4 in FIG. 69) and a second reception antenna group (Rx #1 and Rx #3 in FIG. 69). Each reception antenna group includes two reception antenna elements of which the horizontal antenna spacing is $2D_H$ and the vertical antenna spacing is $D_V$. In each of the reception antenna groups shown in FIG. 69, any adjacent reception antennas are arranged at a spacing of $2D_H$ (in other words, twice as long as the spacing of $D_H$) apart in the horizontal direction and arranged at a spacing of $D_V$ apart in the vertical direction. In other words, in FIG. 69, the reception antennas included in each reception antenna group are linearly arranged to the upper right diagonal side (in other words, to the lower left diagonal side) at an antenna spacing of $2D_H$ in the horizontal direction and an antenna spacing of $D_V$ in the vertical direction.

In FIG. 69, the second reception antenna group is arranged so as to be shifted by $D_H$ to the right-hand side in the horizontal direction and arranged so as to be shifted by $2D_V$ to the lower side in the vertical direction with respect to the first reception antenna group. In other words, the adjacent reception antenna groups shown in FIG. 69 are in a relationship shifted by a spacing of $D_H$ in the horizontal direction and $2D_V$ (in other words, twice as long as the spacing of $D_V$) in the vertical direction.

For example, as shown in FIG. 69, transmission antennas Tx #1 to Tx #4 are arranged at different positions in both the horizontal direction and the vertical direction. Similarly, as shown in FIG. 69, reception antennas Rx #1 to Rx #4 are arranged at different positions in both the horizontal direction and the vertical direction.

In the transmission-reception antenna arrangement shown in FIG. 69, the arrangement positions of the transmission antennas and the arrangement positions of the reception antennas are, for example, in a linear symmetry (in other words, an inverted relationship) with respect to a line parallel to the horizontal direction or the vertical direction.

For example, it is assumed that the horizontal direction (cross direction) shown in FIG. 69 corresponds to X-axis, and the vertical direction (longitudinal direction) shown in FIG. 69 corresponds to Y-axis direction.

In the case of the antenna arrangement shown in FIG. 69, the position coordinates of each of transmission antennas 106 that make up the transmission array antenna are expressed as the position coordinates $(X_{T\_\#2}, Y_{T\_\#2})=(X_{T\_\#1}+D_H, Y_{T\_\#1}+2D_V)$ of transmission antenna Tx #2, the position coordinates $(X_{T\_\#2}, Y_{T\_\#3})=(X_{T\_\#1}+2D_H, Y_{T\_\#1}-D_V)$ of transmission antenna Tx #3, and the position coordinates $(X_{T\_\#4}, Y_{T\_\#2})=(X_{T\_\#1}+3D_H, Y_{T\_\#1}+D_V)$ of transmission antenna Tx #4 with reference to the position coordinates $(X_{T\_\#1}, Y_{T\_\#1})$ of transmission antenna Tx #1.

Similarly, the position coordinates of each of reception antennas 202 that make up the reception array antenna are expressed as the position coordinates $(X_{R\_\#2}, Y_{R\_\#2})=(X_{R\_\#1}-D_H, Y_{R\_\#1}+2D_V)$ of reception antenna Rx #2, the position coordinates $(X_{R\_\#3}, Y_{R\_\#3})=(X_{R\_\#1}+2D_H, Y_{R\_\#1}+D_V)$ of reception antenna Rx #3, and the position coordinates $(X_{R\_\#4}, Y_{R\_\#4})=(X_{R\_\#1}+D_H, Y_{R\_\#1}+3D_V)$ of reception antenna Rx #4 with reference to the position coordinates $(X_{R\_\#1}, Y_{R\_\#1})$ of reception antenna Rx #1.

(2) Arrangement of Virtual Reception Array

The arrangement of the virtual reception array (virtual antennas VA #1 to VA #16), provided in accordance with the above-described transmission-reception antenna arrangement shown in FIG. 69, has the following features.

With the arrangement of the transmission array antenna and the arrangement of the reception array antenna, shown in FIG. 69, each set of the position coordinates $(X_{V\_\#1}, Y_{V\_\#1})$ to $(X_{V\_\#16}, Y_{V\_\#16})$ of virtual reception arrays VA #1 to VA #16 is as follows. Here, VA #1 is expressed as the position reference (0, 0) of the virtual reception array.

(0, 0), $(D_H, 2D_V)$, $(2D_H, -D_V)$, $(3D_H, D_V)$, $(-D_H, 2D_V)$, (0, $4D_V$), $(D_H, D_V)$, $(2D_H, 3D_V)$, $(2D_H, D_V)$, $(3D_H, 3D_V)$, $(4D_H, 0)$, $(5D_H, 2D_V)$, $(D_H, 3D_V)$, $(2D_H, 5D_V)$, $(3D_H, 2D_V)$, and $(4D_H, 4D_V)$ In this way, in the arrangement of the virtual reception array shown in FIG. 69, the virtual reception array elements are arranged at different positions without any overlap. For this reason, the aperture length of the virtual reception array is expanded, so the main lobe narrows, and angular resolution is improved.

Virtual array elements VA #2, VA #7, VA #9, VA #4, VA #15, VA #10, VA #8, and VA #13 positioned around the center of the virtual reception array shown in FIG. 69 are densely arranged at a spacing of $D_H$ in the horizontal direction and a spacing of $D_V$ in the vertical direction. For example, in FIG. 69, when the spacing $D_H$ and the spacing $D_V$ are set to about 0.5λ, virtual array elements VA #2, VA #7, VA #9, VA #4, VA #15, VA #10, VA #8, and VA #13 are arranged at a spacing of $D_H$=0.5λ in the horizontal direction and a spacing of $D_V$=0.5λ in the vertical direction. With this configuration, as in the case of basic arrangement 1 (see, for example, FIG. 8), grating lobes are reduced.

Elements at positions corresponding to coordinates surrounded by the virtual array elements (for example, VA #2, VA #7, VA #9, VA #4, VA #15, VA #10, VA #8, and VA #13) densely arranged at a spacing of $D_H$ and a spacing of $D_V$ are missing around the center of the virtual reception array shown in FIG. 69. Radar apparatus 10 is capable of approximately receiving received signals of the elements at the missing portion by, for example, performing interpolation using received signals of the virtual array elements densely arranged at a spacing of $D_H$ and a spacing of $D_V$ and surrounding the missing portion.

For example, in a MIMO array arrangement of basic arrangement 4, when the spacing $D_H$ and the spacing $D_V$ are set to about 0.5λ the horizontal and vertical element sizes of each transmission antenna 106 and each reception antenna 202 can be designed to a size greater than or equal to about 1λ.

Figure 70A:
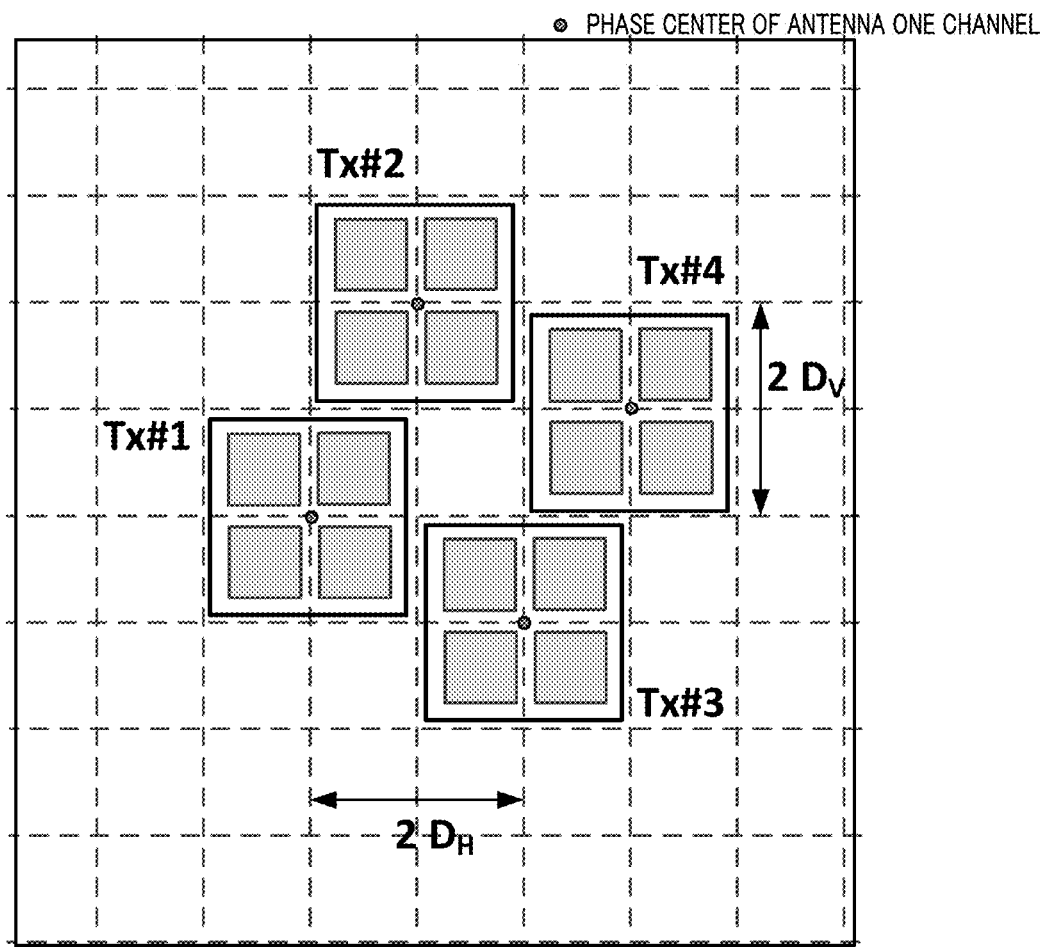
FIG. 70A is a diagram showing a configuration example of a transmission array antenna using sub-arrays according to basic arrangement 4.

With this configuration, for example, an antenna using four elements that are planar patch antennas arranged in a two by two matrix as a sub-array (where the antenna width $W_{ANT}$<$2D_H$, and the antenna height $H_{ANT}$<$2D_V$) as shown in FIG. 9A is applicable to each antenna element of at least one of the transmission array antenna and the reception array antenna shown in FIG. 69. For example, FIG. 70A shows an example in which a sub-array in which planar patch antennas are arranged in a two by two matrix as shown in FIG. 9A is applied to the transmission antenna arrangement shown in FIG. 69.

Figure 70B:
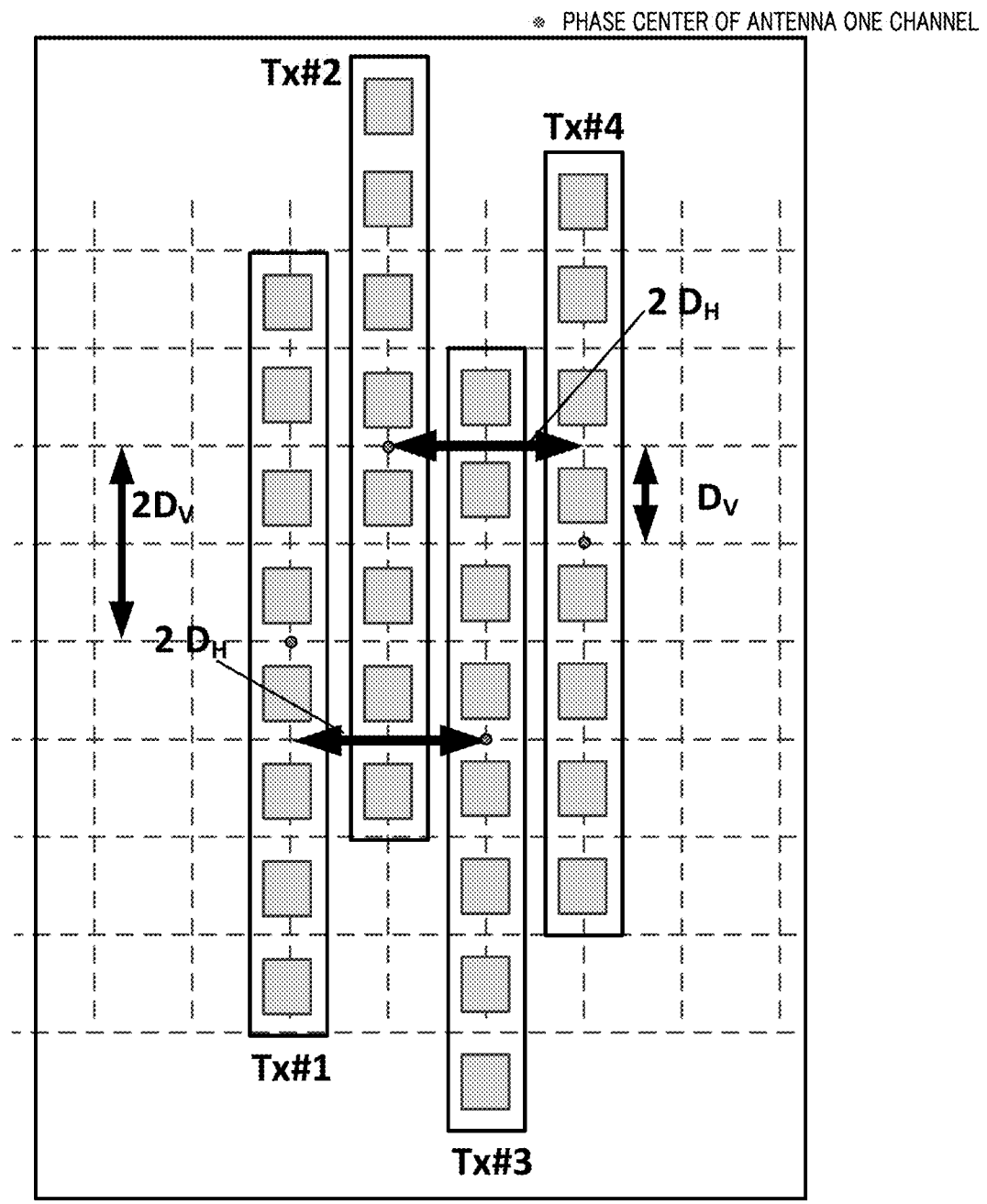
FIG. 70B is a diagram showing a configuration example of a transmission array antenna using sub-arrays according to basic arrangement 4.

In each transmission antenna 106 and each reception antenna 202, when the element size in the cross direction $W_{ANT}$ is less than $D_H$, an antenna with any size in the longitudinal direction may be used. For example, FIG. 70B shows an example in which a sub-array in which planar patch antennas are arranged in a one by eight matrix as shown in FIG. 25A is applied to the antenna arrangement shown in FIG. 69. In addition to the transmission array antenna shown in FIG. 70B, passive elements (dummy elements) may be arranged (not shown).

In this way, in the antenna arrangement according to basic arrangement 4, when the antenna having a sub-array configuration is used, the directivity gain of the antenna is improved, and the detection performance (for example, detection distance) of radar apparatus 10 is improved.

Direction estimator 214 performs direction estimation processing in the horizontal direction and in the vertical direction by using received signals of the virtual reception array obtained from the above-described transmission-reception antenna arrangement. Processing on the virtual reception array of basic arrangement 4 in direction estimator 214 is similar to that of basic arrangement 1, so the description thereof will not be repeated here.

Figure 71:
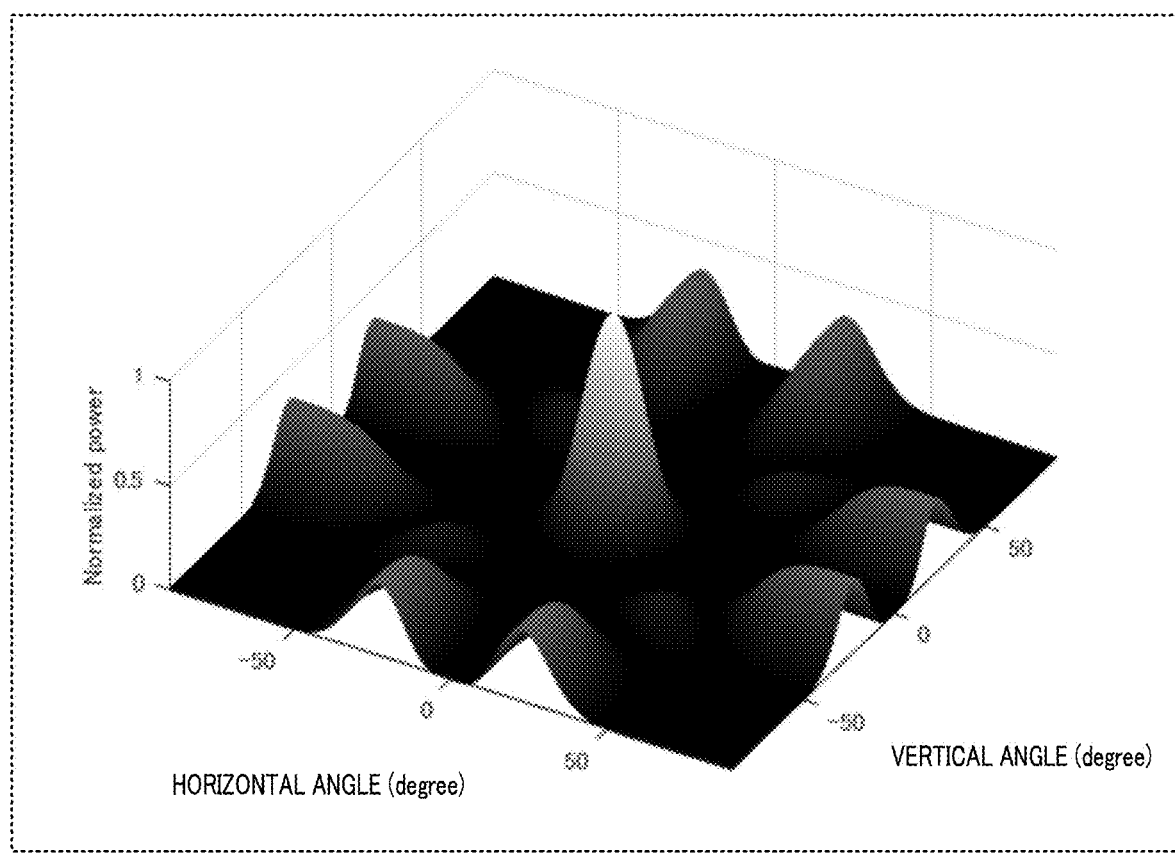
FIG. 71 is a diagram showing an example of a direction estimation result using a transmission-reception antenna arrangement according to basic arrangement 4.

FIG. 71 shows an example of a direction estimation result in the case where, when, for example, the MIMO array arrangement in which the number Nt of transmission antennas 106 is four and the number Na of reception antennas 202 is four ($D_H$=0.5λ, and $D_V$=0.5λ) is used as shown in FIG. 69, a beam former method is used as the direction-of-arrival estimation algorithm of direction estimator 214. In other words, in FIG. 71, the horizontal and vertical antenna spacings of each transmission antenna 106 are greater than or equal to 1λ and the horizontal and vertical antenna spacings of each reception antenna 202 are also greater than or equal to 1λ. The directivity of each antenna is calculated as omnidirectivity.

In FIG. 71, outputs of the direction-of-arrival estimation evaluation function value in the range of ±90 degrees in the horizontal direction and in the range of ±90 degrees in the vertical direction in the case where a target true value is set at zero degrees in the horizontal direction and zero degrees in the vertical direction are plotted.

It is identified in FIG. 71 that, at directions other than zero degrees in the horizontal direction or zero degrees in the vertical direction, grating lobes are reduced as compared to FIG. 1A. For example, in FIG. 71, the ratio (PSLR) of the peak power level of the highest side lobe, other than a main lobe, at directions other than zero degrees in the horizontal direction or zero degrees in the vertical direction, to the peak power level of the main lobe at the direction of zero degrees in the horizontal direction and zero degrees in the vertical direction is about 0.35.

As described above, when the MIMO array arrangement according to basic arrangement 4 is used, even the element size of each antenna in the longitudinal direction or in the cross direction, used for the transmission array antenna and the reception array antenna, is about 1λ, the arrangement can be performed such that the horizontal and vertical antenna spacings in the virtual reception array include an interelement spacing of about 0.5λ, so grating lobes are reduced. For example, the virtual array elements of the virtual reception array shown in FIG. 69 are arranged without any overlap, so the aperture length of the virtual reception array is expanded, and angular resolution is improved.

Modification 1 of Basic Arrangement 4

In basic arrangement 4 (for example, FIG. 69), the case where the number of transmission antennas 106 is four (Nt=4) and the number of reception antennas 202 is four (Na=4) has been described. The number Nt of transmission antennas and the number Na of reception antennas are not limited to these numbers.

In Modification 1 of basic arrangement 4, for example, the arrangement in which the number Nt of transmission antennas and the number Na of reception antennas are increased by using the antenna arrangement shown in FIG. 69 as a basic configuration will be described.

Hereinafter, each of antenna arrangement methods 4-1A, 4-1B, 4-1C, and 4-1D in Modification 1 of basic arrangement 4 will be described.

Arrangement Method 4-1A

For example, a transmission array antenna is made up of a first transmission antenna group and a second transmission antenna group. Each transmission antenna group includes a plurality of transmission antenna elements linearly arranged to the lower right diagonal side at an antenna spacing of $2D_H$ in the horizontal direction and an antenna spacing of $D_V$ in the vertical direction.

The second transmission antenna group is arranged so as to be shifted by $D_H$ to the left-hand side and arranged so as to be shifted by $2D_V$ to the lower side with respect to the first transmission antenna group.

Here, the number of transmission antennas included in the first transmission antenna group is denoted by $N_{TxLowerRightGr1\_ANT}$. For example, $N_{TxLowerRightGr1\_ANT} \geq 2$. Here, the number of transmission antennas included in the second transmission antenna group is denoted by $N_{TxLowerRightGr2\_ANT}$. For example, $N_{TxLowerRightGr2\_ANT} \geq 2$.

For example, a reception array antenna is made up of a first reception antenna group and a second reception antenna group. Each reception antenna group includes a plurality of reception antenna elements linearly arranged to the upper right diagonal side at a spacing of $2D_H$ in the horizontal direction and a spacing of $D_V$ in the vertical direction.

The second reception antenna group is arranged so as to be shifted by $D_H$ to the right-hand side and arranged so as to be shifted by $2D_V$ to the lower side with respect to the first reception antenna group.

Here, the number of reception antennas included in the first reception antenna group is denoted by $N_{RxUpperRightGr1\_ANT}$. For example, $N_{RxUpperRightGr1\_ANT} \geq 2$. Here, the number of reception antennas included in the second reception antenna group is denoted by $N_{RxUpperRightGr2\_ANT}$. For example, $N_{RxUpperRightGr2\_ANT} \geq 2$.

Figure 72:
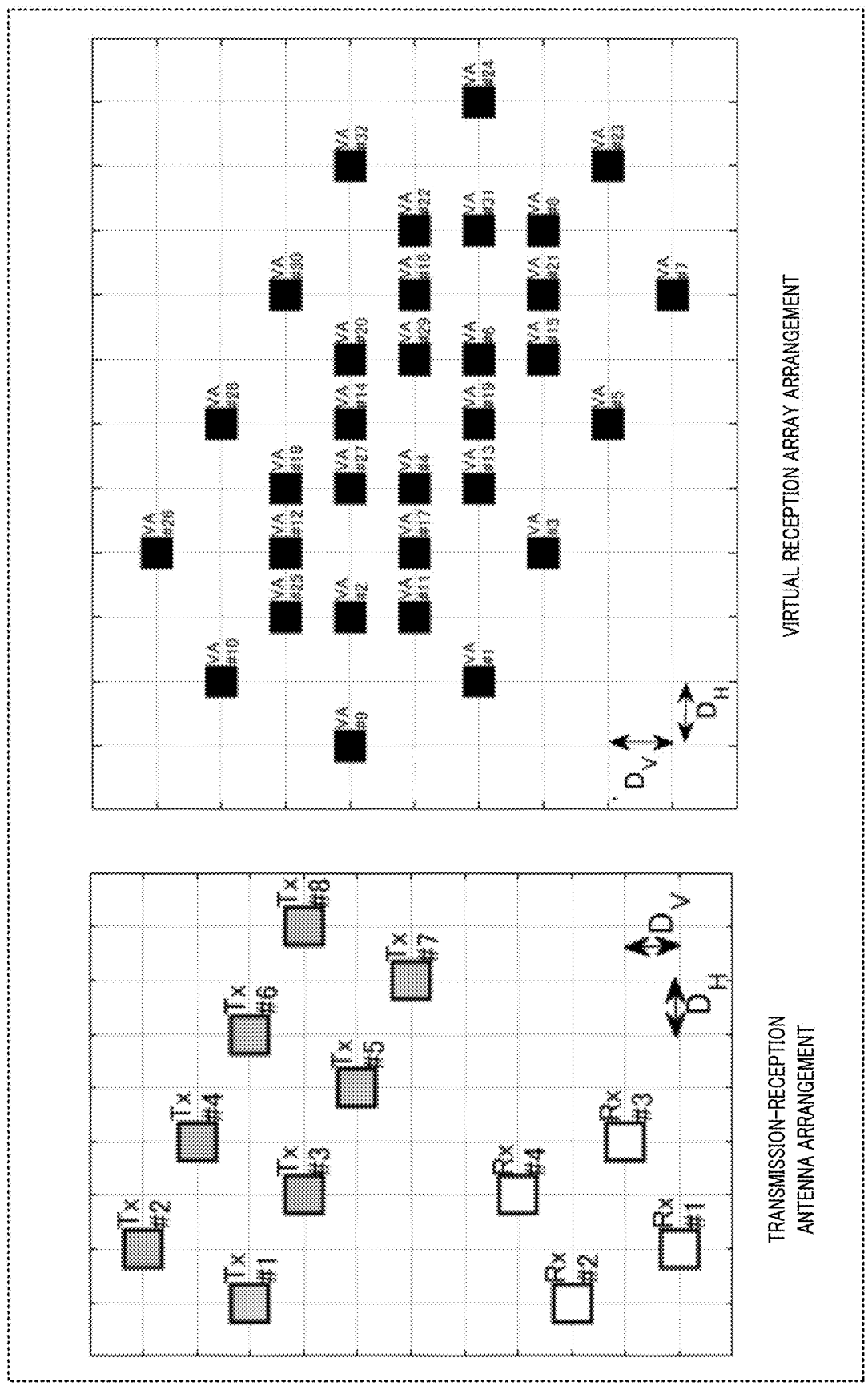
FIG. 72 is a diagram showing an example of an antenna arrangement according to Modification 1 of basic arrangement 4.

FIG. 72 shows an example of a MIMO array arrangement in the case where $N_{TxLowerRightGr1\_ANT}$=4 (Tx #2, Tx #4, Tx #6, and Tx #8), $N_{TxLowerRightGr2\_ANT}$=4 (Tx #1, Tx #3, Tx #5, and Tx #7), $N_{RxUpperRightGr1\_ANT}$=2 (Rx #2 and Rx #4), and $N_{RxUpperRightGr2\_ANT}$=2 (Rx #1 and Rx #3) and an example of the arrangement of a virtual reception array.

Figure 73:
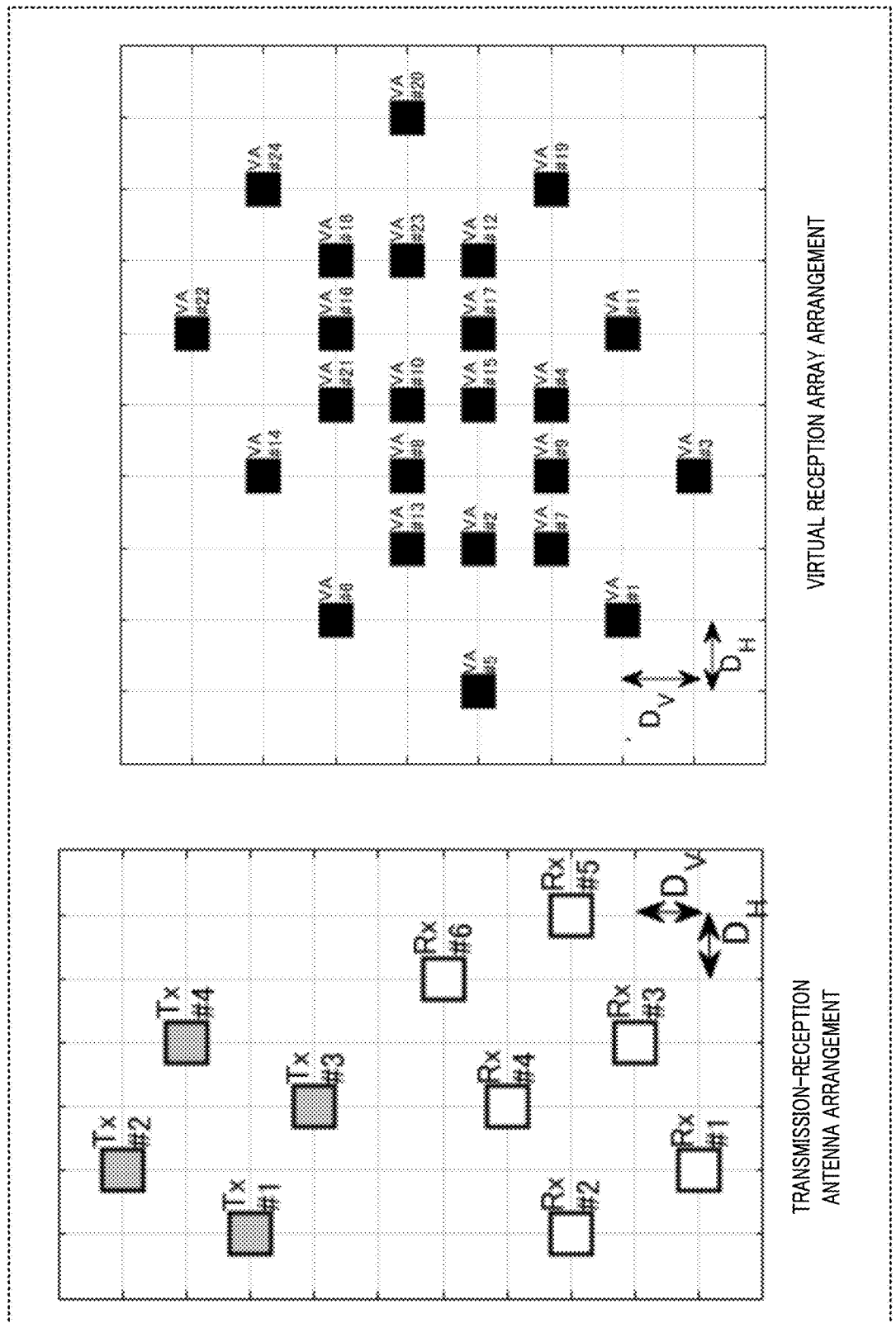
FIG. 73 is a diagram showing an example of an antenna arrangement according to Modification 1 of basic arrangement 4.

FIG. 73 shows an example of a MIMO array arrangement in the case where $N_{TxLowerRightGr1\_ANT}$=2 (Tx #2 and Tx #4), $N_{TxLowerRightGr2\_ANT}$=2 (Tx #1 and Tx #3), $N_{RxUpperRightGr1\_ANT}$=3 (Rx #2, Rx #4, and Rx #6), and $N_{RxUpperRightGr2\_ANT}$=3 (Rx #1, Rx #3, and Rx #5) and an example of the arrangement of a virtual reception array.

Figure 74:
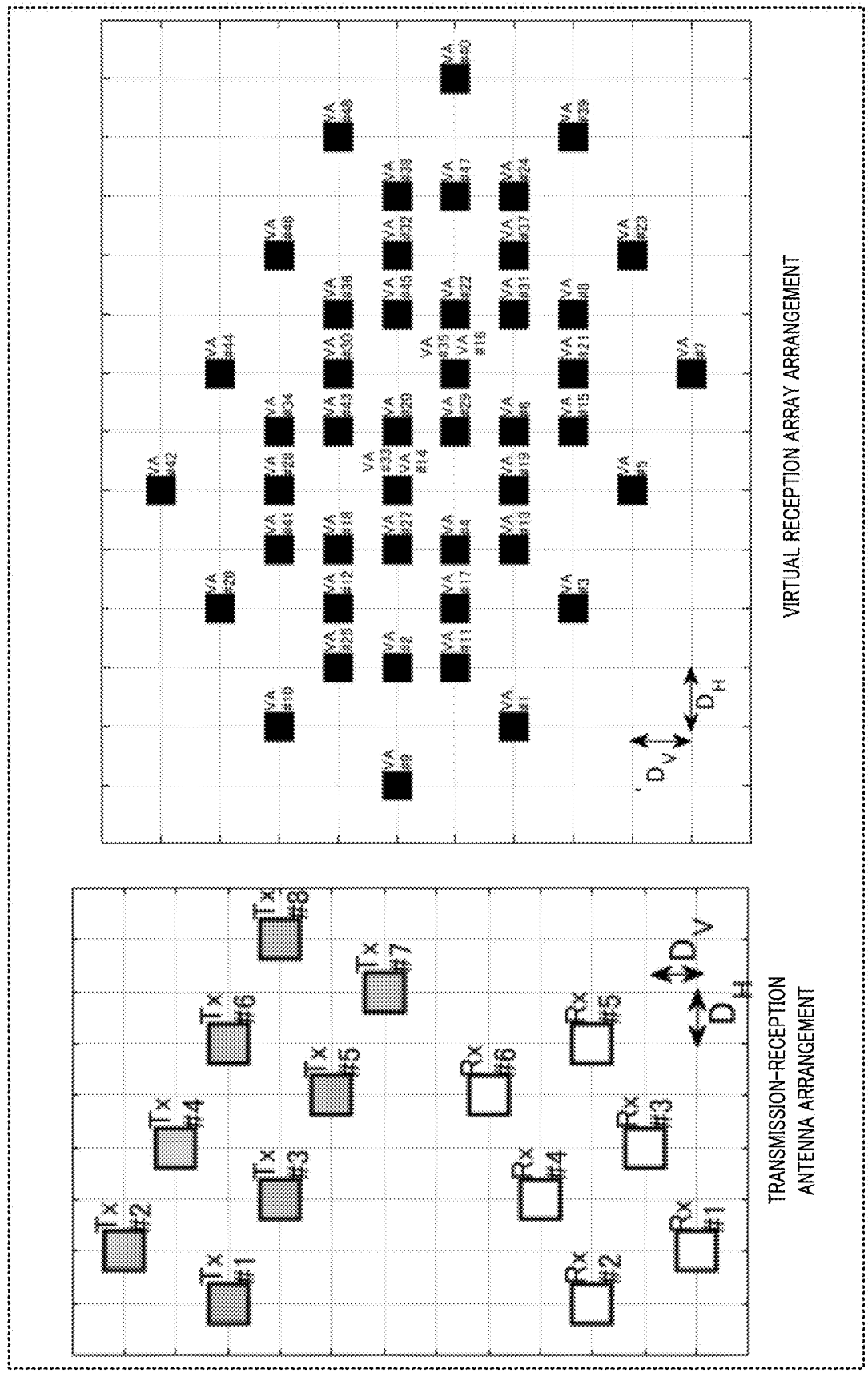
FIG. 74 is a diagram showing an example of an antenna arrangement according to Modification 1 of basic arrangement 4.

FIG. 74 shows an example of a MIMO array arrangement in the case where $N_{TxLowerRightGr1\_ANT}=4$ (Tx #2, Tx #4, Tx #6, and Tx #8), $N_{TxLowerRightGr2\_ANT}=4$ (Tx #1, Tx #3, Tx #5, and Tx #7), $N_{RxUpperRightGr1\_ANT}=3$ (Rx #2, Rx #4, and Rx #6), and $N_{RxUpperRightGr2\_ANT}=3$ (Rx #1, Rx #3, and Rx #5) and an example of the arrangement of a virtual reception array.

In each of the MIMO array arrangements respectively shown in FIGS. 72, 73, and 74, when, for example, $D_H$ and $D_V$ are set to about $0.5\lambda$, the horizontal and vertical element sizes of each transmission antenna 106 and each reception antenna 202 can be designed to a size greater than or equal to about $1\lambda$.

For example, in each of the virtual reception arrays respectively shown in FIGS. 72, 73, and 74, some of the virtual array elements are arranged at overlap positions; however, the aperture length of the virtual reception array is expanded, so angular resolution is improved. In FIGS. 72 and 73, there is no overlap of virtual array elements, and, in FIG. 74, virtual array elements overlap at two portions.

The virtual array elements positioned around the center of each of the virtual reception arrays respectively shown in FIGS. 72, 73, and 74 are densely arranged at a spacing of $D_H$ and a spacing of $D_V$. As shown in FIGS. 72, 73, and 74, elements at positions corresponding to some coordinates are missing around the center of each virtual reception array. Radar apparatus 10 is capable of approximately receiving received signals of the missing elements by performing interpolation using received signals of the virtual array elements densely arranged at a spacing of $D_H$ and a spacing of $D_V$ and surrounding the missing portion.

The number of virtual array elements densely arranged around the center of each of the virtual reception arrays respectively shown in FIGS. 72, 73, and 74 increases depending on $N_{TxLowerRightGr1\_ANT}$, $N_{TxLowerRightGr2\_ANT}$, $N_{RxUpperRightGr1\_ANT}$, and $N_{RxUpperRightGr2\_ANT}$.

For example, in a virtual reception array, $((N_{TxLowerRightGr1\_ANT}+N_{TxLowerRightGr2\_ANT}+N_{RxUpperRightGr1\_ANT}+N_{RxUpperRightGr2\_ANT})-5)$ virtual array elements are arranged at a spacing of $D_H$ in the horizontal direction, and $(0.5\times(N_{TxLowerRightGr1\_ANT}+N_{TxLowerRightGr2\_ANT}+N_{RxUpperRightGr1\_ANT}+N_{RxUpperRightGr2\_ANT})-1)$ virtual array elements are arranged at a spacing of $D_V$ in the vertical direction. As the number of virtual array elements densely arranged at a spacing of $D_H$ and a spacing of $D_V$ in the virtual reception array increases, the effect of reducing grating lobes and side lobes is improved.

As $N_{TxLowerRightGr1\_ANT}$, $N_{TxLowerRightGr2\_ANT}$, $N_{RxUpperRightGr1\_ANT}$, and/or $N_{RxUpperRightGr2\_ANT}$ increases, the number of virtual array elements arranged in the horizontal direction and/or in the vertical direction increases, so the horizontal and/or vertical aperture length of the virtual reception array is expanded, and angular resolution in the horizontal direction and/or the vertical direction is improved.

Figure 75:
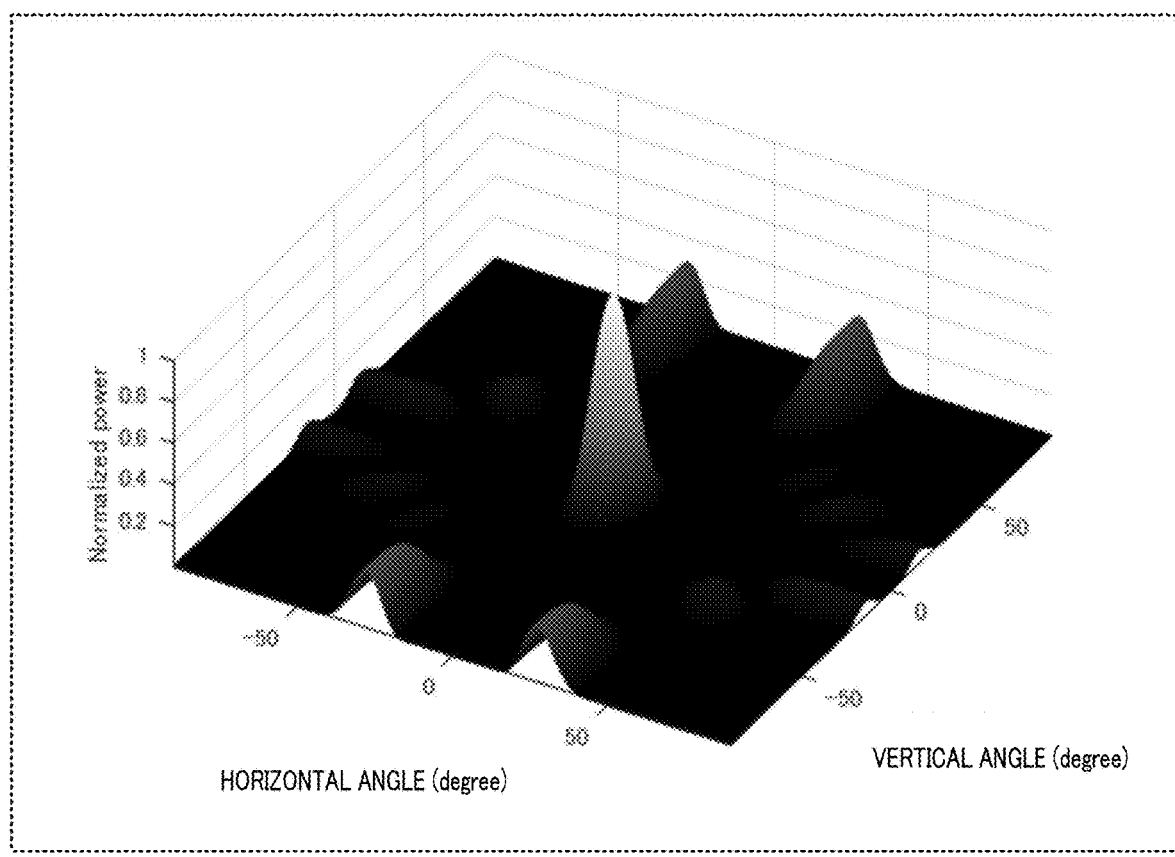
FIG. 75 is a diagram showing an example of a direction estimation result using a transmission-reception antenna arrangement according to Modification 1 of basic arrangement 4.

FIG. 75 shows an example of a direction estimation result in the case where, when, for example, the MIMO array arrangement in which the number Nt of transmission antennas 106 is eight and the number Na of reception antennas 202 is six ($N_{TxLowerRightGr1\_ANT}=N_{TxLowerRightGr2\_ANT}=4$, $N_{RxUpperRightGr1\_ANT}=N_{RxUpperRightGr2\_ANT}=3$, $D_H=0.5\lambda$ and $D_V=0.5\lambda$) is used as shown in FIG. 74, a beam former method is used as the direction-of-arrival estimation algorithm of direction estimator 214. The directivity of each antenna is calculated as omnidirectivity.

In FIG. 75, outputs of the direction-of-arrival estimation evaluation function value in the range of ±90 degrees in the horizontal direction and in the range of ±90 degrees in the vertical direction in the case where a target true value is set at zero degrees in the horizontal direction and zero degrees in the vertical direction are plotted.

It is identified in FIG. 75 that, at directions other than zero degrees in the horizontal direction or zero degrees in the vertical direction, grating lobes are reduced as compared to FIG. 1A. For example, in FIG. 75, the ratio (PSLR) of the peak power level of the highest side lobe, other than a main lobe, to the peak power level of the main lobe at the direction of zero degrees in the horizontal direction and zero degrees in the vertical direction is about 0.28. It is identified that, as compared to, for example, the configuration of basic arrangement 4 shown in FIG. 69 (in the case where $N_{TxLowerRightGr1\_ANT}=N_{TxLowerRightGr2\_ANT}=N_{RxUpperRightGr1\_ANT}=N_{RxUpperRightGr2\_ANT}=2$) (see, for example, FIG. 71), the effect of reducing side lobes is improved by increasing $N_{TxLowerRightGr1\_ANT}$, $N_{TxLowerRightGr2\_ANT}$, $N_{RxUpperRightGr1\_ANT}$, and $N_{RxUpperRightGr2\_ANT}$. It is identified in FIG. 75 that the peak of the main lobe is sharpened as compared to FIG. 71 and the angular resolution is improved as a result of an increase in $N_{TxLowerRightGr1\_ANT}$, $N_{TxLowerRightGr2\_ANT}$, $N_{RxUpperRightGr1\_ANT}$, and $N_{RxUpperRightGr2\_ANT}$.

As $N_{TxLowerRightGr1\_ANT}$, $N_{TxLowerRightGr2\_ANT}$, $N_{RxUpperRightGr1\_ANT}$, and/or $N_{RxUpperRightGr2\_ANT}$ increases, the horizontal aperture length of the virtual array is more expanded than in the vertical direction, with the result that a MIMO array configuration tends to further improve angular resolution in the horizontal direction as compared to angular resolution in the vertical direction.

Arrangement Method 4-1B

In arrangement method 4-1B, the case where the aperture length of a virtual reception array is expanded more in the vertical direction than in the horizontal direction will be described. With this configuration, a MIMO array configuration that further improves angular resolution in the vertical direction as compared to angular resolution in the horizontal direction is obtained.

For example, a transmission array antenna is made up of a first transmission antenna group and a second transmission antenna group. Each transmission antenna group includes a plurality of transmission antenna elements linearly arranged to the upper right diagonal side at an antenna spacing of $D_H$ in the horizontal direction and an antenna spacing of $2D_V$ in the vertical direction.

The second transmission antenna group is arranged so as to be shifted by $2D_H$ to the right-hand side and arranged so as to be shifted by $D_V$ to the lower side with respect to the first transmission antenna group.

Here, the number of transmission antennas included in the first transmission antenna group is denoted by $N_{TxUpperRightGr1\_ANT}$. For example, $N_{TxUpperRightGr1\_ANT} \geq 2$. Here, the number of transmission antennas included in the second transmission antenna group is denoted by $N_{TxUpperRightGr2\_ANT}$. For example, $N_{TxUpperRightGr2\_ANT} \geq 2$.

For example, a reception array antenna is made up of a first reception antenna group and a second reception antenna group. Each reception antenna group includes a plurality of reception antenna elements linearly arranged to the lower right diagonal side at an antenna spacing of $D_H$ in the horizontal direction and an antenna spacing of $2D_V$ in the vertical direction.

The second reception antenna group is arranged so as to be shifted by $2D_H$ to the left-hand side and arranged so as to be shifted by $D_V$ to the lower side with respect to the first reception antenna group.

Here, the number of reception antennas included in the first reception antenna group is denoted by $N_{RxLowerRightGr1\_ANT}$. For example, $N_{RxLowerRightGr1\_ANT} \geq 2$. Here, the number of reception antennas included in the second reception antenna group is denoted by $N_{RxLowerRightGr1\_ANT}$. For example, $N_{RxLowerRightGr2\_ANT} \geq 2$.

Figure 76:
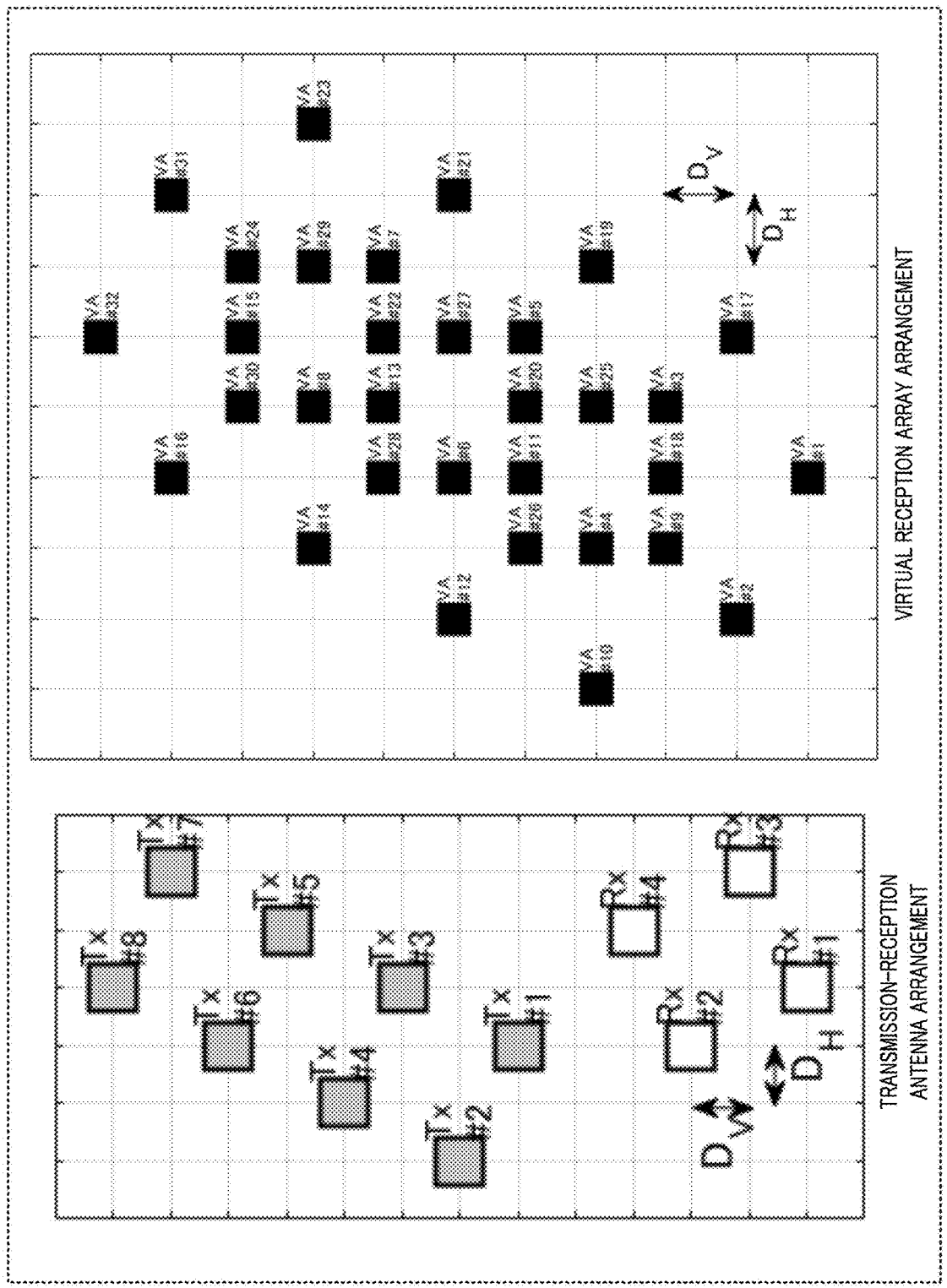
FIG. 76 is a diagram showing an example of an antenna arrangement according to Modification 1 of basic arrangement 4.

FIG. 76 shows an example of a MIMO array arrangement in the case where $N_{TxUpperRightGr1\_ANT}=4$ (Tx #2, Tx #4, Tx #6, and Tx #8), $N_{TxUpperRightGr2\_ANT}=4$ (Tx #1, Tx #3, Tx #5, and Tx #7), $N_{RxLowerRightGr1\_ANT}=2$ (Rx #4 and Rx #3), and $N_{RxLowerRightGr2\_ANT}=2$ (Rx #2 and Rx #1) and an example of the arrangement of a virtual reception array.

Figure 77:
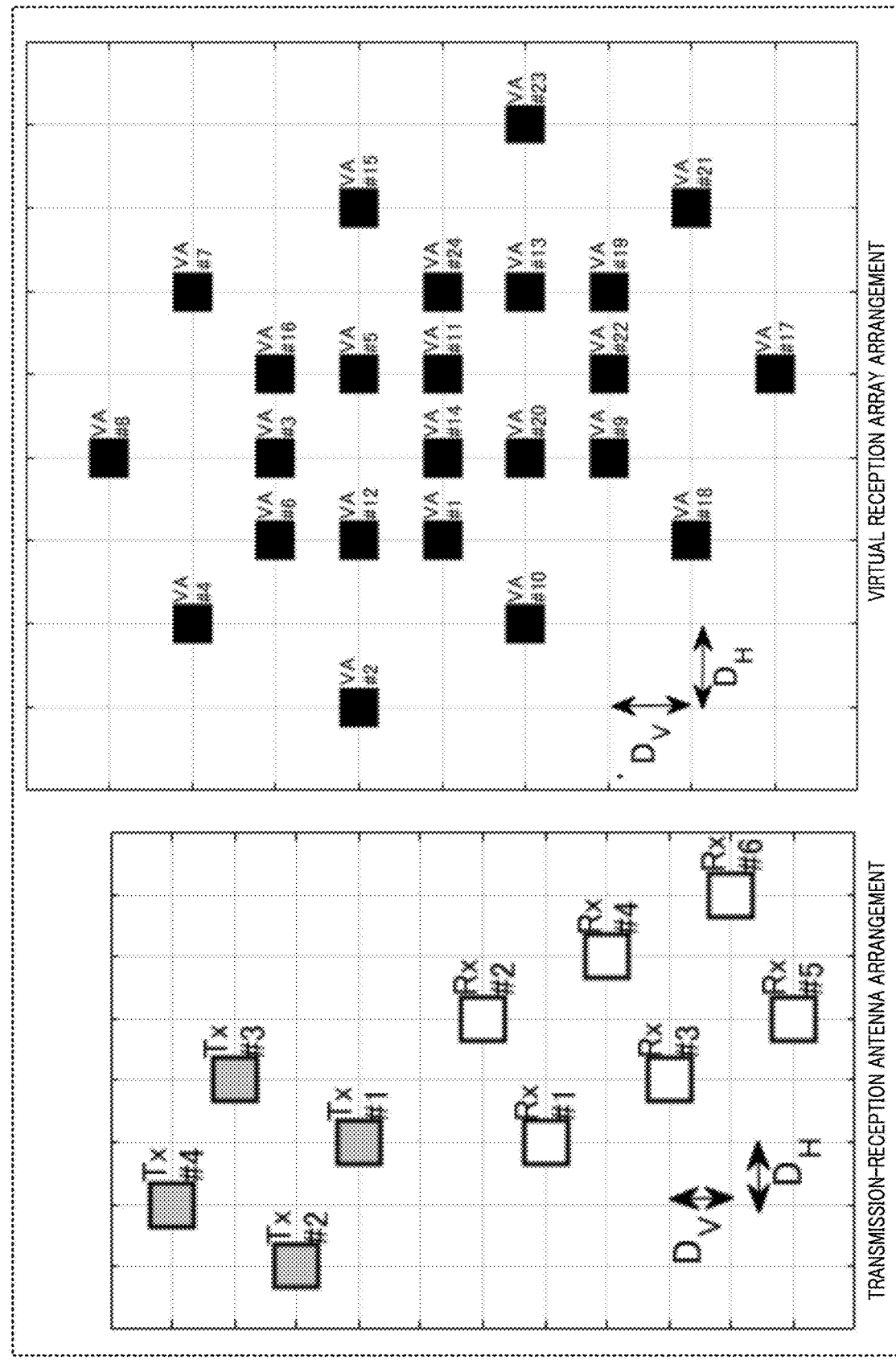
FIG. 77 is a diagram showing an example of an antenna arrangement according to Modification 1 of basic arrangement 4.

FIG. 77 shows an example of a MIMO array arrangement in the case where $N_{TxUpperRightGr1\_ANT}=2$ (Tx #2 and Tx #4), $N_{TxUpperRightGr2\_ANT}=2$ (Tx #1 and Tx #3), $N_{RxLowerRightGr1\_ANT}=3$ (Rx #2, Rx #4, and Rx #6), and $N_{RxLowerRightGr2\_ANT}$ (Rx #1, Rx #3, and Rx #5)=3 and an example of the arrangement of a virtual reception array.

Figure 78:
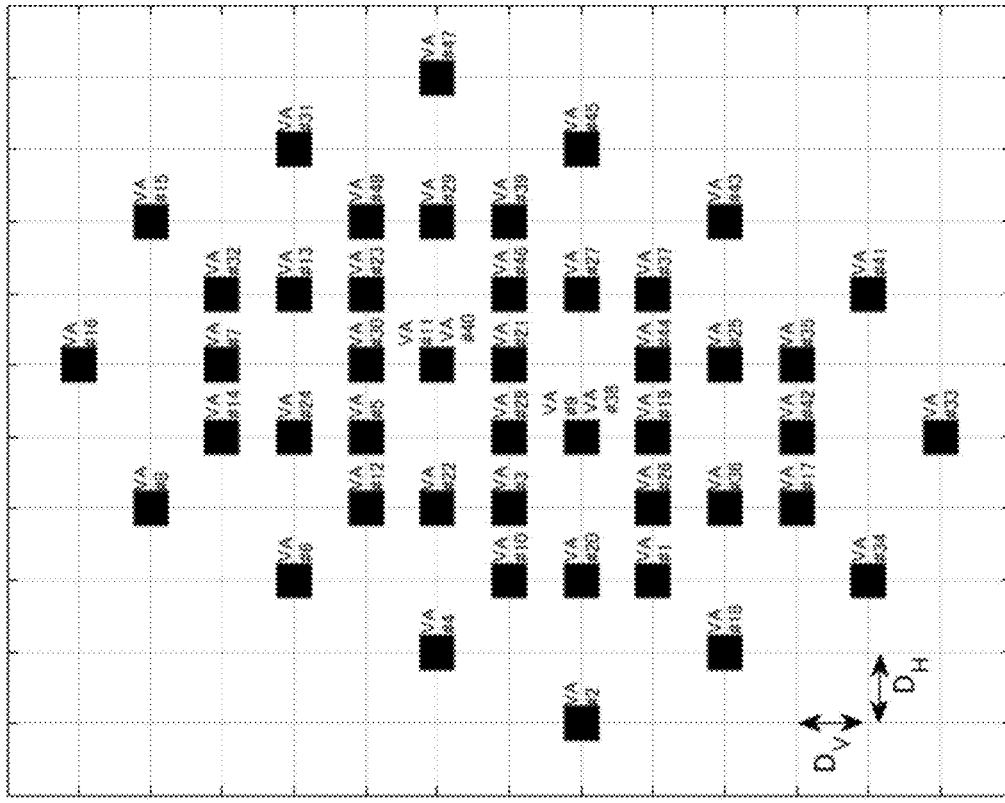
FIG. 78 is a diagram showing an example of an antenna arrangement according to Modification 1 of basic arrangement 4.
Figure 78:
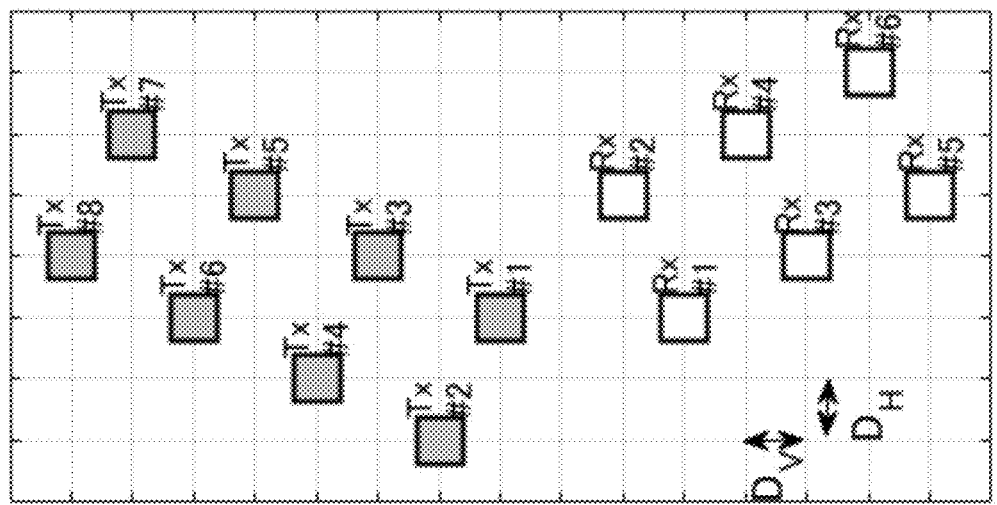

FIG. 78 shows an example of a MIMO array arrangement in the case where $N_{TxUpperRightGr1\_ANT}=4$ (Tx #2, Tx #4, Tx #6, and Tx #8), $N_{TxUpperRightGr2\_ANT}=4$ (Tx #1, Tx #3, Tx #5, and Tx #7), $N_{RxLowerRightGr1\_ANT}=3$ (Rx #2, Rx #4, and Rx #6), and $N_{RxLowerRightGr2\_ANT}=3$ (Rx #1, Rx #3, and Rx #5) and an example of the arrangement of a virtual reception array.

In each of the MIMO array arrangements respectively shown in FIGS. 76, 77, and 78, when, for example, $D_H$ and $D_V$ are set to about $0.5\lambda$, the horizontal and vertical element sizes of each transmission antenna 106 and each reception antenna 202 can be designed to a size greater than or equal to about $1\lambda$.

For example, in each of the virtual reception arrays respectively shown in FIGS. 76, 77, and 78, some of the virtual array elements are arranged at overlap positions; however, the aperture length of the virtual reception array is expanded, so angular resolution is improved. In FIGS. 76 and 77, there is no overlap of virtual array elements, and, in FIG. 78, virtual array elements overlap at two portions.

The virtual array elements positioned around the center of each of the virtual reception arrays respectively shown in FIGS. 76, 77, and 78 are densely arranged at a spacing of $D_H$ and a spacing of $D_V$. As shown in FIGS. 76, 77, and 78, elements at positions corresponding to some coordinates are missing around the center of each virtual reception array. Radar apparatus 10 is capable of approximately receiving received signals of the missing elements by performing interpolation using received signals of the virtual array elements densely arranged at a spacing of $D_H$ and a spacing of $D_V$ and surrounding the missing portion.

The number of virtual array elements densely arranged around the center of each of the virtual reception arrays respectively shown in FIGS. 76, 77, and 78 increases depending on $N_{TxUpperRightGr1\_ANT}$, $N_{TxUpperRightGr2\_ANT}$, $N_{RxLowerRightGr1\_ANT}$, and $N_{RxLowerRightGr2\_ANT}$.

For example, in a virtual reception array, ($0.5 \times (N_{TxUpperRightGr1\_ANT} + N_{TxUpperRightGr2\_ANT} + N_{RxLowerRightGr1\_ANT} + N_{RxLowerRightGr2\_ANT}) - 1$) virtual array elements are arranged at a spacing of $D_H$ in the horizontal direction, and (($N_{TxUpperRightGr1\_ANT} + N_{TxUpperRightGr2\_ANT} + N_{RxLowerRightGr1\_ANT} + N_{RxLowerRightGr2\_ANT}) - 5$) virtual array elements are arranged at a spacing of $D_V$ in the vertical direction. As the number of virtual array elements densely arranged at a spacing of $D_H$ and a spacing of $D_V$ in the virtual reception array increases, the effect of reducing grating lobes and side lobes is improved.

As $N_{TxUpperRightGr1\_ANT}$, $N_{TxUpperRightGr2\_ANT}$, $N_{RxLowerRightGr1\_ANT}$, and/or $N_{RxLowerRightGr2\_ANT}$ increases, the number of virtual array elements arranged in the horizontal direction and/or in the vertical direction increases, so the horizontal and/or vertical aperture length of the virtual reception array is expanded, and angular resolution in the horizontal direction and/or the vertical direction is improved.

Figure 79:
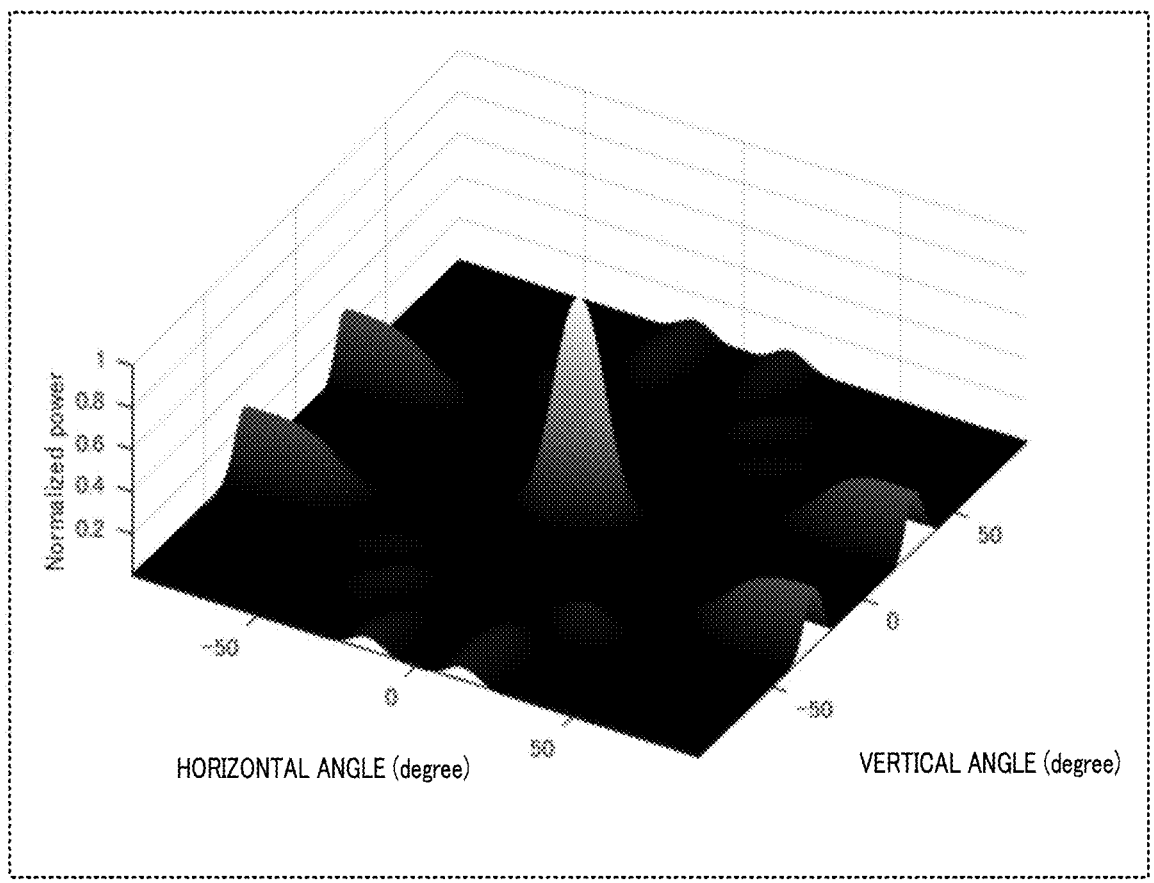
FIG. 79 is a diagram showing an example of a direction estimation result using a transmission-reception antenna arrangement according to Modification 1 of basic arrangement 4.

FIG. 79 shows an example of a direction estimation result in the case where, when, for example, the MIMO array arrangement in which the number Nt of transmission antennas 106 is eight and the number Na of reception antennas 202 is six ($N_{TxUpperRightGr1\_ANT} = N_{TxUpperRightGr2\_ANT} = 4$, $N_{RxLowerRightGr1\_ANT} = N_{RxLowerRightGr2\_ANT} = 3$, $D_H = 0.5\lambda$, and $D_V = 0.5\lambda$) is used as shown in FIG. 78, a beam former method is used as the direction-of-arrival estimation algorithm of direction estimator 214. The directivity of each antenna is calculated as omnidirectivity.

In FIG. 79, outputs of the direction-of-arrival estimation evaluation function value in the range of ±90 degrees in the horizontal direction and in the range of ±90 degrees in the vertical direction in the case where a target true value is set at zero degrees in the horizontal direction and zero degrees in the vertical direction are plotted.

It is identified in FIG. 79 that, at directions other than zero degrees in the horizontal direction or zero degrees in the vertical direction, grating lobes are reduced as compared to FIG. 1A. For example, in FIG. 79, the ratio (PSLR) of the peak power level of the highest side lobe, other than a main lobe, to the peak power level of the main lobe at the direction of zero degrees in the horizontal direction and zero degrees in the vertical direction is about 0.28. It is identified that, as compared to, for example, the configuration of basic arrangement 4 shown in FIG. 69 (in the case where $N_{TxUpperRightGr1\_ANT} = N_{TxUpperRightGr2\_ANT} = N_{RxLowerRightGr1\_ANT} = N_{RxLowerRightGr2\_ANT} =$) (see, for example, FIG. 71), the effect of reducing side lobes is improved by increasing $N_{TxUpperRightGr1\_ANT}$, $N_{TxUpperRightGr2\_ANT}$, $N_{RxLowerRightGr1\_ANT}$, and $N_{RxLowerRightGr2\_ANT}$. It is identified in FIG. 79 that the peak of the main lobe is sharpened as compared to FIG. 71 and the angular resolution is improved as a result of an increase in $N_{TxUpperRightGr1\_ANT}$, $N_{TxUpperRightGr2\_ANT}$, $N_{RxLowerRightGr1\_ANT}$, and $N_{RxLowerRightGr2\_ANT}$.

As $N_{TxUpperRightGr1\_ANT}$, $N_{TxUpperRightGr2\_ANT}$, $N_{RxLowerRightGr1\_ANT}$, and/or $N_{RxLowerRightGr2\_ANT}$ increases, the aperture length of the virtual array in the vertical direction is more expanded than in the vertical direction, with the result that a MIMO array configuration tends to further improve angular resolution in the vertical direction as compared to angular resolution in the horizontal direction.

Arrangement Method 4-1C

The arrangement method 4-1C is a method that is a combination of the arrangement method 4-1A and the arrangement method 4-1B.

For example, a transmission array antenna is made up of a first transmission antenna group and a second transmission antenna group. Each transmission antenna group includes a plurality of transmission antenna elements linearly arranged to the lower right diagonal side at an antenna spacing of $2D_H$ in the horizontal direction and an antenna spacing of $D_V$ in the vertical direction.

The second transmission antenna group is arranged so as to be shifted by $D_H$ to the left-hand side and arranged so as to be shifted by $2D_V$ to the lower side with respect to the first transmission antenna group.

Here, the number of transmission antennas included in the first transmission antenna group is denoted by $N_{TxLowerRightGr1\_ANT}$. For example, $N_{TxLowerRightGr1\_ANT} \geq 2$. Here, the number of transmission antennas included in the second transmission antenna group is denoted by $N_{TxLowerRightGr2\_ANT}$. For example, $N_{TxLowerRightGr2\_ANT} \geq 2$.

For example, a reception array antenna is made up of a first reception antenna group and a second reception antenna group. Each reception antenna group includes a plurality of reception antenna elements linearly arranged to the lower right diagonal side at an antenna spacing of $D_H$ in the horizontal direction and an antenna spacing of $2D_V$ in the vertical direction.

The second reception antenna group is arranged so as to be shifted by $2D_H$ to the left-hand side and arranged so as to be shifted by $D_V$ to the lower side with respect to the first reception antenna group.

Here, the number of reception antennas included in the first reception antenna group is denoted by $N_{RxLowerRightGr1\_ANT}$. For example, $N_{RxLowerRightGr1\_ANT} \geq 2$. Here, the number of reception antennas included in the second reception antenna group is denoted by $N_{RxLowerRightGr2\_ANT}$. For example, $N_{RxLowerRightGr2\_ANT} \geq 2$.

Figure 80:
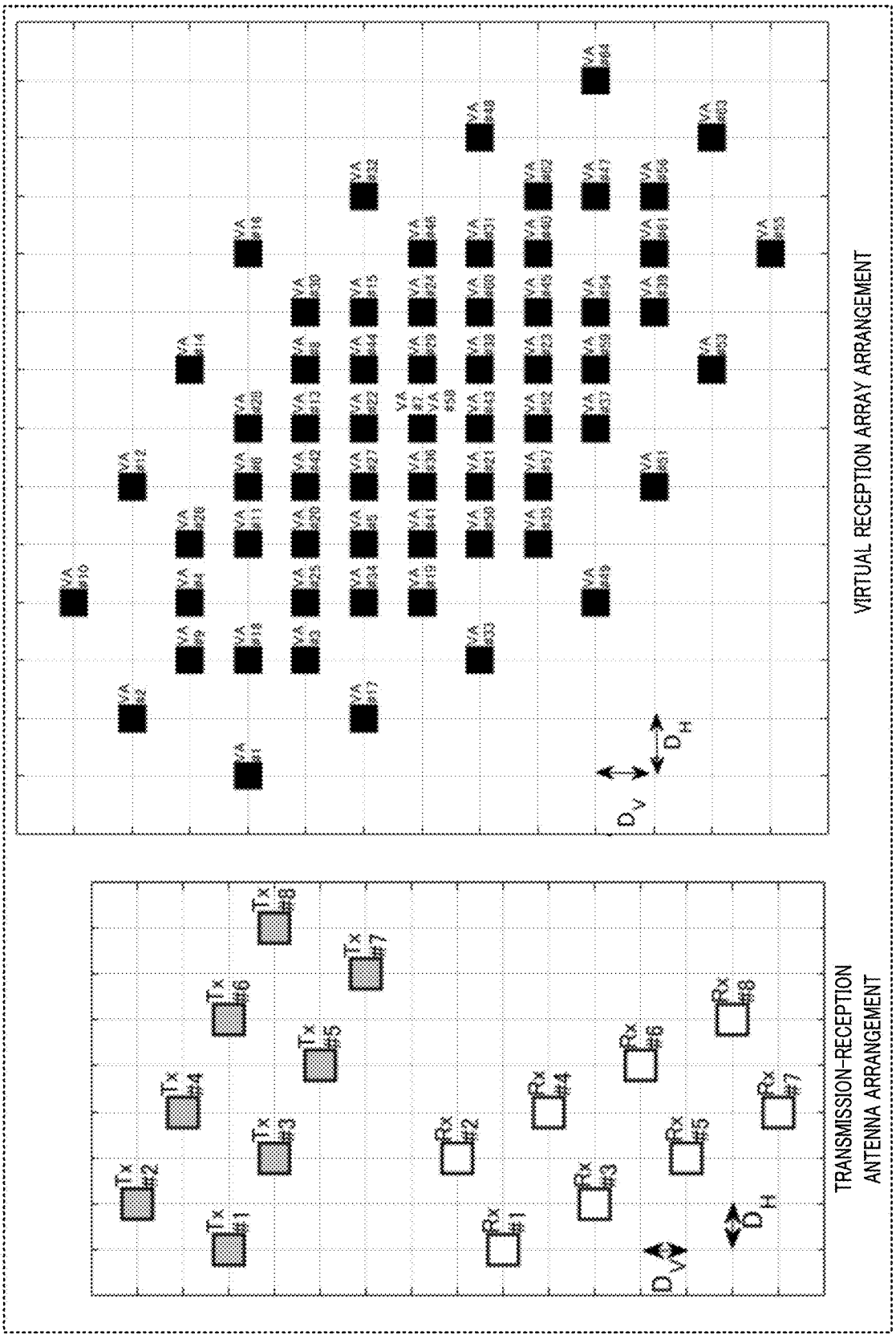
FIG. 80 is a diagram showing an example of an antenna arrangement according to Modification 1 of basic arrangement 4.

FIG. 80 shows an example of a MIMO array arrangement in the case where $N_{TxLowerRightGr1\_ANT}=4$ (Tx #2, Tx #4, Tx #6, and Tx #8), $N_{TxLowerRightGr2\_ANT}=4$ (Tx #1, Tx #3, Tx #5, and Tx #7), $N_{RxLowerRightGr1\_ANT}=4$ (Rx #2, Rx #4, Rx #6, and Rx #8), and $N_{RxLowerRightGr2\_ANT}=4$ (Rx #1, Rx #3, Rx #5, and Rx #7) and an example of the arrangement of a virtual reception array.

In the MIMO array arrangement shown in FIG. 80, when, for example, $D_H$ and $D_V$ are set to about $0.5\lambda$, the horizontal and vertical element sizes of each transmission antenna 106 and each reception antenna 202 can be designed to a size greater than or equal to about $1\lambda$.

In the virtual reception array shown in FIG. 80, some of the virtual array elements are arranged at overlap positions; however, the aperture length of the virtual reception array is expanded, so angular resolution is improved. In FIG. 80, virtual array elements overlap at one portion.

The virtual array elements positioned around the center of the virtual reception array shown in FIG. 80 are densely arranged at a spacing of $D_H$ and a spacing of $D_V$. As shown in FIG. 80, elements at positions corresponding to some coordinates are missing around the center of each virtual reception array. Radar apparatus 10 is capable of approximately receiving received signals of the missing elements by performing interpolation using received signals of the virtual array elements densely arranged at a spacing of $D_H$ and a spacing of $D_V$ and surrounding the missing portion.

The number of virtual array elements densely arranged around the center of the virtual reception array shown in FIG. 80 increases depending on $N_{TxLowerRightGr1\_ANT}$, $N_{TxLowerRightGr2\_ANT}$, $N_{RxLowerRightGr1\_ANT}$ and $N_{RxLowerRightGr2\_ANT}$.

For example, in a virtual reception array, $(0.5 \times (N_{TxLowerRightGr1\_ANT}+N_{TxLowerRightGr2\_ANT}+N_{RxLowerRightGr1\_ANT}+N_{RxLowerRightGr2\_ANT})+1)$ virtual array elements are arranged at a spacing of $D_H$ in the horizontal direction, and $(0.5 \times (N_{TxLowerRightGr1\_ANT}+N_{TxLowerRightGr2\_ANT}+N_{RxLowerRightGr1\_ANT}+N_{RxLowerRightGr2\_ANT})+1)$ virtual array elements are arranged at a spacing of $D_V$ in the vertical direction. As the number of virtual array elements densely arranged at a spacing of $D_H$ and a spacing of $D_V$ in the virtual reception array increases, the effect of reducing grating lobes and side lobes is improved.

As $N_{TxLowerRightGr1\_ANT}$, $N_{TxLowerRightGr2\_ANT}$, $N_{RxLowerRightGr1\_ANT}$, and/or $N_{RxLowerRightGr2\_ANT}$ increases, the number of virtual array elements arranged in the horizontal direction and/or in the vertical direction increases, so the horizontal and/or vertical aperture length of the virtual reception array is expanded, and angular resolution in the horizontal direction and/or the vertical direction is improved.

Arrangement Method 4-1D

The arrangement method 4-1D is a method that is a combination of the arrangement method 4-1A and the arrangement method 4-1B.

For example, a transmission array antenna is made up of a first transmission antenna group and a second transmission antenna group. Each transmission antenna group includes a plurality of transmission antenna elements linearly arranged to the upper right diagonal side at an antenna spacing of $2D_H$ in the horizontal direction and an antenna spacing of $D_V$ in the vertical direction.

The second transmission antenna group is arranged so as to be shifted by $2D_H$ to the right-hand side and arranged so as to be shifted by $D_V$ to the lower side with respect to the first transmission antenna group.

Here, the number of transmission antennas included in the first transmission antenna group is denoted by $N_{TxUpperRightGr1\_ANT}$. For example, $N_{TxUpperRightGr1\_ANT} \geq 2$. Here, the number of transmission antennas included in the second transmission antenna group is denoted by $N_{TxUpperRightGr2\_ANT}$. For example, $N_{TxUpperRightGr2\_ANT} \geq 2$.

For example, a reception array antenna is made up of a first reception antenna group and a second reception antenna group. Each reception antenna group includes a plurality of reception antenna elements linearly arranged to the upper right diagonal side at an antenna spacing of $2D_H$ in the horizontal direction and an antenna spacing of $D_V$ in the vertical direction.

The second reception antenna group is arranged so as to be shifted by $D_H$ to the right-hand side and arranged so as to be shifted by $2D_V$ to the lower side with respect to the first reception antenna group.

Here, the number of reception antennas included in the first reception antenna group is denoted by $N_{RxUpperRightGr1\_ANT}$. For example, $N_{RxUpperRightGr1\_ANT} \geq 2$. Here, the number of reception antennas included in the second reception antenna group is denoted by $N_{RxUpperRightGr2\_ANT}$. For example, $N_{RxUpperRightGr2\_ANT} > 2$.

Figure 81:
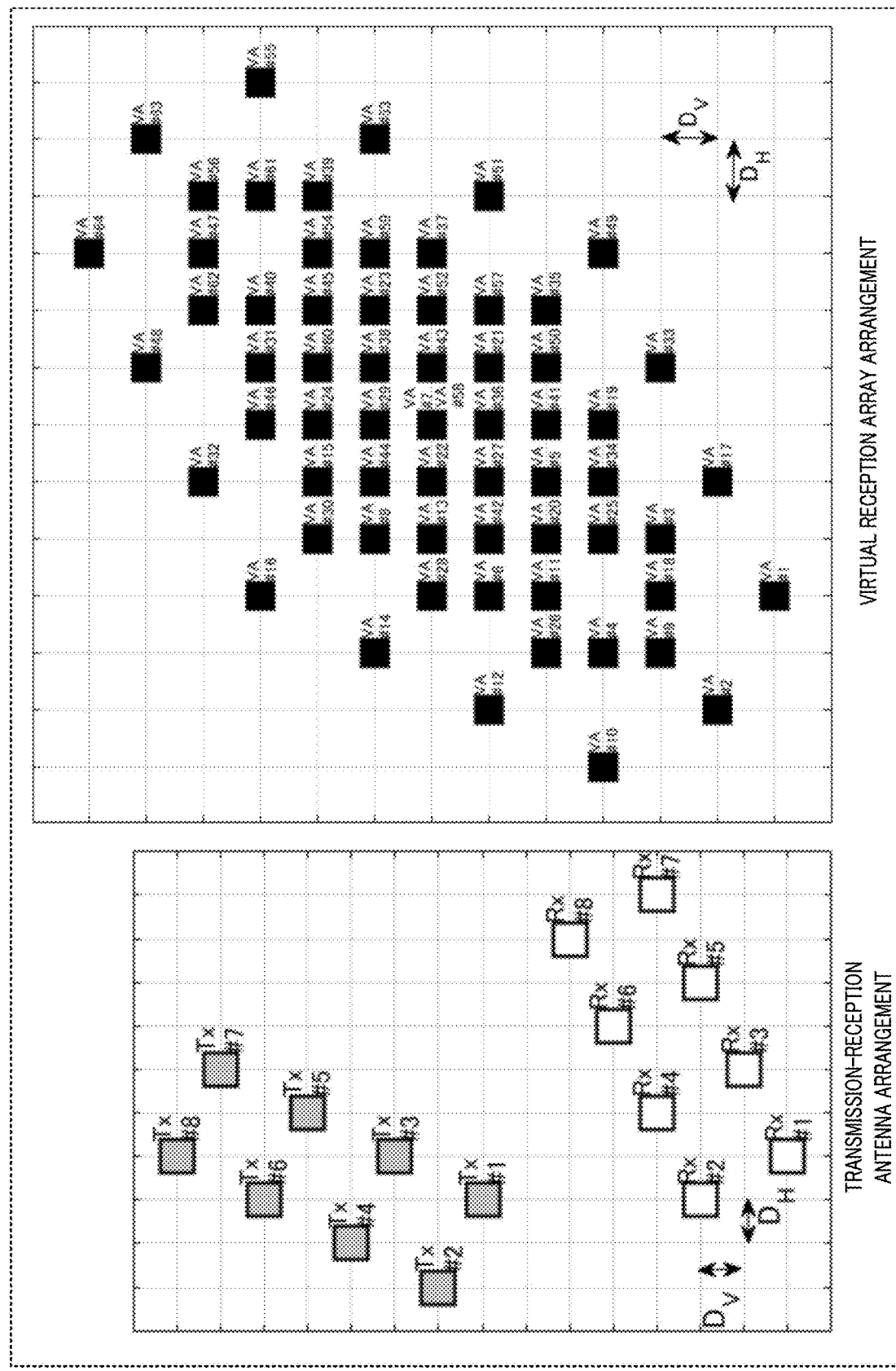
FIG. 81 is a diagram showing an example of an antenna arrangement according to Modification 1 of basic arrangement 4.

FIG. 81 shows an example of a MIMO array arrangement in the case where $N_{TxUpperRightGr1\_ANT}=4$ (Tx #2, Tx #4, Tx #6, and Tx #8), $N_{TxUpperRightGr2\_ANT}=4$ (Tx #1, Tx #3, Tx #5, and Tx #7), $N_{RxUpperRightGr1\_ANT}=4$ (Rx #2, Rx #4, Rx #6, and Rx #8), and $N_{RxUpperRightGr2\_ANT}=4$ (Rx #1, Rx #3, Rx #5, and Rx #7) and an example of the arrangement of a virtual reception array.

In the MIMO array arrangement shown in FIG. 81, when, for example, $D_H$ and $D_V$ are set to about $0.5\lambda$, the horizontal and vertical element sizes of each transmission antenna 106 and each reception antenna 202 can be designed to a size greater than or equal to about $1\lambda$.

In the virtual reception array shown in FIG. 81, some of the virtual array elements are arranged at overlap positions; however, the aperture length of the virtual reception array is expanded, so angular resolution is improved. In FIG. 81, virtual array elements overlap at one portion.

The virtual array elements positioned around the center of the virtual reception array shown in FIG. 81 are densely arranged at a spacing of $D_H$ and a spacing of $D_V$. As shown in FIG. 81, elements at positions corresponding to some coordinates are missing around the center of each virtual reception array. Radar apparatus 10 is capable of approximately receiving received signals of the missing elements by performing interpolation using received signals of the virtual array elements densely arranged at a spacing of $D_H$ and a spacing of $D_V$ and surrounding the missing portion.

The number of virtual array elements densely arranged around the center of the virtual reception array shown in FIG. 81 increases depending on $N_{TxUpperRightGr1\_ANT}$, $N_{TxUpperRightGr2\_ANT}$, $N_{RxUpperRightGr1\_ANT}$, and $N_{RxUpperRightGr2\_ANT}$.

For example, in a virtual reception array, $(0.5 \times (N_{TxUpperRightGr1\_ANT} + N_{TxUpperRightGr2\_ANT} + N_{RxUpperRightGr1\_ANT} + N_{RxUpperRightGr2\_ANT}) + 1)$ virtual array elements are arranged at a spacing of $D_H$ in the horizontal direction, and $(0.5 \times (N_{TxUpperRightGr1\_ANT} + N_{TxUpperRightGr2\_ANT} + N_{RxUpperRightGr1\_ANT} + N_{RxUpperRightGr2\_ANT}))$ virtual array elements are arranged at a spacing of $D_V$ in the vertical direction. As the number of virtual array elements densely arranged at a spacing of $D_H$ and a spacing of $D_V$ in the virtual reception array increases, the effect of reducing grating lobes and side lobes is improved.

As $N_{TxUpperRightGr1\_ANT}$, $N_{TxUpperRightGr2\_ANT}$, $N_{RxUpperRightGr1\_ANT}$, and/or $N_{RxUpperRightGr2\_ANT}$ increases, the number of virtual array elements arranged in the horizontal direction and/or in the vertical direction increases, so the horizontal and/or vertical aperture length of the virtual reception array is expanded, and angular resolution in the horizontal direction and/or the vertical direction is improved.

Each of the antenna arrangement methods 4-1A, 4-1B, 4-1C, and 4-1D in Modification 1 of basic arrangement 4 has been described above.

In the arrangement methods 4-1A, 4-1B, 4-1C, and 4-1D, the case where a transmission array antenna is made up of the first transmission antenna group and the second transmission antenna group has been described. The configuration may be the one in which the number $N_{TxGroup}$ of transmission antenna groups included in the transmission array antenna is greater than or equal to three. In this case, the ntx-th transmission antenna group is arranged in accordance with any one rule of the arrangement methods 4-1A 4-1B, 4-1C, and 4-1D with respect to the (ntx−1)th transmission antenna group. Here, ntx=1, . . . , $N_{TxGroup}$.

Similarly, in the arrangement methods 4-1A, 4-1B, 4-1C, and 4-1D, the case where a reception array antenna is made up of the first reception antenna group and the second reception antenna group has been described. The configuration may be the one in which the number $N_{RxGroup}$ of reception antenna groups is greater than or equal to three. In this case, the nrx-th reception antenna group is arranged in accordance with any one rule of the arrangement methods 4-1A 4-1B, 4-1C, and 4-1D with respect to the (nrx−1)th reception antenna group. Here, nrx=1, . . . , $N_{RxGroup}$.

Figure 82:
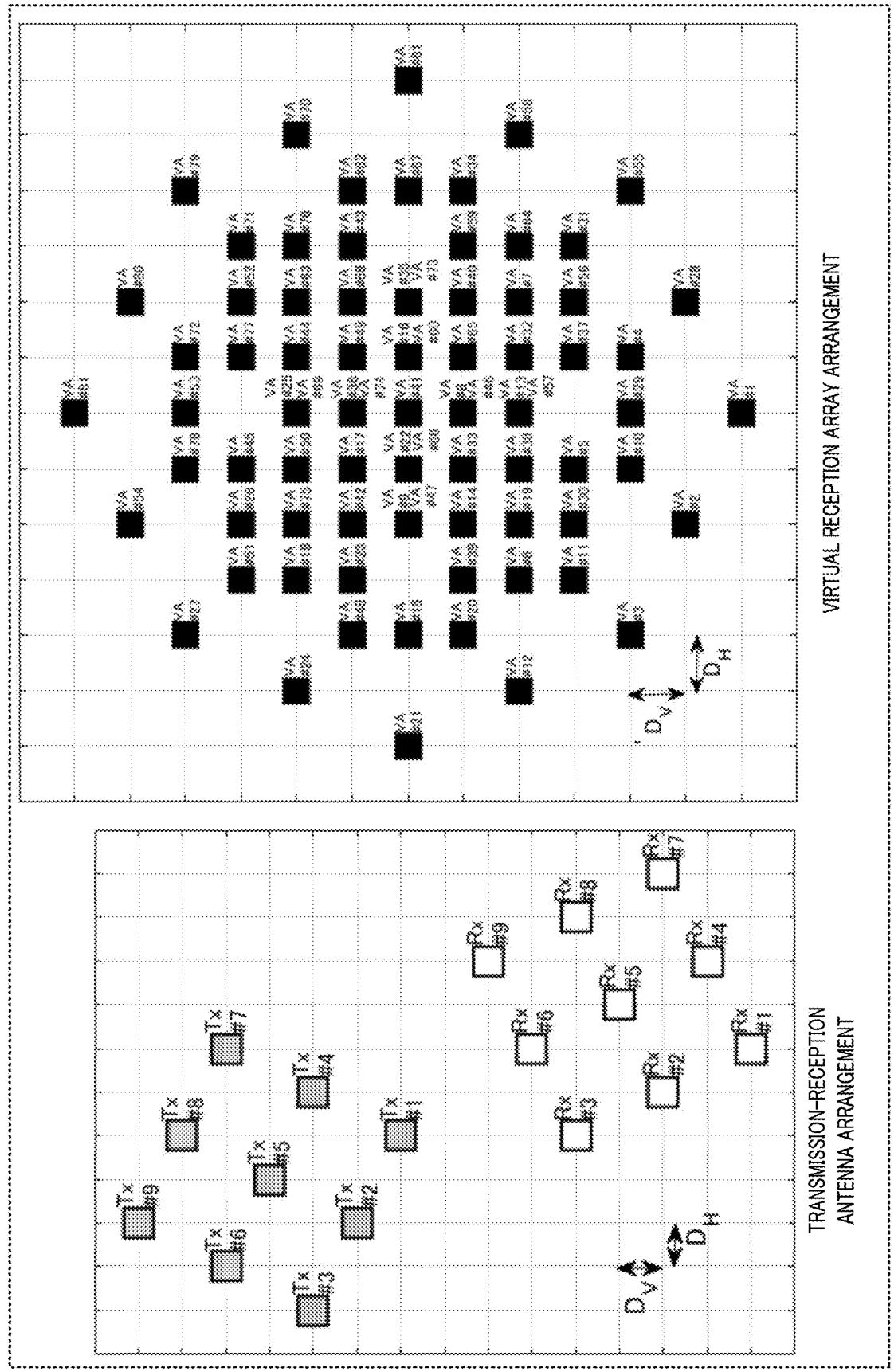
FIG. 82 is a diagram showing an example of an antenna arrangement according to Modification 1 of basic arrangement 4.

FIG. 82, for example, shows an example of a MIMO array arrangement in the case where the number $N_{TxGroup}$ of transmission antenna groups is three, the number $N_{RxGroup}$ of reception antenna groups is three, $N_{TxUpperRightGr1\_ANT}=3$ (Tx #3, Tx #6, and Tx #9), $N_{TxUpperRightGr2\_ANT}=3$ (Tx #2, Tx #5, and Tx #8), $N_{TxUpperRightGr3\_ANT}=3$ (Tx #1, Tx #4, and Tx #7), $N_{RxLowerRightGr1\_ANT}=3$ (Rx #7, Rx #8, and Rx #9), $N_{RxLowerRightGr2\_ANT}=3$ (Rx #4, Rx #5, and Rx #6), and $N_{RxLowerRightGr3\_ANT}=3$ (Rx #1, Rx #2 and Rx #3) and an example of the arrangement of a virtual reception array in the arrangement method 4-1B.

For example, in the MIMO array arrangement shown in FIG. 82, when $D_H$ and $D_V$ are set to about 0.5µ, the horizontal and vertical element sizes of each transmission antenna 106 and each reception antenna 202 can be designed to a size greater than or equal to about 1λ.

In the virtual reception array shown in FIG. 82, some of the virtual array elements are arranged at overlap positions; however, the aperture length of the virtual reception array is expanded, so angular resolution is improved. In FIG. 82, virtual array elements overlap at eight portions.

The virtual array elements positioned around the center of the virtual reception array shown in FIG. 82 are densely arranged at a spacing of $D_H$ and a spacing of $D_V$. As shown in FIG. 82, elements at positions corresponding to some coordinates are missing around the center of each virtual reception array. Radar apparatus 10 is capable of approximately receiving received signals of the missing elements by performing interpolation using received signals of the virtual array elements densely arranged at a spacing of $D_H$ and a spacing of $D_V$ and surrounding the missing portion.

The number of virtual array elements densely arranged around the center of the virtual reception array shown in FIG. 82 increases depending on $N_{TxGroup}$ and $N_{RxGroup}$.

Modification 2 of Basic Arrangement 4

In Modification 2 of basic arrangement 4, a MIMO array arrangement in which each of the arrangement of the four-element transmission array antenna and the four-element reception array antenna shown in basic arrangement 4 is defined as a base set and the arrangement positions of a plurality of the base sets are offset will be described.

In the arrangement described below, the offset of the base set of the transmission array antenna with respect to the horizontal and vertical arrangement positions or the offset of the base set of the reception array antenna with respect to the horizontal and vertical arrangement positions may be set such that there are no overlap elements in the arrangement of a virtual reception array and more virtual array elements are densely arranged at a spacing of $D_V$ or $D_H$ around the center of the virtual reception array. Not limited to this configuration, when, for example, the arrangement in which an unequal spacing arrangement is increased in the arrangement of a virtual reception array or the arrangement in which virtual array elements overlap is increased in the arrangement of a virtual reception array, it can be achieved by adjusting the offset of the arrangement position similarly.

Figure 83:
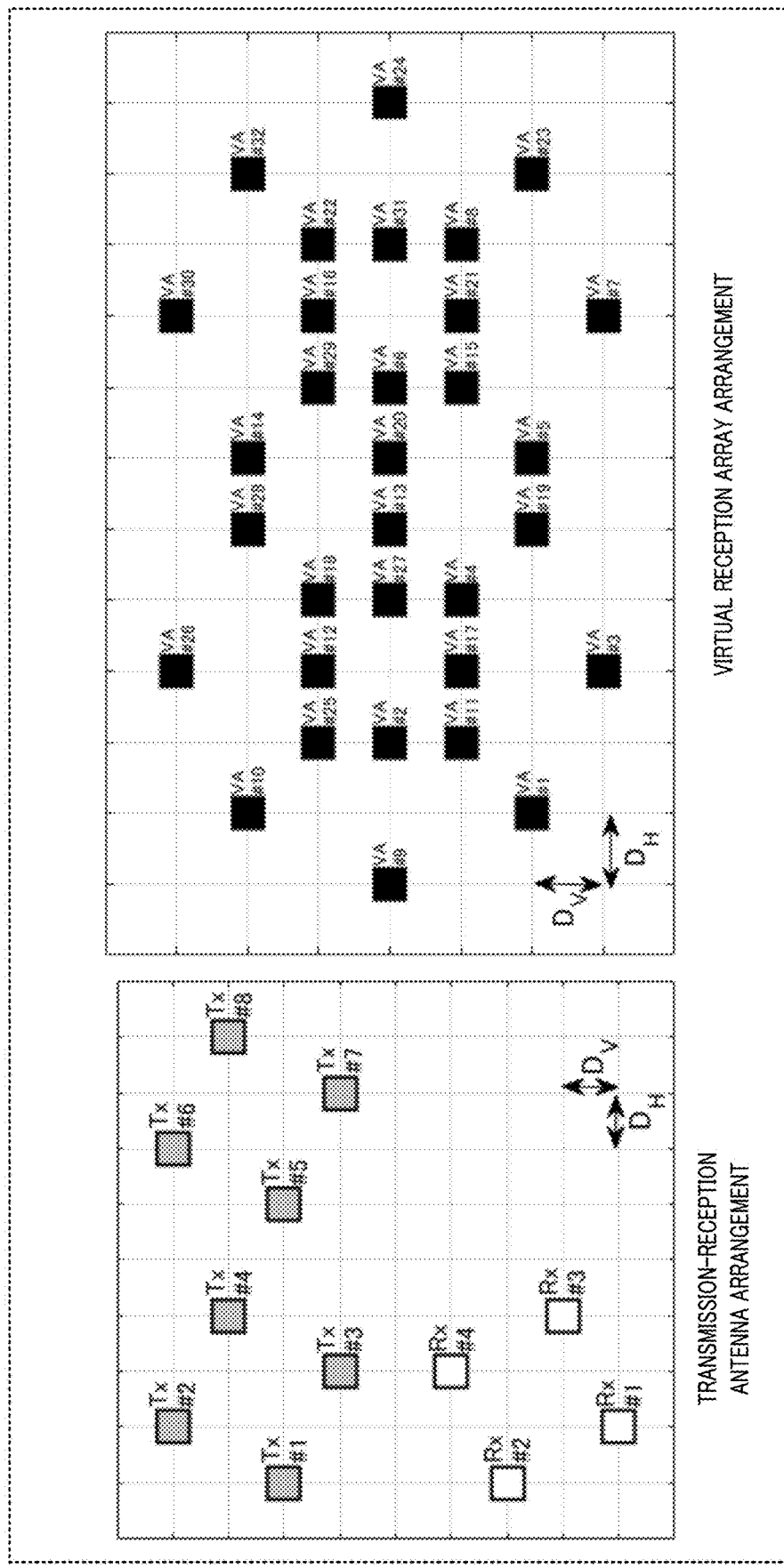
FIG. 83 is a diagram showing an example of an antenna arrangement according to Modification 2 of basic arrangement 4.

FIG. 83 shows an example of a MIMO array arrangement in the case where the number of base sets of the transmission array antenna is set to $N_{TxBaseSet}=2$ and the number of base sets of the reception array antenna is set to $N_{RxBaseSet}=1$ and an example of the arrangement of a virtual reception array. In FIG. 83, the offset of the horizontal arrangement position of the second base set (for example, Tx #5, Tx #6, Tx #7, and Tx #8) with respect to the first base set (for example, Tx #1, Tx #2, Tx #3, and Tx #4) is set to $D_{Hoffset\_TxBaseSet2}=5D_H$, and the offset of the vertical arrangement position of the second base set is set to $D_{Voffset\_TxBaseSet2}=0$. As shown in FIG. 83, with the arrangement in which the two base sets of transmission array antenna are offset in the horizontal direction, the number of virtual array elements densely arranged at a spacing of $D_H$ in the horizontal direction can be increased, so angular resolution in the horizontal direction is improved.

Figure 84:
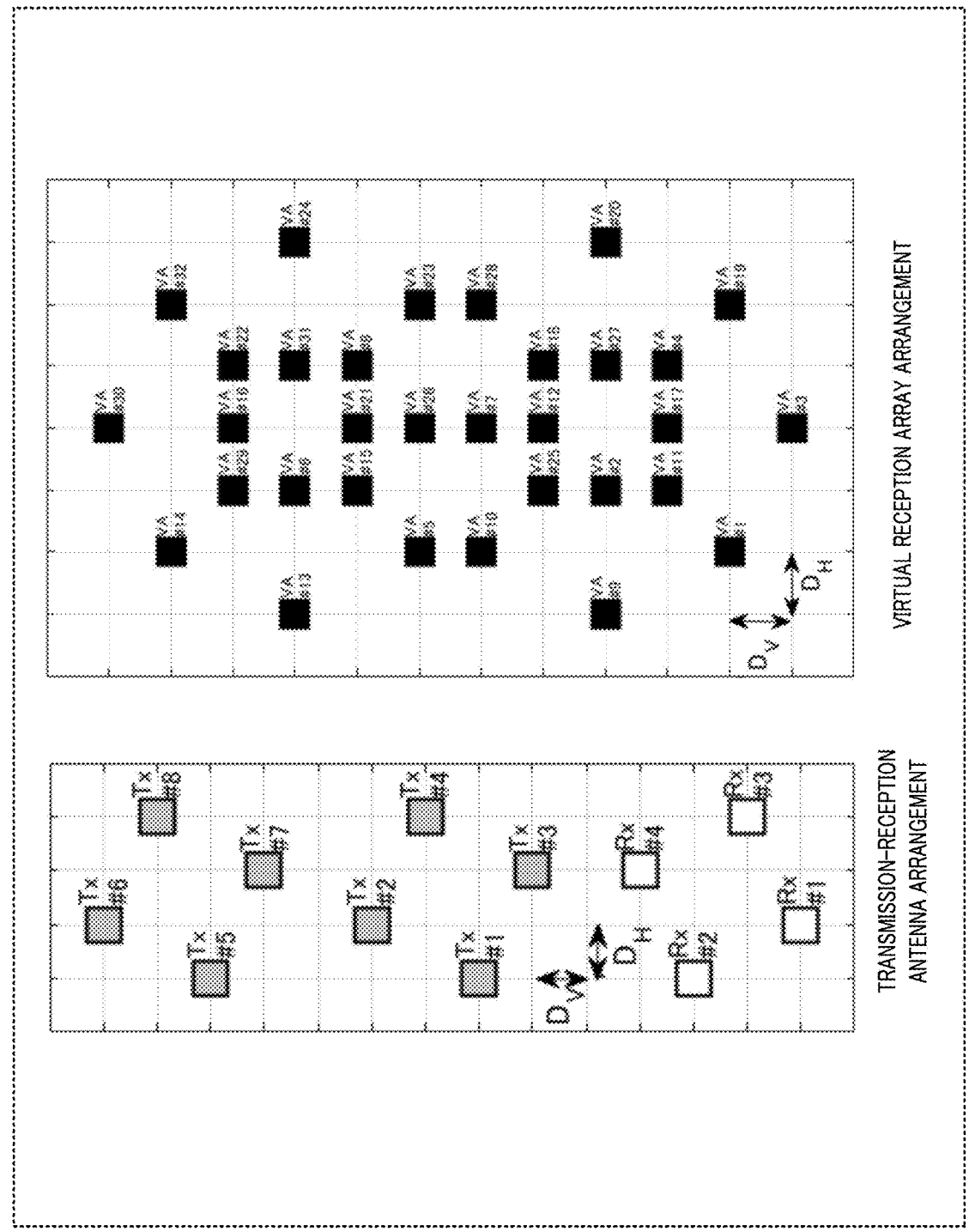
FIG. 84 is a diagram showing an example of an antenna arrangement according to Modification 2 of basic arrangement 4.

FIG. 84 shows an example of a MIMO array arrangement in the case where the number of base sets of the transmission array antenna is set to $N_{TxBaseSet}=2$ and the number of base sets of the reception array antenna is set to $N_{RxBaseSet}=1$ and an example of the arrangement of a virtual reception array. In FIG. 84, the offset of the horizontal arrangement position of the second base set (for example, Tx #5, Tx #6, Tx #7, and Tx #8) with respect to the first base set (for example, Tx #1, Tx #2, Tx #3, and Tx #4) is set to $D_{Hoffset\_TxBaseSet2}=0$, and the offset of the vertical arrangement position of the second base set is set to $D_{Voffset\_TxBaseSet2}=5D_V$. As shown in FIG. 84, with the arrangement in which the two base sets of the transmission array antenna are offset in the vertical direction, the number of virtual array elements densely arranged at a spacing of $D_V$ in the vertical direction can be increased, so angular resolution in the horizontal direction is improved.

Figure 85:
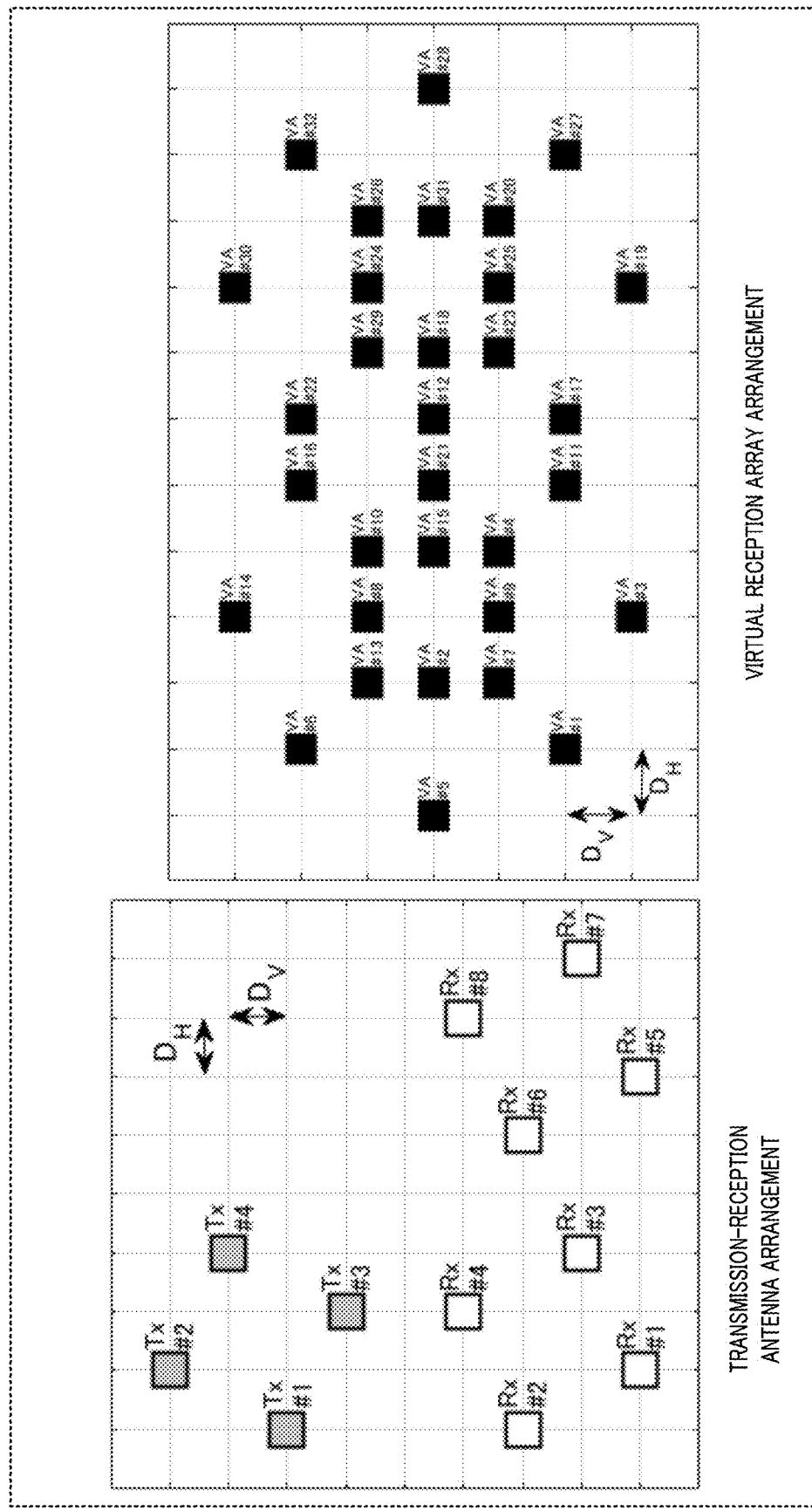
FIG. 85 is a diagram showing an example of an antenna arrangement according to Modification 2 of basic arrangement 4.

FIG. 85 shows an example of a MIMO array arrangement in the case where the number of base sets of the transmission array antenna is set to $N_{TxBaseSet}=1$ and the number of base sets of the reception array antenna is set to $N_{RxBaseSet}=2$ and an example of the arrangement of a virtual reception array. In FIG. 85, the offset of the horizontal arrangement position of the second base set (for example, Rx #5, Rx #6, Rx #7, and Rx #8) with respect to the first base set (for example, Rx #1, Rx #2, Rx #3, and Rx #4) is set to $D_{Hoffset\_RxBaseSet2}=5D_H$, and the offset of the vertical arrangement position of the second base set is set to $D_{Voffset\_RxBaseSet2}=0$. As shown in FIG. 85, with the arrangement in which the two base sets of the reception array antenna are offset in the horizontal direction, the number of virtual array elements densely arranged at a spacing of $D_H$ in the horizontal direction can be increased, so angular resolution in the horizontal direction is improved.

Figure 86:
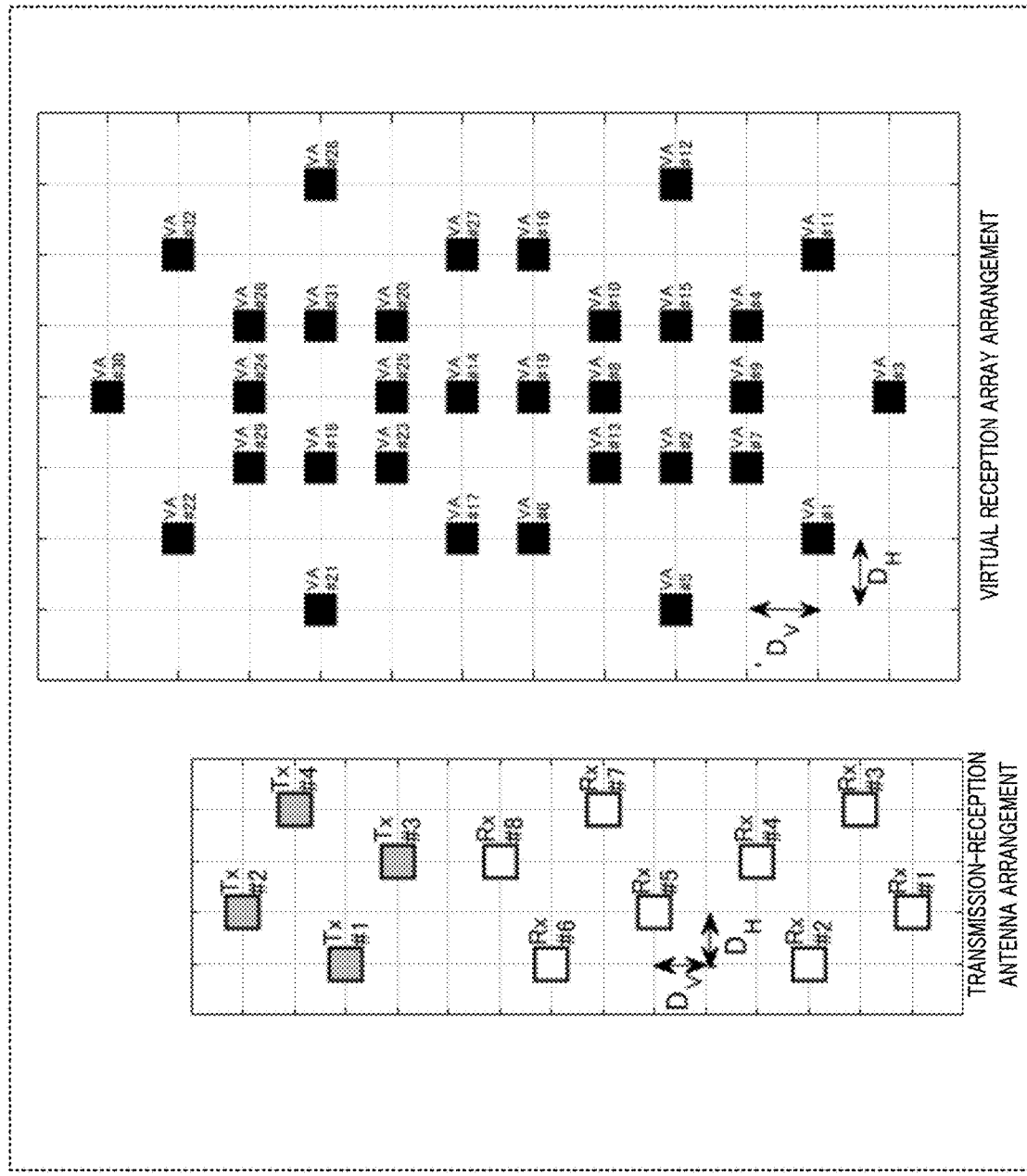
FIG. 86 is a diagram showing an example of an antenna arrangement according to Modification 2 of basic arrangement 4.

FIG. 86 shows an example of a MIMO array arrangement in the case where the number of base sets of the transmission array antenna is set to $N_{TxBaseSet}=1$ and the number of base sets of the reception array antenna is set to $N_{RxBaseSet}=2$ and an example of the arrangement of a virtual reception array. In FIG. 86, the offset of the horizontal arrangement position of the second base set (for example, Rx #5, Rx #6, Rx #7, and Rx #8) with respect to the first base set (for example, Rx #1, Rx #2, Rx #3, and Rx #4) is set to $D_{Hoffset\_RxBaseSet2}=0$, and the offset of the vertical arrangement position of the second base set is set to $D_{Voffset\_RxBaseSet2}=5D_V$. As shown in FIG. 86, with the arrangement in which the two base sets of the reception array antenna are offset in the vertical direction, the number of virtual array elements densely arranged at a spacing of $D_V$ in the vertical direction can be increased, so angular resolution in the vertical direction is improved.

Figure 87:
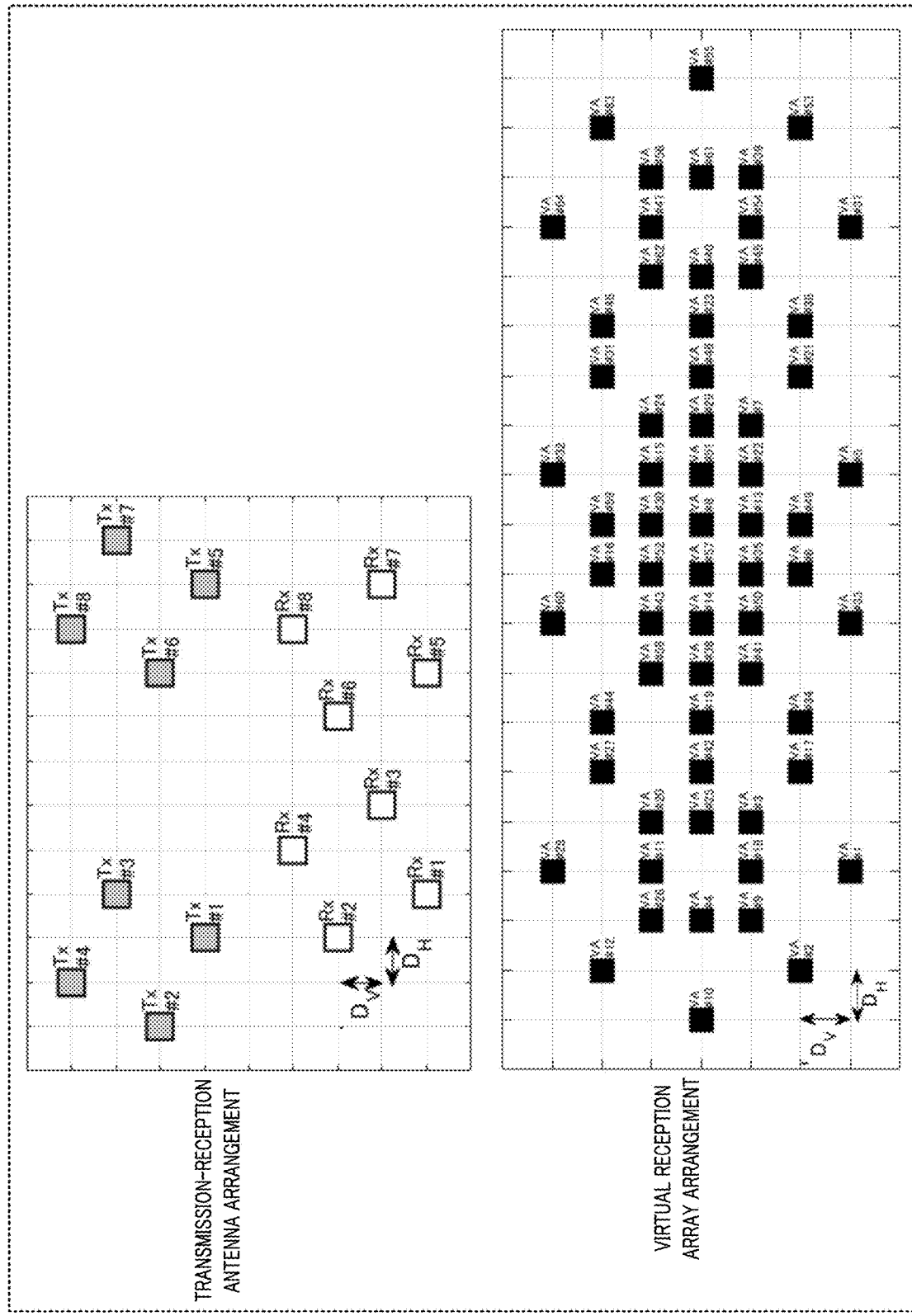
FIG. 87 is a diagram showing an example of an antenna arrangement according to Modification 2 of basic arrangement 4.

FIG. 87 shows an example of a MIMO array arrangement in the case where the number of base sets of the transmission array antenna is set to $N_{TxBaseSet}=2$ and the number of base sets of the reception array antenna is set to $N_{RxBaseSet}=2$ and an example of the arrangement of a virtual reception array. In FIG. 87, the offset of the horizontal arrangement position of the second base set (for example, Tx #5, Tx #6, Tx #7, and Tx #8) with respect to the first base set (for example, Tx #1, Tx #2, Tx #3, and Tx #4) of the transmission array antenna is set to $D_{Hoffset\_TxBaseSet2}=8D_H$, and the offset of the vertical arrangement position of the second base set is set to $D_{Voffset\_TxBaseSet2}=0$. In FIG. 87, the offset of the horizontal arrangement position of the second base set (for example, Rx #5, Rx #6, Rx #7, and Rx #8) with respect to the first base set (for example, Rx #1, Rx #2, Rx #3, and Rx #4) of the reception array antenna is set to $D_{Hoffset\_RxBaseSet2}=5D_H$, and the offset of the vertical arrangement position of the second base set is set to $D_{Voffset\_RxBaseSet2}=0$. As shown in FIG. 87, with the arrangement in which the two base sets of the transmission array antenna are offset in the horizontal direction and the arrangement in which the two base sets of the reception array antenna are offset in the horizontal direction, the number of virtual array elements densely arranged at a spacing of $D_H$ in the horizontal direction can be further increased as compared to, for example, FIG. 83 or FIG. 85, so angular resolution in the horizontal direction is further improved.

Figure 88A:
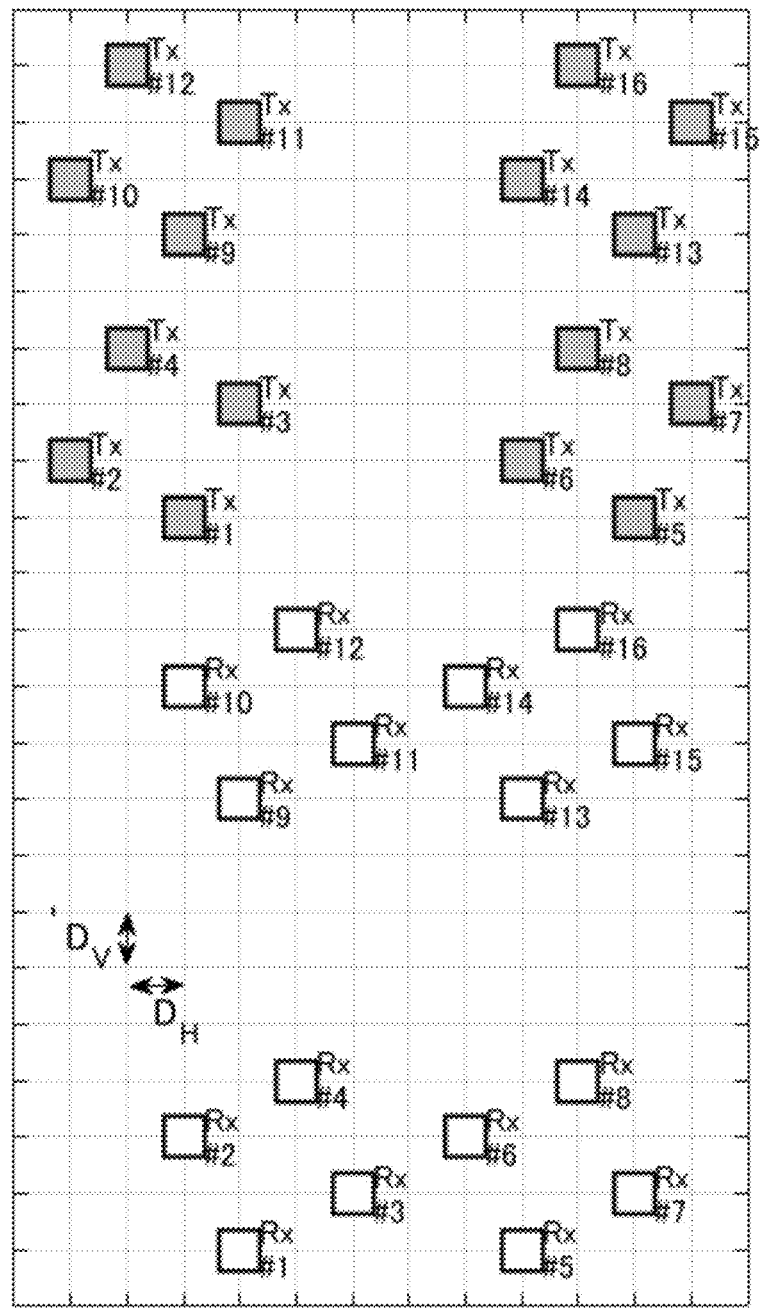
FIG. 88A is a diagram showing an example of an antenna arrangement according to Modification 2 of basic arrangement 4.
Figure 88B:
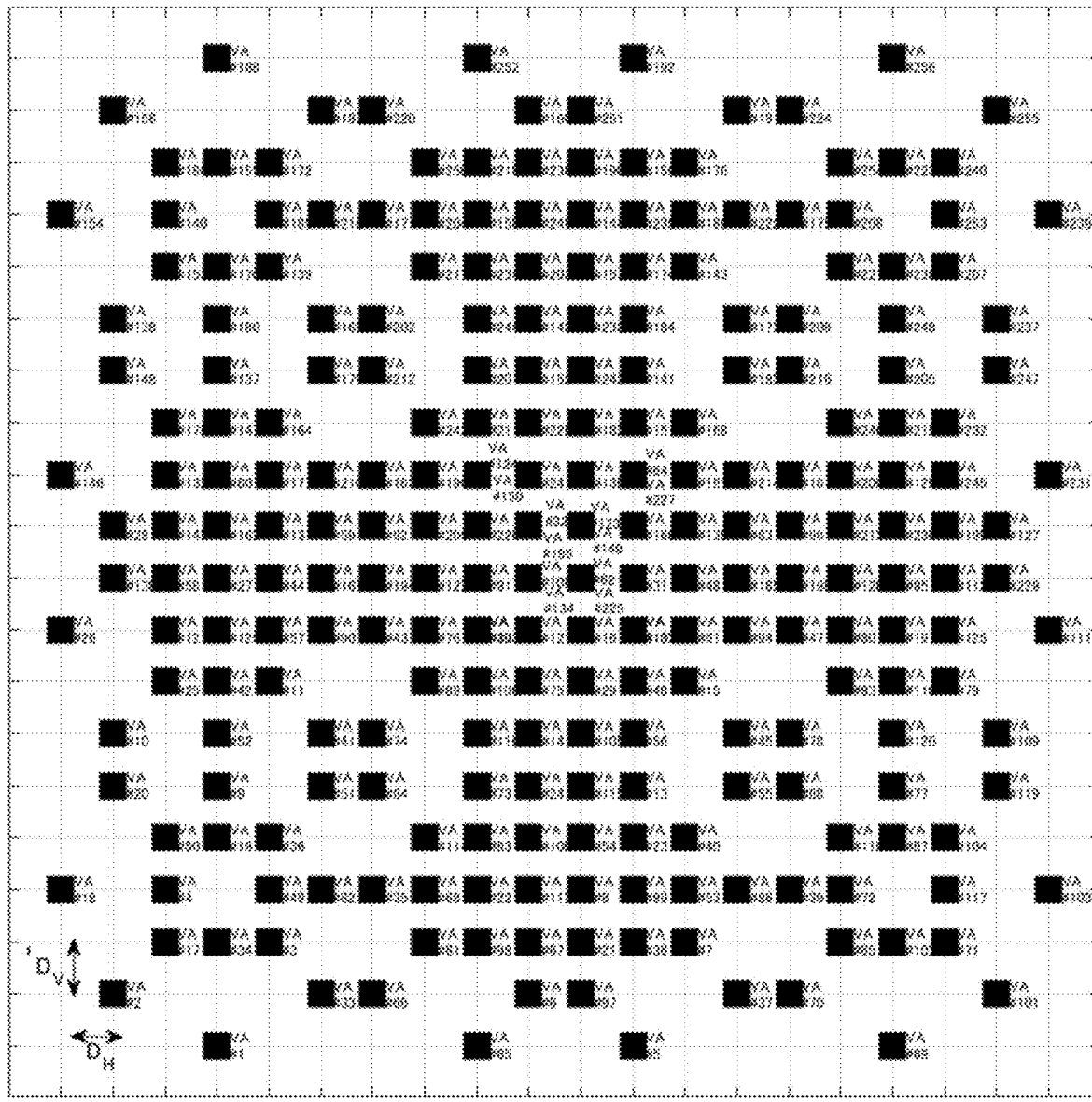
FIG. 88B is a diagram showing an example of an antenna arrangement according to Modification 2 of basic arrangement 4.

FIG. 88A shows an example of a MIMO array arrangement in the case where the number of base sets of the transmission array antenna is set to $N_{TxBaseSet}=4$ and the number of base sets of the reception array antenna is set to $N_{RxBaseSet}=4$. FIG. 88B shows an example of the arrangement of a virtual reception array.

In FIG. 88A, with respect to the first base set (for example, Tx #1, Tx #2, Tx #3, and Tx #4) of the transmission array antenna, the offset of the horizontal arrangement position of the second base set (Tx #5, Tx #6, Tx #7, and Tx #8) is set to $D_{Hoffset\_TxBaseSet2}=8D_H$, the offset of the vertical arrangement position of the second base set is set to $D_{Voffset\_TxBaseSet2}=0$, the offset of the horizontal arrangement position of the third base set (Tx #9, Tx #10, Tx #11, and Tx #12) is set to $D_{Hoffset\_TxBaseSet3}=0$, the offset of the vertical arrangement position of the third base set is set to $D_{Voffset\_TxBaseSet3}=5D_V$, the offset of the horizontal arrangement position of the fourth base set (Tx #13, Tx #14, Tx #15, and Tx #16) is set to $D_{Hoffset\_TxBaseSet4}=8D_H$, and the offset of the vertical arrangement position of the fourth base set is set to $D_{Voffset\_TxBaseSet4}=5D_V$.

In FIG. 88A, with respect to the first base set (for example, Rx #1, Rx #2, Rx #3, and Rx #4) of the reception array antenna, the offset of the horizontal arrangement position of the second base set (Rx #5, Rx #6, Rx #7, and Rx #8) is set to $D_{Hoffset\_RxBaseSet2}=5D_H$, the offset of the vertical arrangement position of the second base set is set to $D_{Voffset\_RxBaseSet2}=0$, the offset of the horizontal arrangement position of the third base set (Rx #9, Rx #10, Rx1411, and Rx #12) is set to $D_{Hoffset\_RxBaseSet3}=0$, the offset of the vertical arrangement position of the third base set is set to $D_{Voffset\_RxBaseSet3}=8D_V$, the offset of the horizontal arrangement position of the fourth base set (Rx #13, Rx #14, Rx #15, and Rx #16) is set to $D_{Hoffset\_RxBaseSet4}=5D_H$, and the offset of the vertical arrangement position of the fourth base set is set to $D_{Voffset\_RxBaseSet4}=8D_V$.

As shown in FIG. 88A and FIG. 88B, with the arrangement in which the base sets of the transmission array antenna are offset in the horizontal direction and the arrangement in which the base sets of the reception array antenna are offset in the horizontal direction, the number of virtual array elements densely arranged at a spacing of $D_H$ in the horizontal direction can be further increased as compared to, for example, FIG. 83 or FIG. 85, so angular resolution in the horizontal direction is further improved. (In the case of FIG. 88, virtual array elements overlap at eight portions.)

Similarly, as shown in FIG. 88A and FIG. 88B, with the arrangement in which the base sets of the transmission array antenna are offset in the vertical direction and the arrangement in which the base sets of the reception array antenna are offset in the vertical direction, the number of virtual array elements densely arranged at a spacing of $D_V$ in the vertical direction can be further increased as compared to, for example, FIG. 84 or FIG. 86, so angular resolution in the vertical direction is further improved.

In Modification 2, the case where the antenna arrangement of basic arrangement 4 is used as a base set has been described. Alternatively, the base set is not limited to the antenna arrangement of basic arrangement 4 and may be, for example, the antenna arrangement of Modification 1 of basic arrangement 4.

The number ($N_{TxBaseSet}$) of base sets included in the transmission array antenna and the number ($N_{RxBaseSet}$) of base sets included in the reception array antenna are not limited to the above examples and may be other values.

Basic Arrangement 5

Figure 89:
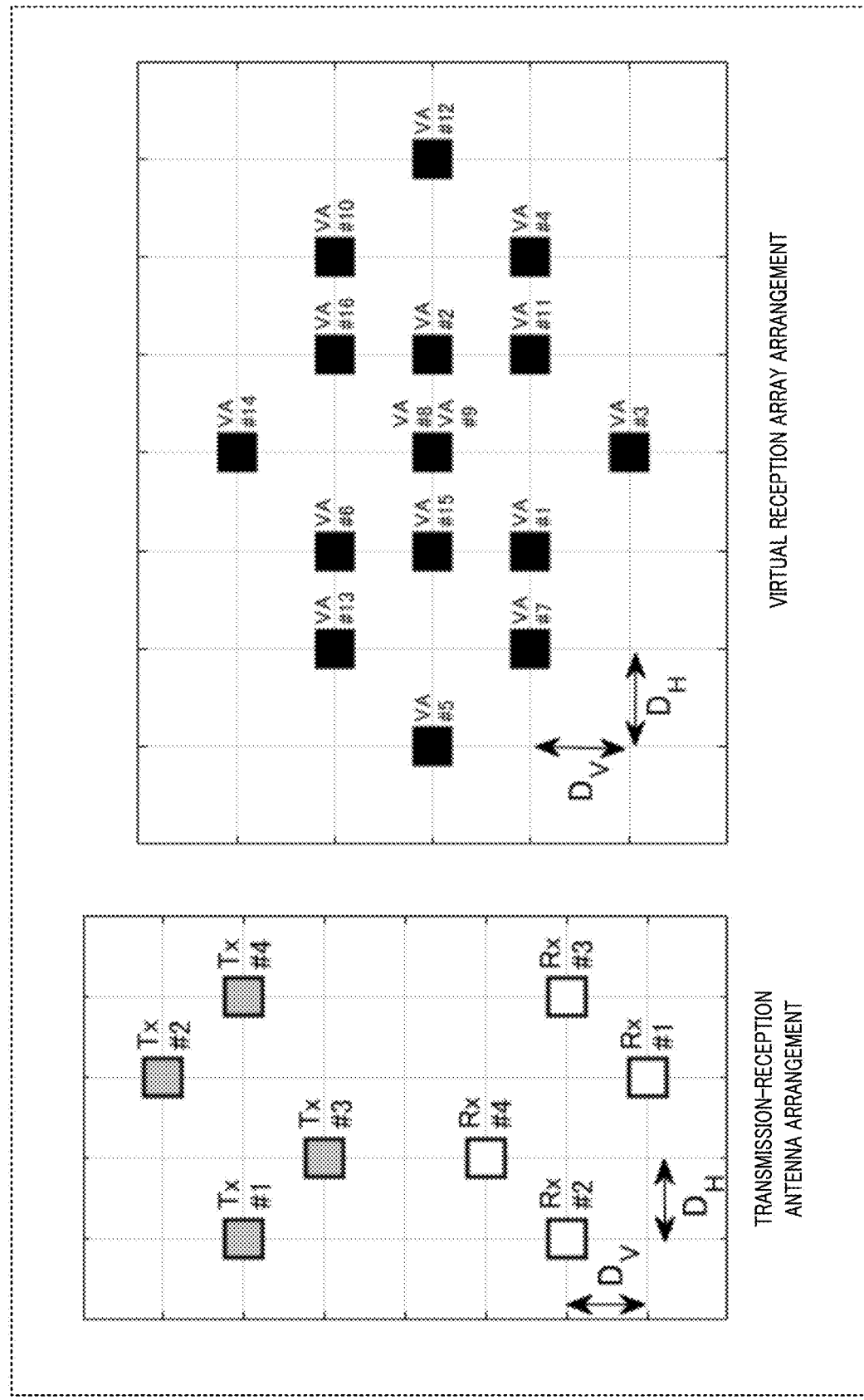
FIG. 89 is a diagram showing an example of an antenna arrangement according to basic arrangement 5.

FIG. 89 shows an example of the arrangement of transmission antennas 106 and reception antennas 202 and an example of the arrangement of a virtual reception array according to basic arrangement 5.

(1) Arrangement of Transmission-Reception Antenna

In FIG. 89, the number Nt of transmission antennas 106 in the transmission array antenna is four (Tx #1, Tx #2, Tx #3, and Tx #4), and the number Na of reception antennas 202 in the reception array antenna is four (Rx #1, Rx #2, Rx #3, and Rx #4).

The transmission array antenna shown in FIG. 89 is made up of, for example, a first transmission antenna group (Tx #2 and Tx #4 in FIG. 89) and a second transmission antenna group (Tx #1 and Tx #3 in FIG. 89). Each transmission antenna group includes two transmission antenna elements of which the horizontal antenna spacing is $D_H$ and the vertical antenna spacing is $D_V$. In each of the transmission antenna groups shown in FIG. 89, any adjacent transmission antennas are arranged at a spacing of $D_H$ apart in the horizontal direction and arranged at a spacing of $D_V$ apart in the vertical direction. In other words, in FIG. 89, the transmission antennas included in each transmission antenna group are linearly arranged to the lower right diagonal side (in other words, to the upper left diagonal side) at an antenna spacing of $D_H$ in the horizontal direction and an antenna spacing of $D_V$ in the vertical direction.

In FIG. 89, the second transmission antenna group is arranged so as to be shifted by $2D_H$ to the left-hand side in the horizontal direction and arranged so as to be shifted by $D_V$ to the lower side in the vertical direction with respect to the first transmission antenna group. In other words, the adjacent transmission antenna groups shown in FIG. 89 are in a relationship shifted by a spacing of $2D_H$ in the horizontal direction (in other words, twice as long as the spacing of $D_H$) and $D_V$ in the vertical direction.

In FIG. 89, the second transmission antenna group is arranged so as to be shifted by $D_H$ to the left-hand side in the horizontal direction and arranged so as to be shifted by $2D_V$ to the lower side in the vertical direction with respect to the first transmission antenna group.

The reception array antenna shown in FIG. 89 is made up of a first reception antenna group (Rx #2 and Rx #4 in FIG. 89) and a second reception antenna group (Rx #1 and Rx #3 in FIG. 89). Each reception antenna group includes two reception antenna elements of which the horizontal antenna spacing is $D_H$ and the vertical antenna spacing is $D_V$. In each of the reception antenna groups shown in FIG. 89, any adjacent reception antennas are arranged at a spacing of $D_H$ apart in the horizontal direction and arranged at a spacing of $D_V$ apart in the vertical direction. In other words, in FIG. 89, the transmission antennas included in each reception antenna group are linearly arranged to the upper right diagonal side (in other words, to the lower left diagonal side) at an antenna spacing of $D_H$ in the horizontal direction and an antenna spacing of $D_V$ in the vertical direction.

In FIG. 89, the second reception antenna group is arranged so as to be shifted by $2D_H$ to the right-hand side in the horizontal direction and arranged so as to be shifted by $D_V$ to the lower side in the vertical direction with respect to the first reception antenna group. In other words, the adjacent reception antenna groups shown in FIG. 89 are in a relationship shifted by a spacing of $2D_H$ in the horizontal direction (in other words, twice as long as the spacing of $D_H$) and $D_V$ in the vertical direction.

For example, as shown in FIG. 89, transmission antennas Tx #1 to Tx #4 are arranged at different positions in the horizontal direction. Similarly, as shown in FIG. 89, reception antennas Rx #1 to Rx #4 are arranged at different positions in the horizontal direction.

In the transmission-reception antenna arrangement shown in FIG. 89, the arrangement positions of the transmission antennas and the arrangement positions of the reception antennas are, for example, in a linear symmetry (in other words, an inverted relationship) with respect to a line parallel to the horizontal direction or the vertical direction.

For example, it is assumed that the horizontal direction (cross direction) shown in FIG. 89 corresponds to X-axis, and the vertical direction (longitudinal direction) shown in FIG. 89 corresponds to Y-axis direction.

For example, in the case of the antenna arrangement shown in FIG. 89, the position coordinates of each of transmission antennas 106 that make up the transmission array antenna are expressed as the position coordinates $(X_{T\_\#2}, Y_{T\_\#2})=(X_{T\_\#1}+2D_H, Y_{T\_\#1}+D_V)$ of transmission antenna Tx #2, the position coordinates $(X_{T\_\#3}, Y_{T\_\#3})=(X_{T\_\#1}+D_H, Y_{T\_\#1}-D_V)$ of transmission antenna Tx #3, and the position coordinates $(X_{T\_\#4}, Y_{T\_\#4})=(X_{T\_\#1}+3D_H, Y_{T\_\#1})$ of transmission antenna Tx #4 with reference to the position coordinates $(X_{T\_\#1}, Y_{T\_\#1})$ of transmission antenna Tx #1.

Similarly, the position coordinates of each of reception antennas 202 that make up the reception array antenna are expressed as the position coordinates $(X_{R\_\#2}, Y_{R\_\#2})=(X_{R\_\#1}-2D_H, Y_{R\_\#1}+D_V)$ of reception antenna Rx #2, the position coordinates $(X_{R\_\#3}, Y_{R\_\#3})=(X_{R\_\#1}+D_H, Y_{R\_\#1}+D_V)$ of reception antenna Rx #3, and the position coordinates $(X_{R\_\#4}, Y_{R\_\#4})=(X_{R\_\#1}-D_H, Y_{R\_\#1}+2D_V)$ of reception antenna Rx #4 with reference to the position coordinates $(X_{R\_\#1}, Y_{R\_\#1})$ of reception antenna Rx #1.

(2) Arrangement of Virtual Reception Array

The arrangement of the virtual reception array (virtual antennas VA #1 to VA #16), provided in accordance with the above-described transmission-reception antenna arrangement shown in FIG. 89, has the following features.

With the arrangement of the transmission array antenna and the arrangement of the reception array antenna, shown in FIG. 89, each set of the position coordinates $(X_{V\_\#1}, Y_{V\_\#1})$ to $(X_{V\_\#16}, Y_{V\_\#16})$ of virtual reception array VA #1 to VA #16 is as follows. Here, VA #1 is expressed as the position reference (0, 0) of the virtual reception array.

(0, 0), $(2D_H, D_V)$, $(D_H, -D_V)$, $(3D_H, 0)$, $(-2D_H, D_V)$, $(0, 2D_V)$, $(-D_H, 0)$, $(D_H, D_V)$, $(D_H, D_V)$, $(3D_H, 2D_V)$, $(2D_H, 0)$, $(4D_H, D_V)$, $(-D_H, 2D_V)$, $(D_H, 3D_V)$, $(0, D_V)$, and $(2D_H, 2D_V)$ In this way, in the arrangement of the virtual reception array shown in FIG. 89, the virtual reception array elements, other than some virtual array elements (for example, VA #8 and #9), are arranged at different positions without any overlap. For this reason, the aperture length of the virtual reception array is expanded, so the main lobe narrows, and angular resolution is improved.

Virtual array elements VA #4, #11, #2, #16, #10, #7, #1, #15, #6, #13, VA #8, and #9 positioned around the center of the virtual reception array shown in FIG. 89 are densely arranged at a spacing of $D_H$ in the horizontal direction and a spacing of $D_V$ in the vertical direction. For example, in FIG. 89, when the spacing $D_H$ and the spacing $D_V$ are set to about $0.5\lambda$, virtual array elements VA #4, #11, #2, #16, #10, #7, #1, #15, #6, #13, VA #8, and #9 are arranged at a spacing of $D_H$=0.5) in the horizontal direction and a spacing of $D_V$=0.5λ in the vertical direction. With this configuration, as in the case of basic arrangement 1 (see, for example, FIG. 8), grating lobes are reduced.

Elements at positions corresponding to coordinates surrounded by the virtual array elements densely arranged at a spacing of $D_H$ and a spacing of $D_V$ are missing around the center of the virtual reception array shown in FIG. 89. Radar apparatus 10 is capable of approximately receiving received signals of the elements at the missing portion by, for example, performing interpolation using received signals of the virtual array elements densely arranged at a spacing of $D_H$ and a spacing of $D_V$ and surrounding the missing portion.

For example, in the MIMO array arrangement configuration shown in FIG. 89, when the spacing $D_H$ and the spacing $D_V$ are set to about 0.5λ, the horizontal and vertical element sizes of each transmission antenna 106 and each reception antenna 202 can be designed to a size greater than or equal to 1λ.

With this configuration, when the element size in the cross direction $W_{ANT}$ of each transmission antenna 106 and each reception antenna 202 is less than $D_H$, an antenna with any size in the longitudinal direction may be used. For example, an antenna using four elements that are planar patch antennas arranged in a one by eight matrix as a sub-array as shown in FIG. 25A is applicable to each antenna of at least one of the transmission array antenna and the reception array antenna shown in FIG. 89.

The number (hereinafter, referred to as $N_{TxGroup1\_ANT}$) of transmission antennas included in the first transmission antenna group and the number (hereinafter, referred to as $N_{TxGroup2\_ANT}$) of transmission antennas included in the second transmit direction antenna group may be equal to each other or different by one antenna. For example, it is defined that $|N_{TxGroup1\_ANT} - N_{TxGroup2\_ANT}|$=0 or 1.

Similarly, the number (hereinafter, referred to as $N_{RxGroup1\_ANT}$) of reception antennas included in the first reception antenna group and the number (hereinafter, referred to as $N_{RxGroup2\_ANT}$) of reception antennas included in the second reception antenna group may be equal to each other or different by one antenna. For example, it is defined that $|N_{RxGroup1\_ANT} - N_{RxGroup2\_ANT}|$=0 or 1.

Figure 90A:
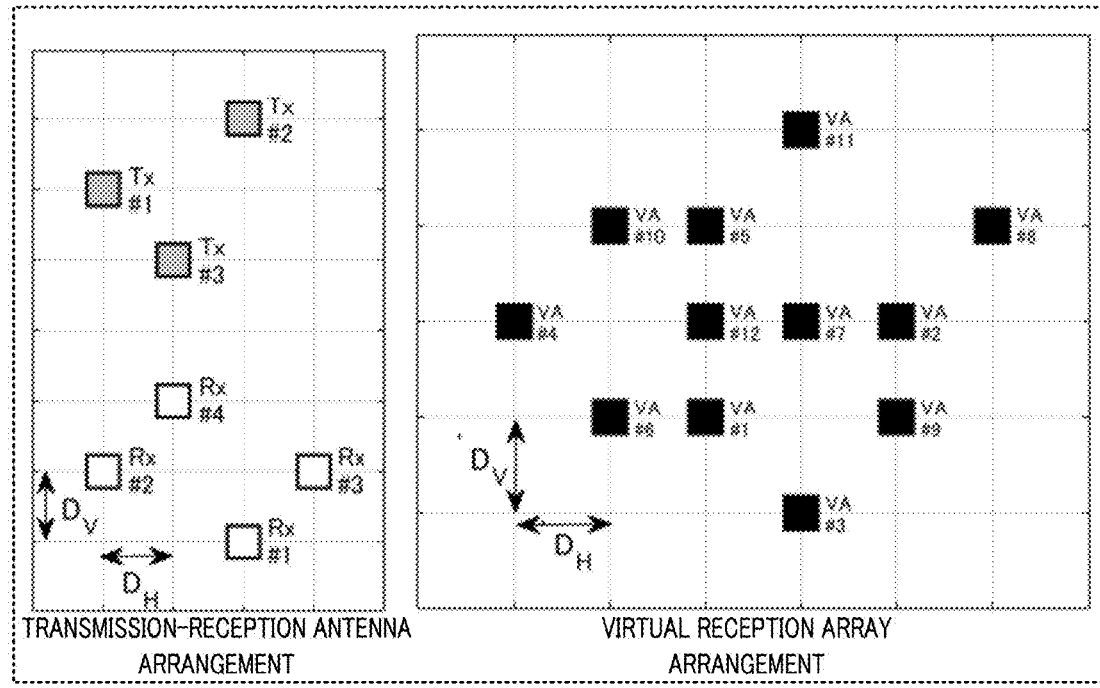
FIG. 90A is a diagram showing an example of an antenna arrangement according to basic arrangement 5.
Figure 90B:
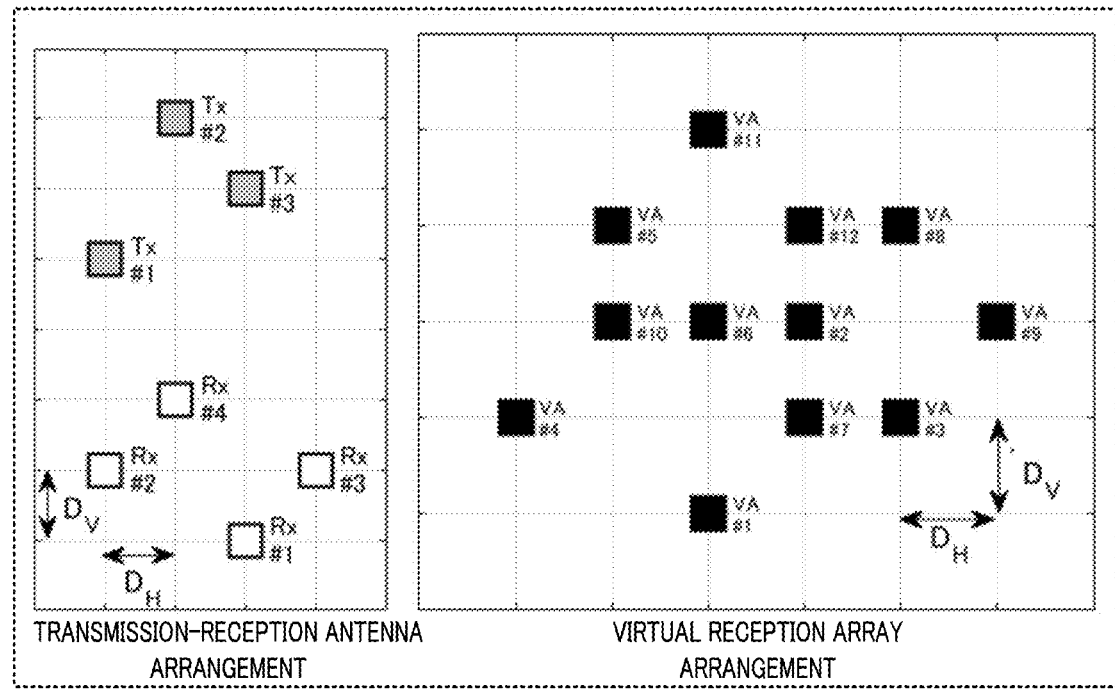
FIG. 90B is a diagram showing an example of an antenna arrangement according to basic arrangement 5.

FIGS. 90A and 90B each show an example of a MIMO array arrangement in the case where there is one antenna difference between the number $N_{TxGroup1\_ANT}$ of transmission antennas included in the first transmission antenna group and the number $N_{TxGroup2\_ANT}$ of transmission antennas included in the second transmission antenna group and the number $N_{RxGroup1\_ANT}$ of reception antennas included in the first reception antenna group and the number $N_{RxGroup2\_ANT}$ of reception antennas included in the second reception antenna group are equal to each other and an example of the arrangement of a virtual reception array.

As shown in FIGS. 90A and 90B, the MIMO array arrangement in the case where $|N_{TxGroup1\_ANT} - N_{TxGroup2\_ANT}|$=1 and $|N_{RxGroup1\_ANT} - N_{RxGroup2\_ANT}|$=0 is a configuration in which the number of transmission antennas is three and the number of reception antennas is four ($N_{RxGroup1\_ANT}=N_{RxGroup2\_ANT}$=2), and there are, for example, two patterns.

FIG. 90A is an example of a MIMO array arrangement in the case where $N_{TxGroup1\_ANT}$=1 (Tx #2) and $N_{TxGroup2\_ANT}$=2 (Tx #1, Tx #3). FIG. 90B is an example of a MIMO array arrangement in which $N_{TxGroup1\_ANT}$=2 (Tx #2 Tx #3) and $N_{TxGroup2\_ANT}$=1 (Tx #1).

Figure 91A:
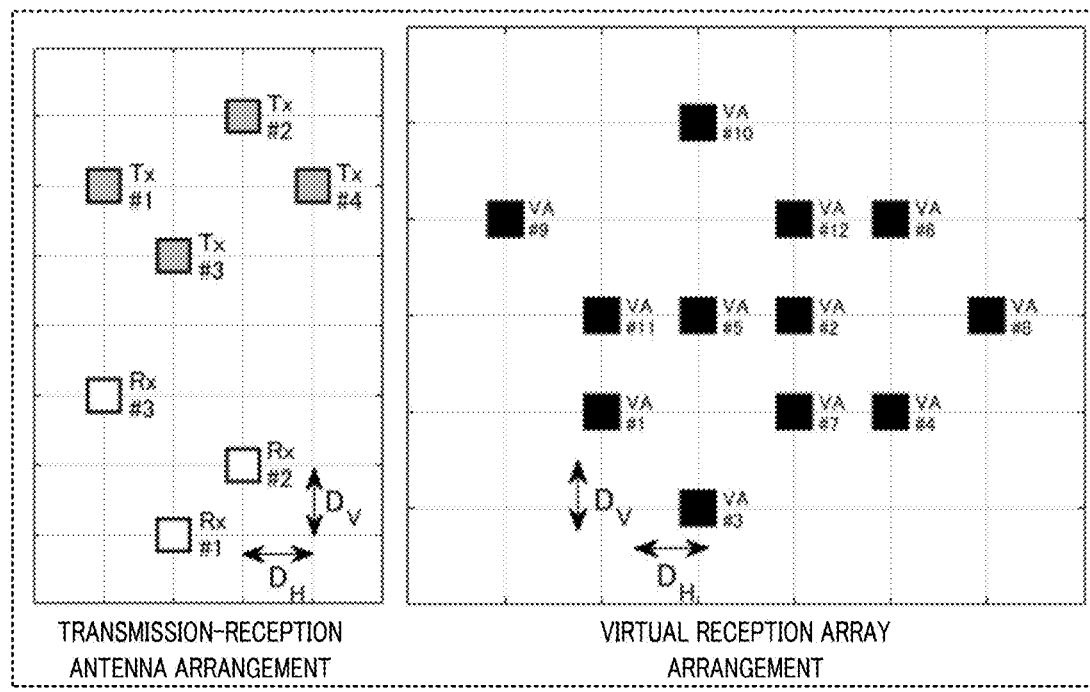
FIG. 91A is a diagram showing an example of an antenna arrangement according to basic arrangement 5.
Figure 91B:
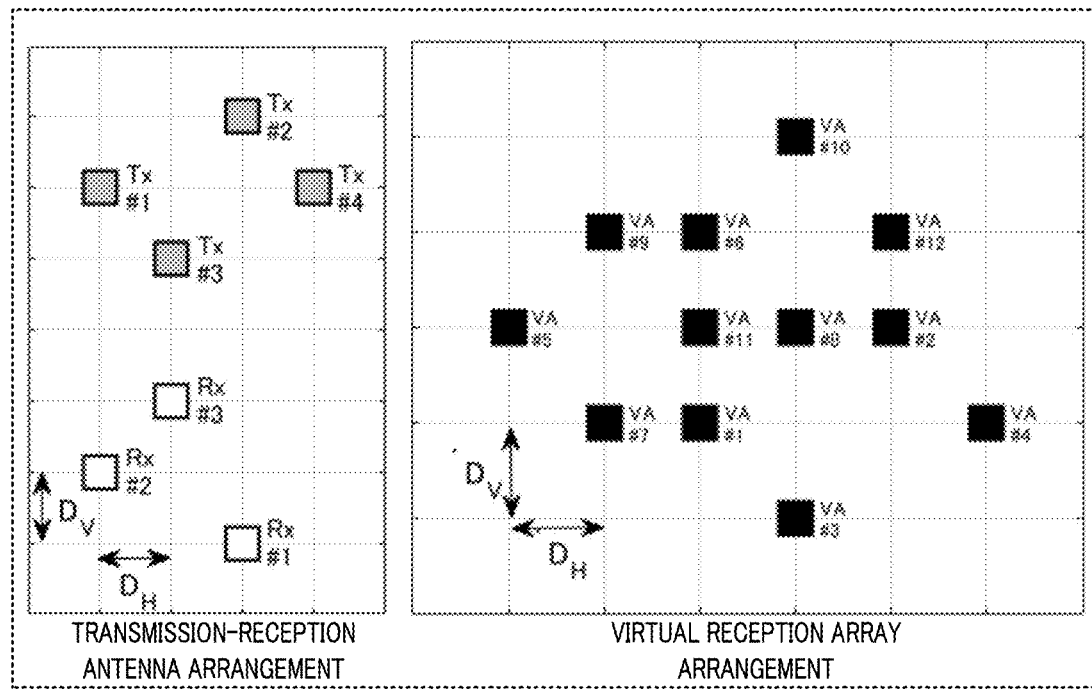
FIG. 91B is a diagram showing an example of an antenna arrangement according to basic arrangement 5.

Next, FIGS. 91A and 91B each show an example of a MIMO array arrangement in the case where the number $N_{TxGroup1\_ANT}$ of transmission antennas included in the first transmission antenna group and the number $N_{TxGroup2\_ANT}$ of transmission antennas included in the second transmission antenna group are equal to each other and there is one antenna difference between the number $N_{RxGroup1\_ANT}$ of reception antennas included in the first reception antenna group and the number $N_{RxGroup2\_ANT}$ of reception antennas included in the second reception antenna group and an example of the arrangement of a virtual reception array.

As shown in FIGS. 91A and 91B, the MIMO array arrangement in the case where $|N_{TxGroup1\_ANT} - N_{TxGroup2\_ANT}|$=0 and $|N_{RxGroup1\_ANT} - N_{RxGroup2\_ANT}|$=1 is a configuration in which the number of transmission antennas is four ($N_{TxGroup1\_ANT}=N_{TxGroup2\_ANT}$=2) and the number of reception antennas is three, and there are, for example, two patterns.

FIG. 91A is a MIMO array arrangement in the case where $N_{RxGroup1\_ANT}$=1 (Rx #3) and $N_{RxGroup2\_ANT}$=2 (Rx #1 and Rx #2). FIG. 91B is a MIMO array arrangement in the case where $N_{TxGroup1\_ANT}$=2 (Rx #2 and Rx #3) and $N_{RxGroup2\_ANT}$=1 (Rx #1).

Next, FIGS. 92A to 92D each show an example of a MIMO array arrangement in the case where there is one antenna difference between the number $N_{TxGroup1\_ANT}$ of transmission antennas included in the first transmission antenna group and the number $N_{TxHGroup2\_ANT}$ of transmission antennas included in the second transmission antenna group and there is one antenna difference between the number $N_{RxGroup1\_ANT}$ of reception antennas included in the first reception antenna group and the number $N_{RxGroup2\_ANT}$ of reception antennas included in the second reception antenna group and an example of the arrangement of a virtual reception array.

As shown in FIGS. 92A to 92D, the MIMO array arrangement in the case where $|N_{TxGroup1\_ANT} - N_{TxGroup2\_ANT}|$=1 and $|N_{RxGroup1\_ANT} - N_{RxGroup2\_ANT}|$=1 is a configuration in which the number of transmission antennas is three and the number of reception antennas is three, and there are, for example, four patterns of FIGS. 92A to 92D.

Figure 92A:
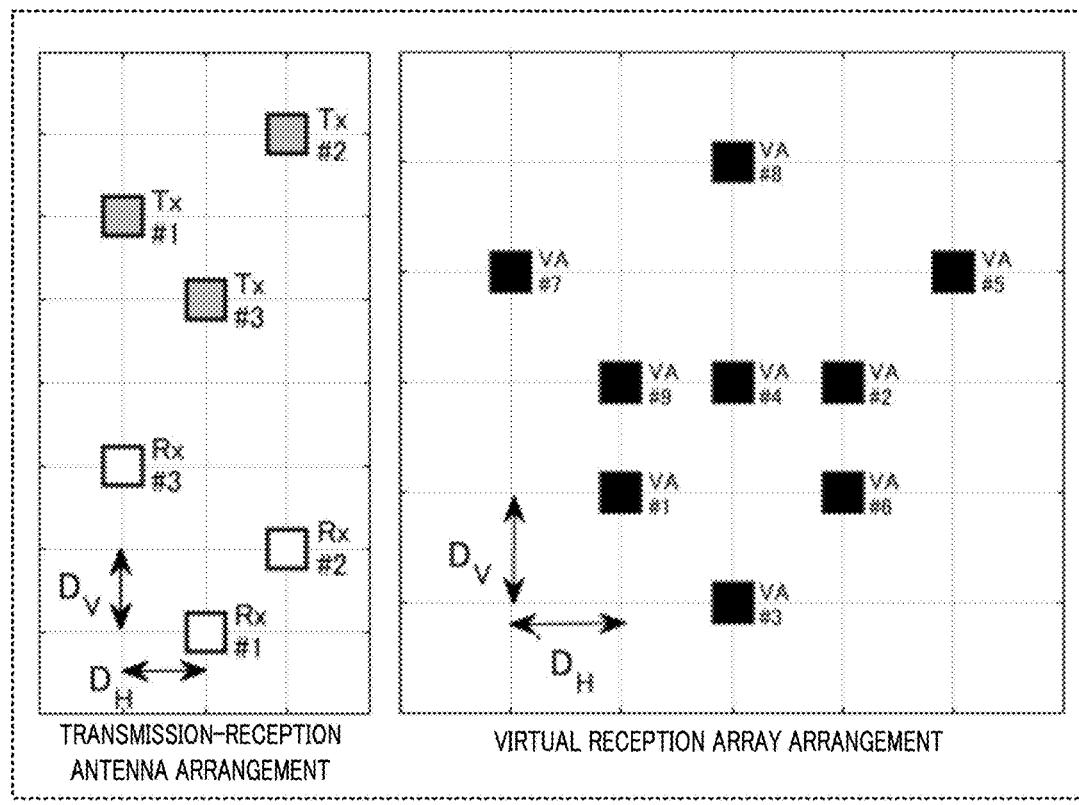

FIG. 92A is a MIMO array arrangement in the case where $N_{TxVGroup1\_ANT}$=1 (Tx #2), $N_{TxVGroup2\_ANT}$=2 (Tx #1 and Tx #3), $N_{RxHGroup1\_ANT}$=1 (Rx #3), and $N_{RxHGroup2\_ANT}$=2 (Rx #1 and Rx #2).

Figure 92B:
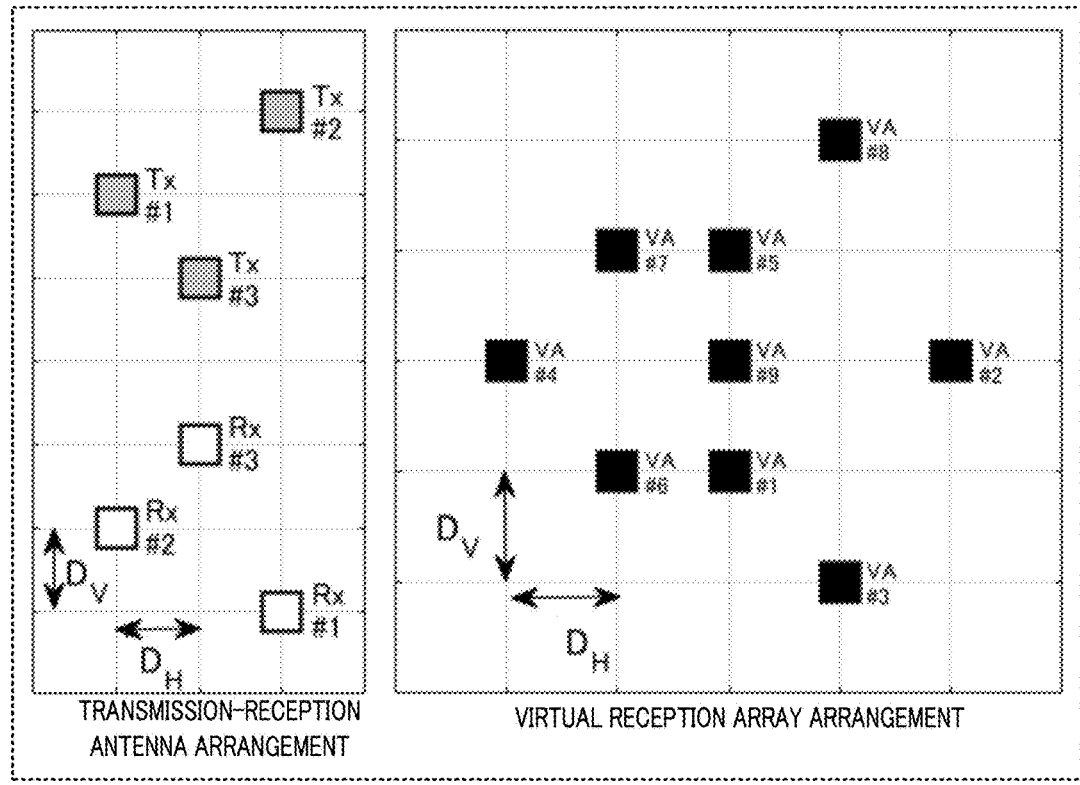

FIG. 92B is a MIMO array arrangement in the case where $N_{TxHGroup1\_ANT}$=1 (Tx #2), $N_{TxVGroup2\_ANT}$=2 (Tx #1 and Tx #3), $N_{RxHGroup1\_ANT}$=2 (Rx #2 and Rx #3), and $N_{RxHGroup2\_ANT}$=1 (Rx #1).

Figure 92C:
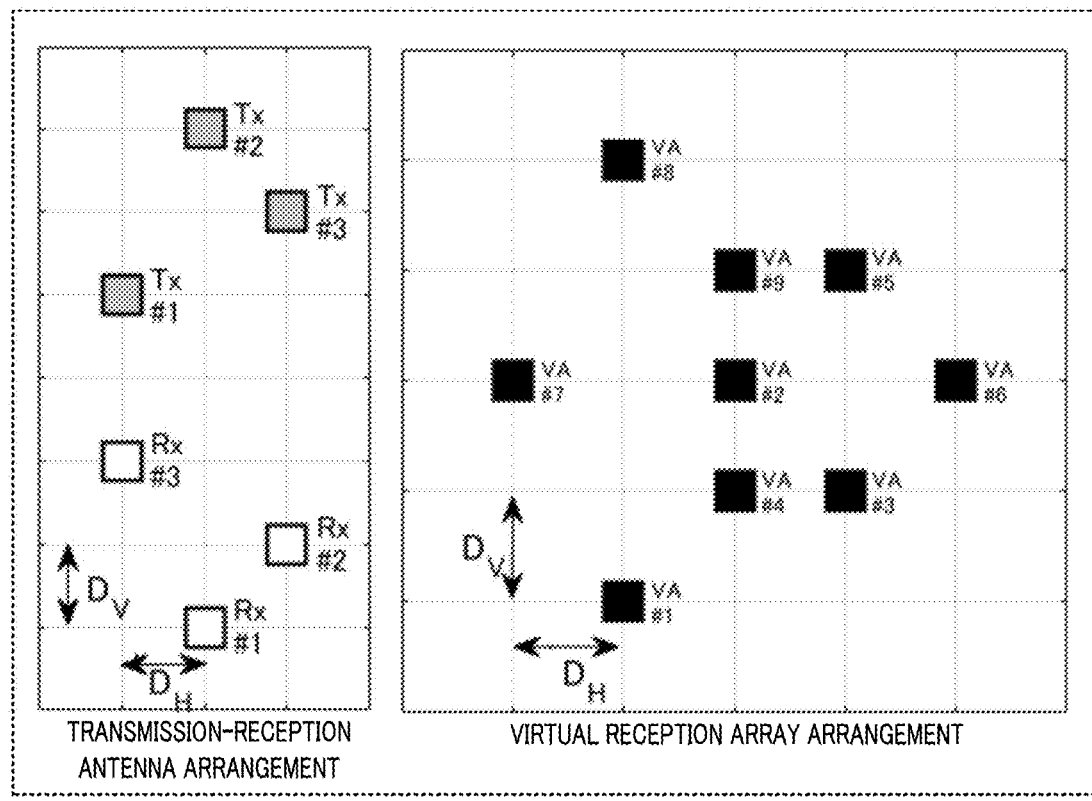

FIG. 92C is a MIMO array arrangement in the case where $N_{TxVGroup1\_ANT}$=2 (Tx #2 and Tx #3), $N_{TxVGroup2\_ANT}$=1 (Tx #1), $N_{RxHGroup1\_ANT}$=1 (Rx #3), and $N_{RxHGroup2\_ANT}$=2 (Rx #1 and Rx #2).

Figure 92D:
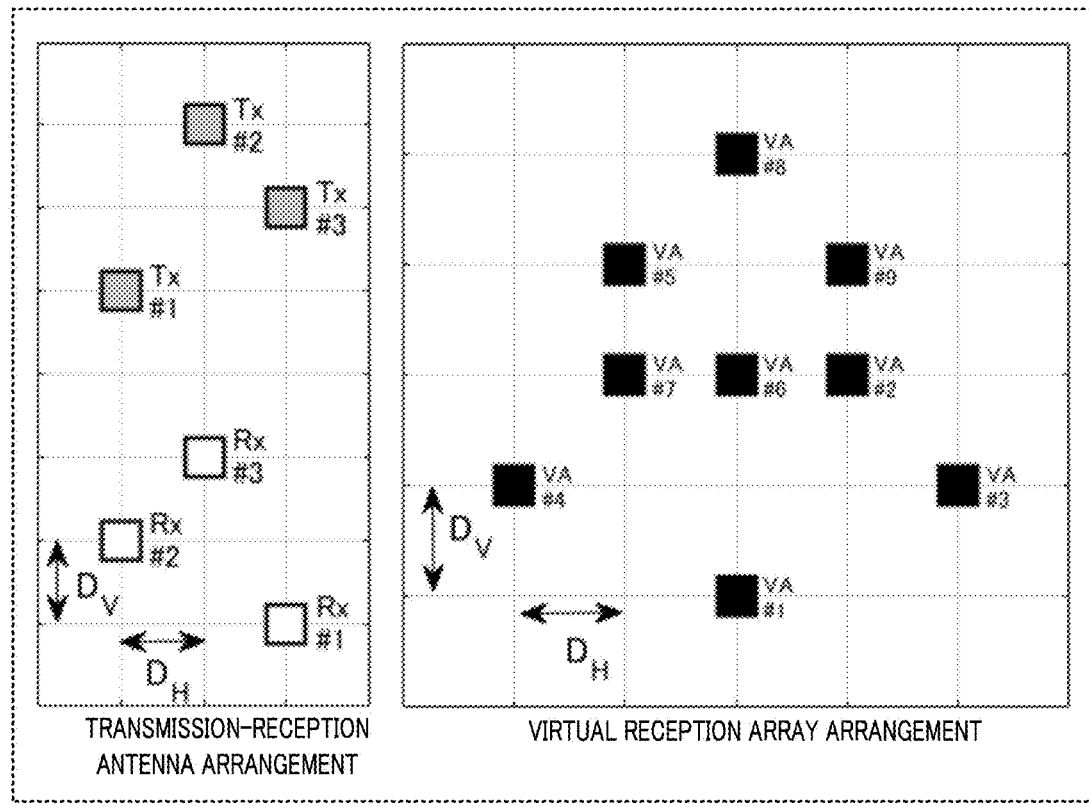

FIG. 92D is a MIMO array arrangement in the case where $N_{TxVGroup1\_ANT}$=2 (Tx #2, Tx #3), $N_{TxVGroup2\_ANT}$=1 (Tx #1), $N_{RxHGroup1\_ANT}$=2 (Rx #2, Rx #3), and $N_{RxHGroup2\_ANT}$=1 (Rx #1).

In each of the virtual reception arrays respectively shown in FIGS. 90A, 90B, 91A, 91B, and 92A to 92D, the virtual array elements are arranged at different positions without any overlap, so the aperture length of the virtual reception array is expanded, and angular resolution is improved.

The virtual array elements positioned around the center of the virtual reception array are densely arranged at a spacing of $D_H$ and a spacing of $D_V$. For example, in each of FIGS. 90A, 90B, 91A, 91B, and 92A to 92D, when the spacing $D_H$ and the spacing $D_V$ are set to about $0.5\lambda$, the virtual array elements positioned around the center of the virtual reception array are arranged at a spacing of $D_H=0.5\lambda$ in the horizontal direction and a spacing of $D_V=0.5\lambda$, in the vertical direction. With this configuration, grating lobes are reduced.

For example, in the MIMO array arrangement of basic arrangement 5, when the spacing $D_H$ and the spacing $D_V$ are set to about $0.5\lambda$, the horizontal and vertical element sizes of each transmission antenna 106 and each reception antenna 202 can be designed to a size greater than or equal to about $1\lambda$.

Figure 93A:
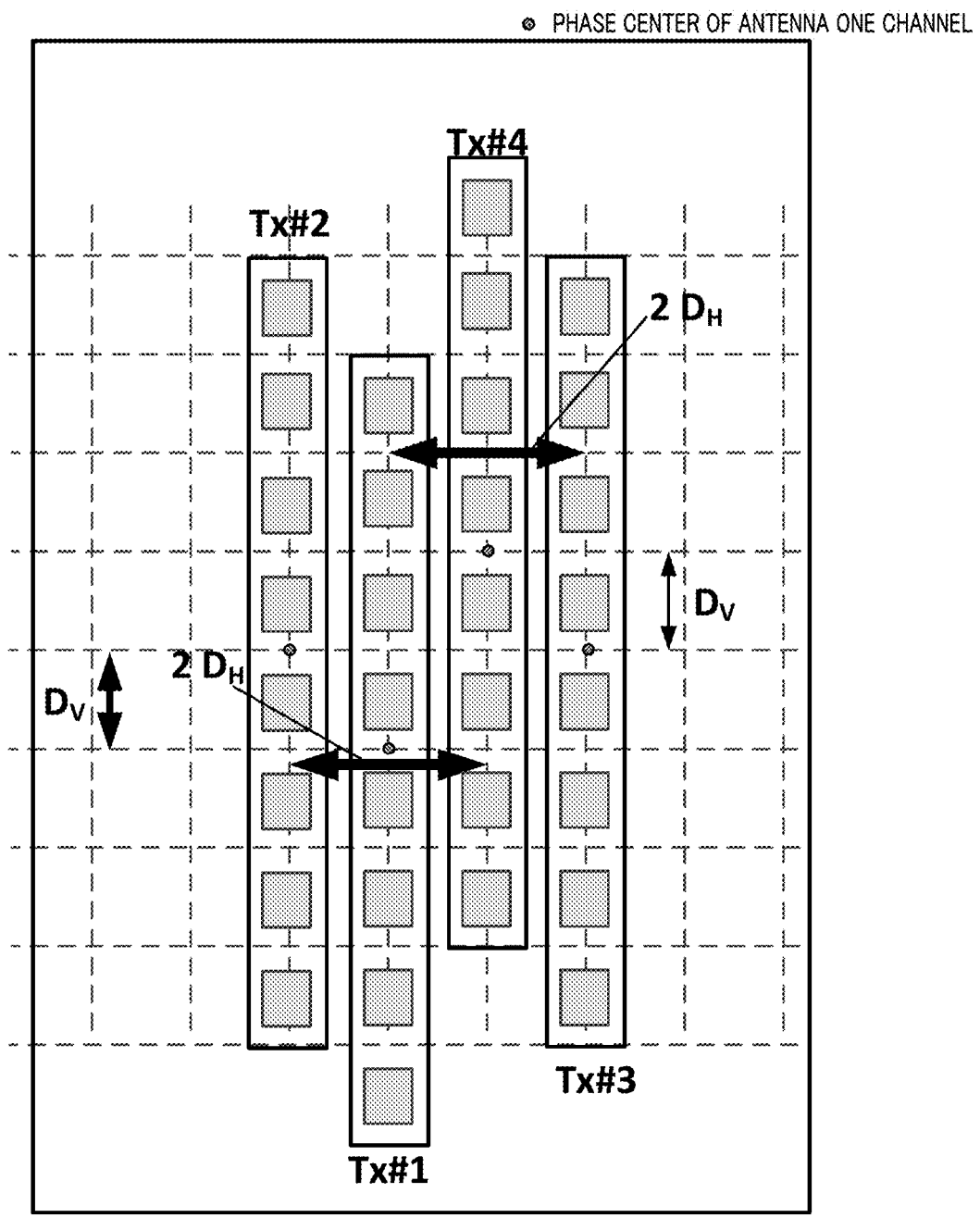
Figure 93B:
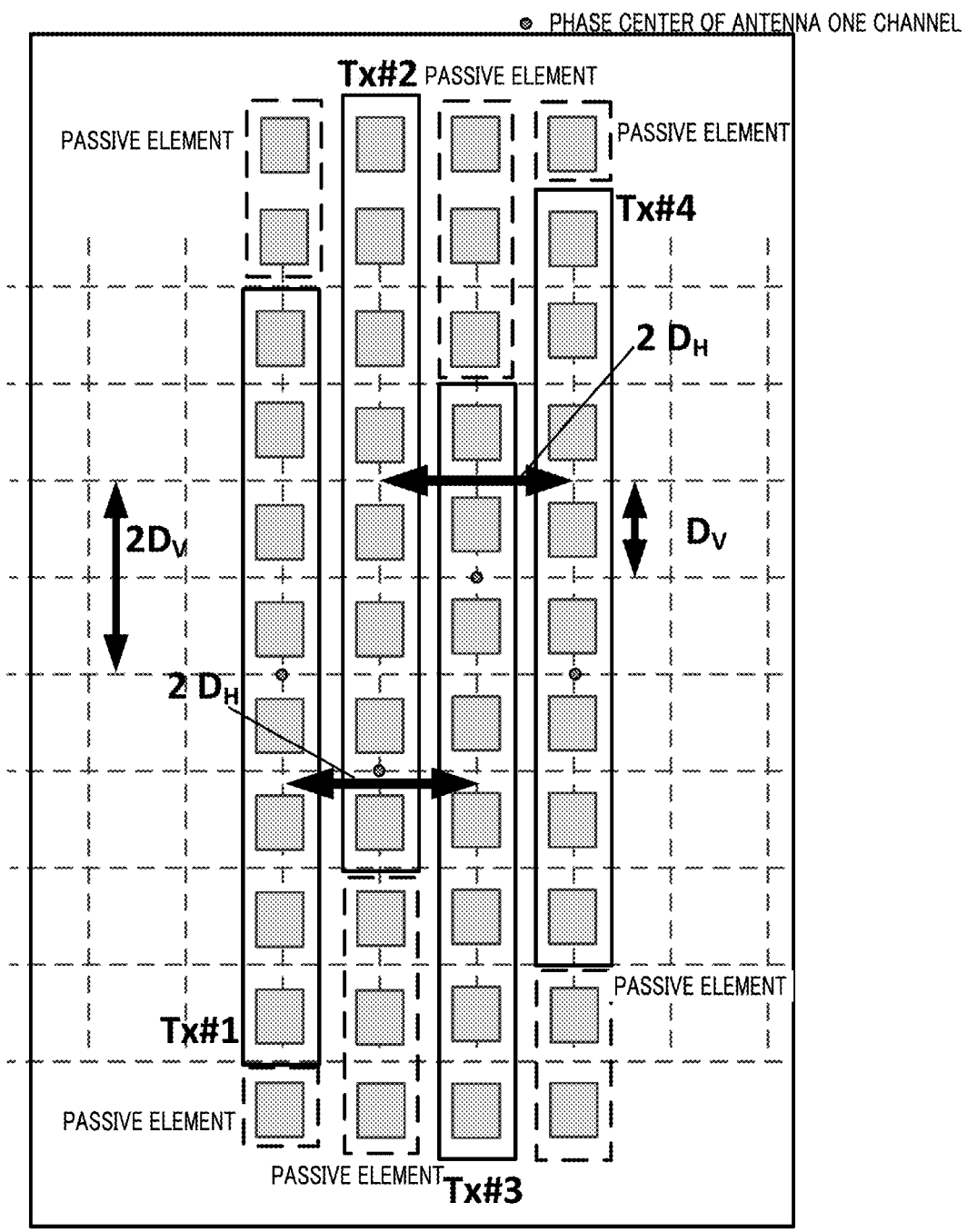

With this configuration, when, for example, the element size in the cross direction $W_{ANT}$ of each transmission antenna 106 and each reception antenna 202 is less than $D_H$, an antenna with any size in the longitudinal direction may be used. For example, FIG. 93A shows an example in which a sub-array in which planar patch antennas are arranged in a one by eight matrix as shown in FIG. 25A is applied to the antenna arrangement shown in FIG. 89. As shown in FIG. 93B, in addition to the transmission array antenna shown in FIG. 93A, passive elements (dummy elements) may be arranged. With the passive elements, the influence of antenna-to-antenna coupling of any adjacent antennas is equalized among the antennas, so the directivity characteristics of each of the transmission antennas (Tx #1 to Tx #4) are equalized.

In this way, in the antenna arrangement according to basic arrangement 5, when the antenna having a sub-array configuration is used, the directivity gain of the antenna is improved, and the detection performance (for example, detection distance) of radar apparatus 10 is improved.

Direction estimator 214 performs direction estimation processing in the horizontal direction and in the vertical direction by using received signals of the virtual reception array obtained from the above-described transmission-reception antenna arrangement. Processing on the virtual reception array of basic arrangement 5 in direction estimator 214 is similar to that of basic arrangement 1, so the description thereof will not be repeated here.

Figure 94:
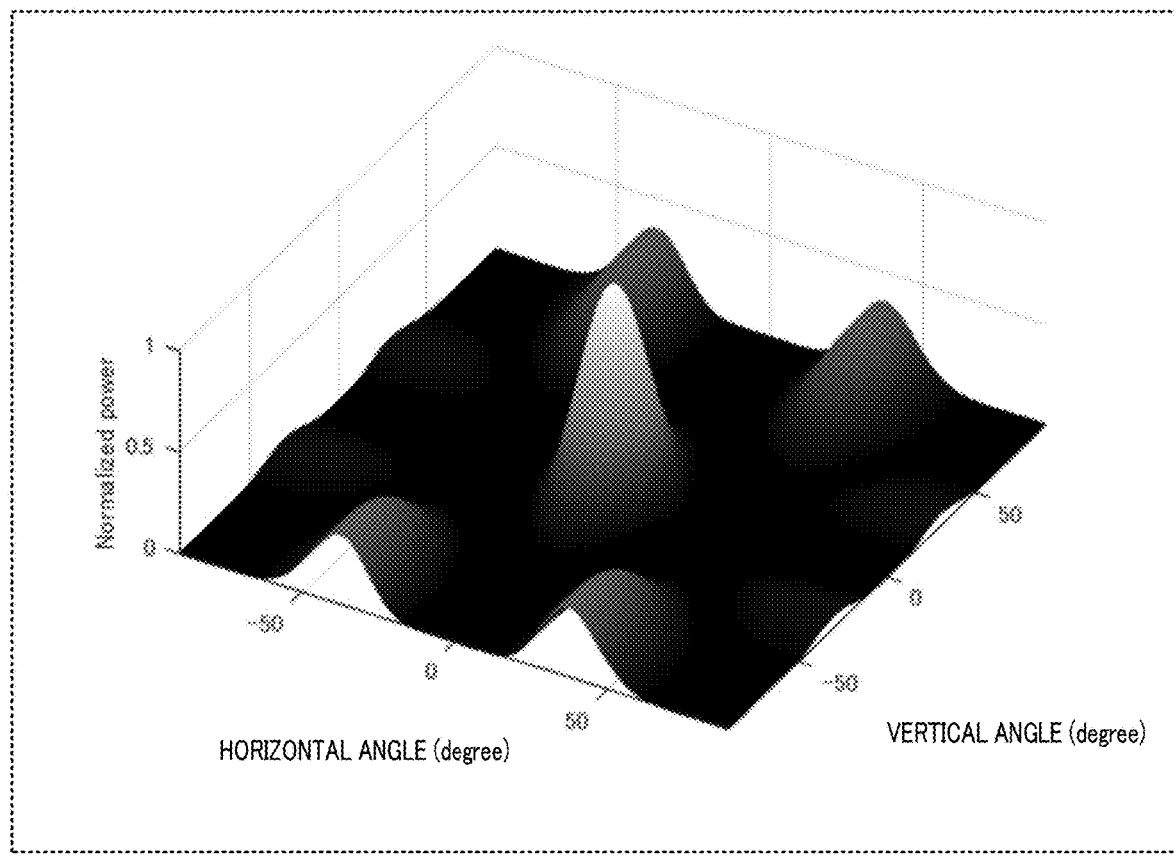

FIG. 94 shows an example of a direction estimation result in the case where, when, for example, the MIMO array arrangement in which the number Nt of transmission antennas 106 is four and the number Na of reception antennas 202 is four ($D_H=0.5\lambda$, and $D_V=0.5\lambda$) is used as shown in FIG. 89, a beam former method is used as the direction-of-arrival estimation algorithm of direction estimator 214. In other words, in FIG. 94, the horizontal and vertical antenna spacings of each transmission antenna 106 are greater than or equal to $1\lambda$ and the horizontal and vertical antenna spacings of each reception antenna 202 are also greater than or equal to $1\lambda$. The directivity of each antenna is calculated as omnidirectivity.

In FIG. 94, outputs of the direction-of-arrival estimation evaluation function value in the range of ±90 degrees in the horizontal direction and in the range of ±90 degrees in the vertical direction in the case where a target true value is set at zero degrees in the horizontal direction and zero degrees in the vertical direction are plotted.

It is identified in FIG. 94 that, at directions other than zero degrees in the horizontal direction or zero degrees in the vertical direction, grating lobes are reduced as compared to FIG. 1A. For example, in FIG. 94, the ratio (PSLR) of the peak power level of the highest side lobe, other than a main lobe, at directions other than zero degrees in the horizontal direction or zero degrees in the vertical direction, to the peak power level of the main lobe at the direction of zero degrees in the horizontal direction and zero degrees in the vertical direction is about 0.35.

As described above, when the MIMO array arrangement according to basic arrangement 5 is used, even the element size of each antenna in the longitudinal direction or in the cross direction, used for the transmission array antenna and the reception array antenna, is about $1\lambda$ the arrangement can be performed such that the horizontal and vertical antenna spacings in the virtual reception array include an interelement spacing of about $0.5\lambda$, so grating lobes are reduced. For example, the virtual array elements of the virtual reception array shown in FIG. 52A are arranged without any overlap, so the aperture length of the virtual reception array is expanded, and angular resolution is improved.

Modification 1 of Basic Arrangement 5

In Modification 1 of basic arrangement 5, a MIMO array arrangement in which each of the arrangement of the transmission array antenna and the reception array antenna shown in basic arrangement 5 is defined as a base set and the arrangement positions of a plurality of the base sets are offset will be described.

Hereinafter, each of arrangement methods 5-1A, 5-1B, and 5-1C in Modification 1 of basic arrangement 5 will be described.

Arrangement Method 5-1A

In the arrangement method 5-1A, a MIMO array arrangement in which each of the arrangement of the four-element transmission array antenna and the four-element reception array antenna shown in basic arrangement 5 is defined as a base set and the arrangement positions of a plurality of the base sets are offset will be described.

In the arrangement described below, the offset of the base set of the transmission array antenna with respect to the horizontal and vertical arrangement positions or the offset of the base set of the reception array antenna with respect to the horizontal and vertical arrangement positions may be set such that there are no overlap elements in the arrangement of a virtual reception array and more virtual array elements are densely arranged at a spacing of $D_V$ or $D_H$ around the center of the virtual reception array. Not limited to this configuration, when, for example, the arrangement in which an unequal spacing arrangement is increased in the arrangement of a virtual reception array or the arrangement in which virtual array elements overlap is increased in the arrangement of a virtual reception array, it can be achieved by adjusting the offset of the arrangement position similarly.

Figure 95:
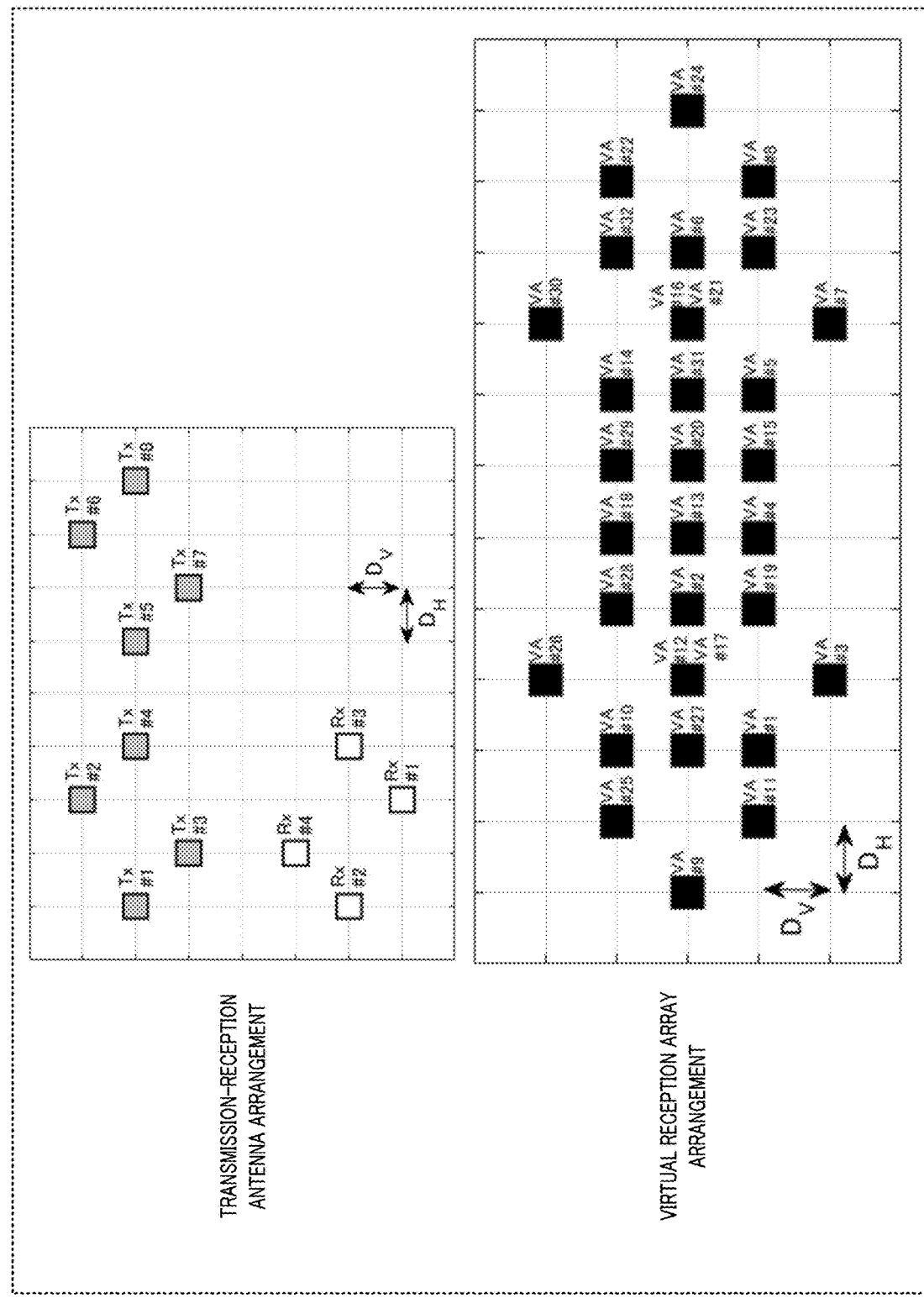

FIG. 95 shows an example of a MIMO array arrangement in the case where the number of base sets of the transmission array antenna is set to $N_{TxBaseSet}=2$ and the number of base sets of the reception array antenna is set to $N_{RxBaseSet}=1$ and an example of the arrangement of a virtual reception array. In FIG. 95, the offset of the horizontal arrangement position of the second base set (Tx #5, Tx #6, Tx #7, and Tx #8) with respect to the first base set (Tx #1, Tx #2, Tx #3, and Tx #4) is set to $D_{Hoffset\_TxBaseSet2}=5D_H$, and the offset of the vertical arrangement position of the second base set is set to $D_{Voffset\_TxBaseSet2}=0$. As shown in FIG. 95, with the arrangement in which the two base sets of the transmission array antenna are offset in the horizontal direction, the number of virtual array elements densely arranged at a spacing of $D_H$ in the horizontal direction can be increased, so angular resolution in the horizontal direction is improved. In the case of FIG. 95, virtual array elements overlap at two portions.

Figure 96:
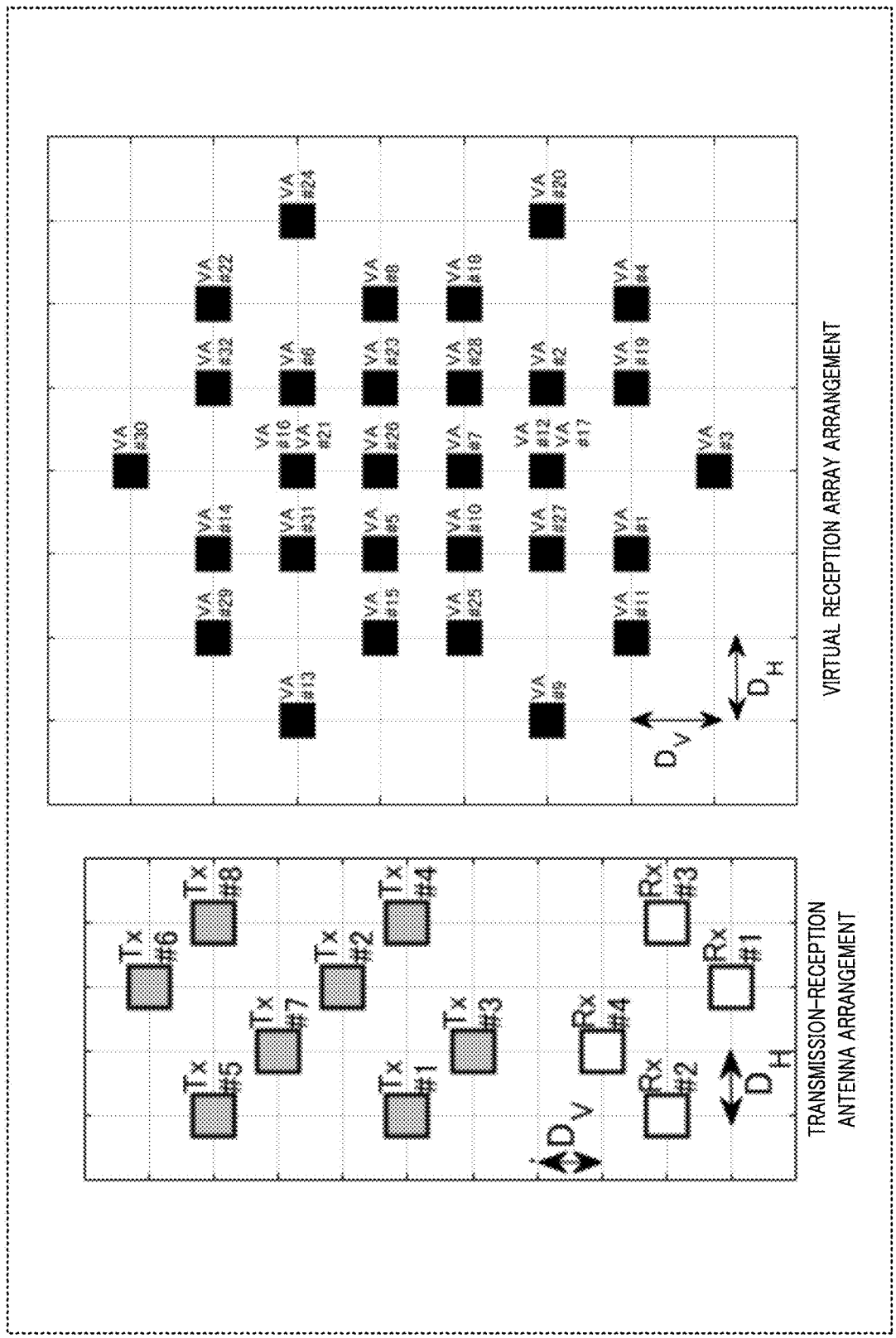

FIG. 96 shows an example of a MIMO array arrangement in the case where the number of base sets of the transmission array antenna is set to $N_{TxBaseSet}=2$ and the number of base sets of the reception array antenna is set to $N_{RxBaseSet}=1$ and an example of the arrangement of a virtual reception array. In FIG. 96, the offset of the horizontal arrangement position of the second base set (Tx #5, Tx #6, Tx #7, and Tx #8) with respect to the first base set (Tx #1, Tx #2, Tx #3, and Tx #4) is set to $D_{Hoffset\_TxBaseSet2}=0$, and the offset of the vertical arrangement position of the second base set is set to $D_{Voffset\_TxBaseSet2}=3D_V$. As shown in FIG. 96, with the arrangement in which the two base sets of the transmission array antenna are offset in the vertical direction, the number of virtual array elements densely arranged at a spacing of $D_V$ in the vertical direction can be increased, so angular resolution in the horizontal direction is improved. In the case of FIG. 96, virtual array elements overlap at two portions.

Figure 97:
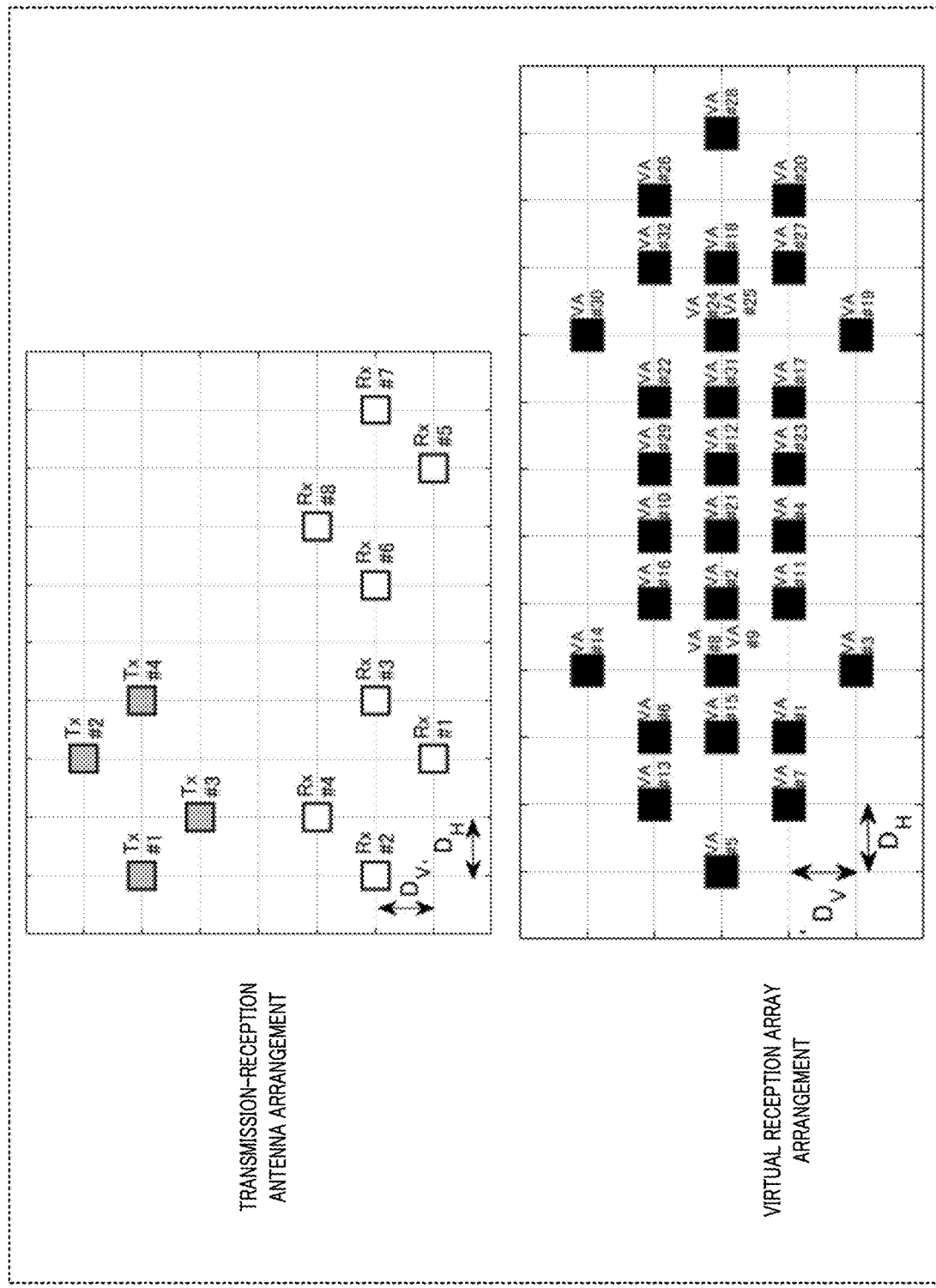

FIG. 97 shows an example of a MIMO array arrangement in the case where the number of base sets of the transmission array antenna is set to $N_{TxBaseSet}=1$ and the number of base sets of the reception array antenna is set to $N_{RxBaseSet}=2$ and an example of the arrangement of a virtual reception array. In FIG. 97, the offset of the horizontal arrangement position of the second base set (for example, Rx #5, Rx #6, Rx #7, and Rx #8) with respect to the first base set (for example, Rx #1, Rx #2, Rx #3, and Rx #4) is set to $D_{Hoffset\_RxBaseSet2}=5D_H$, and the offset of the vertical arrangement position of the second base set is set to $D_{Voffset\_RxBaseSet2}=0$. As shown in FIG. 97, with the arrangement in which the two base sets of the reception array antenna are offset in the horizontal direction, the number of virtual array elements densely arranged at a spacing of $D_H$ in the horizontal direction can be increased, so angular resolution in the horizontal direction is possible. In the case of FIG. 97, virtual array elements overlap at two portions.

Figure 98:
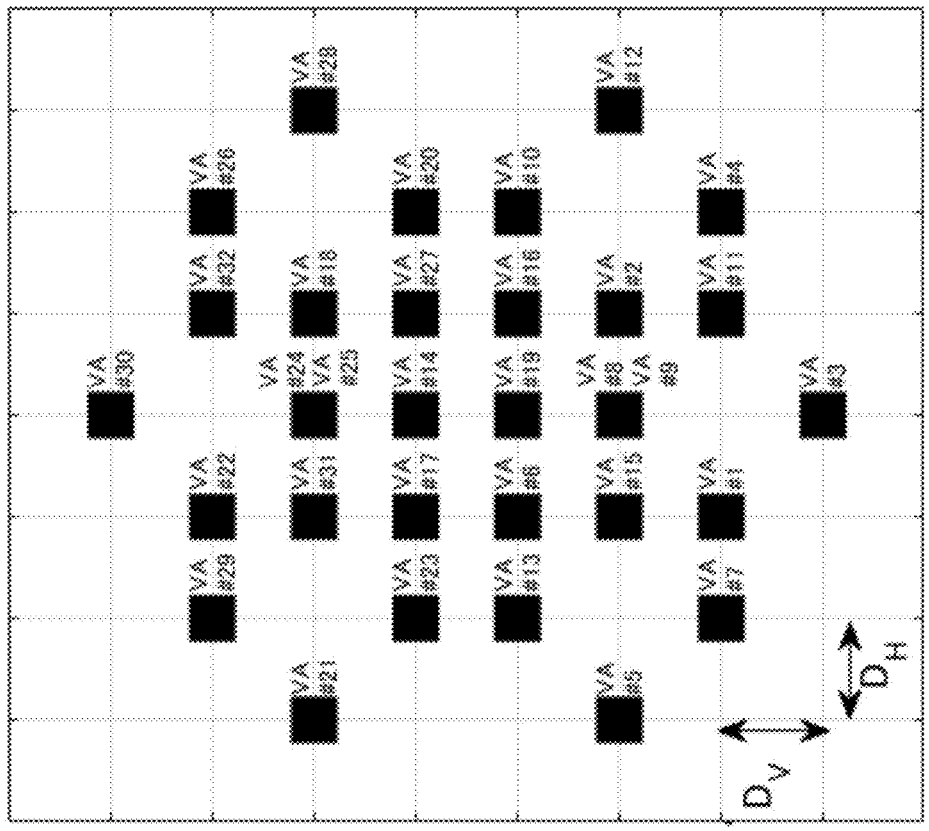
Figure 98:
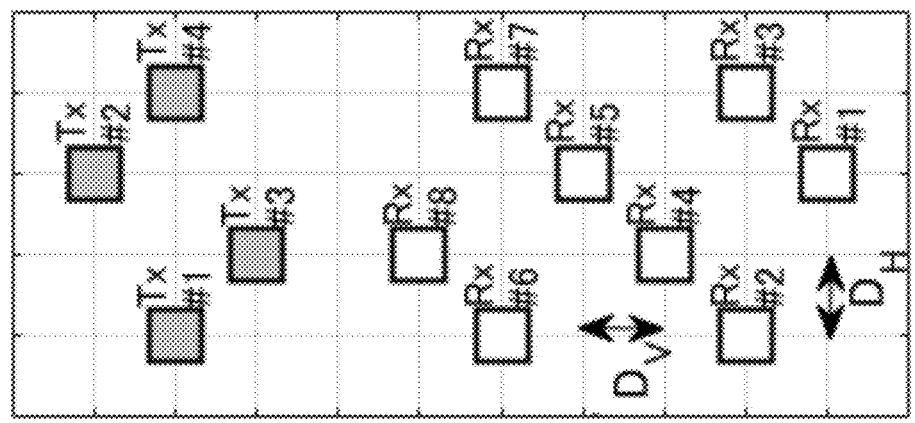

FIG. 98 shows an example of a MIMO array arrangement in the case where the number of base sets of the transmission array antenna is set to $N_{TxBaseSet}=1$ and the number of base sets of the reception array antenna is set to $N_{RxBaseSet}=2$ and an example of the arrangement of a virtual reception array. In FIG. 98, the offset of the horizontal arrangement position of the second base set (Rx #5, Rx #6, Rx #7, and Rx #8) with respect to the first base set (for example, Rx #1, Rx #2, Rx #3, and Rx #4) is set to $D_{Hoffset\_RxBaseSet2}=0$, and the offset of the vertical arrangement position of the second base set is set to $D_{Voffset\_RxBaseSet2}=3D_V$. As shown in FIG. 98, with the arrangement in which the two base sets of the reception array antenna are offset in the vertical direction, the number of virtual array elements densely arranged at a spacing of $D_V$ in the vertical direction can be increased, so angular resolution in the vertical direction is improved. In the case of FIG. 98, virtual array elements overlap at two portions.

Figure 99:
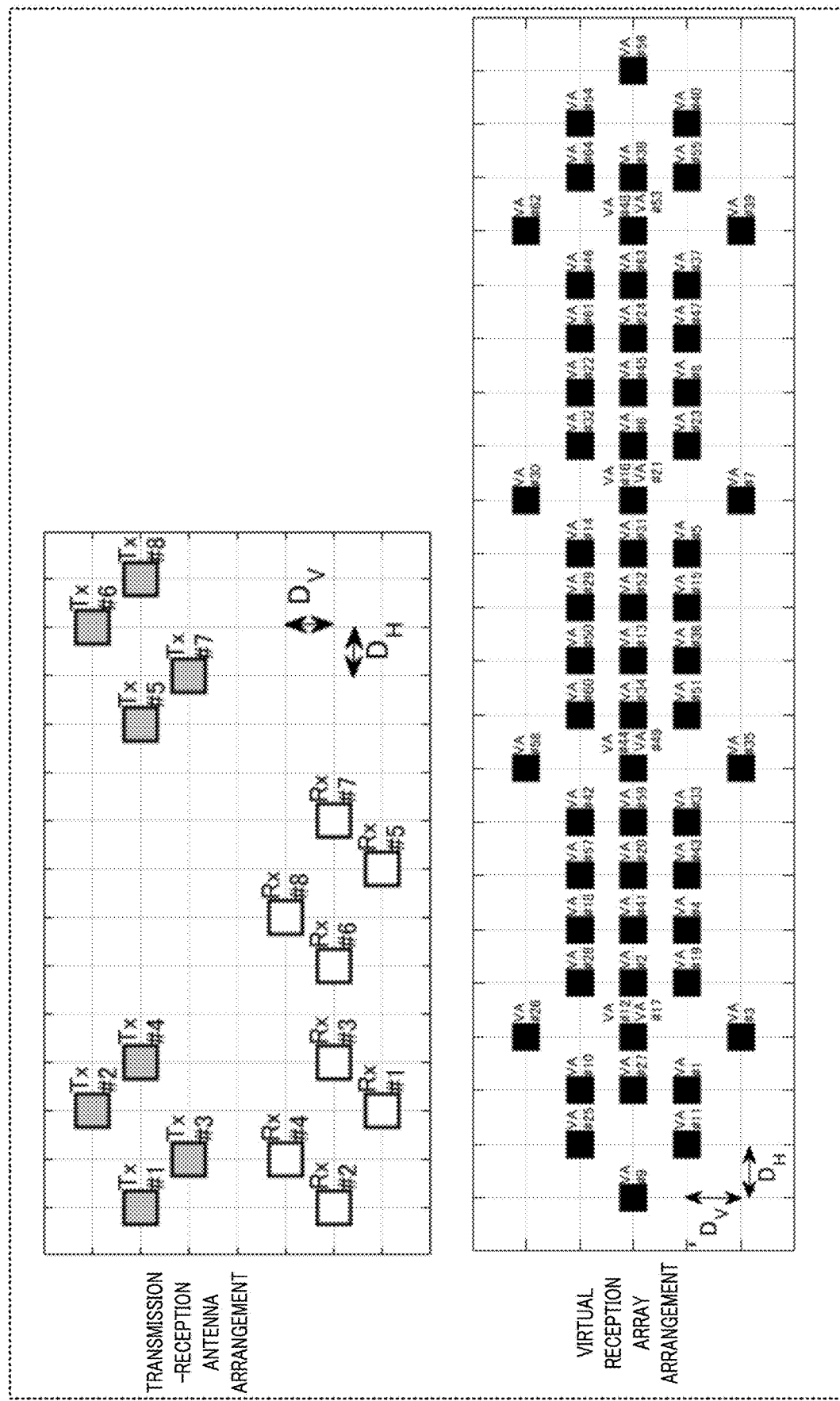

FIG. 99 shows an example of a MIMO array arrangement in the case where the number of base sets of the transmission array antenna is set to $N_{TxBaseSet}=2$ and the number of base sets of the reception array antenna is set to $N_{RxBaseSet}=2$ and an example of the arrangement of a virtual reception array. In FIG. 99, the offset of the horizontal arrangement position of the second base set (Tx #5, Tx #6, Tx #7, and Tx #8) with respect to the first base set (for example, Tx #1, Tx #2, Tx #3, and Tx #4) of the transmission array antenna is set to $D_{Hoffset\_TxBaseSet2}=10D_H$, and the offset of the vertical arrangement position of the second base set is set to $D_{Voffset\_TxBaseSet2}=0$. In FIG. 99, the offset of the horizontal arrangement position of the second base set (Rx #5, Rx #6, Rx #7, and Rx #8) with respect to the first base set (for example, Rx #1, Rx #2, Rx #3, and Rx #4) of the reception array antenna is set to $D_{Hoffset\_RxBaseSet2}=5D_H$, and the offset of the vertical arrangement position of the second base set is set to $D_{Voffset\_RxBaseSet2}=0$. As shown in FIG. 99, with the arrangement in which the two base sets of the transmission array antenna are offset in the horizontal direction and the arrangement in which the two base sets of the reception array antenna are offset in the horizontal direction, the number of virtual array elements densely arranged at a spacing of $D_H$ in the horizontal direction can be further increased as compared to, for example, FIG. 95 or FIG. 97, so angular resolution in the horizontal direction is further improved. In the case of FIG. 99, virtual array elements overlap at four portions.

FIG. 100A shows an example of a MIMO array arrangement in the case where the number of base sets of the transmission array antenna is set to $N_{TxBaseSet}=2$ and the number of base sets of the reception array antenna is set to $N_{RxBaseSet}=4$. FIG. 100B shows an example of the arrangement of a virtual reception array.

In FIG. 100A, the offset of the horizontal arrangement position of the second base set (Tx #5, Tx #6, Tx #7, and Tx #8) with respect to the first base set (for example, Tx #1, Tx #2, Tx #3, and Tx #4) of the transmission array antenna is set to $D_{Hoffset\_TxBaseSet2}=5D_H$, and the offset of the vertical arrangement position of the second base set is set to $D_{Voffset\_TxBaseSet2}=00$.

In FIG. 100A, with respect to the first base set (for example, Rx #1, Rx #2, Rx #3, and Rx #4) of the reception array antenna, the offset of the horizontal arrangement position of the second base set (Rx #5, Rx #6, Rx #7, and Rx #8) is set to $D_{Hoffset\_RxBaseSet2}=5D_H$, the offset of the vertical arrangement position of the second base set is set to $D_{Voffset\_RxBaseSet2}=-3D_V$, the offset of the horizontal arrangement position of the third base set (Rx #9, Rx #10, Rx #11, and Rx #12) is set to $D_{Hoffset\_RxBaseSet3}=-5D_H$, the offset of the vertical arrangement position of the third base set is set to $D_{Voffset\_RxBaseSet3}=-3D_V$, the offset of the horizontal arrangement position of the fourth base set (Rx #13, Rx #14, Rx #15, and Rx #16) is set to $D_{Hoffset\_RxBaseSet4}=0$, and the offset of the vertical arrangement position of the fourth base set is set to $D_{Voffset\_RxBaseSet4}=-6D_V$.

As shown in FIGS. 100A and 100B, with the arrangement in which the base sets of the transmission array antenna are offset in the horizontal direction and the arrangement in which the base sets of reception array antenna are offset in the horizontal direction, the number of virtual array elements densely arranged at a spacing of $D_H$ in the horizontal direction can be further increased as compared to, for example, FIG. 95 or FIG. 97, so angular resolution in the horizontal direction is further improved.

Similarly, as shown in FIGS. 100A and 100B, with the arrangement in which the base sets of the reception array antenna are offset in the vertical direction, the number of virtual array elements densely arranged at a spacing of $D_V$ in the vertical direction can be increased, so angular resolution in the vertical direction is improved. In the case of FIG. 100B, virtual array elements overlap at eight portions.

Arrangement Method 5-1B

In the arrangement method 5-1B, a MIMO array arrangement in which each of the arrangement of the four-element transmission array antenna and the three-element reception array antenna shown in basic arrangement 5 or each of the arrangement of the three-element transmission array antenna and the arrangement of the four-element reception array antenna is defined as a base set and the arrangement positions of a plurality of the base sets are offset will be described.

Hereinafter, the case where the antenna arrangement shown in FIG. 90A is used as a base set will be described as an example. The antenna arrangement is not limited to the example shown in FIG. 90A and may be another antenna arrangement (for example, FIG. 90B, FIG. 91A, or FIG. 91B).

In the arrangement described below, the offset of the base set of the transmission array antenna with respect to the horizontal and vertical arrangement positions or the offset of the base set of the reception array antenna with respect to the horizontal and vertical arrangement positions may be set such that there are no overlap elements in the arrangement of a virtual reception array and more virtual array elements are densely arranged at a spacing of $D_V$ or $D_H$ around the center of the virtual reception array. Not limited to this configuration, when, for example, the arrangement in which an unequal spacing arrangement is increased in the arrangement of a virtual reception array or the arrangement in which virtual array elements overlap is increased in the arrangement of a virtual reception array, it can be achieved by adjusting the offset of the arrangement position similarly.

FIG. 101 shows an example of a MIMO array arrangement in the case where the number of base sets of the transmission array antenna is set to $N_{TxBaseSet}=2$ and the number of base sets of the reception array antenna is set to $N_{RxBaseSet}=1$ and an example of the arrangement of a virtual reception array. In FIG. 101, the offset of the horizontal arrangement position of the second base set (Tx #4, Tx #5, and Tx #6) with respect to the first base set (Tx #1, Tx #2, and Tx #3) is set to $D_{Hoffset\_TxBaseSet2}=4D_H$, and the offset of the vertical arrangement position of the second base set is set to $D_{Voffset\_TxBaseSet2}=D_V$. As shown in FIG. 101, with the arrangement in which the two base sets of the transmission array antenna are offset in the horizontal direction, the number of virtual array elements densely arranged at a spacing of $D_H$ in the horizontal direction can be increased, so angular resolution in the horizontal direction is improved.

FIG. 102 shows an example of a MIMO array arrangement in the case where the number of base sets of the transmission array antenna is set to $N_{TxBaseSet}=2$ and the number of base sets of the reception array antenna is set to $N_{RxBaseSet}=1$ and an example of the arrangement of a virtual reception array. In FIG. 102, the offset of the horizontal arrangement position of the second base set (Tx #4, Tx #5, and Tx #6) with respect to the first base set (Tx #1, Tx #2, and Tx #3) is set to $D_{Hoffset\_TxBaseSet2}=0$, and the offset of the vertical arrangement position of the second base set is set to $D_{Voffset\_TxBaseSet2}=3D_V$. As shown in FIG. 102, with the arrangement in which the two base sets of the transmission array antenna are offset in the vertical direction, the number of virtual array elements densely arranged at a spacing of $D_V$ in the vertical direction can be increased, so angular resolution in the vertical direction is improved.

FIG. 103 shows an example of a MIMO array arrangement in the case where the number of base sets of the transmission array antenna is set to $N_{TxBaseSet}=1$ and the number of base sets of the reception array antenna is set to $N_{RxBaseSet}=2$ and an example of the arrangement of a virtual reception array. In FIG. 103, the offset of the horizontal arrangement position of the second base set (Rx #5, Rx #6, Rx #7, and Rx #8) with respect to the first base set (for example, Rx #1, Rx #2, Rx #3, and Rx #4) is set to $D_{Hoffset\_RxBaseSet2}=4D_H$, and the offset of the vertical arrangement position of the second base set is set to $D_{Voffset\_RxBaseSet2}=D_V$. As shown in FIG. 103, with the arrangement in which the two base sets of the reception array antenna are offset in the horizontal direction, the number of virtual array elements densely arranged at a spacing of $D_H$ in the horizontal direction can be increased, so angular resolution in the horizontal direction is improved.

FIG. 104 shows an example of a MIMO array arrangement in the case where the number of base sets of the transmission array antenna is set to $N_{TxBaseSet}=1$ and the number of base sets of the reception array antenna is set to $N_{RxBaseSet}=2$ and an example of the arrangement of a virtual reception array. In FIG. 104, the offset of the horizontal arrangement position of the second base set (Rx #5, Rx #6, Rx #7, and Rx #8) with respect to the first base set (for example, Rx #1, Rx #2, Rx #3, and Rx #4) is set to $D_{Hoffset\_RxBaseSet2}=0$, and the offset of the vertical arrangement position of the second base set is set to $D_{Voffset\_RxBaseSet2}=3D_V$. As shown in FIG. 104, with the arrangement in which the two base sets of the reception array antenna are offset in the vertical direction, the number of virtual array elements densely arranged at a spacing of $D_V$ in the vertical direction can be increased, so angular resolution in the vertical direction is improved.

FIG. 105 shows an example of a MIMO array arrangement in the case where the number of base sets of the transmission array antenna is set to $N_{TxBaseSet}=2$ and the number of base sets of the reception array antenna is set to $N_{RxBaseSet}=2$ and an example of the arrangement of a virtual reception array. In FIG. 105, with respect to the first base set (Tx #1, Tx #2, and Tx #3) of the transmission array antenna, the offset of the horizontal arrangement position of the second base set (Tx #4, Tx #5, and Tx #6) is set to $D_{Hoffset\_TxBaseSet2}=4D_H$, and the offset of the vertical arrangement position of the second base set is set to $D_{Hoffset\_TxBaseSet2}=-2D_V$. In FIG. 105, the offset of the horizontal arrangement position of the second base set (Rx #5, Rx #6, Rx #7, and Rx #8) with respect to the first base set (for example, Rx #1, Rx #2, Rx #3, and Rx #4) of the reception array antenna is set to $D_{Hoffset\_RxBaseSet2}=4D_H$, and the offset of the vertical arrangement position of the second base set is set to $D_{Voffset\_RxBaseSet2}=D_V$. As shown in FIG. 105, with the arrangement in which the two base sets of the transmission array antenna are offset in the horizontal direction and the arrangement in which the two base sets of the reception array antenna are offset in the horizontal direction, the number of virtual array elements densely arranged at a spacing of $D_H$ in the horizontal direction can be further increased as compared to, for example, FIG. 101 or FIG. 103, so angular resolution in the horizontal direction is further improved.

FIG. 106A shows an example of a MIMO array arrangement in the case where the number of base sets of the transmission array antenna is set to $N_{TxBaseSet}=2$ and the number of base sets of the reception array antenna is set to $N_{RxBaseSet}=4$. FIG. 106B shows an example of the arrangement of a virtual reception array.

In FIG. 106A, with respect to the first base set (Tx #1, Tx #2, and Tx #3) of the transmission array antenna, the offset of the horizontal arrangement position of the second base set (Tx #4, Tx #5, and Tx #6) is set to $D_{Hoffset\_TxBaseSet2}=4D_H$, and the offset of the vertical arrangement position of the second base set is set to $D_{Voffset\_TxBaseSet2}=D_V$.

In FIG. 106A, with respect to the first base set (for example, Rx #1, Rx #2, Rx #3, and Rx #4) of the reception array antenna, the offset of the horizontal arrangement position of the second base set (Tx #5, Tx #6, Tx #7, and Tx #8) is set to $D_{Hoffset\_RxBaseSet2}=4D_H$, the offset of the vertical arrangement position of the second base set is set to $D_{Voffset\_RxBaseSet2}=2D_V$, the offset of the horizontal arrangement position of the third base set (Tx #9, Tx #10, Tx #11, and Tx #12) is set to $D_{Hoffset\_RxBaseSet3}=-6D_H$, the offset of the vertical arrangement position of the third base set is set to $D_{Voffset\_RxBaseSet3}=-3D_V$, the offset of the horizontal arrangement position of the fourth base set (Tx #13, Tx #14, Tx #15, and Tx #16) is set to $D_{Hoffset\_RxBaseSet4}=-2D_H$, and the offset of the vertical arrangement position of the fourth base set is set to $D_{Voffset\_RxBaseSet4}=-5D_V$.

As shown in FIGS. 106A and 106B, with the arrangement in which the base sets of the transmission array antenna are offset in the horizontal direction and the arrangement in which the base sets of the reception array antenna are offset in the horizontal direction, the number of virtual array elements densely arranged at a spacing of $D_H$ in the horizontal direction can be further increased as compared to, for example, FIG. 101 or FIG. 103, so angular resolution in the horizontal direction is further improved.

Similarly, as shown in FIGS. 106A and 106B, with the arrangement in which the base sets of reception array antenna are offset in the vertical direction, the number of virtual array elements densely arranged at a spacing of $D_V$ in the vertical direction can be increased, so angular resolution in the vertical direction is improved.

Arrangement Method 5-1C

In the arrangement method 5-1C, a MIMO array arrangement in which each of the arrangement of the three-element transmission array antenna and the three-element reception array antenna shown in basic arrangement 5 is defined as a base set and the arrangement positions of a plurality of the base sets are offset will be described.

Hereinafter, the case where the antenna arrangement shown in FIG. 92B is used as a base set will be described as an example. The antenna arrangement is not limited to the example shown in FIG. 92B and may be another antenna arrangement (for example, FIG. 92A, FIG. 92C, or FIG. 92D).

In the arrangement described below, the offset of the base set of the transmission array antenna with respect to the horizontal and vertical arrangement positions or the offset of the base set of the reception array antenna with respect to the horizontal and vertical arrangement positions may be set such that there are no overlap elements in the arrangement of a virtual reception array and more virtual array elements are densely arranged at a spacing of $D_V$ or $D_H$ around the center of the virtual reception array. Not limited to this configuration, when, for example, the arrangement in which an unequal spacing arrangement is increased in the arrangement of a virtual reception array or the arrangement in which virtual array elements overlap is increased in the arrangement of a virtual reception array, it can be achieved by adjusting the offset of the arrangement position similarly.

FIG. 107 shows an example of a MIMO array arrangement in the case where the number of base sets of the transmission array antenna is set to $N_{TxBaseSet}=2$ and the number of base sets of the reception array antenna is set to $N_{RxBaseSet}=1$ and an example of the arrangement of a virtual reception array. In FIG. 107, the offset of the horizontal arrangement position of the second base set (Tx #4, Tx #5, and Tx #6) with respect to the first base set (Tx #1, Tx #2, and Tx #3) is set to $D_{Hoffset\_TxBaseSet2}=3D_H$, and the offset of the vertical arrangement position of the second base set is set to $D_{Voffset\_TxBaseSet2}=0$. As shown in FIG. 107, with the arrangement in which the two base sets of the transmission array antenna are offset in the horizontal direction, the number of virtual array elements densely arranged at a spacing of $D_H$ in the horizontal direction can be increased, so angular resolution in the horizontal direction is improved.

FIG. 108 shows an example of a MIMO array arrangement in the case where the number of base sets of the transmission array antenna is set to $N_{TxBaseSet}=2$ and the number of base sets of the reception array antenna is set to $N_{RxBaseSet}=1$ and an example of the arrangement of a virtual reception array. In FIG. 108, the offset of the horizontal arrangement position of the second base set (Tx #4, Tx #5, and Tx #6) with respect to the first base set (Tx #1, Tx #2, and Tx #3) is set to $D_{Hoffset\_TxBaseSet2}=0$, and the offset of the vertical arrangement position of the second base set is set to $D_{Voffset\_TxBaseSet2}=3D_V$. As shown in FIG. 108, with the arrangement in which the two base sets of the transmission array antenna are offset in the vertical direction, the number of virtual array elements densely arranged at a spacing of $D_V$ in the vertical direction can be increased, so angular resolution in the horizontal direction is improved.

FIG. 109 shows an example of a MIMO array arrangement in the case where the number of base sets of the transmission array antenna is set to $N_{TxBaseSet}=1$ and the number of base sets of the reception array antenna is set to $N_{RxBaseSet}=2$ and an example of the arrangement of a virtual reception array. In FIG. 109, the offset of the horizontal arrangement position of the second base set (Rx #4, Rx #5, and Rx #6) with respect to the first base set (Rx #1, Rx #2, and Rx #3) is set to $D_{Hoffset\_RxBaseSet2}=3D_H$, and the offset of the vertical arrangement position of the second base set is set to $D_{Voffset\_RxBaseSet2}=0$. As shown in FIG. 109, with the arrangement in which the two base sets of the reception array antenna are offset in the horizontal direction, the number of virtual array elements densely arranged at a spacing of $D_H$ in the horizontal direction can be increased, so angular resolution in the horizontal direction is improved.

FIG. 110 shows an example of a MIMO array arrangement in the case where the number of base sets of the transmission array antenna is set to $N_{TxBaseSet}=1$ and the number of base sets of the reception array antenna is set to $N_{RxBaseSet}=2$ and an example of the arrangement of a virtual reception array. In FIG. 110, the offset of the horizontal arrangement position of the second base set (Rx #4, Rx #5, and Rx #6) with respect to the first base set (Rx #1, Rx #2, and Rx #3) is set to $D_{Hoffset\_RxBaseSet2}=0$, and the offset of the vertical arrangement position of the second base set is set to $D_{Voffset\_RxBaseSet2}=3D_V$. As shown in FIG. 110, with the arrangement in which the two base sets of the reception array antenna are offset in the vertical direction, the number of virtual array elements densely arranged at a spacing of $D_V$ in the vertical direction can be increased, so angular resolution in the vertical direction is improved.

FIG. 111 shows an example of a MIMO array arrangement in the case where the number of base sets of the transmission array antenna is set to $N_{TxBaseSet}=2$ and the number of base sets of the reception array antenna is set to $N_{RxBaseSet}=2$ and an example of the arrangement of a virtual reception array. In FIG. 111, with respect to the first base set (Tx #1, Tx #2, and Tx #3) of the transmission array antenna, the offset of the horizontal arrangement position of the second base set (Tx #4, Tx #5, and Tx #6) is set to $D_{Hoffset\_TxBaseSet2}=6D_H$, and the offset of the vertical arrangement position of the second base set is set to $D_{Voffset\_TxBaseSet2}=0$. In FIG. 111, the offset of the horizontal arrangement position of the second base set (Rx #4, Rx #5, and Rx #6) with respect to the first base set (Rx #1, Rx #2, and Rx #3) of the reception array antenna is set to $D_{Hoffset\_RxBaseSet2}=3D_H$, and the offset of the vertical arrangement position of the second base set is set to $D_{Voffset\_RxBaseSet2}=0$. As shown in FIG. 111, with the arrangement in which the two base sets of the transmission array antenna are offset in the horizontal direction and the arrangement in which the two base sets of the reception array antenna are offset in the horizontal direction, the number of virtual array elements densely arranged at a spacing of $D_H$ in the horizontal direction can be further increased as compared to, for example, FIG. 107 or FIG. 109, so angular resolution in the horizontal direction is further improved.

FIG. 112A shows an example of a MIMO array arrangement in the case where the number of base sets of the transmission array antenna is set to $N_{TxBaseSet}=2$ and the number of base sets of the reception array antenna is set to $N_{RxBaseSet}=4$. FIG. 112B shows an example of the arrangement of a virtual reception array.

In FIG. 112A, with respect to the first base set (Tx #1, Tx #2, and Tx #3) of the transmission array antenna, the offset of the horizontal arrangement position of the second base set (Tx #4, Tx #5, and Tx #6) is set to $D_{Hoffset\_TxBaseSet2}=3D_H$, and the offset of the vertical arrangement position of the second base set is set to $D_{Voffset\_TxBaseSet2}=0$.

In FIG. 112A, with respect to the first base set (for example, Rx #1, Rx #2, and Rx #3) of the reception array antenna, the offset of the horizontal arrangement position of the second base set (Rx #4, Rx #5, and Rx #6) is set to $D_{Hoffset\_RxBaseSet2}=-3D_H$, the offset of the vertical arrangement position of the second base set is set to $D_{Voffset\_RxBaseSet2}=-3D_V$, the offset of the horizontal arrangement position of the third base set (Rx #7, Rx #8, and Rx #9) is set to $D_{Hoffset\_RxBaseSet3}=6D_H$, the offset of the vertical arrangement position of the third base set is set to $D_{Voffset\_RxBaseSet3}=0$, the offset of the horizontal arrangement position of the fourth base set (Rx #10, Rx #11, and Rx #12) is set to $D_{Hoffset\_RxBaseSet4}=3D_H$, and the offset of the vertical arrangement position of the fourth base set is set to $D_{Voffset\_RxBaseSet4}=-3D_V$.

As shown in FIGS. 112A and 112B, with the arrangement in which the base sets of the transmission array antenna are offset in the horizontal direction and the arrangement in which the base sets of the reception array antenna are offset in the horizontal direction, the number of virtual array elements densely arranged at a spacing of $D_H$ in the horizontal direction can be further increased as compared to, for example, FIG. 107 or FIG. 109, so angular resolution in the horizontal direction is further improved.

Similarly, as shown in FIGS. 112A and 112B, with the arrangement in which the base sets of the reception array antenna are offset in the vertical direction, the number of virtual array elements densely arranged at a spacing of $D_V$ in the vertical direction can be increased, so angular resolution in the vertical direction is improved.

Each of the arrangement methods 5-1A, 5-1B, and 5-1C has been described above.

In each of the arrangement methods 5-1A, 5-1B, and 5-1C, the number ($N_{TxBaseSet}$) of base sets included in the transmission array antenna and the number ($N_{RxBaseSet}$) of base sets included in the reception array antenna are not limited to the above examples and may be other values.

The embodiments according to one embodiment of the present disclosure has been described above.

The operations according to the above-described embodiments and their variations may be carried out in combination as needed.

Other Embodiments

The number Nt of transmission antennas and the number Na of reception antennas are not limited to the above-described examples and may be other values. The spacing $D_V$ and the spacing $D_H$ are not limited to $0.5\lambda$, and may be, for example, a value greater than or equal to $0.5\lambda$, and less than or equal to $1\lambda$. $D_V$ and $D_H$ may be the same value or may be different values.

In the above-described embodiments, the case where a coded pulse radar is used has been described, and the present disclosure is also applicable to a radar system using a frequency-modulated pulse wave, like a chirped pulse radar.

In radar apparatus 10 shown in FIG. 4, radar transmitter 100 and radar receiver 200 may be individually arranged at physically remote locations.

Radar apparatus 10 according to an exemplary embodiment of the present disclosure includes, for example, a central processing unit (CPU), a storage medium such as a read only memory (ROM) that stores a control program, and a work memory such as a random access memory (RAM), although they are not illustrated. In this case, the functions of the sections described above are implemented by the CPU executing the control program. However, the hardware configuration of the radar apparatus is not limited to that in this example. For example, the functional sections of the radar apparatus may be implemented as an integrated circuit (IC). Each functional section may be formed as an individual chip, or some or all of them may be formed into a single chip.

The expression "section" used in the above-described embodiments may be replaced with another expression such as "circuit (circuitry)," "device," "unit," or "module."

Various embodiments have been described with reference to the drawings hereinabove. Obviously, the present disclosure is not limited to these examples. Obviously; a person skilled in the art would arrive variations and modification examples within a scope described in claims, and it is understood that these variations and modifications are within the technical scope of the present disclosure. Each constituent element of the above-mentioned embodiments may be combined optionally without departing from the spirit of the disclosure.

Each functional block used in the description of each embodiment described above is typically realized by an LSI, which is an integrated circuit. The integrated circuit controls each functional block used in the description of the above embodiments and may include an input terminal and an output terminal. The LSI may be individually formed as chips, or one chip may be formed so as to include a part or all of the functional blocks. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication (collectively referred to as a communication apparatus). Non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle provided with communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof. The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Summary of the Present Disclosure

A radar apparatus according to one embodiment of the present disclosure includes: a radar transmitter circuit that transmits a radar signal by using a transmission array antenna; and a radar receiver circuit that receives a reflected wave signal that is the radar signal reflected from a target by using a reception array: antenna, in which the transmission array antenna is made up of a plurality of transmission antenna groups, each of the plurality of transmission antenna groups includes a plurality of transmission antennas arranged at a second spacing that is an integer multiple of a first spacing in a first direction, the plurality of transmission antenna groups is arranged at a fourth spacing that is an integer multiple of a third spacing in a second direction perpendicular to the first direction, the reception array antenna is made up of a plurality of reception antenna groups, each of the plurality of reception antenna groups includes a plurality of reception antennas arranged at a fifth spacing that is an integer multiple of the first spacing in the first direction, the plurality of reception antenna groups is arranged at a sixth spacing that is an integer multiple of the third spacing in the second direction, a difference between the second spacing and the fifth spacing is the first spacing, and a difference between the fourth spacing and the sixth spacing is the third spacing.

In one embodiment of the present disclosure, arrangement positions, in the first direction, of the transmission antennas included in each transmission antenna group are different between the plurality of transmission antenna groups.

In one embodiment of the present disclosure, arrangement positions, in the first direction, of the reception antennas included in each reception antenna group are different between the plurality of reception antenna groups.

In one embodiment of the present disclosure, at least one of the second spacing and the fifth spacing is longer than one wavelength of the radar signal, at least one of the fourth spacing and the sixth spacing is longer than one wavelength of the radar signal, and the first spacing and the third spacing each are longer than or equal to a half wavelength of the radar signal and shorter than or equal to one wavelength of the radar signal.

In one embodiment of the present disclosure, the second spacing is twice as long as the first spacing, the fourth spacing is three times as long as the third spacing, the fifth spacing is three times as long as the first spacing, and the sixth spacing is twice as long as the third spacing.

In one embodiment of the present disclosure, the second spacing is three times as long as the first spacing, the fourth spacing is three times as long as the third spacing, the fifth spacing is twice as long as the first spacing, and the sixth spacing is twice as long as the third spacing.

A radar apparatus according to one embodiment of the present disclosure includes: a radar transmitter circuit that transmits a radar signal by using a transmission array antenna; and a radar receiver circuit that receives a reflected wave signal that is the radar signal reflected from a target by using a reception array antenna, in which the transmission array antenna includes at least three transmission antennas, and the reception array antenna includes at least three reception antennas, two of the three transmission antennas are arranged at a second spacing twice as long as a first spacing in a first direction, a remaining one of the three transmission antennas is arranged at the first spacing apart from each of the two transmission antennas in the first direction and arranged at a fourth spacing that is twice as long as a third spacing apart from the two transmission antennas in a second direction perpendicular to the first direction, two of the three reception antennas are arranged at the fourth spacing apart from each other in the second direction, and a remaining one of the three reception antennas is arranged at the third spacing apart from each of the two reception antennas in the second direction and arranged at the second spacing apart from the two reception antennas in the first direction.

In one embodiment of the present disclosure, the first spacing and the third spacing each are longer than or equal to a half wavelength of the radar signal and shorter than or equal to one wavelength of the radar signal.

A radar apparatus according to one embodiment of the present disclosure includes: a radar transmitter circuit that transmits a radar signal by using a transmission array antenna; and a radar receiver circuit that receives a reflected wave signal that is the radar signal reflected from a target by using a reception array antenna, in which the transmission array antenna is made up of a plurality of transmission antenna groups, and each of the plurality of transmission antenna groups includes a plurality of transmission antennas, in each of the plurality of transmission antenna groups, any adjacent two of the transmission antennas are arranged at a second spacing that is twice as long as a first spacing apart in a first direction and arranged at a third spacing apart in a second direction perpendicular to the first direction, of the plurality of transmission antenna groups, any adjacent transmission antenna groups are in a relationship shifted by the first spacing in the first direction and shifted by a fourth spacing twice as long as the third spacing in the second direction, and arrangement positions of the plurality of transmission antennas and arrangement positions of a plurality of reception antennas included in the reception array antenna are symmetric with respect to a line parallel to the first direction or the second direction.

In one embodiment of the present disclosure, the first spacing and the third spacing each are longer than or equal to a half wavelength of the radar signal and shorter than or equal to one wavelength of the radar signal.

A radar apparatus according to one embodiment of the present disclosure includes: a radar transmitter circuit that transmits a radar signal by using a transmission array antenna; and a radar receiver circuit that receives a reflected wave signal that is the radar signal reflected from a target by using a reception array antenna, in which the transmission array antenna is made up of a plurality of transmission antenna groups, and each of the plurality of transmission antenna groups includes a plurality of transmission antennas, in each of the plurality of transmission antenna groups, any adjacent two of the transmission antennas are arranged at a first spacing apart in a first direction and arranged at a second spacing in both of a second direction perpendicular to the first direction, of the plurality of transmission antenna groups, any adjacent transmission antenna groups are arranged at a third spacing that is twice as long as the first spacing apart in the first direction and in a relationship shifted by the second spacing in the second direction, and arrangement positions of the plurality of transmission antennas and arrangement positions of a plurality of reception antennas included in the reception array antenna are symmetric with respect to a line parallel to the first direction or the second direction.

In one embodiment of the present disclosure, the first spacing and the second spacing each are longer than or equal to a half wavelength of the radar signal and shorter than or equal to one wavelength of the radar signal.

The disclosure of Japanese Patent Application No. 2019-053751, filed Mar. 20, 2019, including the specification, drawings, and abstract, is incorporated herein by reference in its entirety.

INDUSTRIAL APPLICABILITY

The present disclosure is suitable as a radar apparatus that detects a target.

REFERENCE SIGNS LIST

10 Radar apparatus
100 Radar transmitter
200 Radar receiver
300 Reference signal generator
101, 101a Radar transmission signal generator
102 Code generator
103 Modulator
104 LPF
105 Transmission radio section
106 Transmission antenna
111 Code storage
112 DA converter
201 Antenna channel processor
202 Reception antenna
203 Receiving radio section
204 Amplifier
205 Frequency converter
206 Quadrature detector
207 Signal processor
208, 209 AD converter
210 Separator
211 Correlation operator
212 Adder
213 Doppler frequency analyzer
214 Direction estimator

The invention claimed is:

1. A radar apparatus comprising:
a radar transmitter circuit that transmits a radar signal by using a transmission array antenna; and
a radar receiver circuit that receives a reflected wave signal that is the radar signal reflected from a target by using a reception array antenna, wherein
the transmission array antenna includes a plurality of transmission antenna groups,
each of the plurality of transmission antenna groups includes a plurality of transmission antennas arranged at a second spacing that is a first integer multiple of a first spacing in a first direction,
a spacing at which each of the plurality of transmission antenna groups is arranged is a fourth spacing that is a second integer multiple of a third spacing in a second direction perpendicular to the first direction,
the reception array antenna is made up of a plurality of reception antenna groups,
each of the plurality of reception antenna groups includes a plurality of reception antennas arranged at a fifth spacing that is a third integer multiple of the first spacing in the first direction,
a spacing at which each of the plurality of reception antenna groups is arranged is a sixth spacing that is a fourth integer multiple of the third spacing in the second direction,
the first integer is smaller than the second integer, and
the third integer larger than the fourth integer.

2. The radar apparatus according to claim 1, wherein
a difference between the second spacing and the fifth spacing is the first spacing, and
a difference between the fourth spacing and the sixth spacing is the third spacing.

3. The radar apparatus according to claim 1, wherein
at least one of the second spacing and the fifth spacing is longer than one wavelength of the radar signal,
at least one of the fourth spacing and the sixth spacing is longer than one wavelength of the radar signal, and
the first spacing and the third spacing each are longer than or equal to a half wavelength of the radar signal and shorter than or equal to one wavelength of the radar signal.

4. The radar apparatus according to claim 1, wherein
the second spacing is twice as long as the first spacing,
the fourth spacing is three times as long as the third spacing,
the fifth spacing is three times as long as the first spacing, and
the sixth spacing is twice as long as the third spacing.

5. The radar apparatus according to claim 1, wherein
the second spacing is three times as long as the first spacing,
the fourth spacing is three times as long as the third spacing,
the fifth spacing is twice as long as the first spacing, and
the sixth spacing is twice as long as the third spacing.

6. The radar apparatus according to claim 1, wherein the first spacing is equal to the third spacing.

7. The radar apparatus according to claim 1, wherein the first integer is smaller than the third integer.

8. The radar apparatus according to claim 1, wherein a ratio of the second integer to the first integer is equal to a ratio of the third integer to the fourth integer.

9. The radar apparatus according to claim 8, wherein the ratio of the second integer to the first integer is three to two.

10. The radar apparatus according to claim 8, wherein the first integer is equal to the fourth integer, and the second integer is equal to the third integer.

* * * * *